United States Patent [19]
Wang

[11] Patent Number: 4,920,492
[45] Date of Patent: Apr. 24, 1990

[54] METHOD OF INPUTTING CHINESE CHARACTERS AND KEYBOARD FOR USE WITH SAME

[75] Inventor: Jeff Wang, Taipei, Taiwan

[73] Assignee: Buck S. Tsai, Taipei, Taiwan; a part interest

[21] Appl. No.: 127,069

[22] Filed: Dec. 1, 1987

[30] Foreign Application Priority Data

Jun. 22, 1987 [CN] China ................................ 76103564

[51] Int. Cl.$^5$ ................................................ G06F 15/38

[52] U.S. Cl. .................................... 364/419; 400/110; 400/484

[58] Field of Search ....................... 400/110, 484, 489; 364/419, 200 MS File, 900 MS File

[56] References Cited

U.S. PATENT DOCUMENTS 4,270,022 5/1981 Loh ................................ 400/110 X
4,327,421 4/1982 Wang ................................ 364/900
4,379,288 4/1983 Leung ............................ 400/110 X
4,505,602 3/1985 Wong ................................ 400/110
4,602,878 7/1986 Merner ............................... 400/110
4,669,901 6/1987 Feng ................................. 400/484
4,684,926 8/1987 Yong-Min ...................... 400/110 X
4,689,743 8/1987 Chiu .................................. 364/419

*Primary Examiner*—Jerry Smith
*Assistant Examiner*—Steven Kibby
*Attorney, Agent, or Firm*—Ladas & Parry

[57] ABSTRACT

An improved method for inputting Chinese characters into computers and the keyboard arrangement therefor wherein the Chinese characters, of which the numbers are enormous and the structures are complicated, are reduced to obtain only a few rules for inputting Chinese characters and the 244 radicals are allocated on a standard keyboard.

The present inputting method is based on "stroke orders". The manner in which the characters are input conforms with general writing habits such that the method is easy and convenient for an operator to learn fast.

2 Claims, 4 Drawing Sheets

METHOD OF INPUTTING CHINESE CHARACTERS AND KEYBOARD FOR USE WITH SAME

The present invention relates to an improved method for inputting Chinese characters into computers and the keyboard arrangement therefor wherein the Chinese characters, of which the numbers are enormous and the structures are complicated, are reduced to obtain only a few rules for inputting Chinese characters and the 244 radicals are allocated on a standard keyboard.

BACKGROUND OF THE INVENTION

For many years, the applicatnt has devoted himself to the study of the characteristics such as shapes, sounds, meanings, and stroke orders of the Chinese characters and developed the present "stroke order" based Chinese Information Inputting Method" and the keyboard therefor. It is believed that Chinese data processing should be computerized and the speed of operation increased but not at the expense of the tradition and the beauty of the Chinese characters. With the present inputting method, in addition to achieving the objects of fast and convenient operation, the tradition according to which the Chinese characters have been evolved is not overlooked.

SUMMARY OF THE INVENTION

The present inputting method consists of:

1. Code Indexing Rules for the Chinese Inputting Method in which:
   (1) Considering the stroke orders, a character is indexed according to its radical that covers most strokes (i.e., to make the code as simple as possible) and the strokes that have been indexed are not repeated; each of the characters being indexed with four codes, i.e., a first, a second, a third, and a last code (1, 2, 3, . . . N) with others omitted;
   (2) In case the discontinued strokes of a character constitute a radical, said character should be indexed by using said radical crossed with the other strokes when fewer number of codes for the character can be obtained, thus

| | | | | | | |
|---|---|---|---|---|---|---|
| □ | | | | | | |

(3) In case a character, or a part thereof, is divided into symmetrical right and left sides, the strokes in the middle portion are written first, then the strokes in the sides, thus
   "  " in
   "  " in
   "  " in
   With this rule, however, there are four exceptions, i.e., characters with "  ", "  ", "  " or "  " in the sides are written from left to right as usual. Examples are:  ,  ,  , etc.;
   (4) In case a single radical of a character encloses the remaining strokes, the character shall be written in the following manner:
   a. The radical which encloses on four sides is written first, such as:  ;
   b. The radical which encloses on three sides with an opening facing down, left or right is written first, such as:  ,  ; if opening facing up, said radical is written after the enclosed strokes such as:  ;
   c. The radical which encloses on two side and is located on the upper left or upper right corner is written first, such as:  ,  ; and when the radical is located on the lower left or lower right corner, the enclosed strokes are written first, then the radical, such as:  ,  ; and
   d. In other shapes, when the stroke (or strokes) which encloses other strokes is not a radical, the character is written from left to right and from up to down, that is, in the usual manner, such as:  ,  ,  , and  .
   (5) Radicals of  ,  ,  ,  , and  are defined as follows:
   a. When radicals of "  " and "  " are crossed with other strokes before the last stroke of the radicals is completed, they are indexed directly as "  " or "  ", such as "  " and "  "; otherwise, they are indexed as "  ", such as "  " and "  ";
   b. For the radical of "  " crossed with other strokes, it is indexed as "  " instead of being indexed as "  ". For example, in character "  ", "  " not "  " is used for indexing; and
   c. For characters with the radical of "  ", the portion of "  " with the strokes contained therein is indexed only as "  " without regard to the other strokes whatever being included in the configuration of the radical.

With the present Chinese inputting method, code indexing of the enormous number of complicated Chinese characters is simplified by using only five input indexing rules which are well-defined and consistent. Also, each rule conforms with the others. For example, in Rule 2, "In case the discontinued strokes of a character constitute a radical, said character should be indexed by using said radical crossed with the other strokes when fewer number of codes for the character can be obtained, thus is indexed by taking
  is indexed by taking which are in exact conformation with of Rule 4 which defines radicals enclosing on four or three sides.

It is extremely important that the codes are indexed in strict accordance with the indexing rules or code indexing of the characters would become a pure memory job just like the case with the irregular verbs in English. The method adopted by a local software company which has the largest market share has numerous cases of irrgular indexing. For example, according to the aforementioned method, is indexed by using  but
  is indexed by using  :

With the construction of the Chinese characters being rather erratic, if there is no definite rules to follow, the user will find it even more difficult in indexing the characters. Consider the two aforementioned characters, according to the present Ta Yi inputting method, is indexed by using  and
  is indexed by using  .

TABLE 1 is a list of keystrokes for each key.

TABLE 2 is a list of statistics for the number of input code.

ATTACHMENT 1 is a table for filing of the codes of Chinese characters.

ATTACHMENT 2 is a list of the repeated characters.

DESCRIPTION OF THE DRAWINGS

In Table 1, a list of the combination of the Radicals used in the present Chinese Inputting Method is shown.

In the present Chinese inputting method, every radical is definitely established so that there will be no confusion or doubt in indexing any character and the radical, in turn, is classified according to shape of the strokes and attributes. The radicals are grouped into families and very neatly arranged so that they are not only consistent with the tradition of the Chinese characters but also convenient for the user to remember. Further, the radicals are established taking into account the different ways in which the Chinese characters are recognized and written between individual users. For example:

"  " is written as "  " by some users;

"  " is usually written as "  "; and

"  " is usually written as "  ".

When this happens, the indexing code will be identical according to the Ta Yi method no matter which way the character is written.

Figure 1:
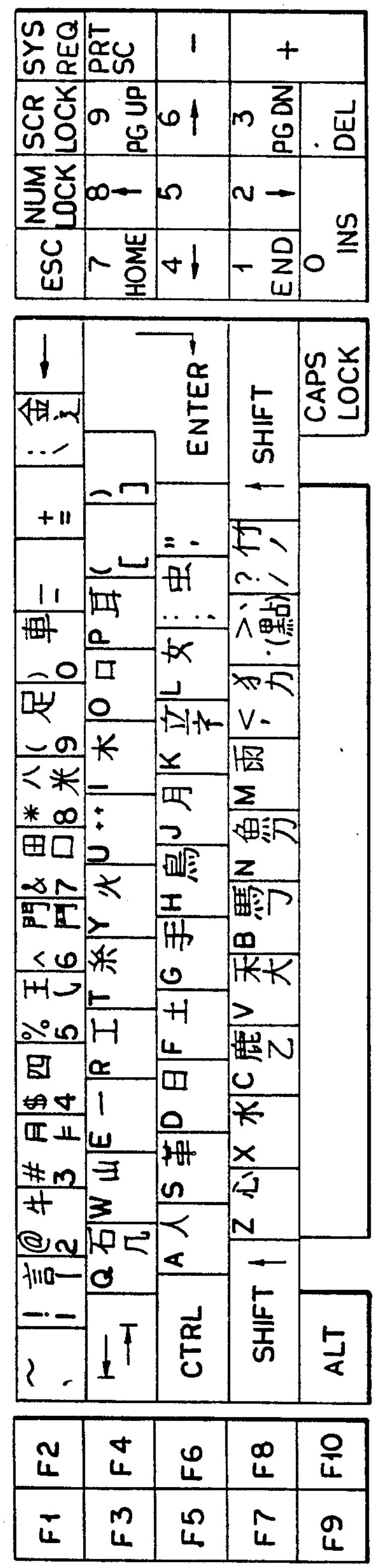
FIG. 1 is a layout of the keyboard arrangement.

In FIG. 1, a layout of the keyboard arrangement is shown.

The keyboard arrangement for the present Chinese Data Inputting Method is constructed according to the general systems and a standard keyboard is used so that the method can be applied in connection with conventional system programs and keyboard. Thus, the Chinese language system can be operated by using the present Chinese data inputting method without difficulty so long as the system software or program packages are provided with a structure capable of functioning as shown in the flow chart of FIG. 2. Therefore, a substantial saving of costs can be obtained by not replacing the system and the keyboard. In the present inputting method, all the 244 radicals are allocated on the 41 keys by a statistical approach in which the frequency of usage of each of the radicals is carefully calculated so that the radicals are allocated on the proper keys according to their respective frequencies of usage. For example, the radicals in the less frequently used group are allocated on the keys operated by the less dexterous little fingers or the figure keys in the uppermost row. The speed of inputting can also be increased accordingly, as is shown in detail in Table 2. In addition, the 41 groups of the radicals are so arranged that in each group, the chances of the distribution on the first and the last codes are approximately the same so as to minimize the chances of repeated codes.

In Attachment 1, the code file of the present Glossary of Chinese Characters is shown. Efforts have been made by the Applicant to calculate and analyze the keystrokes required for all the indexed input codes of some 13,804 Chinese characters included in the glossary for the present inputting method and found the following results:

(1) The number of codes per character averaged 3.61, as is shown in detail in Table 3, for the characters use in the present inputting method and 3.35 for those commonly used in local newspapers.

(2) In the approximately 13,804 characters included in the Attachment, there are a total of 1,280 repeated characters giving a repetition percentage of 9.28; most of the repetition involve only two characters. When it is programmed that "in case if characters repeated, the commonly used one will be the first to be read automatically", the repetition cases are thus lowered to an insignificant 4.5% (see Attachment II: A List of Repeated Characters for the present Chinese Inputting Method).

(3) Using the present inputting method, 61% of the characters may each be completed with no more than four codes while a maximum of 85% of the characters with less than 13 strokes (average number of strokes per character for all Chinese characters is about 13.3) may be written in the same manner. Of the some 13,804 characters, 88 may be written with one stroke; 805, with two strokes; 3,498, with three strokes and; 9,413, with four strokes.

In the above total, there are included variants and characters which may be written in two or more ways.

Figure 2:
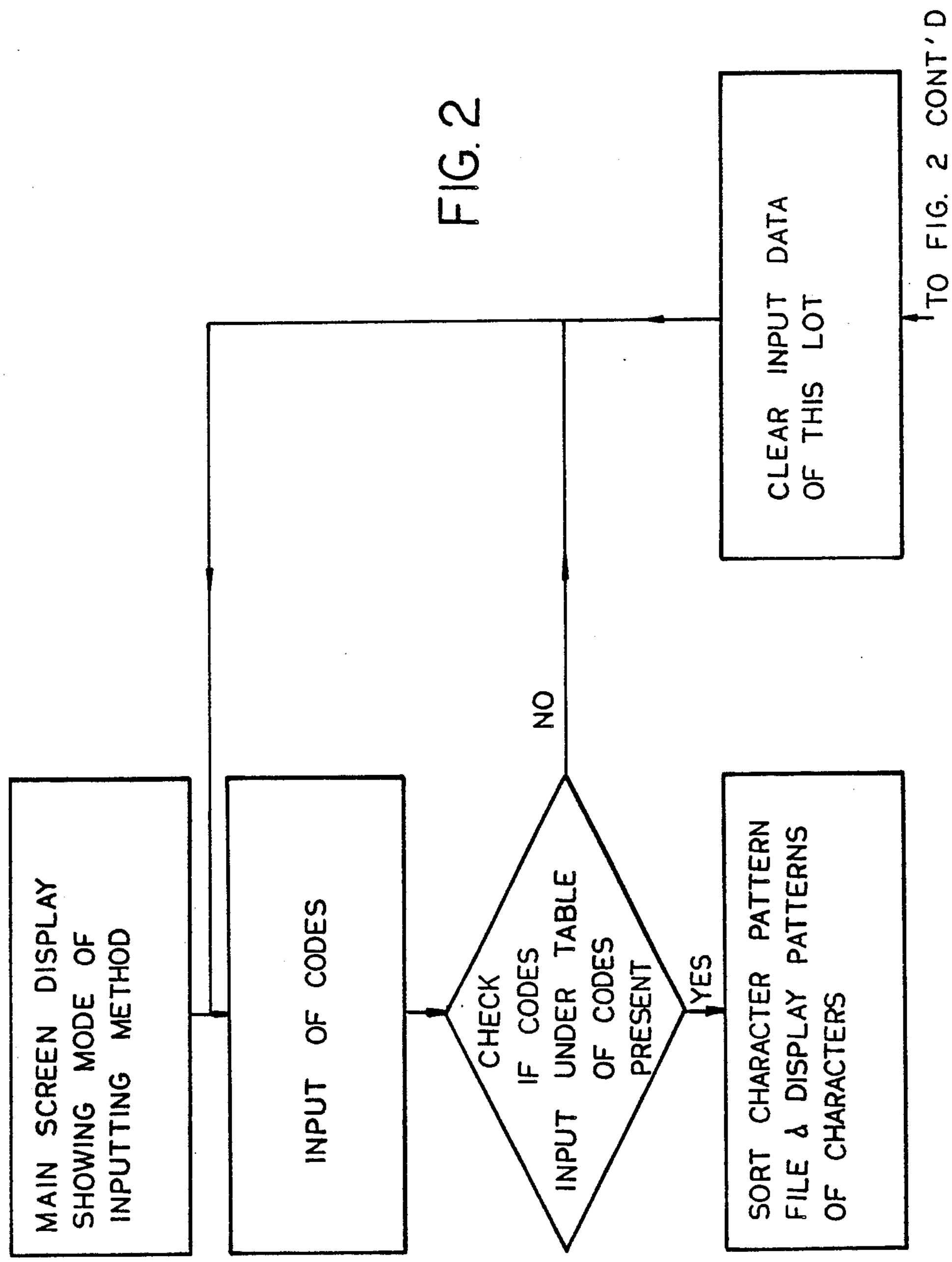
FIG. 2 is a flow chart of data input of Chinese characters.
Figure 2:
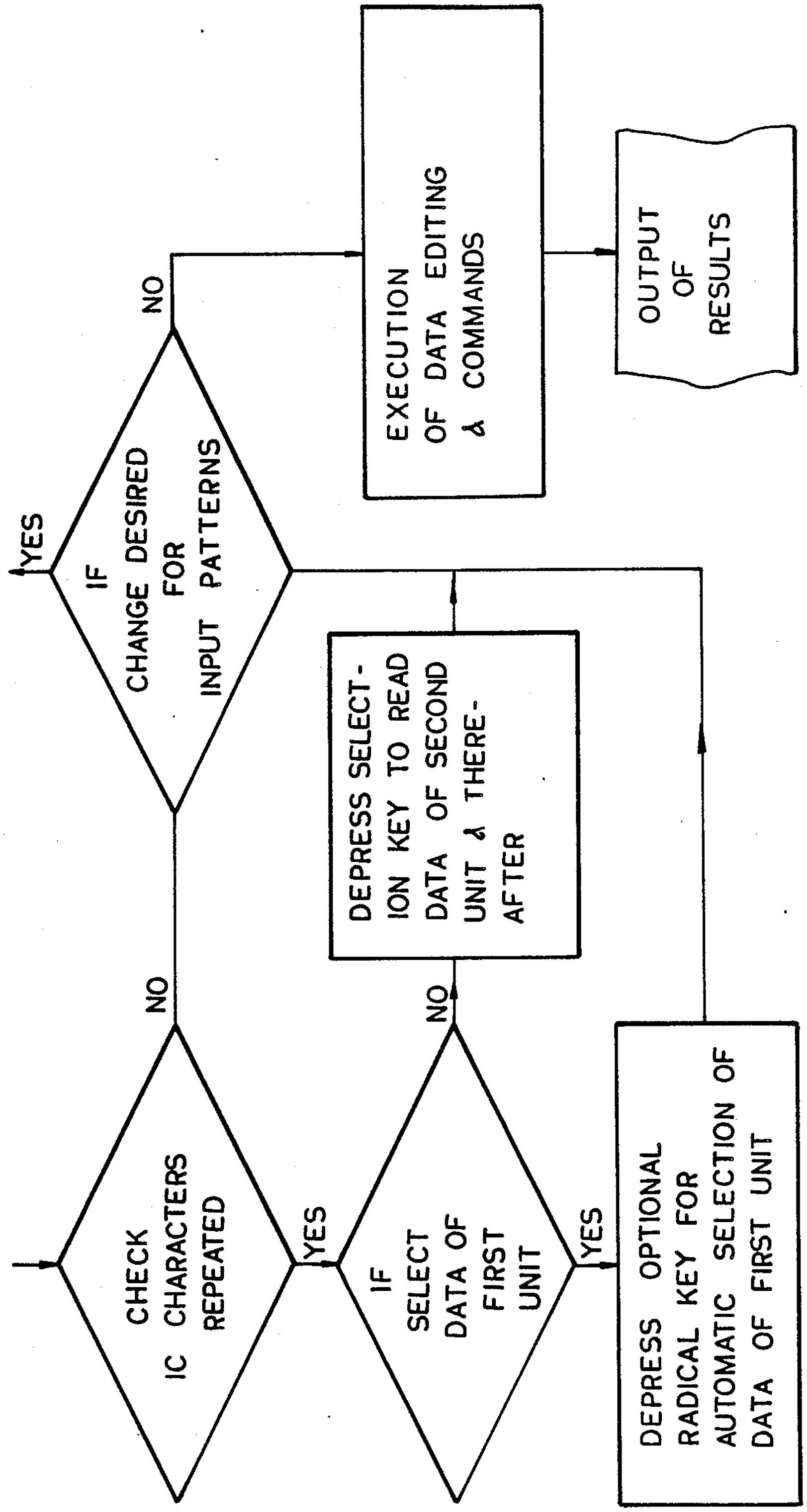
Figure 3:
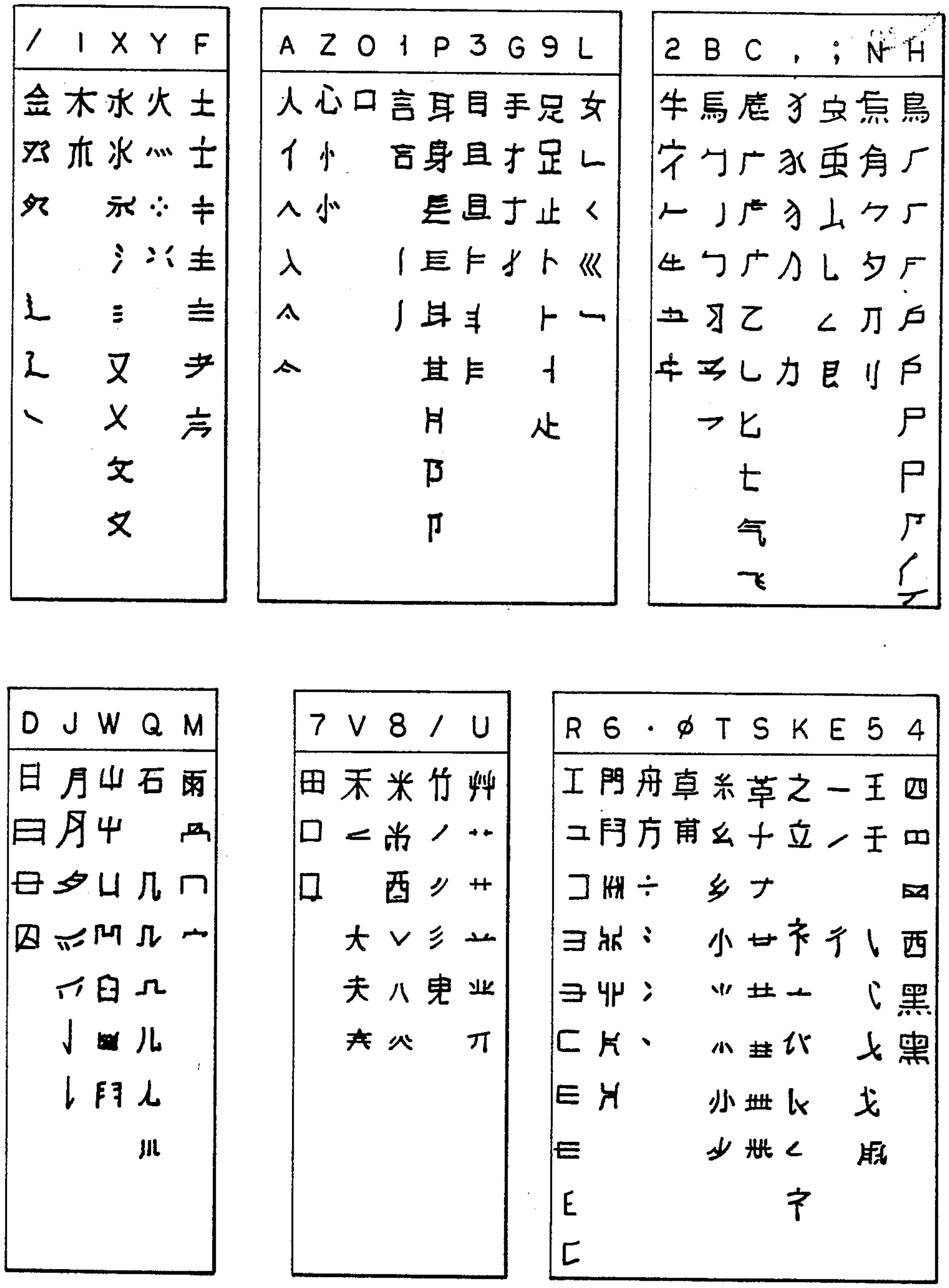
FIG. 3 is a list of radical combination for the present Chinese inputting method.

In FIG. 2, the flow chart of data input of Chinese characters is shown. The most difficult part lies in the treatment of preventing repetition. However, the problem of repeated input code groups is inevitable when Chinese characters are input by using the radical method, such as   and  ;   and  ;   and  ; etc., unless another code is added for discriminating one character from another of similar shape and configuration. This, however, will increase the number of codes and, hence, must result in greatly reduced speed at which the characters are input. Therefore, the treatment of the repeated characters is extremely important. Of the some 13,804 characters included in the glossary of the present Chinese Inputting Method", there are 1,280 characters which are similar one with another in some way and referred to as "repeated characters". The rate of repetition is about 9.28% and most cases of repetition involve two characters. If the system is enabled to automatically read the first of the similar characters which are indexed with the same repeated codes (that is to say, the most commonly used one of the similar characters is arranged to be the first in order), the rate of repetition will be lowered to about 4.5%. Then, the system is provided with a correction function by using the backspace key for the case where a non-commonly used character is input. The method is that an entire group of the similar characters with the same repeated codes are listed and displayed at the twenty-sixth row on the lower portion of the screen for selection, while the most commonly used one of the similar characters is arranged at the first place. When the selected character is the first one, the code of the next character can be kept by depressing the keyboard as an input. In the mean time, said first repeated character has already jumped into the edit area of the screen automatically without the need of the selection key. If the selected character of repetition is the second or the one after that, selection can be performed by depressing the area of the digit keys at the lower right portion. Function of the present inputting method as compared to other methods:

The present Chinese Inputting Method incorporates general writing habits into its indexing rules. In operation, one thus does not have to "consider the shape of a character before indexing and, then analyze and disassemble the radical", or "to index like playing jigsaw puzzles", as is necessary for other methods. With the present method, the codes of characters are "indexed" or "written" in a natural manner. Results obtained from many experiments have demonstrated that with the present Chinese Inputting Method", the strokes of a character are "taken out" for indexing in a natural way much like the way in which one would think to "write" the strokes with a pen; each keystroke being equal to writing an average of four strokes. The present inputting method interferes with the thinking of the operator to the least extent and with the present method, in contrast to conventional inputting methods, lengthy operation does not cause loss of accuracy.

Following is a comparision, by way of examples, between the present Inputting Method and known conventional inputting methods:

| CHARACTER | OTHER INPUTTING METHODS | PRESENT INPUTTING METHOD |
|---|---|---|
| | (5 codes, not completed) | (3 codes, completed) |
| | (5 codes, not completed) | (3 codes, completed) |
| | (4 codes, not completed) | (4 codes, completed) |
| | (3 codes, completed) | (2 codes, completed) |
| | (5 codes, not completed) | (4 codes, completed) |
| | (4 codes, not completed) | (4 codes, completed) |
| | (4 codes, not completed) | (4 codes, completed) |
| | (2 codes, not completed) | (1 code) |
| | (4 codes, not completed) | (4 codes, completed) |
| | (4 codes, not completed) | (4 codes, not completed) |
| | (3 codes, not completed) | (4 codes, completed) |
| | (4 codes, not completed) | (2 codes, completed) |
| | (4 codes, not completed) | (3 codes, completed) |
| | (4 codes, not completed) | (4 codes, completed) |

The present inputting method has the following features:

1. Characters can be input quickly and accurately in a way which keeps up the tradition of the Chinese characters,
2. Fewer keys are used, shift operation is not necessary, each character can be input with an average of 3.61 codes, and rate of repetition is low; the method being thus highly practical;
3. The method is easy to learn, the operation conforms with the mode of thinking (or response) of the Chinese, the method is thus suitable for users of various levels and sectors; for ordinary users inexperienced in processing Chinese and with an educational background at high school level, an average of about one hour of practice is sufficient to enable them to actually work on the computer inputting Chinese.

In addition, the present inputting method, by having low rate of repetition and minimizing the number of codes required for indexing each character (as described hereinbefore, Chinese characters, as a whole, averaged 3.61 codes per character), provides optimal conditions for developing Chinese language data processing on computers. In other words, the Chinese language can be treated using not only "characters" but also "phrases" (or "expressions") as the input units. In fact, one of the characteristics of the Chinese language is the high flexibility of combining characters into phrases which correspond to the English words. For example, "  " (country, nation)
"  " (building)
"  " (structure, building)

Accordingly, it is highly advantageous that there are more than 2.8 million different arrangements (414) possible for the 41 radicals used in the present. Chinese Inputting Methods which may well contain tens of thousands of the frequently used and less frequently used phrases and all the characters for everyday use and still maintain a very low rate of repetition. When inputting "phrases, according to the present method, phrases consisting of two characters are indexed by taking the first codes of both characters while phrases consisting of three or more characters are indexed by taking the first code of each of the characters and the last code of the last character so that there will be no more than four codes for any character and the strokes that have been taken for indexing will not be repeated. With the present inputting method, encouraging results that Chinese can be input at a speed of 75 units/min have been obtained. That is to say, when the character is used as the input unit Chinese data can be input at a speed of 75 characters/min; when both characters and phrases are used as the input unit, they can be input at a speed of as high as 110 characters/min.

TABLE 1

LIST OF KEYSTROKES FOR EACH KEY

| KEY | KEYSTROKES | KEY | KEYSTROKES |
|---|---|---|---|
| , | 1684 | H | 1333 |
| . | 1216 | I | 1378 |
| / | 1275 | J | 1238 |
| 0 | 257 | K | 1570 |
| 1 | 1304 | L | 815 |
| 2 | 692 | M | 1600 |
| 3 | 718 | N | 1097 |
| 4 | 469 | O | 2586 |
| 5 | 762 | P | 742 |
| 6 | 231 | Q | 860 |
| 7 | 674 | R | 1362 |
| 8 | 1567 | S | 1401 |
| 9 | 809 | T | 1006 |
| ; | 1070 | U | 1852 |
| A | 1918 | V | 1276 |
| B | 1589 | W | 802 |
| C | 1458 | X | 2305 |
| D | 1568 | Y | 650 |
| E | 2417 | Z | 592 |
| F | 1956 | | 931 |
| G | 884 | | |
| Total Keyboard = 49844 | | | |

TABLE 2

LIST OF STATISTICS FOR THE NUMBERS OF INPUT CODE

| | numbers of the characters | | keystroke |
|---|---|---|---|
| keyed with one code | 88 | × 1 = | 88 |
| keyed with two codes | 805 | × 2 = | 1,610 |
| keyed with three codes | 3,498 | × 3 = | 10,494 |
| keyed with four codes | 9,413 | × 4 = | 37,652 |
| Total | 13,804 | | 49,844 |

Average keystrokes per character = 3.610

ATTACHMENT 1 TABLE FOR FILING OF THE CODES OF CHINESE CHARACTERS

| | | | | | | | | | | | |
|---|---|---|---|---|---|---|---|---|---|---|---|
| , | 力 | ,,, | 劦 | ,,,J | 脅 | ,,,L | 妿 | ,,,Z | 勰 | ,.RK | 狼 |
| ,/9\ | 狿 | ,/C | 犰 | ,/D1 | 狎 | ,/DS | 狎 | ,/DX | 獤 | ,0G. | 猼 |
| ,0H1 | 獑 | ,1 | 狺 | ,1RX | 獀 | ,1V. | 獄 | ,1VH | 鸑 | ,1WX | 獀 |
| ,2C | 犵 | ,2E | 狌 | ,2MN | 獬 | ,33X | 獲 | ,38 | 狽 | ,4B; | 獨 |
| ,4EK | 獧 | ,4TF | 玀 | ,5 | 狂 | ,5 | 狂 | ,5H | 獒 | ,5\ | 逛 |
| ,7EK | 猥 | ,88 | 猶 | ,8X | 獥 | ,9H5 | 獮 | ,;8X | 狻 | ,;Q | 狁 |
| ,A4D | 獪 | ,AB. | 狑 | ,AI | 狳 | ,AOA | 獫 | ,ARO | 獊 | ,ARV | 猴 |
| ,ASO | 猞 | ,B,I | 猱 | ,B,O | 獝 | ,BC | 犯 | ,BF | 狃 | ,BFW | 猸 |
| ,BGT | 猻 | ,BGU | 猛 | ,BO | 狗 | ,CCF | 狴 | ,CQ | 猇 | ,CS8 | 獏 |
| ,D1 | 狎 | ,D2E | 猩 | ,D4X | 猨 | ,DBL | 猲 | ,DCC | 猑 | ,DD | 猖 |
| ,DE | 狚 | ,DF | 狸 | ,DI | 猓 | ,E8X | 獼 | ,EDE | 狟 | ,EET | 狋 |
| ,ES | 犴 | ,ES5 | 狨 | ,FC | 狫 | ,FD | 豬 | ,FFQ | 獟 | ,FJ | 猜 |
| ,FNV | 猰 | ,FO | 狤 | ,FOK | 猿 | ,GH1 | 狾 | ,H/T | 獂 | ,H3X | 獿 |
| ,H9E | 狉 | ,H;\ | 狐 | ,HC | 狔 | ,HEX | 猳 | ,HJ | 猏 | ,HJX | 獶 |
| ,HMU | 猵 | ,HR1 | 獅 | ,HUA | 獗 | ,IO8 | 獺 | ,J2W | 猺 | ,JE | 狙 |
| ,JRJ | 猙 | ,K8X | 狡 | ,K9 | 犿 | ,KAS | 猝 | ,KDF | 獞 | ,KDQ | 獍 |
| ,KDS | 獐 | ,KOK | 獽 | ,KQ | 犺 | ,L45 | 獵 | ,L75 | 獵 | ,LD5 | 獵 |
| ,M8 | 狖 | ,MEO | 狪 | ,MEU | 獳 | ,MF1 | 獳 | ,MG. | 狩 | ,MH1 | 獳 |
| ,MJ | 猾 | ,MO | 猧 | ,MUE | 獳 | ,MZJ | 狰 | ,N, | 豫 | ,NN2 | 獬 |
| ,O | 加 | ,O1 | 狆 | ,O38 | 賀 | ,OB | 駕 | ,OEJ | 智 | ,OH | 駕 |
| ,OI | 架 | ,OJ | 狷 | ,OKK | 袈 | ,OOX | 獼 | ,OVC | 犁 | ,O\ | 迦 |
| ,Q; | 瘋 | ,QY | 狣 | ,R5 | 狘 | ,RB1 | 狒 | ,RBX | 獮 | ,RG | 犽 |
| ,RJ/ | 犽 | ,RK | 狠 | ,S78 | 獚 | ,SE8 | 獚 | ,SO | 狜 | ,SOJ | 猢 |
| ,UAX | 獲 | ,UDL | 獦 | ,UO1 | 獰 | ,UOF | 獾 | ,UUV | 獛 | ,V4 | 獯 |
| ,V8T | 獠 | ,VAA | 狹 | ,VAO | 獢 | ,VEJ | 猗 | ,VN | 猁 | ,VV | 獉 |
| ,WBY | 獡 | ,WQ | 猊 | ,XS1 | 狶 | ,XT/ | 猀 | ,XWX | 猨 | ,Y | 狄 |
| ,YZ | 悐 | ,Y\ | 逖 | . | 方 | . | 舟 | .. | 舫 | ./BP | 鄰 |
| ./BY | 為 | ./D | 舶 | ./D5 | 艎 | ./QY | 艞 | .1.1 | 州 | .1RX | 艘 |
| .1WX | 艘 | .22E | 旌 | .22H | 鶩 | .22V | 族 | .23 | 舴 | .24T | 艨 |
| .2A. | 旍 | .2AD | 旛 | .2B9 | 旋 | .2BC | 施 | .2BG | 斿 | .2B\ | 遊 |
| .2H1 | 旂 | .2HC | 旎 | .2J7 | 旟 | .2K1 | 旆 | .2KQ | 旐 | .2MK | 旃 |
| .2P8 | 旗 | .2Q | 洗 | .2Q | 斻 | .2QY | 旒 | .2RJ | 膂 | .2RK | 旅 |
| .2SM | 旆 | .2TJ | 旓 | .2U\ | 旞 | .2VC | 旄 | .2VJ | 旖 | .2W8 | 旝 |
| .4F | 壐 | .5\ | 艇 | .7S | 舳 | .7SO | 涸 | .8O | 船 | .;J | 朗 |
| .;JF | 塱 | .;N | 剆 | .;NA | 欴 | .;O | 冶 | .;P | 郎 | .A. | 於 |
| .AB. | 冷 | .AB. | 舲 | .AI | 艅 | .AKF | 准 | .AKX | 艛 | .AO | 冶 |
| .ARO | 艙 | .ARO | 滄 | .B | 馮 | .BGU | 艋 | .BZ | 憑 | .C29 | 凝 |
| .C7, | 艫 | .C7U | 艫 | .D1 | 舺 | .D3 | 艒 | .DOL | 艭 | .E7D | 艚 |
| .EJ. | 舨 | .EN | 冱 | .ENN | 冽 | .EOJ | 舸 | .ERL | 凄 | .F8X | 凌 |
| .FJ | 清 | .H | 鵃 | .HMU | 艑 | .HVC | 艉 | .HX | 舨 | .ID | 凍 |
| .JBG | 艀 | .JRJ | 淨 | .K7V | 凜 | .K8. | 艕 | .K8P | 艏 | .KDF | 艟 |
| .KQ | 航 | .KT | 舷 | .MC | 舵 | .MFO | 凋 | .N | 舠 | .NA | 次 |
| .NA. | 瓷 | .NA8 | 資 | .NA8 | 粢 | .NAI | 栥 | .NAI | 粢 | .NAK | 瓷 |
| .NAL | 姿 | .NAO | 咨 | .NAV | 粢 | .NAZ | 恣 | .NO. | 艤 | .O1 | 舯 |
| .OQ | 況 | .P | 邡 | .P81 | 澌 | .QO | 船 | .QX | 般 | .QX1 | 幋 |
| .QXG | 搫 | .QXI | 槃 | .QXK | 褩 | .QXL | 鞶 | .QXQ | 磐 | .QXS | 鞶 |
| .QXT | 縏 | .QXU | 盤 | .R | 舡 | .R1C | 肥 | .R1U | 艦 | .R1Y | 凞 |
| .RK | 良 | .S | 斗 | .S8 | 舼 | .SLI | 艓 | .SM1 | 艣 | .SRL | 淒 |
| .SX. | 汳 | .TJ | 艄 | .TM7 | 艢 | .U/3 | 艏 | .U8U | 艗 | .UF5 | 艤 |
| .UFR | 艖 | .UM, | 艨 | .VEB | 舿 | .W | 舢 | .WAF | 淮 | .X | 永 |

| | | | | | | | | | | | |
|---|---|---|---|---|---|---|---|---|---|---|---|
| .X | 放 | .X | 冰 | .X2 | 觪 | .XD | 祖 | .XF | 觪 | .XWX | 蝃 |
| .\ | 涂 | / | 竹 | /, | 芳 | /,O | 笳 | /.2C | 箷 | /.2V | 簇 |
| /.A. | 箖 | /.BY | 為 | /.RK | 筫 | /.RU | 篕 | //3\ | 籩 | //7C | 篦 |
| //9\ | 筵 | //B/ | 第 | //BX | 笈 | //D1 | 箄 | //D5 | 篁 | //DS | 箄 |
| /0BC | 範 | /0MU | 箮 | /0NA | 簸 | /1J. | 簋 | /23 | 笮 | /2E | 笙 |
| /2O | 箸 | /2O\ | 箔 | /2Q | 筅 | /2Q8 | 籛 | /3 | 自 | /3, | 臬 |
| /3/, | 臬 | /37. | 鼫 | /37C | 鼽 | /37C | 鼿 | /37E | 鼾 | /37K | 齉 |
| /37K | 齉 | /37L | 齃 | /37N | 劓 | /37O | 鼩 | /37S | 鼾 | /37U | 鼻 |
| /37X | 齂 | /3AA | 臬 | /3I | 臬 | /3I. | 鼽 | /3IC | 齆 | /3IH | 鵖 |
| /3M\ | 邊 | /3P | 郎 | /3Q | 覓 | /3T/ | 篰 | /3U | 算 | /3V. | 臭 |
| /3V; | 篡 | /3VC | 暮 | /3VT | 纂 | /3Z | 息 | /3ZP | 鄎 | /4, | 眾 |
| /4AA | 眾 | /4DS | 簟 | /4ET | 簾 | /4F. | 籈 | /4FS | 睪 | /4H5 | 篾 |
| /4I | 棄 | /4TF | 籬 | /5U | 筭 | /5\ | 筵 | /6/1 | 篺 | /6/S | 篺 |
| /6D | 簡 | /6I4 | 籣 | /6KX | 篋 | /7/. | 囪 | /7/B | 粵 | /7/\ | 囪 |
| /7E5 | 篋 | /7NZ | 匆 | /7NZ | 匆 | /7S | 笛 | /7SO | 箇 | /7U | 算 |
| /7V | 箘 | /7X | 囟 | /7X | 篋 | /9O | 苫 | /9XO | 簬 | /9\ | 延 |
| /9\; | 筌 | /9\P | 郷 | /; | 鬼 | /; | 厶 | /;.S | 魁 | /;4T | 魘 |
| /;;/ | 篸 | /;AF | 魋 | /;CU | 魑 | /;E5 | 魃 | /;EA | 魎 | /;EI | 魅 |
| /;H1 | 魮 | /;K; | 魍 | /;ML | 魍 | /;O | 笞 | /;P | 節 | /;P8 | 魌 |
| /;R5 | 魆 | /;S. | 魃 | /;SX | 魃 | /;T5 | 魕 | /;TJ | 魈 | /;U | 笄 |
| /A1I | 篠 | /A1X | 筱 | /A23 | 筰 | /AA5 | 籛 | /AB | 笒 | /AB. | 笒 |
| /AE5 | 筏 | /AEX | 箯 | /AF | 筌 | /AFJ | 簰 | /AG. | 符 | /AI | 笨 |
| /AO | 答 | /AO8 | 籲 | /AOA | 簽 | /AON | 劄 | /AOU | 籥 | /ARV | 篌 |
| /B | 篤 | /B. | 笱 | /B.F | 箭 | /B/ | 笏 | /BB | 乃 | /BB5 | 戳 |
| /BB6 | 鼐 | /BBA | 笈 | /BBF | 籦 | /BBG | 孕 | /BBI | 朵 | /BBN | 剁 |
| /BBT | 孬 | /BBU | 盈 | /BBX | 夃 | /BD | 筍 | /BEE | 笱 | /BEO | 笥 |
| /BG\ | 箛 | /BO | 笱 | /BRC | 箢 | /BWW | 翁 | /BX | 及 | /BXY | 箂 |
| /C | 九 | /C | 篚 | /C. | 丸 | /C.L | 尬 | /C1 | 尷 | /C7U | 篕 |
| /C; | 尣 | /CC | 筦 | /CCQ | 尪 | /CD | 旭 | /CD | 旮 | /CE\ | 籧 |
| /CH | 鳩 | /CH8 | 頄 | /CQ | 尨 | /CU3 | 尲 | /CUT | 簾 | /D | 白 |
| /D.1 | 鷩 | /D.H | 鷩 | /D.\ | 邀 | /D/; | 魄 | /D/D | 皛 | /D/E | 皞 |
| /D/H | 鶡 | /D/I | 皪 | /D/P | 郫 | /D/S | 卑 | /D/X | 皦 | /D1 | 箄 |
| /D2O | 皓 | /D5 | 皇 | /D5Q | 皝 | /D5\ | 遑 | /D9C | 皉 | /DA. | 的 |
| /DB. | 的 | /DC | 皂 | /DC | 皀 | /DCE | 暨 | /DCH | 鵖 | /DCP | 即 |
| /DCQ | 既 | /DCY | 皚 | /DE | 笪 | /DES | 箄 | /DHX | 皈 | /DIE | 皋 |
| /DIH | 鶃 | /DJ. | 皭 | /DJ7 | 皤 | /DKO | 皜 | /DKX | 皎 | /DM1 | 帛 |
| /DMQ | 皖 | /DOL | 簍 | /DOX | 籔 | /DRQ | 兜 | /DS | 阜 | /DTI | 樂 |
| /DUF | 箄 | /DUU | 皏 | /DV1 | 卑 | /DV5 | 皒 | /DVB | 翱 | /DVH | 鶴 |
| /DVH | 鶴 | /DVP | 郫 | /DVS | 皐 | /DWU | 皚 | /DX | 泉 | /DXX | 皛 |
| /DYB | 翱 | /D\ | 迫 | /E,\ | 篴 | /E2P | 籥 | /E55 | 箋 | /E99 | 箷 |
| /E;N | 箌 | /ED. | 篝 | /EE | 笁 | /EEQ | 筦 | /EG | 竽 | /EOJ | 笥 |
| /ER9 | 箎 | /ES | 竿 | /ESO | 箬 | /EU | 笲 | /F;U | 簍 | /FB. | 筠 |
| /FB. | 籌 | /FBE | 筠 | /FD | 箸 | /FF | 筆 | /FFR | 簣 | /FG. | 等 |
| /FJ | 箐 | /FOF | 簠 | /G4S | 簭 | /G5 | 我 | /GO | 箈 | /GR1 | 箍 |
| /GR7 | 籀 | /GSD | 籍 | /GSE | 箝 | /GSF | 籋 | /H1\ | 笊 | /H38 | 須 |
| /H3L | 籮 | /HCQ | 箴 | /HMU | 篇 | /HO5 | 箴 | /HR1 | 篩 | /I3 | 箱 |
| /IAA | 笨 | /IE | 笨 | /II | 箖 | /IM | 策 | /IO8 | 籟 | /IOA | 箴 |
| /J, | 筋 | /JHX | 簱 | /JRJ | 箏 | /JUX | 籐 | /K | 乏 | /K | 笠 |
| /K/E | 篷 | /K8. | 簩 | /K8X | 笑 | /KAS | 萃 | /KDK | 簑 | /KH | 鵁 |
| /KH | 鵁 | /KJX | 籠 | /KL | 笆 | /KO, | 籫 | /KOO | 篙 | /KOP | 箚 |

| | | | | | | | | | | | |
|---|---|---|---|---|---|---|---|---|---|---|---|
| /KQ | 笐 | /KX; | 篝 | /KXE | 篕 | /KXF | 籮 | /KX\ | 篴 | /LO | 筎 |
| /LX | 筬 | /M/V | 奥 | /M/W | 壼 | /M8R | 箜 | /MAF | 籗 | /MAF | 篧 |
| /MEO | 筒 | /MEQ | 笎 | /MEX | 箢 | /MF | 甪 | /MHR | 管 | /MO | 向 |
| /MO\ | 簻 | /MU | 血 | /MU, | 衆 | /MU5 | 衊 | /MU9 | 衃 | /MUA | 衆 |
| /MUF | 衄 | /MUP | 卹 | /MUP | 衈 | /N, | 篆 | /NH1 | 簷 | /NO | 笞 |
| /O/O | 筥 | /O18 | 篢 | /O38 | 簣 | /OM; | 禹 | /OMP | 鄗 | /OOS | 簟 |
| /OQ. | 兔 | /P8 | 箕 | /P8F | 簊 | /P8X | 簸 | /PAI | 篠 | /QY | 筅 |
| /R | 笁 | /R16 | 簫 | /R1C | 笆 | /R1U | 籃 | /R33 | 篚 | /R38 | 簀 |
| /R5 | 筐 | /R61 | 籥 | /RAA | 笯 | /RA\ | 籩 | /RB. | 篛 | /RB/ | 第 |
| /RB1 | 第 | /RBB | 篛 | /RC8 | 簣 | /RCG | 箏 | /RF | 筆 | /RJ5 | 筤 |
| /RO | 笸 | /RP | 筇 | /RP | 笻 | /RQ. | 筑 | /RQD | 簪 | /RQG | 箏 |
| /RQI | 築 | /RVA | 篋 | /SO. | 傅 | /S78 | 簧 | /SDS | 箨 | /SE8 | 簧 |
| /SMF | 籌 | /T | 糸 | /T/3 | 箚 | /TB. | 箹 | /TJ | 筠 | /TJN | 節 |
| /TM7 | 簹 | /TT1 | 篩 | /UJN | 箭 | /USO | 箬 | /V1O | 筈 | /V8T | 篆 |
| /V;O | 箸 | /VA | 笑 | /VAA | 筴 | /VAO | 箞 | /VID | 籍 | /VN | 箹 |
| /VNN | 簃 | /VS | 笨 | /VUF | 篁 | /WE8 | 箅 | /X/D | 箔 | /XO. | 簿 |
| /X;O | 箈 | /XBC | 笵 | /XD/ | 簜 | /XDF | 篞 | /XF\ | 篷 | /XJ7 | 籓 |
| /XS8 | 箯 | /XX | 笅 | /YY, | 篘 | /ZRA | 筷 | /\E5 | 籛 | /\EU | 簽 |
| /\NX | 籙 | /\VF | 籧 | 0 | 車 | 0 | 甫 | 0. | 輔 | 0.X | 敷 |
| 0/C | 軌 | 0/DI | 轢 | 00 | 輔 | 000 | 轟 | 00\ | 轆 | 02DX | 輹 |
| 02V | 軼 | 04EK | 輾 | 05 | 軒 | 0777 | 轞 | 07S | 軸 | 088 | 轄 |
| 08N2 | 轔 | 080 | 輅 | 0;O | 軩 | 0A/ | 軫 | 0AB | 軨 | 0AB. | 軨 |
| 0AF | 輇 | 0AG. | 輎 | 0AJN | 輸 | 0AMU | 輪 | 0B,I | 輮 | 0B1 | 軥 |
| 0BB/ | 轇 | 0BO | 軥 | 0C | 軋 | 0C | 轤 | 0C7U | 轤 | 0DBL | 輵 |
| 0DCC | 輥 | 0DI | 輠 | 0DMU | 輼 | 0E55 | 輚 | 0E;F | 輕 | 0ED. | 轉 |
| 0ELR | 輕 | 0EL\ | 蟄 | 0EMA | 輛 | 0EO7 | 輻 | 0EOJ | 輌 | 0EQ | 軓 |
| 0ER5 | 軾 | 0ES | 軒 | 0EU1 | 軒 | 0EWC | 軘 | 0F8X | 輚 | 0FAO | 輴 |
| 0FJ | 輶 | 0FOK | 轂 | 0G. | 專 | 0H | 轊 | 0H;\ | 軝 | 0HBC | 軛 |
| 0HBG | 輻 | 0HC | 軶 | 0HE1 | 斬 | 0HE9 | 塹 | 0HED | 暫 | 0HEF | 嶄 |
| 0HEI | 槧 | 0HEQ | 慙 | 0HE\ | 墼 | 0HM1 | 輛 | 0HMV | 軟 | 0HOZ | 轗 |
| 0HS3 | 輻 | 0HSK | 轘 | 0HV9 | 輕 | 0JI7 | 輻 | 0JJ | 轉 | 0K8X | 較 |
| 0K;X | 轍 | 0KF | 軖 | 0KLA | 轅 | 0KOT | 輬 | 0L7 | 輜 | 0LDI | 轆 |
| 0MA | 軜 | 0MEQ | 輐 | 0MFO | 轄 | 0MFO | 輞 | 0MUL | 輞 | 0MV | 軮 |
| 0N. | 軔 | 0NA | 軟 | 0NO | 軺 | 0NOQ | 輓 | 0O8 | 軹 | 0OP | 輯 |
| 0OQ | 軓 | 0OQX | 轂 | 0P | 郙 | 0PC | 輒 | 0Q. | 軚 | 0QX | 輆 |
| 0R/O | 軺 | 0R1U | 轞 | 0RE5 | 軝 | 0REE | 軧 | 0S8 | 軼 | 0SU8 | 轅 |
| 0SX. | 軷 | 0TJ | 輴 | 0TTO | 轚 | 0UDL | 輣 | 0UF5 | 轙 | 0UU | 輧 |
| 0UU. | 輣 | 0UUV | 轐 | 0V | 軑 | 0V8T | 輡 | 0VAO | 轎 | 0VC | 軞 |
| 0VV | 輳 | 0VVA | 轃 | 0WH1 | 輲 | 0WQ | 輗 | 0WQ0 | 擊 | 0WQ; | 擊 |
| 0WQF | 墼 | 0WQG | 擊 | 0WQI | 槃 | 0WQT | 繫 | 0WQW | 蟿 | 0XG | 擎 |
| 0XO | 輅 | 0XXX | 轂 | 0\ | 連 | 0\ | 連 | 1 | 言 | 1,5 | 証 |
| 1. | 訪 | 1.11 | 訓 | 1.NO | 詔 | 1.RK | 諒 | 1.X | 詠 | 1/7Z | 譓 |
| 1/9\ | 誕 | 1/AO | 諮 | 1/D1 | 諱 | 1/D5 | 諱 | 1/DS | 諱 | 10 | 誦 |
| 10\ | 謰 | 111 | 川 | 1111 | 訓 | 1118 | 順 | 11RX | 謏 | 11WX | 謏 |
| 123 | 詐 | 127. | 誨 | 12C | 訖 | 12I | 誅 | 12O | 詰 | 12O2 | 諱 |
| 12Q | 詵 | 12Q8 | 讃 | 12S | 許 | 12SY | 謔 | 12V | 訣 | 133 | 誹 |
| 14DS | 譚 | 14ET | 謤 | 14F | 證 | 14FS | 譯 | 16I4 | 讕 | 16J | 調 |
| 1777 | 譯 | 178X | 謏 | 17J | 調 | 17UK | 讓 | 17Z | 謂 | 188. | 謝 |
| 18; | 訟 | 18EU | 論 | 18OQ | 說 | 18\ | 謎 | 19 | 計 | 19C | 詘 |
| 19EX | 諔 | 19O | 詁 | 1;2V | 誒 | 1;O | 詒 | 1A/ | 診 | 1AA5 | 識 |

| | | | | | | | | | | | |
|---|---|---|---|---|---|---|---|---|---|---|---|
| 1AB. | 詅 | 1ABZ | 諗 | 1AC | 訛 | 1AF | 詮 | 1AJN | 諭 | 1AKF | 誰 |
| 1AKF | 讎 | 1AKX | 護 | 1AKY | 譙 | 1AMU | 論 | 1AOA | 譣 | 1ARO | 諂 |
| 1B,O | 譎 | 1B.F | 誦 | 1B1C | 訑 | 1B9J | 謂 | 1BB | 詡 | 1BB/ | 謬 |
| 1BBD | 謵 | 1BD | 詢 | 1BEO | 詞 | 1BWW | 謅 | 1C/. | 訊 | 1C1. | 訊 |
| 1C29 | 譺 | 1C9 | 訊 | 1CCD | 諧 | 1CD | 詣 | 1CE. | 讞 | 1CJE | 譃 |
| 1CJG | 譸 | 1CQ | 詵 | 1CR | 謔 | 1CS | 訊 | 1CSY | 讌 | 1CUT | 譧 |
| 1CX | 詖 | 1D4X | 謾 | 1DBL | 謁 | 1DE9 | 諟 | 1DI | 課 | 1DOL | 謱 |
| 1E,. | 諺 | 1E,W | 圝 | 1E.A | 以 | 1E2O | 語 | 1E55 | 諓 | 1E9 | 証 |
| 1EDZ | 諰 | 1EG | 訏 | 1EJ | 訂 | 1ELR | 誙 | 1EO7 | 諨 | 1EOJ | 訶 |
| 1ER5 | 試 | 1ES | 訐 | 1ESO | 話 | 1EU | 訮 | 1EU1 | 評 | 1EU5 | 諴 |
| 1EWC | 訰 | 1F38 | 請 | 1F41 | 謊 | 1F48 | 讀 | 1FB. | 譸 | 1FD | 諸 |
| 1FF | 詿 | 1FFC | 艷 | 1FFQ | 譔 | 1FFU | 豐 | 1FFZ | 譴 | 1FG. | 詩 |
| 1FJ | 請 | 1FK | 諘 | 1FO | 詰 | 1FOO | 譆 | 1FZ | 誌 | 1G. | 討 |
| 1H/T | 謜 | 1HB5 | 誠 | 1HBB | 謳 | 1HCQ | 訴 | 1HE1 | 訢 | 1HE9 | 訴 |
| 1HEK | 誫 | 1HEO | 話 | 1HKS | 譯 | 1HMU | 諞 | 1HO5 | 諴 | 1HV9 | 譔 |
| 1I. | 詸 | 1I4 | 諫 | 1IAA | 誅 | 1II | 誺 | 1J2W | 謠 | 1J3. | 嬴 |
| 1J;. | 贏 | 1JD. | 嬴 | 1JE | 詛 | 1JEX | 諼 | 1JH. | 嬴 | 1JI7 | 謡 |
| 1JL. | 羸 | 1JRJ | 諍 | 1JTV | 諆 | 1JU. | 羸 | 1K// | 諺 | 1K7E | 謯 |
| 1K8. | 謗 | 1K81 | 諦 | 1K8O | 謫 | 1K8O | 謫 | 1K8X | 詨 | 1KAS | 誶 |
| 1KD | 諳 | 1KD5 | 識 | 1KF | 註 | 1KLA | 該 | 1KO, | 謙 | 1KOG | 諄 |
| 1KOK | 讓 | 1KOO | 謞 | 1KOT | 諒 | 1KOX | 識 | 1KX/ | 諺 | 1KX; | 講 |
| 1M0 | 譚 | 1MA | 訥 | 1MC | 詑 | 1MEB | 謣 | 1MEE | 誼 | 1MEO | 詷 |
| 1MER | 譝 | 1MFO | 調 | 1MJ7 | 譒 | 1MJE | 誼 | 1MO | 詷 | 1MVC | 詫 |
| 1N. | 訒 | 1N.9 | 譖 | 1N.Z | 認 | 1N2I | 譟 | 1N4X | 讀 | 1NH1 | 譴 |
| 1NHC | 詭 | 1NMX | 讀 | 1NN | 誃 | 1NO | 詔 | 1NO | 詻 | 1NO. | 譏 |
| 1NW | 謟 | 1O1\ | 謔 | 1OLV | 誤 | 1OOB | 誇 | 1OOI | 謀 | 1OOS | 譚 |
| 1OP | 諿 | 1P8 | 諆 | 1P8L | 諶 | 1PG. | 謝 | 1PJZ | 譞 | 1PPP | 譌 |
| 1PQL | 諶 | 1PX | 諏 | 1Q; | 諷 | 1QX | 設 | 1QY | 詵 | 1R | 訌 |
| 1R5 | 誆 | 1RA | 訣 | 1RAA | 誣 | 1RBT | 謚 | 1RC | 記 | 1RC8 | 諆 |
| 1RCZ | 誋 | 1RED | 諳 | 1REE | 詆 | 1RG | 訝 | 1RJ/ | 諤 | 1ROO | 謳 |
| 1RPX | 譤 | 1RQD | 譜 | 1RR | 詎 | 1RRP | 鄹 | 1RRX | 叟 | 1S | 計 |
| 1S38 | 讀 | 1SC. | 試 | 1SE | 詌 | 1SEI | 謀 | 1SJ | 誧 | 1SL | 謏 |
| 1SLI | 諜 | 1SMF | 講 | 1SMG | 詩 | 1SMS | 譾 | 1SO | 詁 | 1SOF | 謹 |
| 1SOY | 讌 | 1SX. | 誸 | 1SY | 誒 | 1T, | 詏 | 1T/ | 訬 | 1TJ | 誚 |
| 1TM4 | 譿 | 1TT3 | 譽 | 1TT5 | 護 | 1TT; | 譽 | 1TTA | 譽 | 1TTB | 譽 |
| 1TTD | 譽 | 1TTG | 學 | 1TTG | 學 | 1TTH | 叢 | 1TTI | 樂 | 1TTL | 變 |
| 1TTV | 與 | 1TTW | 巒 | 1TTX | 變 | 1TTZ | 戀 | 1TT\ | 攀 | 1U8U | 謐 |
| 1UAX | 護 | 1UDL | 講 | 1UDV | 諛 | 1UEF | 譁 | 1UF | 詳 | 1UF5 | 議 |
| 1UJB | 讜 | 1UKQ | 譏 | 1UOF | 謹 | 1URT | 謙 | 1US | 詳 | 1USO | 諾 |
| 1UU | 訮 | 1UUD | 譜 | 1V/B | 誘 | 1V1O | 話 | 1VA | 訞 | 1VAO | 譑 |
| 1VB/ | 誘 | 1VC | 託 | 1VEB | 誇 | 1VFD | 請 | 1VI | 誺 | 1VL | 誘 |
| 1VNN | 謻 | 1VUF | 誰 | 1W | 訕 | 1WA | 諛 | 1WFX | 譏 | 1WH1 | 譴 |
| 1WQ | 說 | 1WW | 詘 | 1WWU | 黷 | 1WX | 叟 | 1WXP | 鄹 | 1XD | 諸 |
| 1XO | 諮 | 1YY | 談 | 1YYX | 燮 | 1Z/U | 謐 | 1\ | 這 | 1\EU | 證 |
| 2 | 牛 | 2, | 牞 | 2/B/ | 犻 | 22 | 年 | 22 | 料 | 22E | 牲 |
| 22O | 牿 | 23 | 乍 | 238 | 犋 | 23V. | 犋 | 23Z | 怎 | 23\ | 迮 |
| 24;C | 犤 | 27. | 每 | 27. | 牳 | 27.Q | 毓 | 27.T | 繁 | 27.X | 敏 |
| 27.X | 繁 | 27S | 牰 | 2AF | 牷 | 2B/ | 物 | 2B1C | 牠 | 2B1\ | 迤 |
| 2BWW | 犓 | 2C | 乞 | 2C | 牝 | 2CN | 刉 | 2CY | 犍 | 2C\ | 迄 |
| 2DSX | 犦 | 2DX | 复 | 2E | 生 | 2E2E | 牲 | 2E2O | 牾 | 2E3 | 眚 |

| | | | | | | | | | | | |
|---|---|---|---|---|---|---|---|---|---|---|---|
| 2E7, | 塄 | 2E9P | 卸 | 2ELR | 牼 | 2F | 牡 | 2F48 | 犢 | 2FG. | 特 |
| 2HEX | 犌 | 2HU; | 犡 | 2I | 朱 | 2IH | 鴸 | 2IP | 邾 | 2KDF | 犝 |
| 2KOG | 犉 | 2KOO | 犒 | 2L45 | 犠 | 2L75 | 犧 | 2LD5 | 犧 | 2LM2 | 牽 |
| 2MBG | 牸 | 2MFO | 犗 | 2MN | 制 | 2MNG | 掣 | 2MNK | 製 | 2MUW | 犅 |
| 2N | 觕 | 2N. | 牣 | 2O | 告 | 2O, | 勂 | 2O2 | 韋 | 2O2. | 韌 |
| 2O2. | 韍 | 2O2O | 韗 | 2O28 | 韥 | 2O2; | 韣 | 2O2E | 韡 | 2O2F | 韝 |
| 2O2F | 韡 | 2O2G | 韕 | 2O2I | 韎 | 2O2I | 韖 | 2O2I | 韘 | 2O2K | 韔 |
| 2O2O | 韐 | 2O2P | 鄣 | 2O2S | 韢 | 2O2U | 韞 | 2O2W | 韜 | 2O2\ | 違 |
| 2O33 | 靠 | 2OH | 鵠 | 2OP | 郜 | 2O\ | 造 | 2Q | 先 | 2Q28 | 贊 |
| 2Q2N | 劗 | 2Q2P | 酇 | 2Q2Q | 兟 | 2REE | 牴 | 2RF\ | 犍 | 2S | 午 |
| 2S/F | 犕 | 2S3 | 犆 | 2SC/ | 犹 | 2SEO | 牾 | 2SEP | 卸 | 2SII | 舞 |
| 2SN2 | 舞 | 2SO | 牯 | 2SW | 缶 | 2SWA | 缺 | 2SWE | 缽 | 2SWF | 罐 |
| 2SWJ | 䍃 | 2SWO | 缿 | 2SWR | 缸 | 2SWS | 缽 | 2SWS | 罈 | 2SWU | 罏 |
| 2SWU | 缾 | 2SWY | 缹 | 2SY | 無 | 2SY. | 甒 | 2SYH | 鷡 | 2SYP | 鄦 |
| 2S\ | 迕 | 2U/X | 犪 | 2UF5 | 犧 | 2UVC | 犈 | 2V | 失 | 2V | 矢 |
| 2V, | 劮 | 2V.S | 矧 | 2V4C | 矯 | 2V8D | 矰 | 2VAF | 雉 | 2VAF | 雉 |
| 2VAO | 犞 | 2VEJ | 犄 | 2VEU | 短 | 2VH | 鴩 | 2VH | 鴙 | 2VO | 知 |
| 2VOD | 智 | 2VR1 | 矧 | 2VRR | 矩 | 2VUX | 矱 | 2VVA | 矨 | 2VVL | 矮 |
| 2VVO | 矯 | 2V\ | 迭 | 2X | 牧 | 3 | 目 | 3/3. | 瞤 | 3/D1 | 睥 |
| 3/DS | 睥 | 3/K | 眨 | 31WX | 瞍 | 32C | 盵 | 32SY | 瞴 | 32V | 眣 |
| 33 | 非 | 330 | 輩 | 33; | 蜚 | 33AC | 毴 | 33AF | 䨽 | 33AK | 餥 |
| 33AX | 䨾 | 33BB | 翡 | 33E | 韭 | 33I | 棐 | 33KK | 裴 | 33KX | 斐 |
| 33L | 婓 | 33N | 剕 | 33Q | 睍 | 33V | 奜 | 33V. | 瞑 | 33Z | 悲 |
| 34DS | 瞫 | 34ET | 瞟 | 36 | 鼎 | 36D | 鼏 | 36RX | 鼒 | 37I | 睏 |
| 38 | 貝 | 38 | 具 | 38 | 眯 | 38/K | 貶 | 380. | 賻 | 382E | 貹 |
| 383. | 賏 | 3831 | 甖 | 3838 | 賏 | 3838 | 贔 | 383H | 鸚 | 383L | 嬰 |
| 383W | 罌 | 384S | 贉 | 388D | 贈 | 389O | 貼 | 38;/ | 賿 | 38;B | 賂 |
| 38;O | 貽 | 38AT | 賒 | 38BC | 貤 | 38D/ | 賜 | 38D3 | 賵 | 38E. | 賕 |
| 38E5 | 賊 | 38E5 | 賦 | 38E5 | 賤 | 38E; | 贅 | 38EB | 䝮 | 38F5 | 贓 |
| 38F8 | 贖 | 38FD | 賭 | 38G/ | 財 | 38H | 鴨 | 38H5 | 贓 | 38HK | 賑 |
| 38HX | 販 | 38KA | 賅 | 38KO | 賠 | 38KQ | 䝳 | 38KS | 賥 | 38MO | 賗 |
| 38M8 | 䞑 | 38MI | 賝 | 38MJ | 貯 | 38MO | 賙 | 38N | 則 | 38N | 盼 |
| 38N1 | 贍 | 38N2 | 䝾 | 38O1 | 賻 | 38OQ | 貺 | 38P | 郥 | 38PK | 賬 |
| 38R/ | 䞁 | 38RE | 貾 | 38RU | 贐 | 38SF | 購 | 38SJ | 賄 | 38U5 | 贓 |
| 38UT | 賺 | 38UU | 監 | 38V. | 賧 | 38VD | 賭 | 38X | 敗 | 38XO | 賂 |
| 38YY | 賧 | 38\ | 賍 | 3;2 | 睟 | 3;O | 眙 | 3A/ | 眕 | 3A4D | 瞗 |
| 3AJN | 睮 | 3AKF | 睢 | 3AKY | 瞧 | 3AMU | 睔 | 3AOA | 瞼 | 3B,O | 䀹 |
| 3B. | 眗 | 3BD | 眴 | 3BEE | 眗 | 3CS8 | 矌 | 3D1 | 眒 | 3DE9 | 睼 |
| 3DES | 睤 | 3DOL | 瞜 | 3E1B | 眄 | 3E9 | 眐 | 3EA9 | 瞛 | 3EE; | 眃 |
| 3EG | 盰 | 3EI | 眛 | 3EJ | 盯 | 3ER9 | 睫 | 3ES | 盱 | 3EWC | 盹 |
| 3F8F | 睦 | 3F8X | 睖 | 3F;U | 瞌 | 3FD | 睹 | 3FF | 眭 | 3FJ | 睛 |
| 3H | 鴡 | 3H1; | 矚 | 3HE1 | 盺 | 3HFF | 睚 | 3HRK | 脈 | 3HS3 | 睸 |
| 3HV. | 瞑 | 3HX | 眅 | 3IAA | 睞 | 3JI | 睬 | 3JM2 | 瞬 | 3JRJ | 睜 |
| 3KAS | 睟 | 3KDF | 瞳 | 3KDS | 暐 | 3KJX | 矓 | 3KL | 肊 | 3KT | 眩 |
| 3KX; | 瞝 | 3LP | 鄍 | 3MAF | 矐 | 3MD8 | 瞑 | 3ME8 | 瞚 | 3ME8 | 矉 |
| 3MEJ | 眝 | 3MEQ | 睆 | 3MFO | 瞎 | 3MFO | 睭 | 3MNC | 睕 | 3MQ | 眈 |
| 3N4X | 矆 | 3NH1 | 瞻 | 3NMX | 矆 | 3NN | 眵 | 3NO | 昭 | 3NO | 眳 |
| 3NOQ | 睌 | 3NX | 睬 | 3O18 | 瞶 | 3OJ | 眴 | 3OOI | 睬 | 3OOZ | 䁛 |
| 3P | 眮 | 3Q | 見 | 3Q3Q | 覞 | 3QEX | 瞷 | 3QY | 晄 | 3R5 | 眶 |
| 3R5 | 眡 | 3RED | 睧 | 3RJ5 | 眠 | 3RK | 眼 | 3RPX | 瞰 | 3S38 | 瞋 |

| | | | | | | | | | | | |
|---|---|---|---|---|---|---|---|---|---|---|---|
| 3SMA | 瞞 | 3T, | 盼 | 3T/ | 眇 | 3T/1 | 睇 | 3T/T | 睬 | 3T/Z | 懸 |
| 3TJ | 睄 | 3TM4 | 瞧 | 3TMF | 瞠 | 3U7 | 瞄 | 3UDV | 瞑 | 3UEF | 睥 |
| 3UF | 眫 | 3UM, | 矇 | 3UOF | 矅 | 3UUV | 瞨 | 3UV | 眹 | 3UVC | 睠 |
| 3V. | 昊 | 3V.H | 鴡 | 3V.P | 郥 | 3V3Q | 瞡 | 3V4 | 瞟 | 3V8T | 瞭 |
| 3VC | 眊 | 3VG5 | 瞰 | 3VRB | 睞 | 3VUF | 睡 | 3VY | 瞅 | 3WQ | 睆 |
| 3XS1 | 睎 | 3YY | 睽 | 3\EU | 瞪 | 3\EV | 睽 | 4 | 四 | 4 | 西 |
| 4 | 黑 | 4, | 罛 | 4/DX | 罬 | 4/K | 罜 | 41 | 言 | 41N | 罰 |
| 41TT | 羉 | 433 | 罪 | 438 | 買 | 438 | 賈 | 438H | 鷶 | 444V | 罴 |
| 44F | 罫 | 47Z | 罳 | 48 | 粟 | 484D | 罾 | 49DS | 罩 | 49O | 點 |
| 4;;/ | 黲 | 4;JC | 罷 | 4;JY | 羆 | 4AAA | 眾 | 4AB | 黔 | 4AOU | 黬 |
| 4B | 罵 | 4B, | 罗 | 4B; | 蜀 | 4B;A | 歜 | 4B;H | 鸀 | 4B;X | 斀 |
| 4DS | 覃 | 4DSH | 鷣 | 4DUF | 罼 | 4E2X | 覆 | 4E5 | 默 | 4E9 | 罡 |
| 4EE/ | 影 | 4EE8 | 顯 | 4EE; | 飄 | 4EEB | 翾 | 4EEN | 剽 | 4EET | 票 |
| 4EE\ | 瓢 | 4EO5 | 罭 | 4EOB | 罶 | 4EO\ | 還 | 4F | 墨 | 4F | 垔 |
| 4F48 | 黷 | 4FD | 署 | 4FE. | 甄 | 4FF | 罣 | 4FF9 | 罫 | 4FNA | 歅 |
| 4FO | 黠 | 4FOK | 罯 | 4FP | 鄄 | 4FUH | 鷃 | 4FUS | 睪 | 4FUX | 斁 |
| 4H9 | 罘 | 4H;\ | 罛 | 4HE. | 罻 | 4HYN | 罽 | 4I | 栗 | 4IH | 黭 |
| 4II | 罧 | 4JBG | 罦 | 4JE | 罝 | 4KD | 黯 | 4KDF | 罿 | 4KF | 罣 |
| 4KOT | 黥 | 4L | 要 | 4LB/ | 勡 | 4LDI | 罺 | 4MNC | 黦 | 4MQ | 默 |
| 4NH1 | 黵 | 4NN | 黟 | 4OJ | 罥 | 4P8L | 黰 | 4PQL | 黱 | 4R.7 | 罶 |
| 4RJ5 | 罠 | 4RQ | 黖 | 4S3 | 置 | 4S38 | 顆 | 4SB | 羇 | 4SE | 黜 |
| 4SO | 詈 | 4SVJ | 罱 | 4T, | 黝 | 4TAF | 羅 | 4TA\ | 邏 | 4UD1 | 羃 |
| 4V. | 黙 | 4VB\ | 遷 | 4VDC | 罨 | 4VDC | 黤 | 4VR\ | 遷 | 4WW | 黮 |
| 4XXX | 罬 | 4X\ | 還 | 4ZAF | 罹 | 4\ | 酒 | 5 | 王 | 5 | 壬 |
| 5,O | 珈 | 5. | 玉 | 5. | 王 | 5. | 玡 | 5.15 | 班 | 5.29 | 璇 |
| 5.;P | 琊 | 5.RK | 琅 | 5/7Z | 璁 | 5/; | 瑰 | 5/D | 珀 | 5/DI | 璨 |
| 5/DQ | 碧 | 5/DX | 琭 | 5/O; | 瑀 | 50.X | 璥 | 50\ | 璉 | 5111 | 珊 |
| 52B9 | 琁 | 52I | 珠 | 52O2 | 瑋 | 52Q | 珖 | 52Q8 | 璜 | 52S | 玝 |
| 533 | 琲 | 538 | 琪 | 538L | 瓔 | 53Q | 現 | 54EK | 環 | 54I | 瑮 |
| 55 | 玨 | 555/ | 瑟 | 55AB | 琴 | 55CC | 琵 | 55RC | 琶 | 55Z/ | 瑟 |
| 55\ | 斑 | 5777 | 瓓 | 57V | 珚 | 584D | 璔 | 58N | 玢 | 58N2 | 璘 |
| 58R/ | 琸 | 59 | 珽 | 59C | 琡 | 59EX | 瑕 | 59M3 | 瑃 | 59N8 | 璪 |
| 59O | 玷 | 59XO | 璐 | 5; | 丟 | 5;M | 瑀 | 5;O | 珆 | 5A/ | 珍 |
| 5A11 | 玠 | 5A4D | 琀 | 5AB. | 玪 | 5ABO | 琀 | 5AE5 | 玳 | 5AJN | 瑜 |
| 5AK\ | 璡 | 5AO | 玲 | 5ARO | 瑲 | 5B | 瑪 | 5B,O | 瑞 | 5B. | 玓 |
| 5BB | 珝 | 5BB/ | 璆 | 5BBS | 瓕 | 5BD | 珣 | 5BRC | 瑵 | 5CC | 玭 |
| 5CCD | 瑎 | 5CE, | 璙 | 5CE. | 瓛 | 5CQ | 琥 | 5CRO | 瑭 | 5CX | 玻 |
| 5D1 | 珅 | 5D1 | 玾 | 5D2E | 珵 | 5D3 | 瑁 | 5DCC | 琨 | 5DD | 琩 |
| 5DE/ | 瑒 | 5DF | 理 | 5DH/ | 瑒 | 5DKT | 璟 | 5DKX | 瑍 | 5E,. | 琢 |
| 5E2O | 琣 | 5E55 | 琖 | 5EA9 | 瑽 | 5ED. | 瑼 | 5EEJ | 珩 | 5EEQ | 玩 |
| 5EG | 玗 | 5EJ | 玎 | 5EOJ | 珂 | 5ES | 玕 | 5EU1 | 玶 | 5EX. | 球 |
| 5F | 玤 | 5F.X | 璥 | 5FBY | 璹 | 5FF | 珪 | 5H | 瑀 | 5H13 | 瑂 |
| 5H38 | 頊 | 5HEX | 瑕 | 5HO5 | 瑊 | 5HSO | 琚 | 5II | 琳 | 5J | 玥 |
| 5J2W | 瑤 | 5JBG | 琈 | 5JE | 珇 | 5JEX | 瑗 | 5JI7 | 璠 | 5JMX | 瑗 |
| 5JRJ | 琤 | 5K8P | 璊 | 5K8X | 珓 | 5K8\ | 璲 | 5K;Q | 琉 | 5K;Q | 琉 |
| 5KDS | 璋 | 5KJX | 瓏 | 5KO | 琣 | 5KOK | 瓖 | 5KOT | 瓊 | 5KT | 玹 |
| 5KX | 玟 | 5KX5 | 斑 | 5KX; | 瑀 | 5L/N | 瑙 | 5L/X | 瑙 | 5LDI | 璅 |
| 5LKW | 瑙 | 5M0 | 琿 | 5M0\ | 璉 | 5M8/ | 璓 | 5M8I | 琛 | 5M8O | 瑢 |
| 5ME3 | 瑁 | 5ME8 | 瓆 | 5MEE | 瑄 | 5MET | 琮 | 5MF | 琠 | 5MFO | 琱 |
| 5MH1 | 瑞 | 5MHR | 琯 | 5MK | 玥 | 5MME | 珊 | 5MNC | 琓 | 5MS8 | 瑛 |

| | | | | | | | | | | | |
|---|---|---|---|---|---|---|---|---|---|---|---|
| 5MU | 珊 | 5N, | 琭 | 5N4X | 瓊 | 5NMV | 瑍 | 5NMX | 瓊 | 5NO | 玿 |
| 5NX | 琜 | 5N\ | 玖 | 5O5 | 珵 | 5OJ | 琄 | 5OOI | 璪 | 5OOO | 噩 |
| 5P | 珥 | 5P8 | 琪 | 5QE1 | 珮 | 5QY | 珧 | 5R | 玒 | 5R/O | 珸 |
| 5R1P | 瑯 | 5R1U | 璶 | 5RA | 玦 | 5RF | 瑋 | 5RG | 玡 | 5RGP | 琊 |
| 5RJ/ | 玡 | 5RJP | 琊 | 5RR. | 瑀 | 5S1G | 琣 | 5S38 | 瑱 | 5S78 | 璜 |
| 5S8 | 珙 | 5SE | 玵 | 5SE8 | 璜 | 5SJ | 琸 | 5SL. | 琠 | 5SMA | 瑞 |
| 5SOF | 瑾 | 5SOJ | 瑚 | 5T38 | 瑣 | 5TEQ | 珖 | 5TM7 | 璫 | 5TT5 | 璣 |
| 5U | 弄 | 5U,\ | 璲 | 5UAI | 璨 | 5UAX | 瓁 | 5UBX | 瓛 | 5UF | 珜 |
| 5UFR | 瑳 | 5UFU | 瑤 | 5UJN | 瑜 | 5UMV | 瑛 | 5UOF | 瓘 | 5UUV | 璞 |
| 5V/B | 琇 | 5VB/ | 琇 | 5VEJ | 琦 | 5VF | 瑋 | 5VG5 | 珴 | 5VN | 琍 |
| 5VV | 瑧 | 5WAB | 琸 | 5WAF | 璀 | 5WAO | 璃 | 5WE8 | 瑱 | 5WH1 | 瑞 |
| 5X | 玫 | 5X.; | 瑤 | 5XF; | 琺 | 5XO | 珞 | 5XS1 | 琋 | 5YY | 琰 |
| 5Z/ | 珌 | 5\ | 廷 | 5\ | 迋 | 5\EU | 璒 | 5\H8 | 瓋 | 6 | 門 |
| 6 | 片 | 6 | 門 | 6 | 爿 | 6 | 丱 | 6. | 閉 | 6.A. | 閼 |
| 6.RK | 閬 | 6/3I | 闌 | 6/D1 | 牌 | 6/DS | 牌 | 61 | 閶 | 6202 | 閶 |
| 63KX | 闅 | 63V. | 闃 | 64EK | 闤 | 64F | 闉 | 65 | 閏 | 65\ | 闥 |
| 67I | 閽 | 68OQ | 閱 | 6; | 閫 | 6;U | 閛 | 6A | 閃 | 6AE5 | 閥 |
| 6AJN | 牏 | 6AKF | 闇 | 6AO | 閻 | 6AOB | 闍 | 6ARO | 牄 | 6B | 閭 |
| 6D | 間 | 6D1 | 閧 | 6DBB | 闞 | 6DD | 闔 | 6DL | 閿 | 6E | 門 |
| 6E5 | 戕 | 6E55 | 牋 | 6EEE | 閆 | 6EO5 | 閾 | 6EOJ | 牁 | 6EOJ | 閜 |
| 6ER5 | 臧 | 6ES | 閈 | 6EU | 閞 | 6EU1 | 閈 | 6F | 壯 | 6F48 | 牘 |
| 6F;U | 閤 | 6FAO | 牆 | 6FD | 闍 | 6FF | 闐 | 6FKK | 裝 | 6FU\ | 闥 |
| 6FV | 奘 | 6FY | 焋 | 6G/ | 閉 | 6H0 | 牖 | 6HE1 | 斨 | 6HOS | 闒 |
| 6HX | 版 | 6I | 床 | 6I | 閑 | 6I4 | 闌 | 6IH | 鵬 | 6J | 閒 |
| 6JG. | 將 | 6JG8 | 醬 | 6JG; | 鱉 | 6JGF | 壁 | 6JGI | 槳 | 6JGV | 獎 |
| 6JGX | 漿 | 6JH | 鶬 | 6JMX | 闊 | 6K8. | 牓 | 6KD | 閹 | 6KLA | 闕 |
| 6KM1 | 閙 | 6KQ | 閬 | 6KX | 閔 | 6L | 妝 | 6NMR | 闠 | 6NO | 閣 |
| 6NW | 闓 | 6O | 問 | 6O/O | 閣 | 6O18 | 閹 | 6OOO | 闆 | 6OOS | 闌 |
| 6P | 聞 | 6RED | 闇 | 6RPX | 闞 | 6RPX | 闞 | 6S38 | 闐 | 6S8 | 開 |
| 6S8C | 闀 | 6S; | 閎 | 6SLI | 牒 | 6TM7 | 闛 | 6TMF | 闡 | 6TT6 | 闕 |
| 6UF | 牂 | 6US | 牂 | 6UWA | 闟 | 6V. | 狀 | 6V3Q | 闋 | 6VC | 閼 |
| 6VDC | 闍 | 6W | 閭 | 6WEU | 闃 | 6WQ | 閲 | 6XO | 閣 | 6XVO | 闊 |
| 6Y | 閃 | 6Z | 閟 | 6Z/ | 閡 | 6\EV | 閡 | 7 | 田 | 7 | 口 |
| 7, | 男 | 7,L, | 嬲 | 7. | 母 | 70 | 圖 | 71 | 圓 | 7111 | 唰 |
| 71TI | 圞 | 7202 | 團 | 74EK | 圜 | 74FS | 圝 | 777 | 畾 | 777E | 疊 |
| 777F | 壘 | 777F | 壘 | 777H | 鸓 | 777I | 櫐 | 777Q | 罍 | 777T | 纍 |
| 777W | 疉 | 78M | 四 | 78MT | 黹 | 78N2 | 疄 | 78X | 畟 | 7;8X | 畯 |
| 7A | 囚 | 7A/ | 彫 | 7A11 | 界 | 7AB. | 圀 | 7AC | 囮 | 7AMU | 圇 |
| 7B. | 畇 | 7B/ | 囫 | 7BEE | 畇 | 7BG | 囝 | 7CC | 毗 | 7CC | 毘 |
| 7E, | 圂 | 7E,Z | 恩 | 7E2O | 圊 | 7ED. | 團 | 7EJ | 町 | 7EK | 畏 |
| 7EO5 | 國 | 7EWC | 國 | 7F;U | 圕 | 7FB. | 疇 | 7FF | 畦 | 7FG. | 時 |
| 7FJ | 圖 | 7FOK | 園 | 7FUS | 圍 | 7HX | 畈 | 7I | 困 | 7J | 胃 |
| 7KL | 甿 | 7KQ | 圎 | 7L | 囡 | 7MNC | 畹 | 7O | 回 | 7O18 | 圜 |
| 7O38 | 圓 | 7OKO | 圖 | 7OKP | 圖 | 7OSO | 圖 | 7OSP | 圖 | 7O\ | 迴 |
| 7P | 回 | 7S | 由 | 7S | 毌 | 7S38 | 貫 | 7S8 | 異 | 7SEB | 粵 |
| 7SJ | 胄 | 7SJ | 圊 | 7SO | 固 | 7S\ | 迪 | 7T | 累 | 7U | 曲 |
| 7U | 畀 | 7UEC | 豔 | 7UEU | 豔 | 7UEU | 豐 | 7UHK | 農 | 7US | 畔 |
| 7UVC | 圈 | 7V | 因 | 7V | 困 | 7V. | 畎 | 7VDF | 畽 | 7VEJ | 畸 |
| 7VNA | 歐 | 7VZ | 恩 | 7WH1 | 圌 | 7X | 畋 | 7XO | 略 | 7XXX | 畷 |
| 7Z | 思 | 7ZH8 | 聰 | 8 | 八 | 8 | 米 | 8 | 西 | 8.11 | 酬 |

| | | | | | | | | | | | |
|---|---|---|---|---|---|---|---|---|---|---|---|
| 8.S | 料 | 8/3. | 糢 | 8/; | 醜 | 8/D | 粕 | 8/D1 | 粺 | 8/DS | 稗 |
| 80 | 醑 | 80G. | 糐 | 81 | 丫 | 81RX | 酸 | 81WX | 酸 | 823 | 酢 |
| 82C | 粁 | 82O | 酷 | 82O\ | 糙 | 83Q | 粯 | 84 | 粞 | 84D | 曾 |
| 84D. | 甑 | 84DP | 鄫 | 84DS | 醰 | 84ET | 醭 | 84FD | 糬 | 84FS | 醳 |
| 87E. | 糲 | 87S8 | 糞 | 87UK | 醿 | 87UU | 醴 | 88 | 酋 | 88;; | 醬 |
| 88G. | 尊 | 88GH | 鷷 | 88G\ | 遵 | 88N | 粉 | 88N | 酚 | 88V | 奠 |
| 88V. | 猷 | 88VP | 鄭 | 88\ | 遒 | 88\ | 醚 | 89O | 粘 | 89O | 酟 |
| 8; | 公 | 8;8X | 酸 | 8;;/ | 糁 | 8;BB | 翁 | 8;BH | 鶲 | 8;E. | 瓮 |
| 8;H8 | 頌 | 8;QC | 毧 | 8AI | 酴 | 8AKF | 醀 | 8AKY | 醮 | 8B,I | 糅 |
| 8B. | 酌 | 8B/ | 粅 | 8B1C | 酏 | 8B2W | 醄 | 8B9J | 醑 | 8BB/ | 醪 |
| 8BF | 粗 | 8BG | 籽 | 8C | 麄 | 8C/. | 粃 | 8C1. | 粃 | 8CD | 酯 |
| 8CE, | 醣 | 8CF | 妝 | 8CI8 | 醾 | 8CRO | 糖 | 8CRO | 醣 | 8CRX | 糠 |
| 8CS | 粃 | 8D2E | 醒 | 8DE9 | 醍 | 8DEF | 糧 | 8DF | 粴 | 8DI | 粿 |
| 8DMU | 醽 | 8E55 | 醆 | 8E7D | 糟 | 8EB | 兮 | 8EDX | 粳 | 8EI | 粖 |
| 8EJ | 酊 | 8EMC | 醞 | 8EOJ | 酮 | 8ES | 酐 | 8FBG | 酵 | 8FD | 酩 |
| 8FJ | 精 | 8G. | 籿 | 8G. | 酎 | 8HD | 粨 | 8HU; | 糯 | 8HX | 粄 |
| 8II | 醂 | 8J4. | 醨 | 8JE | 粗 | 8JG. | 酻 | 8K | 粒 | 8K;U | 醢 |
| 8KAS | 醉 | 8KAS | 粹 | 8KDZ | 醕 | 8KO | 酷 | 8KOG | 醇 | 8KOK | 醭 |
| 8KX; | 醲 | 8L | 籹 | 8M83 | 醉 | 8MC | 酡 | 8MEO | 粡 | 8MEO | 酮 |
| 8MET | 粽 | 8MH1 | 糯 | 8MH1 | 醹 | 8MME | 糊 | 8MOO | 醽 | 8MQ | 酖 |
| 8MQU | 醘 | 8MU | 粣 | 8MVU | 醯 | 8N | 分 | 8N2. | 黺 | 8N2B | 翂 |
| 8N2C | 氛 | 8N2L | 粼 | 8N2P | 鄰 | 8N2\ | 遂 | 8N38 | 貧 | 8NF | 坌 |
| 8NGG | 掰 | 8NH | 鳻 | 8NH8 | 頒 | 8NMU | 盆 | 8NO | 酪 | 8NP | 邠 |
| 8NU | 弅 | 8NW | 岔 | 8NX | 攽 | 8NX | 酴 | 8NY | 贫 | 8NZ | 忿 |
| 8O | 谷 | 8O5 | 酲 | 8OAO | 谿 | 8OB/ | 谬 | 8OC. | 谺 | 8OCE | 谹 |
| 8OH | 鵒 | 8OKX | 豅 | 8OMR | 谾 | 8ON; | 谿 | 8ONA | 欲 | 8ONZ | 慾 |
| 8OOX | 豂 | 8OP | 卻 | 8OQ | 兑 | 8OQX | 敓 | 8ORX | 豁 | 8OS8 | 谼 |
| 8OS; | 谽 | 8P | 郤 | 8PK | 粻 | 8Q. | 粃 | 8QX | 酘 | 8R1C | 粑 |
| 8R1U | 糮 | 8R9J | 糈 | 8RB. | 稊 | 8RB/ | 弟 | 8RB1 | 弟 | 8RB1 | 籾 |
| 8RB; | 糨 | 8RBB | 稊 | 8RBH | 鵜 | 8RBN | 剃 | 8RC | 配 | 8ROO | 醍 |
| 8RR | 粔 | 8S | 籵 | 8S/F | 糒 | 8SD | 醋 | 8SE | 酣 | 8SO | 酤 |
| 8SOJ | 糊 | 8SOJ | 醐 | 8SOU | 醢 | 8SOY | 醐 | 8S\ | 杖 | 8TH8 | 頪 |
| 8TJ | 醢 | 8U64 | 糒 | 8UAF | 醛 | 8UDV | 糢 | 8UFR | 醝 | 8UFY | 糕 |
| 8UJN | 糏 | 8UUV | 醭 | 8V | 酥 | 8V.8 | 類 | 8V1 | 粁 | 8V4 | 醺 |
| 8VC | 耗 | 8VC | 酕 | 8VDC | 醃 | 8VDL | 醃 | 8X | 父 | 8X | 敉 |
| 8X | 敞 | 8X.; | 糬 | 8X3 | 瞥 | 8X9 | 蹩 | 8X9D | 楷 | 8X; | 蟞 |
| 8XAD | 橃 | 8XEC | 斃 | 8XEU | 釜 | 8XH | 鷩 | 8XH1 | 斧 | 8XL | 嫳 |
| 8XM1 | 幣 | 8XMR | 鱉 | 8XN | 鼈 | 8XNN | 爹 | 8XO | 酪 | 8XOC | 鏊 |
| 8XPP | 爺 | 8XRB | 彆 | 8XRC | 爸 | 8XU | 弊 | 8XV. | 獘 | 8XW | 醱 |
| 8XXX | 醊 | 8XZ | 憋 | 8\ | 迷 | 8\RX | 醚 | 9 | 足 | 9 | 卜 |
| 9 | 止 | 9,O | 蹦 | 9.RK | 踉 | 9/BI | 踩 | 9/BX | 跛 | 9/DI | 蹀 |
| 9/DX | 蹤 | 90\ | 踵 | 91YX | 踱 | 927. | 踇 | 92C | 趷 | 92I | 跦 |
| 92Q | 跣 | 92Q8 | 蹟 | 92S2 | 蹪 | 92V | 跌 | 92VO | 跑 | 933F | 躍 |
| 933X | 躩 | 938 | 貞 | 938\ | 遉 | 94 | 跴 | 94B; | 蹋 | 94V\ | 躂 |
| 96I4 | 躏 | 96J. | 踹 | 97R | 卣 | 97R\ | 逌 | 97X5 | 鹹 | 97XA | 鹼 |
| 97XR | 鹺 | 97XY | 鹵 | 98 | 趴 | 984D | 蹭 | 988. | 蹲 | 988P | 蹾 |
| 98N2 | 蹸 | 99 | 趾 | 99 | 踶 | 99C | 跐 | 99DS | 踔 | 99EX | 蹝 |
| 99O | 跕 | 99T | 跢 | 9;8X | 踆 | 9;M | 踽 | 9;O | 跆 | 9A/ | 跈 |
| 9ABZ | 跲 | 9AF | 跧 | 9AG. | 跗 | 9AJN | 踰 | 9AKF | 踓 | 9AMU | 踚 |
| 9AO | 跲 | 9ARO | 蹌 | 9AYJ | 蹐 | 9B,I | 蹂 | 9B. | 趵 | 9B., | 蹄 |

| | | | | | | | | | | | |
|---|---|---|---|---|---|---|---|---|---|---|---|
| 9B.F | 踊 | 9B8 | 踘 | 9BBA | 跋 | 9BBF | 躍 | 9BBI | 跺 | 9BRC | 跑 |
| 9C | 此 | 9C | 蹝 | 9C1 | 訾 | 9C3 | 眥 | 9C38 | 貲 | 9C9O | 跕 |
| 9CAF | 雌 | 9CAK | 觜 | 9CD; | 嶲 | 9CDF | 躚 | 9CE, | 蹝 | 9CEE | 些 |
| 9CET | 柴 | 9CF. | 蹢 | 9CH8 | 頾 | 9CI | 柴 | 9CMA | 觜 | 9CN | 觜 |
| 9CN | 紫 | 9CO | 呰 | 9CQ | 砦 | 9CSX | 踱 | 9CSY | 蹠 | 9CT | 紫 |
| 9CX | 跛 | 9C\ | 鮆 | 9D5 | 踐 | 9DB/ | 踢 | 9DBB | 蹋 | 9DE/ | 踼 |
| 9DE9 | 踶 | 9DH/ | 踼 | 9DI | 桌 | 9DI | 踝 | 9DS | 卓 | 9DS5 | 戟 |
| 9DSH | 鵫 | 9DS\ | 逴 | 9DUF | 蹕 | 9E | 上 | 9E55 | 踐 | 9E7D | 踖 |
| 9E8X | 蹣 | 9E9 | 卡 | 9E99 | 蹦 | 9E;F | 跬 | 9EA9 | 蹤 | 9EC | 北 |
| 9EC8 | 冀 | 9ECJ | 背 | 9ECP | 邶 | 9ECP | 鄁 | 9EG | 趼 | 9EJ8 | 頔 |
| 9EO7 | 蹓 | 9ER9 | 踺 | 9ET3 | 督 | 9ETK | 裻 | 9ETX | 叔 | 9ETZ | 惄 |
| 9ET\ | 鬈 | 9EU | 跰 | 9EXX | 赦 | 9EZ | 志 | 9F38 | 蹟 | 9F8F | 踥 |
| 9F8X | 踆 | 9F9 | 跣 | 9FB. | 躊 | 9FBG | 跱 | 9FF | 跬 | 9FFQ | 蹺 |
| 9FG. | 峙 | 9FG. | 跱 | 9FU\ | 蹥 | 9H | 鴇 | 9HBO | 踻 | 9HC | 跜 |
| 9HE8 | 蹪 | 9HE9 | 跅 | 9HF. | 蹻 | 9HMU | 蹁 | 9HSK | 蹍 | 9HSO | 踞 |
| 9HT5 | 歲 | 9HT8 | 顏 | 9HTB | 翽 | 9HTN | 劌 | 9HUA | 蹶 | 9IDE | 踏 |
| 9J | 肯 | 9JE | 跙 | 9JI | 踩 | 9JI7 | 蹯 | 9JTV | 蹊 | 9JW | 蹈 |
| 9K81 | 蹄 | 9K8O | 蹢 | 9K8P | 蹐 | 9K8X | 跤 | 9KAS | 踤 | 9KF | 跓 |
| 9KJX | 躘 | 9KL | 踥 | 9KO | 踣 | 9KO. | 蹴 | 9KOK | 躟 | 9KT | 跡 |
| 9L45 | 躐 | 9L75 | 躐 | 9LD5 | 躐 | 9M83 | 睿 | 9M85 | 蹈 | 9M8F | 壑 |
| 9MAD | 蹓 | 9MC | 跎 | 9ME3 | 睿 | 9MEF | 壑 | 9MET | 蹤 | 9MEX | 穀 |
| 9MEX | 叡 | 9MJX | 穀 | 9MME | 蹮 | 9MNC | 踈 | 9MU | 躧 | 9MUA | 献 |
| 9NHC | 跪 | 9NN | 跢 | 9NX8 | 粲 | 9NXE | 鑿 | 9NXK | 餐 | 9O | 占 |
| 9O18 | 躓 | 9O3Q | 覘 | 9O9X | 战 | 9OC | 乩 | 9OOI | 躁 | 9O\ | 站 |
| 9P8 | 踑 | 9P8L | 踶 | 9PC | 跘 | 9PPP | 躡 | 9PQL | 踸 | 9PX | 踙 |
| 9Q | 跖 | 9QI | 跺 | 9QY | 跳 | 9R.7 | 蹓 | 9R1C | 跁 | 9RA | 趹 |
| 9RCZ | 跽 | 9RK | 跟 | 9RR | 距 | 9S38 | 蹎 | 9SD | 踖 | 9SL | 跐 |
| 9SLI | 蹀 | 9SM1 | 踹 | 9SMA | 蹣 | 9SO | 跕 | 9SX | 歧 | 9SX | 跂 |
| 9SX. | 跋 | 9T | 步 | 9TH1 | 蹩 | 9TH8 | 頻 | 9THS | 蹩 | 9TJ | 踃 |
| 9TMF | 蹚 | 9TTE | 躠 | 9U/X | 蹉 | 9U6F | 躝 | 9UFD | 躇 | 9UFR | 蹉 |
| 9US | 跰 | 9UU | 踫 | 9UU | 跰 | 9UUV | 蹼 | 9UVC | 踡 | 9UVD | 蹯 |
| 9V | 趺 | 9VAO | 蹻 | 9VD | 蹛 | 9VDF | 踵 | 9VEB | 跨 | 9VEJ | 踦 |
| 9VL | 踒 | 9VRB | 蹥 | 9VW | 踳 | 9VY | 踧 | 9W | 齒 | 9W/; | 齲 |
| 9W2C | 齕 | 9W7I | 齾 | 9W9 | 齪 | 9W9C | 齱 | 9W;M | 齲 | 9W;O | 齝 |
| 9WA. | 齡 | 9WA1 | 齗 | 9WBC | 齙 | 9WBO | 齣 | 9WBW | 齺 | 9WC | 齔 |
| 9WD5 | 齜 | 9WD; | 齴 | 9WEO | 齬 | 9WH1 | 踹 | 9WH1 | 齗 | 9WHF | 齷 |
| 9WJE | 齟 | 9WJJ | 蹢 | 9WK/ | 齶 | 9WNO | 齠 | 9WO8 | 齦 | 9WOB | 齶 |
| 9WPX | 齯 | 9WR/ | 齖 | 9WRK | 齦 | 9WS8 | 齻 | 9WSD | 齰 | 9WSL | 齷 |
| 9WUU | 齸 | 9WVJ | 齮 | 9WWQ | 齯 | 9XD | 踏 | 9XO | 路 | 9XOH | 鷺 |
| 9\EU | 蹬 | 9\RX | 蹵 | ; | 虫 | ;./Y | 蝸 | ;.2G | 蝴 | ;.;P | 螂 |
| ;.N8 | 蠆 | ;.RK | 蜋 | ;.S | 蚪 | ;/3. | 螅 | ;/3Z | 螅 | ;/7Z | 蟌 |
| ;/9\ | 螆 | ;/; | 䖳 | ;/D1 | 蜱 | ;/D5 | 蝗 | ;/DS | 蟀 | ;/O; | 蝺 |
| ;0 | 蜅 | ;0H1 | 蟴 | ;1FD | 蠕 | ;2 | 牟 | ;23 | 蚱 | ;2B9 | 蝭 |
| ;2C | 虼 | ;2DX | 螋 | ;2H | 鵪 | ;2I | 蛛 | ;2V | 矣 | ;2V | 蛈 |
| ;2VA | 蚨 | ;2VO | 蜘 | ;33F | 蠷 | ;33X | 蠖 | ;38L | 蠳 | ;3Q | 蜆 |
| ;4 | 蟔 | ;4B; | 蠋 | ;4DS | 蟫 | ;4EK | 蠉 | ;4ET | 螵 | ;4FS | 蟳 |
| ;5\ | 蜓 | ;6 | 蠕 | ;6HX | 蟨 | ;777 | 蝭 | ;7E5 | 蜩 | ;7J | 蜎 |
| ;7O | 蛆 | ;7S | 蚰 | ;7T | 螺 | ;7U | 蚰 | ;7V | 蝈 | ;88 | 蜷 |
| ;8; | 蚣 | ;8;B | 蝓 | ;8N | 蚡 | ;8OQ | 蜕 | ;8X | 蚊 | ;8XX | 蛟 |
| ;8X\ | 逡 | ;9O | 蛄 | ;;2 | 蛘 | ;;; | 蟲 | ;;;/ | 參 | ;;;C | 鍎 |

| | | | | | | | | | | | |
|---|---|---|---|---|---|---|---|---|---|---|---|
| ;;;E | 蔘 | ;;;N | 剼 | ;;;T | 粂 | ;;;U | 蠱 | ;;M | 蝺 | ;;P | 蝑 |
| ;A | 以 | ;A11 | 蚧 | ;AB | 蛉 | ;AB. | 蛉 | ;AE8 | 蟦 | ;AG. | 蚍 |
| ;AI | 蜍 | ;AJN | 蝓 | ;AKF | 蜼 | ;AKY | 蟭 | ;AMU | 蝓 | ;AO | 蛤 |
| ;AR/ | 蜱 | ;B | 螞 | ;B,I | 蝶 | ;B. | 蚼 | ;B. | 蚼 | ;B.F | 蝠 |
| ;B2W | 蝳 | ;B9J | 蟜 | ;BB/ | 蟉 | ;BBF | 蠗 | ;BEE | 蚼 | ;BGU | 蛞 |
| ;BO | 蚼 | ;BXW | 蝹 | ;C | 螔 | ;C.V | 蝂 | ;C7U | 蠦 | ;CC | 蝍 |
| ;CCD | 蜡 | ;CCF | 蜼 | ;CRO | 螗 | ;CSY | 蝷 | ;CUT | 蟑 | ;CUW | 蟀 |
| ;CX | 蚾 | ;D | 蛔 | ;D3 | 蝟 | ;D4X | 蟃 | ;DB/ | 蝪 | ;DBA | 蝶 |
| ;DBL | 蝪 | ;DE/ | 蝪 | ;DE9 | 蝭 | ;DH/ | 蝪 | ;DI | 蜱 | ;DMU | 蝹 |
| ;DOL | 螻 | ;E7D | 螬 | ;E;F | 蛭 | ;EDZ | 蟪 | ;EEQ | 蚖 | ;EJ | 虰 |
| ;ELR | 蛵 | ;EMA | 蚸 | ;ENN | 蜊 | ;EO5 | 蠛 | ;EO7 | 蝠 | ;EOJ | 蚵 |
| ;ER9 | 蜨 | ;ES | 蚲 | ;EX. | 蛷 | ;F | 蚌 | ;F7. | 蝳 | ;FD | 蝫 |
| ;FF | 蛙 | ;FFQ | 蟯 | ;FJ | 蜻 | ;FO | 蛄 | ;FO/ | 蟛 | ;FOO | 蟢 |
| ;H/T | 螈 | ;H13 | 蝟 | ;H1; | 蠣 | ;H38 | 蝢 | ;H7P | 蝠 | ;H9E | 蛵 |
| ;H;\ | 蝹 | ;HBC | 蛇 | ;HCQ | 螔 | ;HD | 蛆 | ;HE1 | 蚚 | ;HE9 | 蚸 |
| ;HEK | 蜄 | ;HEX | 蝦 | ;HEY | 蝸 | ;HL5 | 蝛 | ;HMU | 蝹 | ;HMV | 蟆 |
| ;HR | 蚯 | ;HR1 | 螄 | ;HRI | 蝹 | ;HSO | 蜛 | ;HU; | 蟎 | ;HV. | 蜈 |
| ;H\ | 蚞 | ;I | 蛛 | ;I8; | 蜙 | ;ID | 蝀 | ;IH1 | 螄 | ;JBG | 蜉 |
| ;JC; | 蠁 | ;JCC | 能 | ;JCY | 熊 | ;JCZ | 態 | ;JE | 蛆 | ;JEX | 蝯 |
| ;JG. | 蛶 | ;JI7 | 蟠 | ;JIZ | 蟋 | ;JTV | 蝶 | ;K7E | 蟺 | ;K8. | 螃 |
| ;K8O | 蟜 | ;K8P | 蜻 | ;K8X | 蛟 | ;KD5 | 蟙 | ;KDS | 蟑 | ;KF | 蛀 |
| ;KJX | 蠰 | ;KL | 虻 | ;KO, | 螈 | ;KOG | 蜉 | ;KOJ | 蜉 | ;KOK | 蠰 |
| ;KQ | 蚢 | ;KT | 蚿 | ;KTS | 蜂 | ;KX | 蚊 | ;KX; | 螃 | ;L1 | 蚪 |
| ;L45 | 蠟 | ;L75 | 蠟 | ;LD5 | 蠟 | ;M | 禹 | ;M8F | 螳 | ;MA | 蚋 |
| ;MC | 蛇 | ;MD8 | 螟 | ;ME8 | 螾 | ;ME8 | 蟥 | ;MEE | 蝗 | ;MER | 蠅 |
| ;MF | 蛃 | ;MFO | 蜩 | ;MFO | 蟮 | ;MH1 | 蠕 | ;MJ | 蜡 | ;MNC | 蜿 |
| ;MO | 蝸 | ;MP | 鄒 | ;N | 蚓 | ;N, | 蝝 | ;N38 | 蛸 | ;N4, | 蝝 |
| ;NH1 | 蟾 | ;NHC | 蟯 | ;NO | 蛁 | ;NW | 蛤 | ;O | 台 | ;OE. | 皕 |
| ;OI | 臬 | ;OJ | 蜎 | ;OLV | 蜈 | ;OOS | 蟬 | ;OP | 邰 | ;OY | 臭 |
| ;OZ | 怠 | ;O\ | 迨 | ;P | 即 | ;P8 | 蜞 | ;PF | 型 | ;PO5 | 蟶 |
| ;Q | 允 | ;Q | 虮 | ;R | 虹 | ;R1C | 蚆 | ;R2B | 蠣 | ;RA | 蚗 |
| ;RB1 | 蚓 | ;RC8 | 蝶 | ;RDL | 蝘 | ;RE5 | 蚔 | ;REE | 蚔 | ;RG | 蚜 |
| ;RJ/ | 蚜 | ;RK | 蜋 | ;RK\ | 蜫 | ;RQ | 既 | ;RQE | 暨 | ;RQF | 塈 |
| ;RQN | 鱀 | ;RR | 蚷 | ;RR. | 蝭 | ;S78 | 蟥 | ;SC. | 蚘 | ;SC/ | 蛖 |
| ;SD | 蜡 | ;SE | 蚶 | ;SE8 | 蟥 | ;SLI | 蝶 | ;SM1 | 蝏 | ;SMS | 蝻 |
| ;SO | 蛄 | ;SOF | 蟽 | ;SOJ | 蝴 | ;SU8 | 蟦 | ;SX | 蚑 | ;SX. | 蚑 |
| ;T, | 蚴 | ;TJ | 蛸 | ;TM7 | 蟷 | ;TMF | 蝗 | ;TT5 | 蟣 | ;U | 弁 |
| ;U45 | 蠖 | ;UAX | 蠖 | ;UDV | 螟 | ;UF | 蛘 | ;UF | 蛘 | ;UF5 | 蟻 |
| ;UFQ | 蛘 | ;UH | 鵃 | ;UM, | 蠓 | ;UMV | 蟆 | ;UOF | 蠸 | ;UR1 | 蟻 |
| ;UR6 | 蠛 | ;USI | 蝶 | ;UU | 蛢 | ;UVC | 蜷 | ;UVU | 蟒 | ;V | 蚨 |
| ;V.S | 蝌 | ;V0 | 蚕 | ;V1O | 蛞 | ;V38 | 蚕 | ;V7 | 蚕 | ;V8T | 蟟 |
| ;VAA | 蛺 | ;VAO | 蟜 | ;VC | 蚝 | ;VC | 蚝 | ;VDF | 蝩 | ;VG5 | 蛾 |
| ;VL | 蜲 | ;VN | 蝌 | ;VRB | 蛦 | ;VV | 蠑 | ;WAO | 蠵 | ;WEU | 螘 |
| ;WQ | 蜺 | ;XF | 蜂 | ;XRI | 蝶 | ;XWX | 蝬 | ;XXX | 蝬 | ;YY, | 蟧 |
| ;YYI | 蝶 | A | 人 | A | 入 | A, | 仂 | A,5 | 侹 | A,O | 伽 |
| A. | 仿 | A. | 俐 | A./Y | 偽 | A.NA | 攸 | A.RK | 俍 | A.X | 倣 |
| A/7X | 俊 | A/7Z | 偬 | A/; | 傀 | A/BB | 仍 | A/BX | 伋 | A/C | 仇 |
| A/D | 伯 | A/D1 | 俾 | A/D5 | 偟 | A/DS | 俾 | A/DX | 儆 | A/MU | 伷 |
| A/T | 傢 | A0G. | 傅 | A0\ | 倢 | A1 | 信 | A11 | 介 | A1EA | 似 |
| A1FD | 儲 | A1RV | 候 | A1X | 攸 | A1X. | 條 | A1X/ | 修 | A1X4 | 儵 |

| | | | | | | | | | | | |
|---|---|---|---|---|---|---|---|---|---|---|---|
| A1X9 | 筌 | A1XB | 脩 | A1XI | 條 | A1XJ | 脩 | A1XN | 絛 | A1XS | 脩 |
| A1XT | 條 | A1XY | 倏 | A1XZ | 悠 | A1X\ | 鋚 | A2 | 件 | A23 | 作 |
| A27. | 侮 | A2C | 仡 | A2D/ | 傷 | A2I | 侏 | A2O2 | 偉 | A2Q | 侁 |
| A2Q8 | 僨 | A2S | 仵 | A2V | 佚 | A33 | 俳 | A38 | 俱 | A38/ | 傌 |
| A38N | 側 | A3Q | 倪 | A438 | 價 | A48 | 僳 | A4D | 會 | A4DN | 劊 |
| A4DP | 鄶 | A4EK | 偎 | A4ET | 僄 | A4L | 便 | A4TF | 儷 | A4VC | 偎 |
| A5 | 任 | A538 | 賃 | A5H | 鴌 | A5I | 凭 | A5Z | 恁 | A5\ | 侹 |
| A6 | 們 | A6J | 僩 | A7 | 佃 | A777 | 儡 | A77T | 傫 | A7EK | 偎 |
| A7O | 佪 | A7SB | 傍 | A7SO | 個 | A7UK | 儂 | A7Z | 偲 | A8 | 仈 |
| A84D | 僧 | A88 | 偤 | A88. | 傖 | A8; | 伀 | A8BF | 儸 | A8J | 佾 |
| A8N | 份 | A8N2 | 傍 | A8O | 俗 | A8OQ | 俛 | A9 | 企 | A9 | 促 |
| A9 | 仆 | A938 | 偵 | A9C | 倱 | A9CI | 傑 | A9DS | 倬 | A9E | 仩 |
| A9E9 | 什 | A9EJ | 僑 | A9EX | 傲 | A9O | 佔 | A;/5 | 餭 | A;/; | 餣 |
| A;/O | 餉 | A;0 | 餔 | A;0. | 餺 | A;1X | 餿 | A;2 | 伴 | A;2, | 飭 |
| A;21 | 飾 | A;28 | 饌 | A;2V | 俟 | A;5 | 飪 | A;7K | 餵 | A;8A | 餕 |
| A;8X | 俊 | A;95 | 饑 | A;; | 蝕 | A;;O | 飴 | A;;X | 餕 | A;A | 似 |
| A;AI | 餘 | A;AV | 餛 | A;BC | 飽 | A;BO | 飼 | A;C8 | 饒 | A;D/ | 餳 |
| A;DC | 餛 | A;DL | 餲 | A;DX | 餒 | A;E5 | 餞 | A;EC | 飩 | A;EJ | 飣 |
| A;EJ | 餡 | A;EU | 餖 | A;FO | 饐 | A;FQ | 饒 | A;FU | 饁 | A;FU | 饐 |
| A;HV | 餱 | A;HX | 飯 | A;IO | 餗 | A;JL | 餒 | A;KE | 饘 | A;KK | 饟 |
| A;KX | 餃 | A;M | 偏 | A;MO | 餌 | A;MO | 館 | A;MR | 館 | A;N, | 餘 |
| A;N. | 饑 | A;NA | 飲 | A;NW | 餡 | A;O | 飴 | A;O8 | 饋 | A;P | 餌 |
| A;Q | 飢 | A;R7 | 餾 | A;R8 | 饌 | A;RO | 饂 | A;RP | 饗 | A;S8 | 饋 |
| A;SF | 饉 | A;SG | 餑 | A;SJ | 餬 | A;T5 | 饑 | A;TI | 饌 | A;U, | 饈 |
| A;UF | 饈 | A;UO | 饍 | A;UU | 餅 | A;UV | 饃 | A;UX | 餟 | A;V5 | 餓 |
| A;VA | 飫 | A;VC | 飥 | A;VL | 餧 | A;VO | 餂 | A;XJ | 餚 | A;XX | 餟 |
| A;YY | 餤 | A;Z/ | 飶 | AA11 | 价 | AA4D | 儈 | AAAF | 侳 | AAAS | 傘 |
| AAB | 伶 | AAB. | 伶 | AAB8 | 倫 | AAE5 | 鐵 | AAF | 坐 | AAF | 佺 |
| AAFN | 剉 | AAFX | 娄 | AAJE | 俎 | AAJN | 偷 | AAKF | 倠 | AAKY | 僬 |
| AAMU | 倫 | AAO | 佮 | AAOA | 儉 | AARO | 倉 | AAW | 偸 | AB | 今 |
| AB | 傌 | AB,O | 倆 | AB. | 今 | AB.. | 瓴 | AB.8 | 領 | AB.B | 翎 |
| AB.F | 俑 | AB.H | 鴒 | AB1C | 他 | AB1Z | 偬 | AB38 | 貪 | AB8 | 侖 |
| AB8D | 諭 | AB8U | 盒 | ABAF | 雃 | ABB/ | 仍 | ABB/ | 儚 | ABBA | 仮 |
| ABD | 佝 | ABEO | 伺 | ABG | 仔 | ABH | 鴿 | ABKK | 衾 | ABO | 含 |
| ABO | 佝 | ABO8 | 頷 | ABZ | 念 | ABZX | 斂 | AC | 化 | AC29 | 儗 |
| AC38 | 貨 | AC7Z | 傹 | ACA. | 俯 | ACC | 仳 | ACCD | 偕 | ACH8 | 傾 |
| ACRF | 傭 | ACVC | 侂 | ACY | 儦 | AD1 | 伸 | AD4X | 侵 | ADBB | 偈 |
| ADBL | 偈 | ADCC | 伲 | ADD | 倡 | ADE | 但 | ADE9 | 偍 | ADF | 俚 |
| ADM; | 偶 | ADOL | 僂 | ADSX | 偎 | ADTY | 偎 | AE2 | 伍 | AE2O | 俉 |
| AE5 | 代 | AE5 | 伐 | AE52 | 傘 | AE54 | 黛 | AE55 | 傒 | AE58 | 貸 |
| AE5I | 垈 | AE5K | 袋 | AE5W | 岱 | AE7D | 儁 | AE7E | 儃 | AE9Y | 僊 |
| AE;F | 侄 | AE;N | 倒 | AEA9 | 從 | AED. | 傳 | AEDX | 便 | AEE | 仁 |
| AEE5 | 侙 | AEE; | 伝 | AEEE | 仨 | AEEL | 侫 | AEF. | 倚 | AEJ | 仃 |
| AEJ. | 佤 | AELR | 俓 | AEMA | 俩 | AEMC | 儸 | AENN | 例 | AEO7 | 偪 |
| AEOJ | 何 | AEOJ | 俜 | AEOX | 使 | AER9 | 倢 | AESO | 佸 | AESW | 偭 |
| AET | 余 | AEU1 | 伻 | AEUN | 俩 | AEWC | 伅 | AEX. | 俅 | AEX; | 禽 |
| AF | 全 | AF | 仕 | AF.X | 傲 | AF38 | 僨 | AF48 | 價 | AF8X | 倰 |
| AF; | 佉 | AFB. | 儔 | AFC | 佬 | AFF | 佳 | AFFQ | 僥 | AFG. | 侍 |
| AFJ | 倩 | AFK | 俵 | AFNV | 僽 | AFO | 佶 | AFOF | 僖 | AFOO | 僖 |
| AFT | 傣 | AFUS | 倖 | AG. | 付 | AG.L | 妥 | AG.Z | 恁 | AGOR | 俜 |

| | | | | | | | | | | | |
|---|---|---|---|---|---|---|---|---|---|---|---|
| AH7P | 偭 | AH9 | 伓 | AH95 | 㑘 | AH9E | 伾 | AH9O | 俖 | AHAF | 偏 |
| AHBG | 偋 | AHBO | 偈 | AHCQ | 傂 | AHD | 佰 | AHE1 | 伒 | AHEF | 偓 |
| AHEK | 侲 | AHEX | 假 | AHJX | 僾 | AHM1 | 偭 | AHMU | 偏 | AHOS | 僻 |
| AHSO | 倨 | AHUU | 偋 | AHV9 | 偓 | AHWW | 倔 | AH\ | 伬 | AI | 休 |
| AI | 余 | AI.S | 斜 | AI7 | 畬 | AI8; | 艌 | AI9X' | 敘 | AIAF | 䧿 |
| AIE | 體 | AIE | 体 | AIH | 偶 | AII9 | 俆 | AIIT | [illegible] | AIW | 釡 |
| AIWW | 鑫 | AIX | 敘 | AIY | 烋 | AIZ | 悆 | AI\ | 途 | AJ | 玥 |
| AJ.A | 似 | AJ2W | 㑥 | AJBG | 俘 | AJI7 | 僠 | AJIZ | 傜 | AJJ | [illegible] |
| AJL | 俀 | AJMF | 偁 | AJMX | 僾 | AJN | 俞 | AJNA | 歈 | AJNC | 毹 |
| AJNP | 鄃 | AJNQ | 覦 | AJNZ | 愈 | AJN\ | 逾 | AJRC | [illegible] | AJTV | 俁 |
| AK | 位 | AK7E | 儃 | AK8. | 傍 | AK8P | 儕 | AK8X | 倣 | AK8X | 佼 |
| AKAS | 倅 | AKD | 倍 | AKDF | 僮 | AKDS | 偉 | AKDZ | 億 | AKF | 住 |
| AKF | 隹 | AKF2 | 雓 | AKFF | 雔 | AKFF | 讎 | AKFF | 雥 | AKFH | 鵻 |
| AKFI | 集 | AKFN | [illegible] | AKFO | 售 | AKFS | 隼 | AKFW | 雋 | AKFX | 隻 |
| AKFX | 雙 | AKFY | 焦 | AKF\ | 進 | AKIQ | 儺 | AKJX | 儱 | AKK | 依 |
| AKL | 伝 | AKLA | 侅 | AKLL | 伝 | AKM1 | 佈 | AKO | 倍 | AKO. | 傚 |
| AKOJ | 停 | AKOK | 倞 | AKOK | 儴 | AKOT | 倞 | AKQ | 伉 | AKT | 伭 |
| AL45 | 儼 | AL75 | 儼 | ALD5 | 儼 | ALO | 伽 | AM8O | 傛 | AM8R | 倥 |
| AMAA | 肉 | AMAF | 傕 | AMC | 佗 | AME, | 傢 | AME8 | 儐 | AMEJ | 佇 |
| AMEO | 侗 | AMER | [illegible] | AMET | 倧 | AMF | 佣 | AMFO | 倜 | AMH1 | 儒 |
| AMHR | 倌 | AML | 侒 | AMNC | 倇 | AMQ | 伉 | AMS8 | 倎 | AMSF | [illegible] |
| AMU | 侖 | AMV | 佒 | AMVC | 侘 | AMZJ | 停 | AN. | 仞 | AN2I | 傑 |
| AN38 | 偩 | AN4, | 像 | ANH1 | 儋 | ANHC | 佹 | ANN | 侈 | ANO. | 儀 |
| ANOQ | 俛 | ANT | 你 | ANTZ | 您 | AO | 合 | AO/O | 侶 | AO1 | 仲 |
| AO18 | 僨 | AO7 | 畣 | AO8 | 伿 | AO9X | 敆 | AOAA | 歛 | AOAN | 劍 |
| AOAO | 僉 | AOAX | 斂 | AOBA | 歙 | AOBB | 翕 | AOG | 拿 | AOGG | [illegible] |
| AOH | 鴿 | AOH8 | 頜 | AOI | 保 | AOIF | 堡 | AOIJ | [illegible] | AOIY | 煲 |
| AOKX | 龕 | AOLV | 俁 | AOMU | 盒 | AONA | 欱 | AOO8 | 頷 | AOOA | 僉 |
| AOOD | [illegible] | AOOH | [illegible] | AOON | 劍 | AOOS | 僤 | AOOU | 侖 | AOOV | 龢 |
| AOOX | 斂 | AOOX | 儼 | AOP | 命 | AOP | 部 | AOP | 倡 | AOQ | 侃 |
| AORC | 俋 | AOU | 弇 | AP | 佴 | AP8 | 倛 | AP8A | 僛 | AP8L | 偡 |
| APK | 倀 | APQL | 偡 | AQ | 仉 | AQ; | 佩 | AQE1 | 佩 | AQY | 佻 |
| AR | 仜 | AR | 全 | AR/ | 伊 | AR/5 | 戧 | AR/H | 鶬 | AR/N | 創 |
| AR/O | 倉 | AR1U | 儘 | AR1V | 候 | AR2P | 卿 | AR2V | 侯 | ARB1 | 佛 |
| ARB1 | 佛 | ARC8 | 僎 | ARDL | 偃 | AREE | 低 | ARF\ | 健 | ARG | 伢 |
| ARJ/ | 伢 | ARK | 食 | ARK | 佷 | ARMX | 侵 | AROO | 傴 | ARP | 仰 |
| ARQD | 僭 | ARR | 佢 | AS | 什 | AS | 升 | AS/F | 備 | AS/Z | 德 |
| AS3 | 值 | AS38 | 偵 | AS8 | 供 | ASC. | 优 | ASD | 借 | ASJ | 侑 |
| ASL | 伳 | ASLI | 傑 | ASM | 佈 | ASM1 | 佈 | ASMF | 僃 | ASO | 估 |
| ASO | 佑 | ASO | 舍 | ASO0 | 舖 | ASOF | 僅 | ASOF | 儺 | ASOH | 鴣 |
| ASOJ | 舒 | ASOR | 館 | ASOX | 做 | ASR | 佐 | ASU8 | 債 | ASX | 伎 |
| AS\ | 仗 | AT | 尒 | AT/3 | 偕 | ATJ | 俏 | ATM4 | 儻 | ATM7 | 償 |
| ATM8 | 償 | ATMO | 倘 | AU.Y | 僞 | AU/Y | 僞 | AU4N | 僔 | AUBX | 僘 |
| AUF | 佯 | AUF5 | 儀 | AUFR | 傞 | AUMV | 㑷 | AUP | 倩 | AURT | 傔 |
| AUS | 伴 | AUSO | 偌 | AUU | 併 | AUUV | 僕 | AUVC | 倦 | AV | 伕 |
| AV. | 伏 | AV1 | 仟 | AV1O | 佸 | AV1W | 偛 | AV8T | 僚 | AV; | [illegible] |
| AVAA | 俠 | AVAO | 僑 | AVD | 倚 | AVDC | 俺 | AVDF | 僅 | AVDL | 俺 |
| AVEB | 倚 | AVEJ | 倚 | AVET | 倴 | AVF | 倖 | AVG5 | 俄 | AVL | 倭 |
| AVN | 俐 | AVRB | 侇 | AVS | 體 | AVUF | 倕 | AVVD | 偺 | AVX | 倷 |
| AVXX | 俟 | AVY | 俶 | AVYZ | 憖 | AW | 仙 | AW | 仚 | AW | 仚 |

| | | | | | | | | | | | |
|---|---|---|---|---|---|---|---|---|---|---|---|
| AWAB | 侉 | AWAF | 催 | AWH1 | 偳 | AWJJ | 備 | AWQ | 倪 | AX | 氽 |
| AX. | 佟 | AX9D | 偺 | AXAD | 傄 | AXO | 佫 | AXS1 | 俙 | AXYX | 傻 |
| AY | 伙 | AYJ | 脊 | AYJH | 鵲 | AYY | 倓 | AYY, | 傍 | AZ | 佡 |
| AZ/ | 佖 | A\ET | 傺 | B | 馬 | B, | 矛 | B,;; | 矗 | B,AB | 矜 |
| B,I | 柔 | B,IH | 鶔 | B,MC | 毹 | B,MH | 鶜 | B,MN | 矟 | B,MO | 矞 |
| B,M\ | 遹 | B,SD | 矠 | B,X, | 務 | B,X3 | 瞀 | B,X; | 蝥 | B,XB | 鶩 |
| B,XF | 堥 | B,XH | 鶩 | B,XI | 楘 | B,XL | 婺 | B,XS | 鍪 | B,X\ | 鏊 |
| B. | 勺 | B. | 匀 | B.M, | 勇 | B.MF | 甬 | B.MZ | 恿 | B.M\ | 通 |
| B.RK | 駺 | B/ | 勿 | B/. | 匆 | B/.Z | 匆 | B/7Z | 驄 | B/; | 駹 |
| B/BX | 駁 | B/C | 匃 | B/D | 曶 | B/D5 | 驓 | B/MF | 甮 | B/N | 刎 |
| B/Z | 忽 | B/\ | 匆 | B0 | 匍 | B1 | 匐 | B111 | 馴 | B1C | 也 |
| B1C\ | 迆 | B1RX | 騪 | B1WX | 騪 | B2Q | 駪 | B2SW | 匐 | B33 | 騑 |
| B4 | 駰 | B4DS | 驛 | B4ET | 驃 | B4FS | 驛 | B4L | 騕 | B7 | 甸 |
| B7S | 駎 | B7SB | 騁 | B7T | 騍 | B7V | 駟 | B8 | 匊 | B84D | 騭 |
| B8H | 虢 | B8N2 | 騖 | B8OQ | 駪 | B9 | 疋 | B9; | 蛋 | B9E8 | 驥 |
| B9IO | 疏 | B9J | 胥 | B9KQ | 疏 | B; | 勾 | B;2V | 騃 | B;8X | 駿 |
| B;;/ | 驂 | B;O | 駘 | B;Q | 駒 | BA/ | 駗 | BAB. | 駖 | BABZ | 驗 |
| BAF | 駩 | BAG. | 駙 | BAI | 駼 | BAKF | 騅 | BAOA | 驗 | BASO | 駱 |
| BB | 羽 | BB,I | 騥 | BB,O | 騖 | BB. | 駒 | BB/ | 乃 | BB/5 | 戳 |
| BB/6 | 翩 | BB/; | 翿 | BB/D | 習 | BB/G | 孕 | BB/I | 朵 | BB/N | 剁 |
| BB/Q | 翫 | BB/T | 豖 | BB/U | 盈 | BB/X | 马 | BB0\ | 翴 | BB1C | 馳 |
| BB2V | 翐 | BB2W | 騎 | BB78 | 翼 | BB8N | 翂 | BBA | 及 | BBA/ | 翏 |
| BBA5 | 戮 | BBA5 | 戳 | BBA8 | 翾 | BBAF | 翟 | BBAF | 翯 | BBAH | 鷚 |
| BBAH | 鷚 | BBAP. | 郛 | BBAV | 翭 | BBBA | 駁 | BBBD | 騽 | BBBO | 翑 |
| BBCX | 翍 | BBD9 | 翟 | BBH | 翞 | BBH8 | 翲 | BBK | 翌 | BBK | 翃 |
| BBKL | 翜 | BBKO | 翯 | BBKS | 翠 | BBKT | 翝 | BBMO | 翬 | BBO | 翑 |
| BBO1 | 翀 | BBR | 翋 | BBSX | 翇 | BBU | 羿 | BBVA | 翣 | BBVC | 翯 |
| BBWW | 騷 | BBX | 马 | BBX5 | 翽 | BBXU | 盈 | BBXX | 翄 | BC | 乜 |
| BC7U | 驢 | BCAC | 騶 | BCC1 | 騶 | BCU | 驢 | BD | 旬 | BD | 馹 |
| BDBL | 騸 | BDCC | 騉 | BDE9 | 騠 | BDES | 騜 | BDI | 騍 | BDML | 騵 |
| BDP | 郇 | BDUF | 驛 | BD\ | 迿 | BE | 刁 | BE11 | 卍 | BE1H | 卍 |
| BE;F | 駐 | BEE | 匀 | BEMC | 騙 | BEO | 司 | BEO7 | 訇 | BEOQ | 覗 |
| BES | 馯 | BES5 | 駭 | BEU1 | 訇 | BEU1 | 駍 | BEU5 | 駴 | BF | 丑 |
| BFFQ | 驍 | BFO5 | 驖 | BFP | 那 | BFQ | 駱 | BG | 子 | BG | 孑 |
| BG/T | 孫 | BG/Z | 遜 | BG/\ | 遜 | BGBC | 孢 | BGBG | 孖 | BGBK | 承 |
| BGC | 孔 | BGEE | 孫 | BGH\ | 孤 | BGKA | 孩 | BGM1 | 孺 | BGMT | 孮 |
| BGMU | 孟 | BGRU | 孺 | BGX | 孜 | BGY | 承 | BH/T | 騵 | BH9E | 駓 |
| BHBB | 騙 | BHBG | 騳 | BHBO | 騧 | BHEX | 騣 | BHMU | 騙 | BIAA | 騋 |
| BIO | 騋 | BJ | 了 | BJ | 予 | BJE | 駔 | BJH8 | 預 | BJN, | 豫 |
| BJTV | 驛 | BJXK | 承 | BJ\ | 孓 | BK7E | 驢 | BK8X | 駁 | BKDS | 驛 |
| BKT | 駐 | BKLA | 駿 | BKOK | 驤 | BKOX | 駿 | BKS | 驛 | BMC | 駝 |
| BME8 | 驕 | BMEO | 騞 | BMFO | 騆 | BMI3 | 驕 | BMO | 騆 | BMO | 騆 |
| BNO | 駋 | BNX | 騄 | BO | 句 | BO, | 劬 | BO1 | 蚼 | BOAF | 雊 |
| BOH | 鴝 | BOH1 | 斪 | BOJ | 駒 | BONA | 欨 | BONN | 夠 | BOOS | 驛 |
| BOX | 駃 | BP | 騆 | BP8 | 騏 | BPRB | 駉 | BPX, | 驟 | BPXA | 驟 |
| BQ; | 騷 | BQY | 駣 | BR.7 | 騮 | BR16 | 騄 | BR61 | 騄 | BRA | 駚 |
| BRC | 包 | BRCN | 刨 | BRCY | 怉 | BRF\ | 騠 | BRMX | 騣 | BROO | 驅 |
| BRR | 駈 | BSB8 | 驎 | BSC/ | 駹 | BSOF | 騹 | BSOY | 驖 | BU | 尋 |
| BUAO | 匒 | BUDS | 騂 | BUEF | 驊 | BUJN | 騟 | BUOF | 驊 | BUU | 駢 |
| BV | 馱 | BV9C | 騄 | BVAO | 驕 | BVC | 馲 | BVDC | 匍 | BVEJ | 騎 |

| | | | | | | | | | | | |
|---|---|---|---|---|---|---|---|---|---|---|---|
| BWAO | 驕 | BWBF | 雛 | BWBH | 鴰 | BWBP | 鄒 | BWBW | 芻 | BWBX | 皴 |
| BX | 馭 | BX | 氶 | BX | 敤 | BX.; | 騷 | BXE | 丞 | BXEC | 沓 |
| BXEJ | 胥 | BXEY | 烝 | BXO | 駱 | BXW | 函 | BXW | 匈 | BXW8 | 頙 |
| BXWX | 駿 | BXX | 駁 | BZ/ | 駜 | B\EV | 騤 | C | 七 | C | 乙 |
| C | 匕 | C | 鹿 | C | 气 | C | 疟 | C.,A | 瘸 | C.,O | 痂 |
| C... | 瘀 | C..V | 疿 | C..X | 瘕 | C./1 | 痺 | C./; | 瘽 | C./K | 疙 |
| C./P | 癎 | C./S | 痹 | C./U | 瘻 | C./Z | 癔 | C.0 | 痛 | C.1A | 癌 |
| C.1X | 瘦 | C.2. | 痗 | C.23 | 痄 | C.2C | 疙 | C.2N | 痢 | C.2O | 痴 |
| C.2V | 疾 | C.33 | 痱 | C.3L | 瘿 | C.4T | 瘭 | C.4X | 瘵 | C.6J | 痼 |
| C.7O | 痐 | C.7O | 痐 | C.7T | 瘰 | C.7U | 痹 | C.9C | 疵 | C.9O | 痞 |
| C.; | 痓 | C.;P | 癙 | C.;X | 痠 | C.A/ | 疹 | C.A1 | 疥 | C.AD | 瘡 |
| C.AF | 痓 | C.AF | 痙 | C.AF | 瘫 | C.AJ | 瘠 | C.AN | 痲 | C.AO | 瘡 |
| C.AV | 瘊 | C.AZ | 癒 | C.B/ | 瘳 | C.BF | 痛 | C.BO | 痾 | C.C | 疙 |
| C.C9 | 癡 | C.CC | 疪 | C.CR | 瘧 | C.CX | 疲 | C.D/ | 瘍 | C.DE | 疸 |
| C.DU | 瘟 | C.E, | 瘃 | C.E. | 瘃 | C.E9 | 症 | C.E9 | 瘥 | C.EA | 病 |
| C.EJ | 疔 | C.EO | 痦 | C.ER | 痙 | C.EU | 痘 | C.EX | 癨 | C.EX | 癥 |
| C.F. | 痔 | C.FD | 瘏 | C.FG | 痵 | C.FV | 瘼 | C.FZ | 痣 | C.FZ | 癒 |
| C.HM | 癟 | C.HO | 痞 | C.HS | 癖 | C.HX | 瘕 | C.HX | 癜 | C.I8 | 癩 |
| C.II | 痲 | C.II | 痳 | C.IN | 瘌 | C.JE | 疽 | C.JJ | 瘸 | C.KA | 痎 |
| C.KD | 瘖 | C.KF | 痓 | C.KP | 瘠 | C.KS | 瘴 | C.KS | 瘁 | C.LF | 癰 |
| C.M7 | 瘤 | C.M8 | 痶 | C.MO | 痾 | C.MO | 瘑 | C.MR | 瘖 | C.N1 | 癘 |
| C.NF | 癬 | C.NN | 瘆 | C.NV | 瘓 | C.N\ | 疚 | C.O8 | 瘨 | C.OS | 瘰 |
| C.OW | 癌 | C.PE | 癃 | C.PJ | 痾 | C.PZ | 癮 | C.Q; | 瘋 | C.QX | 疫 |
| C.R | 症 | C.R1 | 痡 | C.R5 | 疷 | C.R7 | 瘤 | C.RC | 疤 | C.RD | 瘄 |
| C.RK | 痕 | C.RX | 瘕 | C.S. | 疣 | C.S/ | 瘯 | C.S8 | 癲 | C.S8 | 瘨 |
| C.SE | 痟 | C.SF | 癰 | C.SF | 瘇 | C.SJ | 痏 | C.SL | 瘧 | C.TJ | 痏 |
| C.U; | 癘 | C.UA | 瘯 | C.UF | 痒 | C.UK | 癢 | C.UO | 瘩 | C.UO | 痦 |
| C.UR | 瘥 | C.UV | 瘼 | C.V8 | 瘠 | C.VB | 痍 | C.VC | 痷 | C.VF | 痙 |
| C.VG | 瘏 | C.VL | 瘘 | C.VL | 瘫 | C.VN | 痢 | C.VT | 瘵 | C.VZ | 瘛 |
| C.W | 疝 | C.W5 | 癟 | C.WA | 痩 | C.X. | 疼 | C.X/ | 痨 | C.X; | 癰 |
| C.Y | 疢 | C.Y, | 癆 | C.YY | 瘓 | C.\T | 瘵 | C.\X | 癈 | C/ | 气 |
| C/.; | 蝨 | C/.\ | 迅 | C/; | 庬 | C/BB | 氛 | C/D1 | 库 | C/D; | 虛 |
| C/D; | 廬 | C/DQ | 殿 | C/DS | 庳 | C0 | 庫 | C1 | 气 | C1.H | 鴟 |
| C1.\ | 迅 | C11 | 氘 | C111 | 氚 | C1RX | 度 | C1WX | 度 | C2SY | 廡 |
| C2V9 | 疑 | C2VA | 款 | C2VF | 肆 | C2VN | 髻 | C38L | 麼 | C38N | 廁 |
| C4 | 氤 | C4I | 橐 | C5\ | 庭 | C7, | 廣 | C7J | 膚 | C7M8 | 顱 |
| C7MH | 甗 | C7MU | 盧 | C7S8 | 廙 | C7V | 氳 | C7Z | 慮 | C7Z, | 勴 |
| C8 | 氣 | C8 | 槖 | C8 | 庮 | C8N | 氛 | C8N2 | 齲 | C9C | 庇 |
| C9O | 店 | C; | 虱 | C;QX | 殿 | C;RQ | 殿 | CA | 庆 | CA1C | 飛 |
| CA4D | 層 | CAAF | 座 | CAAH | 鷹 | CAAJ | 膺 | CAAZ | 應 | CAB | 序 |
| CAG. | 府 | CAGA | 腐 | CAI | 麻 | CAKB | 虧 | CBB/ | 廖 | CBB/ | 氛 |
| CBJ | 序 | CBRC | 庖 | CC | 比 | CC | 庀 | CC | 廛 | CC | 廳 |
| CC/, | 勘 | CC/D | 皆 | CC/H | 龤 | CC7U | 盧 | CC8 | 柒 | CCA1 | 飛 |
| CCC | 庇 | CCC | 霹 | CCF | 坒 | CCH8 | 廎 | CCVC | 坒 | CCZ/ | 慿 |
| CD | 旨 | CD1 | 氰 | CDFF | 壓 | CDMU | 氳 | CDOL | 慶 | CE, | 處 |
| CE,N | 劇 | CE,\ | 遽 | CE1E | 氫 | CE7E | 靈 | CE;F | 座 | CEE8 | 穎 |
| CELR | 氫 | CEMC | 龎 | CEO. | 獻 | CEO. | 甗 | CEO1 | 廬 | CEO5 | 戲 |
| CEOW | 鑿 | CEWC | 庉 | CF | 塵 | CF | 刊 | CF | 庄 | CF.X | 廄 |
| CF8X | 麼 | CF;U | 廬 | CFAO | 膚 | CFBG | 庨 | CFG. | 庤 | CFJ | 氰 |
| CFNT | 麋 | CFO. | 廚 | CGSX | 廄 | CH38 | 頃 | CH3X | 廈 | CHE1 | 庍 |

| | | | | | | | | | | | |
|---|---|---|---|---|---|---|---|---|---|---|---|
| CHEK | 瘻 | CHEX | 靡 | CHFD | 麾 | CHO5 | 靡 | CHOS | 靡 | CI | 床 |
| CI3 | 廂 | CIAA | 庥 | CII | 麻 | CII/ | 麼 | CII2 | 麾 | CII3 | 靡 |
| CII8 | 縻 | CII8 | 麋 | CII; | 魔 | CIIC | 麈 | CIIF | 塺 | CIIG | 摩 |
| CIIN | 劘 | CIIQ | 磨 | CIIT | 麼 | CIIT | 縻 | CIIV | 糜 | CIIX | 靡 |
| CIIY | 黂 | CJE | 臺 | CJEX | 皷 | CJG | 虖 | CJGA | 歔 | CK7V | 庱 |
| CK8P | 蔘 | CK;Q | 窯 | CKF | 塵 | CKJX | 龐 | CKLA | 氣 | CKOP | 廓 |
| CKX | 虔 | CLOF | 廬 | CMA | 氚 | CML | 氨 | CN | 切 | CNKK | 絜 |
| CNN2 | 廨 | CNUF | 廦 | CNX | 氯 | COLH | 鷓 | COLV | 虞 | COLV | 虞 |
| CP | 鄜 | CP5Z | 廮 | CP8 | 麒 | CP81 | 廝 | CPA; | 廢 | CPG. | 麝 |
| CQ | 虎 | CQ | 虓 | CQ/ | 虒 | CQ3Q | 虩 | CQA4 | 虢 | CQC8 | 贙 |
| CQCQ | 虤 | CQE5 | 戲 | CQSE | 彪 | CQY | 虒 | CR | 虐 | CR.7 | 廇 |
| CR1H | 鶊 | CR1O | 唐 | CR1X | 慶 | CR1Y | 鷹 | CRA | 庚 | CRA8 | 賡 |
| CRAH | 鶊 | CRB1 | 氟 | CRBP | 麕 | CREE | 底 | CRG | 庈 | CRJ/ | 庌 |
| CRMF | 庸 | CRMH | 鷛 | CRMP | 鄘 | CRX | 康 | CS78 | 廣 | CS7P | 鄺 |
| CS;; | 彘 | CSB | 鴞 | CSC/ | 庬 | CSD | 唐 | CSDJ | 廟 | CSE8 | 廣 |
| CSH | 鴇 | CSH | 鴈 | CSH\ | 庹 | CSM1 | 席 | CSOF | 廛 | CSOQ | 氪 |
| CSX | 度 | CSX | 庋 | CSXN | 剫 | CSY | 庶 | CSYH | 鷓 | CSY\ | 遮 |
| CS\ | 迅 | CTH8 | 穎 | CTMX | 廠 | CU | 虛 | CU3Q | 虧 | CU8 | 處 |
| CUF | 氧 | CUF | 庠 | CUNA | 獻 | CURT | 廉 | CUU | 庰 | CV | 稟 |
| CVDC | 庵 | CVDL | 庵 | CVH8 | 穎 | CW | 氙 | CWA | 庾 | CWQ | 麑 |
| CX | 皮 | CX. | 氦 | CX9O | 虜 | CXAO | 虜 | CXBC | 皰 | CXES | 皯 |
| CXH8 | 頗 | CXH8 | 穎 | CXQ | 處 | CY | 庶 | CYH8 | 頠 | CYY | 氛 |
| CZ | 氙 | CZ/ | 虡 | C\ | 墨 | C\NA | 厥 | C\RX | 廢 | D | 日 |
| D | 曰 | D. | 昉 | D.2C | 曉 | D.X | 昹 | D/BX | 昄 | D/C | 冕 |
| D/DX | 嗷 | D/MO | 晌 | D/MO | 曷 | D0 | 晡 | D1 | 甲 | D1 | 申 |
| D1D/ | 暢 | D1H | 鴨 | D1I4 | 暕 | D23 | 昨 | D27. | 晦 | D2E | 星 |
| D2E5 | 戥 | D2O2 | 暐 | D2V | 昳 | D3 | 冒 | D3, | 勖 | D3Q | 晛 |
| D3VC | 毷 | D4 | 晒 | D4DS | 曛 | D4FD | 曙 | D4X | 曼 | D4XP | 鄤 |
| D5 | 旺 | D5 | 曳 | D8;B | 晗 | D8N | 昐 | D8N2 | 暽 | D8R/ | 冪 |
| D;8X | 晙 | D;M8 | 顒 | D;MZ | 愚 | D;M\ | 遇 | DAB | 昑 | DAB. | 昤 |
| DAK\ | 暹 | DAS | 昇 | DB. | 昀 | DB. | 的 | DB/ | 易 | DB/ | 昒 |
| DB/N | 剔 | DBAA | 歇 | DBAC | 毼 | DBAH | 鶡 | DBAL | 曷 | DBA\ | 遏 |
| DBBA | 昄 | DBBC | 毷 | DBBF | 曜 | DBB\ | 遢 | DBEE | 昀 | DBO | 昫 |
| DBOY | 煦 | DC1M | 阢 | DCC | 昆 | DCS8 | 曠 | DD | 昌 | DD | 田 |
| DDB/ | 暘 | DDBL | 暍 | DDD | 晶 | DDE/ | 暘 | DDH/ | 暘 | DDKT | 曝 |
| DDSX | 曝 | DE | 旦 | DE2O | 晤 | DE9 | 是 | DE9/ | 匙 | DE92 | 踶 |
| DE98 | 題 | DE9C | 匙 | DE9H | 鶗 | DE9X | 最 | DE;F | 晊 | DEA9 | 睒 |
| DEB/ | 昜 | DEB\ | 逿 | DED. | 曂 | DEDE | 暅 | DEDF | 量 | DEG | 旰 |
| DEH | 鴠 | DEI | 昧 | DEKF | 晗 | DEMA | 昊 | DEMC | 曬 | DES | 旱 |
| DES | 旰 | DEV | 昊 | DEWC | 吨 | DF | 里 | DFBF | 墅 | DFBJ | 野 |
| DFD | 暑 | DFEU | 曀 | DFFQ | 曉 | DFG. | 時 | DFJ | 晴 | DH | 昈 |
| DH38 | 晭 | DHA | 昃 | DHB/ | 易 | DHB5 | 晟 | DHB\ | 逷 | DHC | 昵 |
| DHE1 | 昕 | DHEH | 鶤 | DHEK | 晨 | DHEX | 暇 | DHU; | 曬 | DHX | 昄 |
| DI | 果 | DI | 杲 | DI4 | 睞 | DI9X | 數 | DIH1 | 斷 | DIH8 | 顆 |
| DIK | 累 | DINN | 夥 | DJ | 明 | DJE, | 昜 | DJEX | 暖 | DJMR | 曌 |
| DJMU | 盟 | DJMX | 暖 | DJV. | 猒 | DK | 昱 | DKAS | 晬 | DKD | 暗 |
| DKDF | 曈 | DKDS | 暲 | DKJX | 曨 | DKO/ | 影 | DKO8 | 顥 | DKOK | 曩 |
| DKOO | 暠 | DKOT | 景 | DKOT | 晾 | DKOX | 暾 | DKT | 昡 | DKX | 旼 |
| DKX | 旻 | DM0 | 暉 | DM0 | 暈 | DM; | 禺 | DM;8 | 顒 | DM;Z | 愚 |
| DM;\ | 遇 | DMAF | 曜 | DMD8 | 暝 | DME; | 曇 | DMEE | 暄 | DMEQ | 晥 |

| | | | | | | | | | | | |
|---|---|---|---|---|---|---|---|---|---|---|---|
| DMH1 | 曘 | DML | 晏 | DMLH | 曧 | DMNC | 晼 | DMS8 | 暎 | DMV | 映 |
| DNA | 昖 | DNO | 昭 | DNOQ | 晚 | DNOQ | 冕 | DNOY | 照 | DO1C | 毷 |
| DO1H | 鸚 | DO1L | 婁 | DO1X | 數 | DOEG | 㝵 | DOL | 婁 | DOLC | 毷 |
| DOLH | 鸚 | DOLX | 數 | DOOS | 曎 | DOOX | 曮 | DPX | 最 | DQY | 晁 |
| DR, | 易 | DR1P | 昂 | DRB1 | 昲 | DRB8 | 晴 | DRP | 昂 | DRRY | 哭 |
| DRUO | 暚 | DS | 早 | DS81 | 晷 | DS8X | 暴 | DSMA | 暪 | DSMS | 晡 |
| DSOV | 暯 | DSOY | 曣 | DT.P | 鼎 | DTEQ | 晃 | DTM4 | 曔 | DTT8 | 顯 |
| DTTA | 歆 | DUDV | 暵 | DUEF | 曄 | DUF | 畢 | DUF5 | 曦 | DUFH | 鷃 |
| DUH8 | 顥 | DUM, | 曚 | DV | 昗 | DV11 | 昇 | DV11 | 畀 | DV4 | 曛 |
| DV8T | 暸 | DVD | 晗 | DVDC | 晻 | DVEB | 晇 | DW | 昆 | DWEU | 暟 |
| DWQ | 晛 | DWW | 昢 | DX9O | 暑 | DXAO | 暑 | DXS1 | 晞 | DY | 炅 |
| DY | 昳 | DYY | 暌 | D\ET | 暩 | D\EV | 暌 | E | 一 | E | 彳 |
| E, | 豕 | E,. | 豕 | E,.N | 剢 | E,3X | 豭 | E,DU | 豱 | E,E, | 豨 |
| E,E9 | 豵 | E,EU | 豜 | E,EW | 豳 | E,EY | 豯 | E,FD | 豬 | E,FI | 豶 |
| E,FU | 豴 | E,HC | 豰 | E,HT | 豲 | E,HX | 豭 | E,JV | 豯 | E,KA | 豥 |
| E,RC | 豝 | E,RK | 豤 | E,S8 | 豶 | E,X1 | 豨 | E,\ | 逐 | E,\ | 豕 |
| E,\N | 剢 | E. | 彷 | E.35 | 貳 | E/BX | 彶 | E/D5 | 徨 | E/DX | 徵 |
| E1LB | 丐 | E1R; | 覂 | E1RE | 亞 | E1RF | 堊 | E1RZ | 惡 | E2 | 五 |
| E2DX | 復 | E2EP | 御 | E2ET | 禦 | E2O | 吾 | E2O1 | 警 | E2O2 | 偉 |
| E2O9 | 德 | E2OJ | 衛 | E2OP | 部 | E2OX | 敔 | E2O\ | 逜 | E2SP | 御 |
| E2ST | 禦 | E33 | 徘 | E33J | 衝 | E385 | 貢 | E4 | 徆 | E5 | 戈 |
| E5 | 弋 | E5AF | 雅 | E5E5 | 戔 | E5EU | 盞 | E5H | 鳶 | E5N | 划 |
| E7O | 徊 | E7UD | 曹 | E7U\ | 遭 | E8; | 彸 | E8M. | 壟 | E8MH | 鶲 |
| E8MX | 爾 | E8M\ | 邇 | E8X | 徽 | E9 | 下 | E9 | 正 | E99 | 徙 |
| E9B | 丐 | E9EP | 鄢 | E9EY | 焉 | E9X | 政 | E9Z | 丕 | E;;5 | 戳 |
| E;;D | 晉 | E;;P | 鄑 | E;F | 至 | E;F5 | 臹 | E;FF | 侄 | E;FN | 到 |
| E;FP | 郅 | E;FV | 臻 | E;FX | 致 | EA4D | 徻 | EAA9 | 從 | EAAP | 聳 |
| EAAY | 熧 | EAAZ | 慫 | EAB. | 伶 | EAI | 徐 | EB. | 彴 | EBBA | 彶 |
| EBD | 徇 | EBE | 与 | EBOE | 亟 | EBX | 考 | EBX | 攷 | EC | 七 |
| ECX | 彼 | ED;. | 專 | ED;. | 磚 | ED;H | 鷒 | ED;N | 剸 | ED;P | 鄟 |
| ED;Z | 惠 | EDE | 亙 | EDE. | 得 | EDE9 | 徥 | EDWA | 德 | EDX | 更 |
| EDXE | 甦 | EDXP | 郠 | EE | 二 | EE11 | 井 | EE2J | 衏 | EE9 | 征 |
| EE95 | 武 | EE9H | 鳷 | EE9Q | 虢 | EE; | 云 | EE;; | 魂 | EEE | 三 |
| EEE5 | 貳 | EEEJ | 行 | EEJ | 亍 | EELR | 徑 | EEQ | 元 | EEQ8 | 頑 |
| EEQN | 刓 | EEQP | 祁 | EEQR | 黿 | EESJ | 衎 | EET | 示 | EF9 | 徒 |
| EFFJ | 街 | EFG. | 待 | EG | 于 | EGMU | 盂 | EGP | 邘 | EG\ | 迂 |
| EH12 | 得 | EHEX | 假 | EHMU | 遍 | EHS3 | 循 | EI | 未 | EI | 末 |
| EI.J | 術 | EIAA | 徠 | EIX2 | 犛 | EIXA | 釐 | EIXC | 氂 | EIXF | 螯 |
| EIXG | 孷 | EIXL | 嫠 | EIXN | 斄 | EIXX | 釐 | EJ | 丁 | EJ2W | 徭 |
| EJC. | 瓦 | EJE | 亙 | EJE | 徂 | EJH8 | 頂 | EJN | 切 | EJNK | 挈 |
| EJTV | 徯 | EK8. | 徬 | EK;X | 徹 | EKF | 往 | EKJX | 徿 | EKOK | 儴 |
| EKTJ | 衙 | EL | 七 | EL11 | 卍 | ELR | 巠 | ELR, | 勁 | ELR8 | 頸 |
| ELRH | 鵛 | ELRN | 剄 | ELRQ | 踁 | ELR\ | 逕 | EM.C | 麗 | EM.H | 鸝 |
| EM.P | 酈 | EM.\ | 邐 | EM1A | 兩 | EMA | 丙 | EMAP | 邴 | EMEJ | 衕 |
| EMET | 徖 | EMF | 再 | EMFO | 徟 | EMW | 两 | EN | 互 | EN | 歹 |
| EN. | 亙 | EN/. | 殞 | EN/U | 殈 | EN2/ | 殤 | EN2I | 殊 | EN7J | 衡 |
| EN;O | 殆 | ENA/ | 殄 | ENA5 | 殲 | ENAA | 殮 | ENAK | 餮 | ENB/ | 殇 |
| ENBD | 殉 | ENC | 死 | ENDU | 殟 | ENE. | 殏 | ENE5 | 殘 | ENEE | 殛 |
| ENEE | 殭 | ENER | 殌 | ENF8 | 殨 | ENFU | 殪 | ENH | 殢 | ENJE | 殂 |
| ENJG | 殍 | ENK. | 殧 | ENKO | 殕 | ENM8 | 殯 | ENM8 | 殥 | ENMV | 殃 |

| | | | | | | | | | | | |
|---|---|---|---|---|---|---|---|---|---|---|---|
| ENN | 列 | ENNH | 鴷 | ENNK | 裂 | ENNL | 裂 | ENNN | 烮 | ENNX | 殁 |
| ENNY | 烈 | ENN\ | 迾 | ENO8 | 殞 | ENOS | 殫 | ENQX | 殁 | ENRD | 殨 |
| ENRF | 肂 | ENRX | 殔 | ENS1 | 殢 | ENS3 | 殖 | ENSF | 殯 | ENSQ | 殑 |
| ENVA | 殀 | ENVA | 殀 | ENVC | 殗 | EO1A | 歌 | EO1E | 亞 | EO1J | 哥 |
| EO1K | 綡 | EO1L | 要 | EO7H | 鷗 | EO7N | 副 | EO7\ | 逼 | EOE/ | 彧 |
| EOE5 | 或 | EOE5 | 彧 | EOEZ | 惑 | EOJ | 可 | EOM/ | 鷊 | EOM1 | 鬲 |
| EOM; | 融 | EOMB | 翮 | EOMH | 鷊 | EOMS | 鬳 | EOMX | 鬷 | EORJ | 事 |
| EOU | 豆 | EOU1 | 豍 | EOU8 | 頭 | EOUC | 豌 | EOUP | 郖 | EOUR | 豇 |
| EOUS | 豍 | EOUT | 豏 | EOUX | 豉 | EOU\ | 逗 | EOX | 吏 | EQ | 兀 |
| EQ. | 尤 | EQ; | 尬 | EQE, | 尷 | EQNC | 尥 | EQX | 役 | EQXF | 徑 |
| ER5 | 式 | ER9 | 疌 | ERB1 | 彿 | EREE | 彽 | ERF | 律 | ERK | 很 |
| ERL | 妻 | ERLH | 鶈 | ERLP | 郪 | ES | 干 | ES4Z | 德 | ES5 | 戎 |
| ES8J | 衎 | ESES | 开 | ESEY | 荓 | ESH | 鳱 | ESH8 | 頇 | ESN | 刊 |
| ESO | 舌 | ESO5 | 舐 | ESOE | 甜 | ESOF | 舑 | ESOH | 鴰 | ESOJ | 銜 |
| ESON | 刮 | ESOY | 舕 | ESOZ | 舔 | ESOZ | 憇 | ESO\ | 适 | ESP | 邢 |
| ESW | 舌 | ESWA | 敌 | ETMO | 徜 | ETX | 後 | EU | 井 | EU | 亓 |
| EU. | 井 | EU/ | 形 | EU1 | 平 | EU5 | 戒 | EUAF | 雃 | EUF | 徉 |
| EUH | 鳽 | EUH8 | 顯 | EUN | 刑 | EUN. | 刱 | EUNF | 型 | EUP | 邢 |
| EV | 天 | EVDJ | 衝 | EVEJ | 徛 | EVO | 吞 | EW1X | 徵 | EWC | 屯 |
| EWC8 | 頓 | EWC\ | 迍 | EWEX | 微 | EWEX | 徽 | EWEX | 徽 | EWEX | 徽 |
| EWEX | 徽 | EWEZ | 懲 | EWJ8 | 頓 | EX. | 求 | EX.K | 裘 | EX.U | 盂 |
| EX.X | 救 | EX.Z | 愁 | EX.\ | 逑 | EXEJ | 衍 | EXEZ | 愆 | EZ5 | 忒 |
| E\EJ | 衙 | F | 土 | F | 士 | F | 丰 | F. | 坊 | F.RK | 垠 |
| F.X | 敖 | F.X. | 獒 | F.X1 | 謷 | F.X8 | 贅 | F.X; | 鳌 | F.XB | 驁 |
| F.XG | 摮 | F.XN | 鰲 | F.XP | 聱 | F.XR | 鼇 | F.XY | 熬 | F.X\ | 遨 |
| F/9\ | 埏 | F/; | 塊 | F/BX | 圾 | F/D1 | 埤 | F/D5 | 埠 | F/DS | 埤 |
| F/DX | 墩 | F/MV | 墺 | F0 | 埔 | F05 | 載 | F1 | 井 | F1. | 井 |
| F111 | 圳 | F1N. | 刱 | F1RE | 壺 | F2C | 圪 | F38 | 責 | F38 | 塡 |
| F38, | 勣 | F431 | 謊 | F438 | 賣 | F43Q | 覿 | F43X | 黷 | F4E9 | 堤 |
| F4ET | 墂 | F4F | 堙 | F4FS | 擇 | F4I | 摽 | F6NW | 墹 | F7. | 毒 |
| F7. | 坶 | F7.T | 纛 | F7S | 毒 | F7S5 | 戴 | F7SO | 堌 | F84D | 增 |
| F85 | 截 | F88. | 墫 | F8;B | 埳 | F8F | 垄 | F8F, | 勢 | F8F. | 執 |
| F8FG | 摯 | F8FH | 鷙 | F8FI | 槷 | F8FY | 熱 | F8FY | 蟄 | F8F\ | 達 |
| F8MR | 鼀 | F8N | 坋 | F8X | 麦 | F9 | 走 | F9 | 址 | F9, | 赹 |
| F9.A | 赵 | F9// | 赽 | F928 | 趲 | F92I | 趧 | F988 | 趙 | F99 | 赴 |
| F99S | 趠 | F9A/ | 趁 | F9AF | 趕 | F9AF | 趡 | F9AY | 趡 | F9B. | 趵 |
| F9B8 | 趜 | F9BB | 趐 | F9BC | 起 | F9BE | 趋 | F9BF | 趯 | F9BW | 超 |
| F9D9 | 趧 | F9DS | 趕 | F9EN | 趐 | F9ES | 赶 | F9EX | 埱 | F9FO | 趌 |
| F9FQ | 趦 | F9JE | 趄 | F9L1 | 赳 | F9NN | 趍 | F9NO | 超 | F9O | 坫 |
| F9OI | 趮 | F9PX | 趣 | F9QI | 趑 | F9QY | 越 | F9R5 | 越 | F9RA | 赽 |
| F9RC | 起 | F9S8 | 趫 | F9T/ | 赻 | F9TJ | 趙 | F9TO | 趟 | F9VO | 趏 |
| F9VO | 趫 | F9W | 赸 | F9WW | 趒 | F9\ | 趖 | F; | 去 | F;, | 劫 |
| F;2V | 埃 | F;5 | 鼓 | F;;/ | 墋 | F;DL | 堨 | F;MR | 蠢 | F;MU | 壵 |
| F;N. | 劫 | F;O | 檯 | F;P | 卻 | FAAO | 啬 | FAB | 圴 | FAB. | 坽 |
| FAJN | 堎 | FAK5 | 截 | FAKF | 堆 | FAO | 垥 | FARV | 堠 | FAV. | 垙 |
| FAYJ | 埼 | FB. | 均 | FB. | 均 | FB.F | 埇 | FB.\ | 鋆 | FB1C | 地 |
| FB9J | 婿 | FBBA | 圾 | FBEE | 均 | FBE\ | 鋆 | FBG | 孝 | FBGX | 教 |
| FBO | 耇 | FBR. | 壽 | FBRB | 翿 | FBRY | 燾 | FC | 老 | FC | 圠 |
| FC | 壙 | FC7U | 壚 | FCBJ | 埗 | FCD | 耆 | FCE, | 墟 | FCEF | 臺 |
| FCRF | 墉 | FCRO | 塘 | FCS8 | 壙 | FCU | 墟 | FCVC | 耄 | FCX | 坡 |

| | | | | | | | | | | | |
|---|---|---|---|---|---|---|---|---|---|---|---|
| FD | 者 | FD. | 者 | FD1 | 坤 | FD3Q | 睹 | FD4X | 墁 | FDB/ | 埸 |
| FDBB | 塌 | FDBB | 翥 | FDBL | 堨 | FDE | 坦 | FDE/ | 塲 | FDE9 | 堤 |
| FDF | 埋 | FDF. | 斟 | FDH/ | 場 | FDI | 堁 | FDM; | 堣 | FDMU | 塭 |
| FDOL | 壞 | FDP | 都 | FDY | 煮 | FE0X | 轂 | FE1E | 埡 | FE1E | 壼 |
| FE3X | 殼 | FE;5 | 載 | FE;F | 垤 | FEB | 考 | FED. | 塼 | FEDE | 垣 |
| FEDX | 埂 | FEEA | 款 | FEEB | 圬 | FEEX | 毂 | FEG | 圩 | FEHX | 毃 |
| FEHX | 毄 | FEJ | 玎 | FENX | 縠 | FEO1 | 塌 | FEO5 | 域 | FEO7 | 塥 |
| FEOC | 乩 | FEOJ | 坷 | FEOU | 壹 | FEOX | 殼 | FEOZ | 懿 | FEQ; | 塋 |
| FEQX | 殼 | FEQZ | 愨 | FERX | 穀 | FETX | 穀 | FEU1 | 坪 | FEVX | 穀 |
| FEWC | 坉 | FF | 圭 | FF8X | 埈 | FF9 | 卦 | FFB. | 壔 | FFD | 堵 |
| FFF | 垚 | FFF8 | 翹 | FFFB | 翹 | FFFQ | 堯 | FFFQ | 墝 | FFF\ | 遶 |
| FFG. | 封 | FFG1 | 幫 | FFG2 | 犎 | FFGS | 繫 | FFJ | 埥 | FFLV | 堠 |
| FFN | 封 | FFP | 邽 | FFP | 垹 | FFR | 彗 | FFRZ | 慧 | FFWC | 艷 |
| FFWP | 酆 | FFWU | 豐 | FFWU | 豔 | FFZ | 恚 | FG. | 寺 | FG.P | 邿 |
| FH11 | 磬 | FH12 | 墀 | FH13 | 堳 | FH1D | 罄 | FH1D | 罄 | FH1O | 繫 |
| FH1P | 聲 | FH1Q | 磬 | FH1W | 罄 | FH1X | 檠 | FH1\ | 罄 | FH9 | 坏 |
| FH9E | 坯 | FHB5 | 城 | FHC | 坭 | FHE1 | 圻 | FHE9 | 坼 | FHEO | 垢 |
| FHEY | 塢 | FHFF | 堐 | FHMV | 墂 | FHO5 | 城 | FHR | 坵 | FHRS | 埠 |
| FHV9 | 壢 | FHWW | 堀 | FI4 | 埬 | FI5 | 栽 | FID | 埬 | FJ | 青 |
| FJ3Q | 靚 | FJBG | 垺 | FJG | 垺 | FJG. | 埒 | FJH | 鶄 | FJI | 埰 |
| FJI7 | 墦 | FJJ | 堋 | FJJJ | 靜 | FJM9 | 靛 | FJNC | 靘 | FJP | 郬 |
| FJRJ | 垺 | FK | 表 | FK | 垃 | FK4K | 壞 | FK7E | 壇 | FK7V | 壈 |
| FK8. | 塝 | FK8O | 墒 | FK;J | 堉 | FKAS | 埣 | FKD | 培 | FKDF | 墥 |
| FKDQ | 境 | FKDS | 墇 | FKK5 | 裁 | FKLA | 垓 | FKO | 培 | FKO, | 壕 |
| FKOG | 埻 | FKOK | 壤 | FKOO | 塙 | FKOP | 墎 | FKOX | 墩 | FKQ | 坑 |
| FKS | 垶 | FKX | 墳 | FM8I | 堔 | FM8O | 塔 | FMA5 | 戡 | FMC | 坨 |
| FMD8 | 塓 | FME. | 塚 | FMEO | 垌 | FMEQ | 垸 | FMH1 | 壖 | FMK | 坍 |
| FML | 垵 | FMO | 堝 | FMO | 坰 | FMSJ | 壜 | FMUW | 埇 | FMV | 坱 |
| FMVC | 垞 | FN | 埆 | FN9W | 罶 | FN; | 㽞 | FNA | 坎 | FNG | 挈 |
| FNHC | 垝 | FNI | 絜 | FNN | 翗 | FNO. | 塊 | FNT | 絜 | FNV | 契 |
| FNW | 埳 | FNX | 㓞 | FNZ | 恝 | FO | 吉 | FO, | 劼 | FO1\ | 壚 |
| FO38 | 塤 | FO5 | 哉 | FO5 | 埕 | FOH | 誥 | FOH8 | 頡 | FOK | 袁 |
| FOK\ | 遠 | FOMF | 臺 | FONA | 欯 | FOOB | 塄 | FOOK | 喪 | FOOS | 墠 |
| FOOX | 壧 | FOU | 壴 | FOU. | 鼛 | FOU. | 尌 | FOU. | 鼖 | FOU/ | 彭 |
| FOU1 | 鼙 | FOU3 | 瞽 | FOU6 | 鼘 | FOU; | 鼕 | FOUA | 歖 | FOUF | 鼛 |
| FOUK | 鼟 | FOUO | 喜 | FOUO | 嘉 | FOUO | 嚭 | FOUO | 鼖 | FOUO | 嚞 |
| FOUR | 甏 | FOUS | 鼙 | FOUX | 鼓 | FOUX | 鼔 | FOUY | 熹 | FO\ | 造 |
| FP | 邦 | FP8, | 勘 | FP8L | 堪 | FPQ, | 勘 | FPQL | 堪 | FPT6 | 墈 |
| FQ | 耆 | FQ; | 堀 | FQI | 垛 | FQMR | 鼋 | FQY | 垗 | FR.7 | 塯 |
| FR1U | 壏 | FRB1 | 坲 | FRC | 圯 | FRC | 圮 | FRDL | 堰 | FRE5 | 坻 |
| FREE | 坻 | FRF | 埠 | FRK | 垠 | FRM1 | 埽 | FRMX | 埐 | FRX | 埭 |
| FS3 | 埴 | FS38 | 填 | FS8Z | 堎 | FSDC | 墘 | FSE | 坩 | FSLI | 堞 |
| FSM1 | 墆 | FSOF | 墐 | FSRJ | 埼 | FSU8 | 墳 | FT | 赤 | FT | 素 |
| FT, | 坳 | FT3X | 赧 | FT98 | 赬 | FT; | 赦 | FTCO | 赯 | FTEQ | 垙 |
| FTFD | 赭 | FTFT | 赫 | FTHX | 赧 | FTNC | 赩 | FTP | 郝 | FTRX | 赧 |
| FTX | 赦 | FTX; | 螫 | FUAO | 塔 | FUDV | 墣 | FUF | 垟 | FUFO | 墡 |
| FUFU | 墟 | FUF\ | 達 | FUS | 幸 | FUS | 垟 | FUS. | 執 | FUS1 | 暬 |
| FUS8 | 贄 | FUS; | 蟄 | FUSB | 鷙 | FUSF | 墊 | FUSG | 摯 | FUST | 縶 |
| FUSU | 盩 | FUSX | 報 | FUSZ | 慹 | FUS\ | 瓡 | FUUV | 墣 | FUVC | 墡 |
| FV4 | 壎 | FVDF | 墥 | FVEB | 垮 | FVEJ | 埼 | FVF | 埲 | FVQX | 穀 |

| | | | | | | | | | | | |
|---|---|---|---|---|---|---|---|---|---|---|---|
| FVUF | 埵 | FVXX | 墺 | FWAB | 埁 | FWAF | 墔 | FWEU | 墱 | FWJJ | 塴 |
| FWQ | 垷 | FYY | 埮 | FZ | 志 | FZ3Q | 赳 | FZE. | 墌 | FZEE | 墌 |
| F\EU | 墱 | G | 手 | G, | 扐 | G,,, | 拹 | G,,J | 搚 | G. | 寸 |
| G./Y | 撝 | G.2C | 撒 | G.N | 扚 | G.QX | 搬 | G.S | 抖 | G/ | 才 |
| G/36 | 攡 | G/3T | 攥 | G/3U | 擠 | G/7Z | 摠 | G/9\ | 挺 | G/;P | 揶 |
| G/AO | 搭 | G/BB | 扔 | G/BX | 扱 | G/C, | 抛 | G/D | 拍 | G/D1 | 捭 |
| G/D5 | 揑 | G/DI | 搩 | G/DS | 捭 | G/DX | 撖 | G/K | 扢 | G/MV | 揳 |
| G0 | 捕 | G0 | 捙 | G0ES | 揃 | G0G. | 搏 | G0H1 | 撕 | G0\ | 捷 |
| G1J. | 搧 | G1RX | 搜 | G1WX | 搜 | G27. | 挴 | G2BC | 拖 | G2C | 扢 |
| G2D/ | 摥 | G2O | 措 | G2Q8 | 攢 | G2SY | 撫 | G2V | 抶 | G3 | 看 |
| G33 | 排 | G33X | 攫 | G38L | 攖 | G3Q | 挸 | G4;C | 擺 | G4B; | 擉 |
| G4DS | 擅 | G4EK | 擐 | G4ET | 摽 | G4FS | 擇 | G4I | 揲 | G5\ | 挺 |
| G6 | 捫 | G65 | 撋 | G6I4 | 擱 | G6J | 撊 | G6XO | 攔 | G7. | 拇 |
| G74K | 擂 | G7E5 | 摑 | G7EK | 搌 | G7I | 捆 | G7S | 抽 | G7S8 | 擯 |
| G7T | 摞 | G7UK | 擃 | G7VZ | 摁 | G7XO | 擺 | G7Z | 揌 | G8 | 扒 |
| G88 | 揂 | G88. | 搏 | G88P | 擲 | G8N | 扮 | G8NB | 掰 | G8OQ | 挩 |
| G8X | 撤 | G9 | 捉 | G9 | 扑 | G9 | 扯 | G9DS | 掉 | G9EJ | 措 |
| G9J | 掯 | G9O | 拈 | G9R9 | 捷 | G9T | 拶 | G;2V | 挨 | G;8X | 捘 |
| G;;/ | 摻 | G;O | 抬 | G;P | 抑 | G;Q | 抗 | G;RQ | 摡 | G;U | 拼 |
| GA/ | 抮 | GA11 | 扴 | GA5 | 抵 | GAA5 | 攕 | GAAF | 挫 | GAB | 扲 |
| GAB. | 拎 | GABZ | 捻 | GAE; | 擒 | GAED | 搶 | GAF | 拴 | GAG. | 拊 |
| GAI | 捈 | GAJN | 揄 | GAK/ | 攜 | GAKB | 攜 | GAKD | 掄 | GAKF | 推 |
| GAMU | 掄 | GAO | 拾 | GAOA | 撿 | GAOG | 搿 | GAOU | 捨 | GARO | 搶 |
| GASO | 捨 | GB,I | 揉 | GB. | 扚 | GB.F | 捅 | GB1 | 掏 | GB1C | 扡 |
| GB2W | 掏 | GB8 | 掬 | GB9J | 揖 | GBB/ | 扔 | GBB/ | 摎 | GBBA | 扱 |
| GBBD | 摺 | GBBF | 擢 | GBBY | 為 | GBF | 扭 | GBFP | 挪 | GBGT | 搖 |
| GBJ | 抒 | GBO | 拘 | GBRC | 拖 | GBWW | 搊 | GBXE | 拯 | GC | 扎 |
| GC | 摅 | GC29 | 擬 | GC7, | 擄 | GC7U | 攎 | GC7Z | 攄 | GC8 | 擦 |
| GC9O | 掂 | GCC | 批 | GCCD | 揩 | GCD | 指 | GCE, | 據 | GCI3 | 攃 |
| GCRO | 搪 | GCS8 | 擴 | GCSY | 摭 | GCX | 披 | GD | 扣 | GD1 | 押 |
| GD1 | 抻 | GD5 | 拽 | GDBB | 搨 | GDBL | 揭 | GDCC | 掍 | GDE | 擔 |
| GDE/ | 揚 | GDE9 | 提 | GDES | 捍 | GDF | 捏 | GDF | 捚 | GDH/ | 揚 |
| GDI | 捰 | GDLV | 撲 | GDMU | 搵 | GDOL | 擻 | GDOX | 數 | GDPX | 撮 |
| GDR | 捏 | GE1E | 掗 | GE2O | 捂 | GE5 | 找 | GE;D | 搢 | GE;F | 挃 |
| GE;N | 捯 | GEA9 | 擬 | GED. | 搏 | GEDX | 挭 | GEE; | 抎 | GEEQ | 抏 |
| GEF | 拜 | GEG | 扞 | GEI | 抹 | GEJ | 打 | GELR | 挳 | GEMC | 攦 |
| GEO1 | 搨 | GEO5 | 掝 | GEO7 | 揊 | GEQ | 抏 | GER5 | 拭 | GER9 | 捷 |
| GES | 扦 | GESO | 括 | GESW | 插 | GEU1 | 抨 | GEWC | 扽 | GEX. | 捄 |
| GF; | 抾 | GF;U | 搕 | GFB. | 擣 | GFCD | 揹 | GFEB | 拷 | GFF | 挂 |
| GFF9 | 掛 | GFFQ | 撓 | GFG. | 持 | GFJ | 掅 | GFNV | 揳 | GFO | 拮 |
| GFO8 | 擷 | GFOF | 抬 | GFT | 挬 | GFU\ | 撻 | GGG | 掱 | GH12 | 捍 |
| GH1\ | 抓 | GH9 | 抔 | GH95 | 搣 | GHBB | 搧 | GHBC | 扼 | GHBO | 搨 |
| GHC | 抳 | GHCA | 擻 | GHCQ | 搋 | GHD. | 撅 | GHE1 | 折 | GHE1 | 誓 |
| GHE9 | 拆 | GHE9 | 踅 | GHE; | 蜇 | GHEA | 掀 | GHED | 晢 | GHEF | 握 |
| GHEK | 振 | GHEK | 娎 | GHEO | 哲 | GHEQ | 晳 | GHEY | 搗 | GHEY | 焎 |
| GHEZ | 悊 | GHE\ | 逝 | GHE\ | 銴 | GHFF | 搓 | GHJ | 搞 | GHJX | 擾 |
| GHMU | 揙 | GHO5 | 撼 | GHOS | 擗 | GHOZ | 撼 | GHRK | 搌 | GHRW | 搗 |
| GHR\ | 搥 | GHS3 | 揗 | GHSK | 搌 | GHSO | 据 | GHUA | 撅 | GHUU | 摒 |
| GHV. | 捩 | GHWW | 掘 | GHX | 扳 | GHY5 | 摵 | GI4 | 揀 | GIM | 捸 |
| GJ | 捐 | GJ2W | 搖 | GJBG | 捋 | GJE | 抯 | GJEX | 援 | GJG. | 捋 |

| | | | | | | | | | | | |
|---|---|---|---|---|---|---|---|---|---|---|---|
| GJI | 採 | GJI7 | 播 | GJJ | 捆 | GJL | 援 | GJMX | 授 | GJRJ | 掙 |
| GJVY | 撚 | GJW | 掐 | GK | 拉 | GK7E | 撞 | GK8. | 搒 | GK81 | 揥 |
| GK8O | 摘 | GK8P | 擠 | GK8X | 挍 | GK8\ | 擿 | GK9 | 抃 | GK;X | 撤 |
| GKAS | 捽 | GKA\ | 掖 | GKDF | 撞 | GKDQ | 擯 | GKF | 拄 | GKJX | 攏 |
| GKK | 抆 | GKL | 接 | GKO | 掊 | GKOJ | 捋 | GKOK | 攘 | GKOO | 搞 |
| GKOT | 掠 | GKQ | 抗 | GKT7 | 搐 | GKTF | 擁 | GKTS | 摔 | GKX | 抆 |
| GKX; | 攜 | GKXF | 攤 | GL45 | 攔 | GL75 | 攞 | GLD5 | 擷 | GLDI | 攥 |
| GLN | 摻 | GM0 | 揮 | GM7 | 擂 | GM8 | 抗 | GM83 | 搾 | GM85 | 擱 |
| GM8C | 挖 | GM8I | 探 | GM8R | 控 | GMAD | 摍 | GMAF | 推 | GMAF | 擢 |
| GME8 | 擯 | GME9 | 掟 | GMEB | 擤 | GMEE | 揎 | GMEO | 挏 | GMEQ | 捖 |
| GMF | 抽 | GMFO | 揩 | GMFZ | 撻 | GMH1 | 搖 | GMJ | 揹 | GML | 按 |
| GMNC | 捥 | GMO\ | 擂 | GMQ | 抌 | GMS8 | 擯 | GMS9 | 擡 | GMSK | 搸 |
| GMV | 抉 | GMVC | 挓 | GMZJ | 撐 | GM\T | 擦 | GN | 掏 | GN, | 掾 |
| GN,; | 攄 | GNA | 扻 | GND | 擼 | GNH1 | 擔 | GNMV | 換 | GNN | 拸 |
| GNO | 招 | GNO. | 攙 | GNOQ | 挽 | GNW | 掐 | GO | 扣 | GO, | 拐 |
| GO,N | 捌 | GO18 | 撌 | GO38 | 損 | GOJ | 捐 | GON | 拐 | GONN | 捌 |
| GOOI | 操 | GOOS | 撣 | GOP | 揖 | GOR | 事 | GORC | 挹 | GORN | 擲 |
| GP | 揖 | GP8 | 掑 | GP81 | 撕 | GP8L | 揕 | GPK | 振 | GPP | 挪 |
| GPPP | 攝 | GPQL | 揕 | GPSJ | 擕 | GPX | 撖 | GQ | 拓 | GQX | 投 |
| GQY | 挑 | GR | 扛 | GR/O | 据 | GR11 | 拒 | GR1C | 把 | GR1Q | 攬 |
| GR38 | 揁 | GRA | 抉 | GRB. | 搦 | GRB1 | 拂 | GRBB | 搦 | GRC8 | 撰 |
| GRDL | 揠 | GRE5 | 抵 | GREE | 抵 | GRF\ | 揵 | GRJ5 | 抿 | GRK | 拫 |
| GRL8 | 撰 | GRM1 | 掃 | GROO | 摳 | GRP | 抑 | GRPX | 撤 | GRR | 拒 |
| GRR. | 搗 | GRX | 捷 | GS1G | 挎 | GS38 | 搷 | GS78 | 擯 | GS8 | 拱 |
| GSC, | 拋 | GSC. | 扰 | GSD | 措 | GSD5 | 擻 | GSE | 拑 | GSE8 | 擴 |
| GSJX | 撒 | GSL | 抴 | GSLI | 揲 | GSM1 | 掎 | GSMF | 搆 | GSMG | 挬 |
| GSMS | 揇 | GSOF | 攤 | GSOK | 攘 | GSX | 技 | GSX. | 拔 | GSY | 挾 |
| GS\ | 扙 | GT, | 拗 | GT/ | 抄 | GTJ | 捎 | GTM/ | 撐 | GTM4 | 攩 |
| GTM7 | 擋 | GTMG | 撐 | GU7 | 描 | GU8U | 搵 | GUAI | 搽 | GUAO | 搭 |
| GUAX | 擭 | GUBX | 撇 | GUDL | 搗 | GUDV | 摸 | GUFK | 擭 | GUFR | 搓 |
| GUJN | 揃 | GURT | 搛 | GUS | 拌 | GUSI | 擛 | GUU | 拼 | GUU | 拼 |
| GUUV | 撲 | GUVC | 捲 | GUWJ | 捌 | GU\T | 攃 | GV | 扶 | GV1 | 扦 |
| GV1O | 括 | GV1W | 插 | GV3Q | 攪 | GV8T | 撩 | GVA | 扷 | GVAA | 挾 |
| GVAO | 撟 | GVAZ | 掭 | GVC | 托 | GVC | 托 | GVCC | 撬 | GVDC | 掩 |
| GVDF | 捶 | GVDL | 掩 | GVEB | 挎 | GVEJ | 掎 | GVET | 捺 | GVEV | 揆 |
| GVE\ | 撅 | GVF | 捧 | GVFD | 搼 | GVL | 捼 | GVUF | 捶 | GVV0 | 撐 |
| GVVA | 揆 | GVY | 揪 | GWAF | 摧 | GWAO | 攜 | GWF | 捏 | GWH1 | 揣 |
| GWMQ | 攪 | GWQ | 捝 | GWR | 捏 | GWW | 拙 | GX. | 扠 | GX.; | 搔 |
| GX9D | 揩 | GXAD | 揩 | GXF | 摓 | GXF\ | 撻 | GXIX | 撥 | GXO | 掐 |
| GXXI | 搡 | GXXX | 掇 | GYY | 掞 | GYY, | 撈 | GZE. | 揂 | GZEE | 揂 |
| G\EU | 撜 | G\EV | 揆 | G\NA | 撳 | G\RX | 撥 | H | 烏 | H | 戶 |
| H | 尸 | H | 厂 | H. | 房 | H.5 | 戌 | H.S | 戽 | H/C | 尻 |
| H/D8 | 願 | H/DT | 原 | H/DZ | 愿 | H0 | 庫 | H13 | 眉 | H13P | 屝 |
| H1Y1 | 斵 | H1Y2 | 犀 | H1Y; | 屬 | H1Y\ | 遲 | H1\ | 爪 | H1\C | 爬 |
| H23 | 厍 | H2SW | 居 | H33 | 扉 | H33 | 屝 | H33 | 扉 | H38 | 頁 |
| H388 | 贗 | H38N | 廁 | H39X | 要 | H3E5 | 戛 | H3V1 | 霏 | H3X | 夏 |
| H5 | 戊 | H5 | 戌 | H7 | 屆 | H7P | 面 | H7P; | 靈 | H7PQ | 靦 |
| H8 | 屎 | H84D | 層 | H9 | 不 | H9E | 丕 | H9E5 | 戚 | H9E5 | 慼 |
| H9E8 | 蹙 | H9E9 | 歪 | H9E9 | 甓 | H9EP | 邳 | H9EZ | 慼 | H9H | 鴀 |
| H9LG | 孬 | H9MF | 甭 | H9MU | 盃 | H9O | 否 | H9O | 居 | H9V | 奀 |
| H;8X | 駿 | H;\ | 瓜 | H;\. | 瓞 | H;\; | 醫 | H;\C | 瓟 | H;\V | 瓞 |
| HA | 仄 | HAA8 | 贗 | HAAF | 雁 | HAH | 鴈 | HAH8 | 贗 | HAI | 賒 |
| HAK8 | 顧 | HAKF | 雇 | HAKF | 雔 | HB | 万 | HB | 鴫 | HB5 | 成 |
| HB5P | 郕 | HB5U | 盛 | HBB | 扇 | HBC | 厄 | HBGG | 孱 | HBM5 | 盛 |
| HBO | 局 | HC | 尼 | HC | 匙 | HCC | 屁 | HCQ | 虎 | HCQA | 彪 |
| HCQ\ | 遞 | HC\ | 泥 | HD | 百 | HDAS | 騈 | HDBG | 厚 | HDF | 厘 |
| HDHD | 皕 | HDJ. | 厭 | HDJ1 | 壓 | HDJ4 | 靨 | HDJ; | 魘 | HDJF | 壓 |

| | | | | | | | | | | | |
|---|---|---|---|---|---|---|---|---|---|---|---|
| HDJK | 屨 | HDJL | 豎 | HDJP | 豎 | HDOL | 屢 | HDSX | 鬚 | HDV1 | 鬍 |
| HDXO | 厦 | HE1 | 斤 | HE18 | 質 | HE18 | 頎 | HE1; | 瘸 | HE1A | 欣 |
| HE1\ | 近 | HE2X | 履 | HE9 | 斥 | HE99 | 屐 | HE;F | 屋 | HE;F | 厔 |
| HE;N | 劂 | HEBA | 歆 | HEBC | 卮 | HEBP | 鄖 | HEBY | 烏 | HEDL | 履 |
| HEE. | 辱 | HEE. | 尉 | HEE2 | 犀 | HEE; | 蜃 | HEEJ | 唇 | HEEK | 辰 |
| HEEK | 製 | HEEO | 唇 | HEEP | 鄏 | HEEP | 鄏 | HEEY | 熨 | HEEZ | 尉 |
| HEE\ | 遲 | HENC | 屍 | HEO | 后 | HEOF | 垕 | HEOP | 郈 | HEO\ | 逅 |
| HESI | 屭 | HESL | 屜 | HESX | 屐 | HEVO | 屆 | HFD | 屠 | HFDH | 鵰 |
| HFO. | 廚 | HFW | 屆 | HH | 鳲 | HH3X | 虔 | HHCQ | 號 | HHE1 | 所 |
| HHH | 矗 | HHR1 | 髒 | HJ | 肩 | HJH | 鶊 | HJH8 | 願 | HJM5 | 戛 |
| HJMP | 鄠 | HJMX | 憂 | HKJX | 靡 | HKK | 辰 | HKOX | 戲 | HKS | 犀 |
| HKS | 犀 | HL5 | 威 | HLE5 | 減 | HLH5 | 滅 | HM1. | 耐 | HM1/ | 彤 |
| HM11 | 而 | HM1H | 鴯 | HM1L | 耍 | HM1N | 刷 | HM1V | 耎 | HM1Z | 恧 |
| HM8 | 屄 | HM8 | 駛 | HMC | 鮀 | HMO | 扃 | HMU | 扁 | HMU. | 甌 |
| HMUB | 翩 | HMUH | 鶣 | HMU\ | 遍 | HMVT | 屨 | HO5 | 咸 | HO58 | 頤 |
| HO5N | 鹵 | HO5Z | 感 | HOK, | 劈 | HOK. | 璧 | HOK. | 甓 | HOK1 | 譬 |
| HOK1 | 辭 | HOK8 | 嬖 | HOK9 | 躄 | HOKF | 壁 | HOKG | 擘 | HOKH | 鷿 |
| HOKI | 檗 | HOKJ | 臂 | HOKK | 嬖 | HOKL | 嬖 | HOKN | 劈 | HOKR | 霹 |
| HOKS | 辟 | HOKT | 檗 | HOKZ | 懸 | HOK\ | 避 | HOM1 | 屑 | HORC | 匿 |
| HOX | 咎 | HOZ5 | 感 | HP8 | 騏 | HPEJ | 屙 | HQ | 皃 | HR | 丘 |
| HR. | 乓 | HR/ | 乒 | HR8 | 兵 | HR91 | 歸 | HR; | 皇 | HRA | 缺 |
| HRA8 | 虞 | HRBX | 殷 | HRBZ | 愍 | HRC | 阤 | HRE1 | 師 | HREE | 底 |
| HREI | 梟 | HREK | 婁 | HREP | 鄒 | HREW | 烏 | HRG | 厗 | HRH | 鴟 |
| HRH8 | 顛 | HRHC | 昵 | HRJ/ | 厍 | HRKQ | 觎 | HRM1 | 帥 | HRP | 邸 |
| HRS | 阜 | HRS8 | 顛 | HRW | 岳 | HRW | 島 | HR\ | 追 | HS3 | 盾 |
| HS3. | 厰 | HS38 | 賈 | HS3H | 鶻 | HS3\ | 遁 | HS8F | 堅 | HS8J | 督 |
| HS8X | 殿 | HSC/ | 虒 | HSD | 眉 | HSK | 展 | HSO | 居 | HSOH | 鶋 |
| HTJ | 屆 | HUD, | 勵 | HUD; | 厲 | HUF5 | 蠆 | HUFF | 曆 | HUU | 屏 |
| HUW; | 蠆 | HUWA | 厥 | HUWH | 鷢 | HUWN | 劂 | HV. | 戾 | HVC | 尾 |
| HVCG | 屣 | HVUF | 厘 | HVV | 厤 | HVV9 | 歷 | HVVD | 曆 | HVVQ | 磨 |
| HWW | 屈 | HWWH | 鷗 | HX | 反 | HX | 尿 | HXI | 棨 | HXO | 咨 |
| HXQX | 段 | HXRF | 肇 | HXT | 聚 | HX\ | 返 | HYY | 辰 | H\ | 尺 |
| H\ | 迟 | H\O8 | 咫 | I | 木 | I, | 杓 | I,O | 枷 | I,Y | 栿 |
| I. | 朮 | I. | 枋 | I.11 | 栦 | I.2C | 㮂 | I.2J | 檔 | I.;P | 榔 |
| I.A. | 榦 | I.NA | 杖 | I.RK | 根 | I.S | 科 | I.Z | 恣 | I.\ | 述 |
| I.\H | 鷫 | I/ | 杉 | I/3. | 樗 | I/9\ | 梃 | I/; | 桅 | I/;P | 榔 |
| I/;S | 楒 | I/BD | 榆 | I/BU | 楹 | I/BX | 椴 | I/C | 杌 | I/D | 柏 |
| I/D1 | 棉 | I/D1 | 梈 | I/D5 | 楻 | I/DI | 櫟 | I/DS | 椑 | I/DS | 槔 |
| I/DX | 檄 | I/FD | 楷 | I/K | 栝 | I/KF | 楏 | I0G. | 榑 | I0\ | 槌 |
| I1FD | 檑 | I23 | 柞 | I27. | 梅 | I2BC | 桅 | I2C | 杚 | I2E/ | 鬱 |
| I2I | 栰 | I2MK | 梅 | I2O | 桔 | I2O2 | 椲 | I2Q8 | 櫻 | I2S | 杵 |
| I2S/ | 鬱 | I2V | 栿 | I2VO | 枷 | I3 | 相 | I33 | 柑 | I33F | 權 |
| I38 | 根 | I38 | 棋 | I38L | 櫻 | I3RX | 椵 | I3Z | 想 | I4 | 束 |
| I4 | 柩 | I4 | 栖 | I4. | 楞 | I433 | 楞 | I438 | 櫝 | I4DS | 槽 |
| I4EN | 橱 | I4ET | 標 | I4FS | 桥 | I4TF | 榴 | I4V\ | 櫃 | I5 | 枉 |
| I5OO | 槿 | I5U | 桥 | I5\ | 梃 | I6 | 榴 | I65 | 榴 | I6F | 枇 |
| I6I4 | 檲 | I6OO | 檷 | I777 | 檑 | I77T | 檯 | I7E5 | 榴 | I7EK | 棍 |
| I7I | 梱 | I7S | 柚 | I7SB | 榑 | I7SO | 槶 | I7T | 楒 | I7V | 棍 |
| I7Z | 楒 | I8 | 扒 | I84D | 榴 | I88 | 楢 | I88. | 樽 | I8; | 松 |
| I8;Z | 桧 | I8EB | 杓 | I8N | 枌 | I8N2 | 橉 | I8NI | 樹 | I8OQ | 棿 |
| I8R/ | 梯 | I8Y | 極 | I9 | 朴 | I938 | 楨 | I9DS | 棹 | I9EX | 椒 |
| I9H5 | 樴 | I9O | 枯 | I;8X | 梭 | I;;/ | 樛 | I;M | 橘 | I;O | 檯 |
| I;P | 榔 | I;RQ | 概 | IA1J | 榴 | IA4D | 檜 | IAA | 來 | IAA. | 麥 |
| IAA5 | 檝 | IAA8 | 賚 | IAAF | 埊 | IAAH | 鶆 | IAAP | 郲 | IAAZ | 慭 |
| IAB | 柃 | IAB. | 柃 | IABO | 桧 | IABZ | 捻 | IAC | 枪 | IAE; | 檎 |
| IAEX | 梗 | IAF | 栓 | IAG. | 榭 | IAI | 梌 | IAJN | 榆 | IAKF | 椎 |
| IAKS | 榫 | IAKW | 樵 | IAKY | 樵 | IAMU | 榆 | IAOA | 檢 | IARO | 槍 |

| | | | | | | | | | | | |
|---|---|---|---|---|---|---|---|---|---|---|---|
| IAX | 泰 | IB | 榪 | IB,I | 楙 | IB,I | 楺 | IB,O | 橘 | IB,Z | 懋 |
| IB. | 杓 | IB. | 构 | IB.F | 桶 | IB1C | 杝 | IB8 | 掏 | IB9J | 椙 |
| IB; | 杓 | IBB | 栩 | IBB/ | 樛 | IBBA | 桵 | IBBD | 槢 | IBBF | 櫂 |
| IBBU | 槛 | IBD | 栒 | IBEE | 杓 | IBEO | 椆 | IBF | 杻 | IBFP | 椰 |
| IBG | 李 | IBG | 杍 | IBGT | 榤 | IBJ | 杼 | IBO | 栒 | IBRC | 枹 |
| IC | 札 | IC | 杙 | IC.V | 栰 | IC5\ | 椴 | IC7U | 櫨 | IC; | 蜇 |
| ICC | 枇 | ICCD | 楷 | ICCF | 梿 | ICD | 楮 | ICF. | 槲 | ICJE | 櫨 |
| ICKX | 榬 | ICRF | 樜 | ICRO | 槽 | ICT | 紮 | ICX | 柀 | ICX8 | 檲 |
| IC\X | 櫼 | ID | 東 | ID | 杳 | ID1 | 柙 | ID1 | 棹 | ID4X | 槾 |
| IDBB | 榻 | IDBL | 楬 | IDCC | 棍 | IDE | 查 | IDE | 柦 | IDE/ | 楊 |
| IDEH | 鬱 | IDES | 桿 | IDF | 梩 | IDF. | 樹 | IDH | 鶇 | IDH/ | 楊 |
| IDHH | 鬱 | IDI | 棵 | IDOL | 樓 | IDTQ | 榥 | IE | 本 | IE,. | 椓 |
| IE1E | 桱 | IE2O | 梧 | IE5 | 杙 | IE55 | 棧 | IE7D | 槽 | IE7E | 櫺 |
| IE8X | 楯 | IE;D | 榗 | IE;F | 桎 | IEA9 | 樅 | IEB | 朽 | IEBB | 栩 |
| IEBE | 極 | IED. | 樽 | IEDE | 桓 | IEDX | 梗 | IEDZ | 槵 | IEE5 | 械 |
| IEE; | 柡 | IEEB | 杇 | IEEJ | 桁 | IEEQ | 杬 | IEET | 柰 | IEEX | 隸 |
| IEG | 杅 | IEI | 株 | IEJ | 朾 | IELR | 樫 | IEMA | 柄 | IEMC | 欐 |
| IEN | 栢 | IENN | 栵 | IEO5 | 棫 | IEO7 | 楅 | IEOJ | 柯 | IEOU | 桓 |
| IEQ | 杌 | IER5 | 栻 | IERL | 棲 | IES | 杆 | IEU | 枅 | IEU1 | 枰 |
| IEU5 | 械 | IEWC | 杶 | IEX. | 棣 | IEXJ | 椼 | IF | 杜 | IF38 | 槓 |
| IF48 | 櫝 | IF8. | 檄 | IF8X | 棱 | IF95 | 樾 | IF;U | 榼 | IFAO | 檣 |
| IFB. | 檮 | IFC | 栳 | IFCD | 楮 | IFD | 楮 | IFEB | 栲 | IFF | 桂 |
| IFFQ | 橈 | IFFR | 楷 | IFJ | 精 | IFNV | 楔 | IFO | 桔 | IFO. | 樹 |
| IFOF | 橲 | IFOK | 棱 | IFP | 梆 | IFT | 榛 | IG | 杍 | IG, | 村 |
| IG/ | 材 | IH/T | 橑 | IH12 | 樨 | IH13 | 楣 | IH1; | 橛 | IH3X | 槙 |
| IH9 | 杯 | IH95 | 槭 | IH9E | 柸 | IH9O | 栝 | IH;\ | 柧 | IHBC | 椃 |
| IHBG | 櫉 | IHBO | 楄 | IHC | 棍 | IHCQ | 榹 | IHE1 | 析 | IHE8 | 槓 |
| IHE9 | 柝 | IHE; | 蜇 | IHEC | 榐 | IHED | 晳 | IHEI | 桀 | IHEK | 椳 |
| IHEX | 椵 | IHEZ | 愁 | IHF. | 槆 | IHJX | 樫 | IHM1 | 楠 | IHMU | 楄 |
| IHO5 | 槭 | IHOC | 榿 | IHR\ | 槌 | IHS3 | 楯 | IHSK | 椐 | IHSO | 椐 |
| IHTJ | 榍 | IHUA | 椻 | IHV9 | 櫪 | IHX | 板 | IHXX | 椵 | II | 林 |
| II/ | 彬 | II4 | 棟 | II7 | 替 | II8N | 棼 | IIAA | 楝 | IIAB | 棽 |
| IIB9 | 楚 | IIC | 麓 | IID | 楝 | IIDE | 楂 | IIET | 禁 | IIF | 埜 |
| III | 森 | III9 | 檚 | IIL | 婪 | IIM | 棟 | IIO | 棟 | IIOA | 楙 |
| IION | 樹 | IIP | 梆 | IIQ. | 梵 | IIQ; | 藏 | IIY | 焚 | IJ2W | 榣 |
| IJBG | 桴 | IJE | 柤 | IJEX | 椶 | IJHX | 椵 | IJI | 採 | IJI7 | 橎 |
| IJJ | 棚 | IJL | 桵 | IJRJ | 桴 | IJTV | 榽 | IJVY | 樕 | IJW | 槄 |
| IK | 柆 | IK// | 樛 | IK4K | 櫰 | IK7E | 檀 | IK7T | 櫟 | IK7V | 檁 |
| IK8. | 榜 | IK81 | 椺 | IK8O | 樀 | IK8P | 榾 | IK8X | 校 | IK;Q | 梳 |
| IK;U | 檶 | IKAS | 椊 | IKD5 | 樴 | IKDF | 橦 | IKDK | 榱 | IKDQ | 樈 |
| IKDS | 樟 | IKDZ | 檍 | IKF | 柱 | IKIQ | 櫬 | IKJX | 櫳 | IKL | 棱 |
| IKLA | 核 | IKM1 | 柿 | IKNK | 櫰 | IKO | 棓 | IKO, | 橡 | IKOJ | 楟 |
| IKOK | 櫰 | IKOO | 槁 | IKOP | 椰 | IKOT | 椋 | IKOX | 檄 | IKQ | 杭 |
| IKS | 梓 | IKX/ | 樛 | IKX; | 榴 | IL1 | 枓 | IL7 | 檔 | ILDI | 檩 |
| IM | 束 | IM0 | 楎 | IM7 | 櫑 | IM8 | 枕 | IM83 | 榨 | IM8I | 榨 |
| IM8O | 榕 | IM8R | 椌 | IMA | 枘 | IMAF | 椎 | IMC | 柁 | IMD8 | 槙 |
| IME8 | 檳 | IME9 | 椗 | IMEB | 樗 | IMEE | 楦 | IMEO | 桐 | IMEQ | 梡 |
| IMET | 棕 | IMF | 柟 | IMFO | 棡 | IMH1 | 檽 | IMHR | 棺 | IMIA | 梵 |
| IMIM | 棘 | IMIM | 棗 | IMJ | 榾 | IML | 梭 | IMME | 欄 | IMN | 刺 |
| IMOA | 櫃 | IMOO | 檟 | IMO\ | 槅 | IMQ | 枕 | IMU | 柵 | IMUW | 橱 |
| IMV | 柍 | IMXO | 榕 | IMZJ | 樗 | IN | 桷 | IN, | 櫞 | IN.; | 櫺 |
| IN.S | 樹 | IN2I | 橤 | IN4, | 橡 | INA | 枚 | IND | 櫓 | INH1 | 櫓 |
| INHC | 桅 | INN | 栘 | INN2 | 榪 | INO. | 欖 | INV | 榭 | IO | 東 |
| IO | 杏 | IO, | 敕 | IO, | 枴 | IO,H | 檒 | IO/O | 梠 | IO18 | 櫝 |
| IO5 | 桯 | IO8 | 枳 | IOEB | 椤 | IOJ | 椙 | ION | 剌 | ION | 枴 |
| ION8 | 賴 | IONA | 敕 | IONG | 犁 | IOOI | 橾 | IOOS | 樺 | IOP | 槅 |
| IOQ | 梘 | ION | 敕 | IOX9 | 整 | IOXH | 鰲 | IOX\ | 邀 | IO\ | 速 |

| | | | | | | | | | | | |
|---|---|---|---|---|---|---|---|---|---|---|---|
| IP | 栮 | IP8 | 棋 | IP8L | 椹 | IPG. | 榭 | IPID | 槸 | IPK | 棖 |
| IPO5 | 樫 | IPP | 椰 | IPQL | 椹 | IPSJ | 槁 | IPX | 椰 | IQ | 机 |
| IQ | 柘 | IQ. | 杋 | IQ; | 榳 | IQX | 杸 | IQY | 桃 | IR | 杠 |
| IR.7 | 榴 | IR/O | 椐 | IR16 | 棣 | IR1C | 杷 | IR1P | 柳 | IR1Q | 榥 |
| IR1U | 槛 | IR33 | 榧 | IR38 | 槓 | IR5 | 框 | IR61 | 棣 | IRB1 | 梻 |
| IRC | 杞 | IRDL | 榎 | IRED | 梧 | IREE | 柢 | IRF\ | 楗 | IRG | 杤 |
| IRJ/ | 栲 | IRK | 根 | IRMX | 梫 | IRN\ | 柩 | IRO8 | 樞 | IROO | 榧 |
| IRP | 枊 | IRPX | 橄 | IRR | 榧 | IRR | 柜 | IRX | 棣 | IS1G | 栫 |
| IS3 | 植 | IS38 | 楨 | IS78 | 樻 | IS8 | 栱 | ISD | 棤 | ISD5 | 檝 |
| ISE | 柑 | ISE8 | 横 | ISJ | 椾 | ISL | 柮 | ISLI | 楪 | ISMA | 構 |
| ISMF | 構 | ISMG | 桲 | ISMS | 椭 | ISO | 枯 | ISOF | 槿 | ISOJ | 楜 |
| ISOS | 棒 | ISRL | 楼 | ISU8 | 樻 | ISX | 枝 | ISX. | 柭 | IS\ | 杖 |
| IT, | 梑 | IT/ | 杪 | ITEQ | 桄 | ITJ | 梢 | ITM/ | 槫 | ITM4 | 檍 |
| ITM7 | 檣 | ITMF | 樘 | ITMG | 槔 | ITMI | 樸 | ITN. | 樒 | ITT5 | 檳 |
| IU,\ | 槌 | IU/\ | 槌 | IU64 | 樹 | IUAO | 楷 | IUAX | 樓 | IUBD | 椈 |
| IUDV | 模 | IUEF | 樺 | IUF5 | 樣 | IUFA | 樸 | IUFO | 槎 | IUFR | 槎 |
| IUFX | 樣 | IUFY | 橅 | IUM, | 檬 | IUOF | 權 | IUP | 楫 | IUR1 | 樠 |
| IURG | 檔 | IURO | 榷 | IURT | 栟 | IUS | 柈 | IUSO | 楉 | IUSO | 楉 |
| IUU | 栟 | IUU | 椪 | IUUV | 樸 | IUUX | 欉 | IUV | 栚 | IUVC | 棬 |
| IUX. | 檮 | IUXF | 檷 | IV | 杕 | IV | 枎 | IV1O | 栝 | IV3Q | 榥 |
| IV8T | 橑 | IVAA | 梜 | IVAO | 橋 | IVC | 枆 | IVCC | 樻 | IVD | 椿 |
| IVEB | 桍 | IVEJ | 椅 | IVEV | 檥 | IVE\ | 樝 | IVF | 樺 | IVFF | 楏 |
| IVRB | 椩 | IVRO | 檜 | IVUF | 棰 | IVV | 榛 | IVVA | 楱 | IVW | 椿 |
| IVXX | 椟 | IVY | 楸 | IW8N | 榜 | IWA | 椣 | IWAB | 桍 | IWAO | 欋 |
| IWEF | 櫸 | IWEU | 櫃 | IWFX | 樧 | IWH1 | 檽 | IWW | 椯 | IX | 枚 |
| IX. | 杈 | IX. | 柊 | IXF | 栙 | IXIX | 檄 | IXNI | 楳 | IXO | 格 |
| IXS1 | 桸 | IXT/ | 栍 | IXX; | 欒 | IXXG | 攀 | IXXQ | 樊 | IXXV | 樊 |
| IXXX | 椶 | IY | 杰 | IYY | 椂 | IYY, | 榜 | IYYQ | 梳 | IZ | 杺 |
| IZ/ | 柲 | IZ/U | 榏 | I\EQ | 凳 | I\EU | 橙 | I\EV | 楑 | I\RK | 櫟 |
| J | 月 | J, | 肋 | J, | 豸 | J,/1 | 豣 | J,/C | 貔 | J,/Q | 貌 |
| J,/S | 貏 | J,/\ | 邈 | J,3X | 貜 | J,AI | 貅 | J,AN | 貐 | J,B. | 豹 |
| J,DF | 貍 | J,DL | 貗 | J,EE | 貆 | J,ES | 豣 | J,G/ | 豺 | J,HD | 貊 |
| J,HX | 貑 | J,JV | 貕 | J,M8 | 豿 | J,MA | 豽 | J,N; | 墾 | J,NO | 貂 |
| J,OS | 貚 | J,RF | 墾 | J,RF | 貄 | J,RO | 貙 | J,RZ | 懇 | J,U7 | 貓 |
| J,UV | 貘 | J,W1 | 貒 | J,WW | 貔 | J,XO | 貉 | J. | 肪 | J.A | 以 |
| J/ | 肜 | J/7C | 膻 | J/B/ | 肺 | J/C. | 肒 | J/D | 胉 | J/D1 | 脾 |
| J/DS | 脾 | J/DX | 腺 | J0 | 脯 | J0G. | 膊 | J23 | 胙 | J27. | 胸 |
| J2BC | 脆 | J2C | 肐 | J2DX | 腹 | J2E | 胜 | J2Q8 | 膹 | J2S; | 膩 |
| J2SH | 鴿 | J2ST | 爵 | J2SY | 膴 | J2S\ | 遙 | J2V | 朕 | J33 | 腓 |
| J33F | 臞 | J3Q | 覓 | J4;. | 爵 | J4B; | 膈 | J4ET | 膘 | J4L | 腰 |
| J5\ | 艇 | J7E5 | 膕 | J7EK | 腮 | J7UK | 臏 | J7V | 胭 | J7Z | 腮 |
| J8N2 | 膦 | J8OP | 膷 | J8OQ | 脫 | J8S | 胖 | J;8X | 胺 | J;O | 胎 |
| JA/ | 胗 | JA4D | 膾 | JAAF | 脞 | JAB | 肣 | JABZ | 脸 | JAG. | 附 |
| JAJN | 腧 | JAKF | 脽 | JAKW | 臈 | JAKY | 膲 | JAOA | 臉 | JAYJ | 腈 |
| JB.C | 亂 | JB.Q | 覶 | JB.S | 辭 | JB/O | 吻 | JBB/ | 膠 | JBG | 孚 |
| JBGC | 乳 | JBGP | 郛 | JBO | 朐 | JBRC | 胞 | JBXW | 胸 | JC | 肊 |
| JC7U | 臚 | JCA. | 腑 | JCD | 脂 | JCE, | 膝 | JCY | 臟 | JD1 | 胛 |
| JD1 | 胂 | JD2E | 腥 | JDE | 膽 | JDE/ | 腸 | JDH/ | 腸 | JDM; | 腭 |
| JDMU | 腽 | JDOL | 膜 | JE | 且 | JE, | 助 | JE, | 豚 | JE,\ | 遯 |
| JE;F | 脛 | JEAF | 雎 | JED. | 膞 | JEE5 | 膩 | JEEJ | 脜 | JEEQ | 朊 |
| JELR | 脛 | JEN | 刞 | JEO1 | 膈 | JEO7 | 腷 | JEOU | 脰 | JES | 肝 |
| JESH | 鷄 | JESX | 爰 | JEWC | 脃 | JEX. | 脉 | JF | 肚 | JF; | 胠 |
| JF;P | 腳 | JFFQ | 膮 | JFO/ | 膨 | JFOX | 臌 | JFT | 膝 | JG | 乎 |
| JG. | 肘 | JG.Q | 號 | JH7P | 覗 | JH9E | 胚 | JH;\ | 胍 | JHE1 | 肵 |
| JHEF | 腥 | JHEK | 脤 | JHM1 | 腼 | JHRK | 脈 | JHR\ | 腿 | JHS3 | 腯 |
| JHSO | 腒 | JHX | 服 | JHXH | 鵬 | JHXX | 服 | JI | 采 | JI | 采 |
| JI/ | 彩 | JI4S | 釋 | JI7 | 番 | JI7, | 勫 | JI7B | 翻 | JI7H | 鷭 |

| | | | | | | | | | | | |
|---|---|---|---|---|---|---|---|---|---|---|---|
| JI7P | 畱 | JI7S | 釉 | JIAX | 膝 | JIZ | 悉 | JJ | 朋 | JJBG | 脬 |
| JJG. | 脟 | JJH | 鵬 | JJI7 | 膰 | JK7E | 膻 | JK8. | 膀 | JK8P | 臍 |
| JKAS | 脺 | JKA\ | 腋 | JKD | 腤 | JKD5 | 臓 | JKDF | 膧 | JKDZ | 臆 |
| JKJX | 朧 | JKLA | 胘 | JKM1 | 肺 | JKOJ | 脝 | JKQ | 肮 | JKT | 肱 |
| JKTF | 膸 | JKTS | 膵 | JL | 妥 | JL/N | 腦 | JL/X | 腦 | JL45 | 臘 |
| JL75 | 臘 | JLD5 | 臘 | JLKW | 腦 | JM8F | 膣 | JM8R | 腔 | JMA | 胸 |
| JMAA | 腕 | JMAF | 臛 | JME8 | 膑 | JMEO | 膶 | JMEQ | 腙 | JMH1 | 臑 |
| JMHR | 管 | JML | 胺 | JMN2 | 舜 | JMNC | 腕 | JMO | 腡 | JMO\ | 膓 |
| JMS8 | 腆 | JMU. | 膸 | JMV | 腴 | JMX | 受 | JMZX | 愛 | JN | 削 |
| JN, | 腖 | JN. | 肦 | JNH1 | 膽 | JNHC | 脆 | JNOQ | 腕 | JO5 | 脭 |
| JO8 | 胑 | JOOI | 臊 | JPK | 脹 | JQ | 肌 | JQX | 股 | JQY | 胱 |
| JR | 肛 | JR1; | 曌 | JR1C | 肥 | JRB1 | 脻 | JRB; | 臌 | JREE | 胝 |
| JRF\ | 腱 | JRJ | 爭 | JRK\ | 腿 | JS; | 胈 | JSD | 腊 | JSEI | 膜 |
| JSM | 脼 | JSMG | 脖 | JSMS | 脯 | JSOY | 膆 | JSU8 | 膭 | JSX | 肢 |
| JSX. | 胈 | JT.P | 膷 | JTC | 亂 | JTEQ | 胱 | JTMF | 膛 | JTV | 奚 |
| JTVF | 雞 | JTVH | 雞 | JTVO | 谿 | JU8U | 腦 | JUAX | 腰 | JUDV | 膜 |
| JUFO | 膳 | JUH5 | 臟 | JUH8 | 頷 | JUKS | 脺 | JUM, | 朦 | JUMV | 膜 |
| JUS | 胖 | JUU | 胼 | JUV | 朕 | JUV, | 膀 | JUV1 | 膌 | JUV8 | 臏 |
| JUV; | 臁 | JUVB | 膌 | JUVC | 腊 | JUVF | 脞 | JUVL | 膢 | JUVT | 臊 |
| JUVX | 臊 | JV.Y | 然 | JV4 | 臙 | JV8T | 腙 | JVAA | 腴 | JVCC | 臝 |
| JVDC | 膧 | JVDF | 腫 | JVDL | 膧 | JVEB | 膀 | JVEV | 臻 | JVL | 腠 |
| JVRB | 膹 | JVUF | 腫 | JVVA | 膜 | JW | 舀 | JWA | 腴 | JWAF | 臛 |
| JWW | 腦 | JXO | 胳 | JXWX | 腰 | JXXX | 服 | JY | 炙 | K | 之 |
| K | 立 | K,QX | 毅 | K. | 彷 | K/ | 衫 | K// | 彥 | K//8 | 顏 |
| K/2E | 產 | K/2X | 劃 | K/3U | 褥 | K/;K | 褰 | K/BB | 礽 | K/BX | 殺 |
| K/D | 袙 | K/D1 | 裨 | K/DS | 褲 | K/MV | 褶 | KO | 補 | KO\ | 褳 |
| K23 | 祚 | K2BC | 裣 | K2C | 屹 | K2DX | 複 | K2I | 祩 | K2I | 祩 |
| K2O | 祰 | K2O2 | 褘 | K2Q8 | 襀 | K2RK | 裓 | K2V` | 祑 | K2V | 祑 |
| K33 | 祔 | K3Q | 褆 | K41K | 褱 | K4;C | 襬 | K4B; | 襡 | K4BB | 襬 |
| K4DS | 襌 | K4ET | 褾 | K4F | 褈 | K4FS | 襗 | K4VC | 襘 | K5 | 衽 |
| K6 | 襦 | K6I4 | 襇 | K6J | 襉 | K7I | 裀 | K7N\ | 畝 | K7O, | 鼓 |
| K7O8 | 甑 | K7OC | 氈 | K7OE | 亶 | K7OH | 鸇 | K7OT | 稟 | K7OV | 稟 |
| K7OX | 皺 | K7O\ | 遭 | K7P, | 勯 | K7P8 | 顫 | K7PC | 氈 | K7PE | 亶 |
| K7PH | 鸇 | K7PV | 稟 | K7PX | 顫 | K7F\ | 遭 | K7S | 袖 | K7UK | 褀 |
| K7UU | 禮 | K7V | 褶 | K7Z | 褪 | K8 | 六 | K818 | 齋 | K81E | 齏 |
| K81N | 齎 | K81O | 齏 | K81P | 齊 | K81T | 齋 | K81Y | 齌 | K8EK | 袁 |
| K8M. | 旁 | K8M1 | 帝 | K8MH | 鶇 | K8MO | 商 | K8MO | 啻 | K8MX | 敵 |
| K8M\ | 適 | K8N | 紛 | K8O | 裕 | K8OK | 衰 | K8OQ | 兗 | K8OQ | 裞 |
| K8V8 | 蘄 | K8X | 交 | K8X | 褫 | K8X, | 效 | K8X8 | 頍 | K8XH | 鵁 |
| K8XP | 郊 | K8XX | 效 | K9 | 卞 | K9 | 祉 | K938 | 禎 | K9EJ | 裲 |
| K9O | 站 | K;8X | 竣 | K;;/ | 襂 | K;J | 育 | K;JC | 襬 | K;Q | 充 |
| K;SI | 棄 | KA/ | 衫 | KA11 | 袊 | KA4D | 襘 | KA4D | 襘 | KAA5 | 纖 |
| KAAF | 雜 | KAAS | 卒 | KAB | 衿 | KAG. | 袝 | KAJN | 褕 | KAN\ | 夜 |
| KAO | 袷 | KAO | 袷 | KAOA | 襝 | KAOI | 褓 | KAOK | 褭 | KAOU | 袷 |
| KAV. | 袱 | KB | 禡 | KB,K | 衷 | KB. | 袀 | KB. | 袀 | KB1C | 袘 |
| KB1C | 袘 | KB2W | 裪 | KBB | 袇 | KBB | 翊 | KBB/ | 礽 | KBBA | 役 |
| KBBD | 褶 | KBEE | 袧 | KBEO | 祠 | KBK | 裹 | KBO | 竘 | KBO | 裪 |
| KBRC | 裞 | KBRK | 裒 | KC | 襢 | KC0 | 褌 | KCS1 | 褯 | KCX | 祓 |
| KD | 言 | KD | 袑 | KD/5 | 諻 | KD1 | 裨 | KDB/ | 裼 | KDBB | 襵 |
| KDBB | 襵 | KDBL | 竭 | KDBL | 褐 | KDD | 裼 | KDE | 袒 | KDE/ | 裼 |
| KDE5 | 歆 | KDE9 | 提 | KDE9 | 褆 | KDF | 裡 | KDF | 亶 | KDFC | 彰 |
| KDFK | 裎 | KDH/ | 裼 | KDI | 裸 | KDI | 裸 | KDIK | 裹 | KDK | 竞 |
| KDMU | 裮 | KDNA | 歆 | KDNO | 詔 | KDO8 | 韶 | KDOL | 褸 | KDQ | 竟 |
| KDS | 章 | KDS/ | 彰 | KDS8 | 贛 | KDSP | 鄣 | KDSX | 贛 | KDSX | 襮 |
| KDSZ | 戇 | KDS\ | 逹 | KDUV | 諜 | KDUX | 讀 | KDXF | 辭 | KDZ | 意 |
| KDZH | 鶕 | KE8X | 褊 | KE99 | 褷 | KEG | 衦 | KEMA | 裲 | KEMC | 襦 |
| KEO7 | 福 | KEO7 | 褔 | KEOU | 裋 | KEU5 | 袚 | KEV | 袄 | KF | 主 |

| | | | | | | | | | | | |
|---|---|---|---|---|---|---|---|---|---|---|---|
| KF | 社 | KF48 | 禮 | KF75 | 禳 | KF8K | 褻 | KF8X | 祾 | KF; | 祛 |
| KF; | 祛 | KFB. | 禱 | KFD | 褚 | KFF9 | 禖 | KFFQ | 襓 | KFJ | 靖 |
| KFK | 祛 | KFNV | 禊 | KFNV | 褉 | KFO | 祮 | KFO8 | 襭 | KFOO | 禧 |
| KFQX | 投 | KH | 鵃 | KHCQ | 褫 | KHCQ | 褫 | KHD | 袥 | KHE. | 禠 |
| KHE1 | 祈 | KHEK | 振 | KHEK | 裖 | KHMU | 裼 | KHSO | 裾 | KHU; | 襧 |
| KHUU | 娳 | KI3Q | 親 | KIH1 | 新 | KIIT | 襟 | KIMM | 襟 | KIO | 竦 |
| KIXG | 襜 | KJ91 | 礱 | KJ98 | 襲 | KJ98 | 襲 | KJ9; | 龔 | KJ9F | 礱 |
| KJ9H | 襲 | KJ9K | 龔 | KJ9P | 聾 | KJ9Q | 襲 | KJ9T | 龔 | KJ9X | 龍 |
| KJ9X | 龘 | KJE | 祖 | KJE | 袓 | KJEX | 禐 | KJEX | 褑 | KJJ5 | 望 |
| KJR5 | 氓 | KJRJ | 婂 | KK | 衣 | KK7E | 禮 | KK81 | 褅 | KK81 | 褅 |
| KK;Q | 裗 | KKAS | 捽 | KKIQ | 襯 | KKJX | 襬 | KKMO | 裔 | KKOK | 褱 |
| KKT | 袨 | KKTT | 玆 | KKX; | 褐 | KL | 亡 | KL | 妄 | KL/, | 劾 |
| KL/8 | 膏 | KL/8 | 頦 | KL/A | 亥 | KL/A | 欬 | KL/N | 刻 | KL/U | 忘 |
| KL3 | 盲 | KLI | 宋 | KLJ | 育 | KLJ5 | 望 | KLL | 妄 | KLO | 衂 |
| KLP | 邙 | KLQ | 巟 | KLR5 | 氓 | KLZ | 忘 | KM0 | 褌 | KM0 | 褌 |
| KM1 | 市 | KM8 | 袮 | KM8O | 褣 | KMA | 衲 | KMC | 袉 | KMF | 袮 |
| KMFO | 裯 | KMFO | 裯 | KMH1 | 襦 | KMO | 裍 | KMQ | 衩 | KMS; | 袪 |
| KN | 初 | KN, | 褖 | KN, | 褖 | KN4, | 褖 | KNH1 | 襐 | KNHC | 裧 |
| KNNK | 袤 | KNO | 袑 | KNO | 袑 | KNX | 襐 | KO1 | 神 | KO1 | 神 |
| KO1K | 衷 | KO5 | 裎 | KOB. | 孰 | KOBF | 塾 | KOBG | 享 | KOBH | 鶉 |
| KOBJ | 亨 | KOBP | 郭 | KOBS | 犉 | KOBX | 敦 | KOBY | 熟 | KOBY | 烹 |
| KOBZ | 憝 | KOE. | 毃 | KOJ | 褅 | KOK | 哀 | KOM, | 豪 | KOM1 | 毃 |
| KOMA | 敲 | KOMC | 毫 | KOMC | 毫 | KOMJ | 亭 | KOMJ | 膏 | KOMO | 高 |
| KOMP | 鄗 | KOMQ | 亮 | KOMS | 嗃 | KOMX | 敲 | KOMX | 毃 | KON | 剖 |
| KOO, | 勷 | KOOI | 襍 | KOOK | 襄 | KOOS | 禪 | KOOS | 褌 | KOO\ | 饔 |
| KOP | 部 | KOQ | 祝 | KOQQ | 競 | KORK | 裛 | KOT | 京 | KOT,\ | 就 |
| KOT. | 就 | KOTH | 鶉 | KOTH | 鷲 | KOX | 敔 | KP | 祁 | KP8 | 祺 |
| KQ | 亢 | KQ | 祏 | KQ; | 褞 | KQH8 | 頏 | KQP | 郈 | KQX | 祋 |
| KQY | 桃 | KQ\ | 遀 | KR/O | 裙 | KR1U | 襤 | KRA | 袂 | KRB; | 禮 |
| KRC | 祀 | KRDL | 褔 | KRE5 | 祇 | KRE5 | 衹 | KREE | 祗 | KREE | 祗 |
| KRK | 裉 | KRK\ | 裩 | KRMX | 祲 | KROK | 褒 | KRR. | 裑 | KRVK | 褎 |
| KS | 辛 | KS,S | 辦 | KS.S | 辨 | KS/S | 辨 | KS1G | 袴 | KS1S | 辨 |
| KS1S | 辯 | KS38 | 禛 | KS; | 竑 | KSEI | 祺 | KSHS | 瓣 | KSIO | 辣 |
| KSLI | 褋 | KSO | 祐 | KSO | 祜 | KSTS | 辮 | KSX | 袪 | KSX. | 祓 |
| KSX. | 祓 | KT | 亦 | KT | 玄 | KT, | 袎 | KT.S | 率 | KT2K | 玆 |
| KT7 | 畜 | KT7P | 鄐 | KTA. | 甕 | KTAF | 雍 | KTAF | 壅 | KTAK | 饔 |
| KTAW | 饔 | KTKT | 玆 | KTM1 | 帟 | KTM2 | 牽 | KTM7 | 襠 | KTT/ | 沙 |
| KTT5 | 襪 | KTU | 弈 | KTV | 奕 | KTYS | 率 | KT\ | 跡 | KU,\ | 襁 |
| KU,\ | 襁 | KU45 | 褸 | KUAO | 褡 | KUF | 祥 | KUF; | 襊 | KUFY | 裱 |
| KUM; | 襴 | KUS | 袢 | KUUV | 襆 | KUVC | 褰 | KV | 扶 | KVA | 袄 |
| KVAA | 袂 | KVDC | 裺 | KVEB | 褲 | KVHD | 襖 | KWH1 | 端 | KWK | 宴 |
| KWME | 睿 | KX | 文 | KX. | 衩 | KX2 | 袶 | KX64 | 爛 | KX;A | 蘗 |
| KXE5 | 斌 | KXE8 | 贇 | KXH | 嫣 | KXH/ | 彥 | KXH8 | 顏 | KXHE | 產 |
| KXHN | 劃 | KXHU | 嫣 | KXO | 吝 | KXO | 袼 | KXT | 紊 | KXW; | 离 |
| KXWE | 蚉 | KXWF | 離 | KXXI | 褖 | KXXX | 襏 | KXZ | 忞 | KYY | 祾 |
| KZ/ | 祕 | K\RX | 襏 | L | 女 | L. | 妨 | L./Y | 嫣 | L.29 | 媛 |
| L.RK | 娘 | L/3Z | 媳 | L/7C | 媿 | L/; | 媿 | L/B/ | 姊 | L/BB | 奶 |
| L/D1 | 婢 | L/D1 | 婂 | L/D5 | 媓 | L/DS | 婢 | L/DX | 嫩 | L/MO | 姁 |
| L1 | 媗 | L1EA | 姒 | L1OO | 嚚 | L1RX | 嫂 | L1WX | 嫂 | L1X | 收 |
| L22 | 姅 | L2E | 姓 | L2I | 姝 | L2Q | 姺 | L2SY | 嫵 | L3Q | 娊 |
| L41V | 嫫 | L45\ | 遄 | L4EK | 嫘 | L4ET | 嫖 | L5 | 妊 | L5\ | 娗 |
| L6I | 嫺 | L6J | 嫺 | L7 | 甾 | L7,, | 嬲 | L7. | 姆 | L7E9 | 鷾 |
| L7H | 鷭 | L7J | 媢 | L7S | 妯 | L7SB | 娉 | L7SO | 媢 | L7T | 嫖 |
| L7V | 媢 | L7X\ | 遄 | L8; | 妐 | L8N | 妐 | L8R/ | 婦 | L9 | 娖 |
| L938 | 媜 | L9DS | 婥 | L9EX | 嫋 | L;2V | 娭 | L;A | 姒 | L;O | 始 |
| LA11 | 姈 | LAA5 | 孅 | LAB | 妗 | LAB. | 妗 | LAF | 姶 | LAJN | 婨 |
| LAKX | 嫂 | LAKY | 嫶 | LAO | 姶 | LAOA | 媕 | LAOI | 媬 | LAOU | 婂 |

| | | | | | | | | | | | |
|---|---|---|---|---|---|---|---|---|---|---|---|
| LB | 媽 | LB,I | 媟 | LB. | 妁 | LB1C | 她 | LB9J | 婿 | LBB/ | 奶 |
| LBB/ | 嫪 | LBBF | 嬥 | LBF | 妞 | LBFP | 娜 | LBG | 好 | LBJ | 妤 |
| LBO | 姁 | LBWW | 媢 | LC.V | 嫉 | LCC | 妣 | LCIT | 婬 | LCJG | 婧 |
| LCRF | 嫱 | LCRX | 嫌 | LCSY | 媲 | LCUT | 嫌 | LD1 | 婶 | LD3 | 媢 |
| LD4X | 嫚 | LD5\ | 逽 | LDD | 娼 | LDE | 妲 | LDE/ | 媉 | LDE9 | 媞 |
| LDF | 娌 | LDH/ | 嫣 | LDI | 巢 | LDI | 婐 | LDI, | 勦 | LDIN | 剿 |
| LDIP | 鄛 | LDMU | 媪 | LE1E | 娅 | LE8X | 婻 | LE9 | 娅 | LE9Y | 嫣 |
| LE;F | 姪 | LED. | 嫥 | LEDE | 姮 | LEE; | 妘 | LEEQ | 妧 | LEI | 妹 |
| LEI | 妹 | LELR | 婭 | LEMC | 孋 | LER9 | 婕 | LES | 奸 | LES5 | 娍 |
| LESO | 姡 | LEU | 妍 | LF | 妦 | LF8X | 婈 | LFAO | 婼 | LFB. | 嫴 |
| LFC | 姥 | LFD | 娃 | LFF | 娃 | LFFQ | 嬈 | LFJ | 婧 | LFK | 娘 |
| LFO | 姞 | LFOF | 嬉 | LFOK | 媄 | LFOO | 嬉 | LFT | 嫊 | LFUS | 嫜 |
| LH | 妒 | LH/T | 嫄 | LH13 | 媚 | LH1; | 孎 | LH7P | 媔 | LHC | 妮 |
| LHE. | 嫭 | LHE1 | 妡 | LHEK | 娠 | LHEO | 姤 | LHEX | 娘 | LHFF | 娾 |
| LHMU | 媥 | LHRK | 嫣 | LHVC | 娓 | LIO | 娕 | LIO8 | 嬾 | LIOA | 嫩 |
| LIOX | 嫩 | LJ.A | 姒 | LJ2W | 媱 | LJ5 | 娙 | LJE | 姐 | LJEX | 媛 |
| LJI | 娱 | LJI7 | 嬸 | LJL | 娞 | LJMX | 嫒 | LJW | 婚 | LK7E | 嫱 |
| LK8O | 嫡 | LK8X | 姣 | LKD5 | 孅 | LKDS | 嫜 | LKF | 娃 | LKO | 婄 |
| LKOJ | 婷 | LKOK | 孃 | LKOT | 婛 | LKT | 妶 | LKX | 妏 | LL | 姏 |
| LLL | 姦 | LM8O | 嫆 | LMA | 妠 | LMD8 | 娱 | LME, | 嫁 | LME8 | 嬪 |
| LME9 | 婝 | LMEB | 嫣 | LMEE | 媗 | LMEO | 娴 | LMET | 婃 | LMF | 妠 |
| LMFO | 婤 | LMH1 | 嬬 | LMHR | 婠 | LMI3 | 嬬 | LMJ7 | 嬸 | LML | 婝 |
| LMME | 媦 | LMNC | 婉 | LMO | 媧 | LMS8 | 嫃 | LMU | 媚 | LMV | 妜 |
| LMVC | 妧 | LMZJ | 嫜 | LNHC | 婉 | LNN | 姼 | LNO | 娼 | LNO | 姳 |
| LNOE | 嬔 | LNOQ | 娩 | LNT | 妳 | LO | 如 | LO18 | 嬻 | LOG | 挐 |
| LOH | 駕 | LOJ | 娟 | LOLV | 娱 | LOM1 | 帤 | LOOI | 媃 | LOOS | 嬋 |
| LOOX | 嬺 | LORC | 邕 | LORF | 雝 | LOT | 絮 | LOZ | 恕 | LP8 | 娸 |
| LPEJ | 婀 | LPSJ | 嬬 | LPX | 娵 | LQE1 | 婳 | LQY | 姚 | LR | 妅 |
| LR.7 | 媨 | LR.N | 嬲 | LR11 | 姬 | LR1U | 嬑 | LR2Z | 嫄 | LRB. | 嫋 |
| LRBB | 嫋 | LRBT | 嬲 | LRC | 妃 | LRED | 婚 | LRFE | 嬧 | LRM1 | 婦 |
| LROO | 嫗 | LRR | 姖 | LRUO | 嬥 | LS78 | 嫃 | LSC/ | 媲 | LSE | 姏 |
| LSE8 | 嬪 | LSEI | 媒 | LSJ | 娟 | LSLI | 媟 | LSMF | 媾 | LSMS | 媥 |
| LSO | 姑 | LSOJ | 媩 | LSOS | 婷 | LSOV | 嫫 | LSOY | 嬿 | LSX | 妓 |
| LT/ | 妙 | LTM1 | 媏 | LU7 | 媌 | LUDV | 嫫 | LUEF | 嬅 | LUFO | 嫎 |
| LUFV | 媄 | LUJN | 媍 | LUP | 媔 | LURT | 嫌 | LUS | 姘 | LUSO | 婼 |
| LUTZ | 嬨 | LUU | 姘 | LUVC | 媣 | LUVF | 嫿 | LV | 妖 | LV1 | 奸 |
| LV1O | 姑 | LV8T | 嫽 | LVA | 妖 | LVAO | 嬌 | LVAZ | 嫁 | LVC | 妧 |
| LVD | 婠 | LVEB | 姱 | LVEJ | 婍 | LVG5 | 娥 | LVL | 婑 | LVN | 娴 |
| LVRB | 姨 | LVUF | 媏 | LVV | 嫊 | LW | 如 | LW; | 嬞 | LWAO | 孈 |
| LWEX | 嬓 | LWH1 | 媏 | LWHS | 媬 | LWQ | 娧 | LWQX | 嬓 | LX | 奴 |
| LX, | 努 | LXB | 駑 | LXBG | 孥 | LXG | 孥 | LXM1 | 帑 | LXQ | 砮 |
| LXRB | 弩 | LXZ | 怒 | LY | 災 | LYY | 婑 | LZ/ | 妼 | L\ | 巡 |
| L\EU | 嬁 | M | 雨 | M. | 雩 | M./Y | 寫 | M/C | 宂 | MO | 軍 |
| MOCX | 鞍 | MOH | 鸭 | MOH8 | 顆 | MOP | 鄆 | MO\ | 運 | M1 | 巾 |
| M1 | 雲 | M1/D | 帕 | M1/P | 幱 | M122 | 幃 | M12V | 帙 | M12Y | 幠 |
| M175 | 幗 | M18Q | 帨 | M198 | 幀 | M19O | 帖 | M1;/ | 幓 | M1AF | 帷 |
| M1AO | 帢 | M1C. | 幗 | M1CX | 帔 | M1D3 | 帽 | M1DL | 霧 | M1DQ | 幌 |
| M1DT | 幔 | M1DX | 幔 | M1E5 | 幭 | M1E7 | 幅 | M1EJ | 帄 | M1F. | 幬 |
| M1F8 | 幘 | M1FD | 楮 | M1H8 | 幀 | M1HF | 幄 | M1J7 | 幡 | M1JW | 幅 |
| M1K5 | 幟 | M1KF | 幢 | M1KS | 幛 | M1M, | 幏 | M1M8 | 幞 | M1MQ | 帆 |
| M1MZ | 幢 | M1N1 | 幨 | M1OI | 幧 | M1OS | 幝 | M1PK | 帳 | M1R8 | 幘 |
| M1RC | 帊 | M1S. | 帔 | M1S8 | 幘 | M1TJ | 帩 | M1U, | 幪 | M1U5 | 幾 |
| M1UU | 幉 | M1UV | 幙 | M2 | 牢 | M27. | 霫 | M33 | 霏 | M36 | 寙 |
| M3RX | 霞 | M4EK | 寰 | M528 | 寶 | M5\ | 霆 | M6/I | 寐 | M61 | 寤 |
| M6EA | 寣 | M6EI | 寐 | M6EO | 寤 | M6RX | 寢 | M7 | 雷 | M7S | 宙 |
| M7S8 | 賓 | M7S8 | 寳 | M8 | 穴 | M8 | 采 | M8/. | 窗 | M8/C | 究 |
| M8/K | 窆 | M8/N | 窞 | M8/X | 窗 | M8/X | 竅 | M823 | 窄 | M82O | 窖 |
| M83 | 窅 | M88S | 窺 | M8AI | 窱 | M8AN | 窬 | M8BC | 窅 | M8C | 空 |

| | | | | | | | | | | | |
|---|---|---|---|---|---|---|---|---|---|---|---|
| M8DI | 窴 | M8DL | 窸 | M8E5 | 窢 | M8EA | 窉 | M8EC | 窀 | M8EF | 窒 |
| M8EG | 宇 | M8EQ | 竀 | M8ES | 罕 | M8EV | 突 | M8F8 | 竇 | M8FA | 窾 |
| M8FF | 窐 | M8FG | 窣 | M8FR | 灶 | M8FV | 竅 | M8H | 窵 | M8HW | 窟 |
| M8H\ | 窊 | M8H\ | 窳 | M8J; | 竊 | M8JW | 窯 | M8JZ | 窸 | M8KD | 窨 |
| M8KS | 窣 | M8KX | 窔 | M8M1 | 帘 | M8MO | 窩 | M8N | 穸 | M8N | 窉 |
| M8NW | 窨 | M8O | 容 | M8O | 冏 | M8PB | 窮 | M8PE | 窿 | M8PP | 竊 |
| M8QY | 窕 | M8R | 空 | M8R/ | 穿 | M8RB | 穹 | M8RO | 窘 | M8RP | 窮 |
| M8S8 | 窴 | M8T, | 窈 | M8UY | 窯 | M8U\ | 邃 | M8V. | 突 | M8VA | 窦 |
| M8VC | 竂 | M8VH | 鴪 | M8VQ | 窺 | M8W5 | 竄 | M8WW | 窒 | M8XF | 窪 |
| M8XG | 窄 | M938 | 寘 | M9EX | 寂 | M9XO | 露 | M; | 内 | MA | 内 |
| MAA | 肉 | MAB. | 零 | MAHD | 宿 | MAKF | 霍 | MAKF | 靃 | MAKH | 鶴 |
| MAKW | 寯 | MARX | 寖 | MB, | 雺 | MB,, | 霧 | MB,3 | 霧 | MBB/ | 寥 |
| MBBD | 霤 | MBG | 字 | MBRC | 雹 | MC | 它 | MC29 | 寐 | MDC | 電 |
| MDE9 | 寔 | MDK8 | 冥 | MDKP | 鄍 | MDKQ | 覭 | MDKR | 鼆 | MDL | 宴 |
| MDL | 電 | MDM; | 寓 | MDOL | 寠 | ME, | 家 | ME11 | 斲 | ME75 | 戴 |
| ME78 | 寅 | ME9 | 定 | ME98 | 顁 | ME;F | 室 | MEDE | 宣 | MEE, | 冢 |
| MEE. | 冠 | MEE1 | 斲 | MEE8 | 賓 | MEE; | 雲 | MEEB | 雩 | MEEB | 黔 |
| MEEC | 甩 | MEEP | 鄠 | MEEP | 鄶 | MEEQ | 完 | MEER | 鼂 | MEET | 宗 |
| MEEX | 寇 | MEEX | 鬖 | MEE\ | 鬿 | MEG | 宇 | MEJ | 宁 | MEO | 同 |
| MEO5 | 戢 | MEO7 | 富 | MEO\ | 迥 | MER9 | 寁 | MERL | 靈 | MET8 | 賓 |
| MEWX | 霰 | MF | 用 | MF | 冉 | MF4Z | 憲 | MFO | 周 | MFO | 害 |
| MFO/ | 彫 | MFOB | 翢 | MFOF | 雕 | MFOH | 鵰 | MFOH | 鵃 | MFON | 割 |
| MFOO | 谿 | MFO\ | 週 | MG. | 守 | MH3N | 寡 | MH;\ | 靡 | MHB5 | 宬 |
| MHE. | 爵 | MHEK | 震 | MHEK | 宸 | MHEX | 霞 | MHM1 | 需 | MHOS | 霹 |
| MHR | 官 | MHRZ | 寁 | MHR\ | 追 | MHV9 | 靡 | MI | 宋 | MI3 | 霜 |
| MII | 霖 | MII/ | 霦 | MJ | 骨 | MJ,F | 霾 | MJ/. | 骫 | MJ/1 | 髀 |
| MJ/S | 髀 | MJO. | 髆 | MJ4; | 髑 | MJ7U | 髖 | MJ9C | 骴 | MJA1 | 骱 |
| MJCI | 髒 | MJCX | 骸 | MJDI | 髁 | MJDL | 髏 | MJE | 宜 | MJES | 骭 |
| MJEX | 骾 | MJFQ | 髐 | MJG | 雩 | MJH | 髃 | MJH8 | 髖 | MJHK | 霡 |
| MJI | 宋 | MJI7 | 審 | MJIQ | 觀 | MJKA | 骸 | MJKO | 髜 | MJKQ | 骯 |
| MJKX | 骹 | MJM. | 髖 | MJM8 | 髓 | MJMO | 髂 | MJQX | 骰 | MJSO | 骷 |
| MJS\ | 髓 | MJUR | 髊 | MJUU | 髒 | MJUU | 骿 | MJVB | 髈 | MJXO | 骼 |
| MK | 丹 | MK/ | 彤 | MK8P | 霽 | MKAB | 霹 | MKH | 鵑 | MKJX | 寵 |
| MKJX | 寵 | MKL | 霎 | MKN | 刖 | MKOP | 霏 | MKS | 宰 | MKUX | 腹 |
| MKX | 雯 | ML | 安 | MLH | 鴳 | MLH8 | 頞 | MLI | 案 | MME | 冊 |
| MME, | 霎 | MMEN | 剛 | MMV | 霙 | MNBC | 宛 | MNBH | 鶟 | MNBN | 剜 |
| MNBZ | 惌 | MNO. | 冤 | MO | 咼 | MO/O | 宮 | MO38 | 竇 | MON | 剮 |
| MOOA | 靈 | MOOO | 霝 | MOOP | 鄙 | MOP5 | 霰 | MO\ | 過 | MO\ | 迥 |
| MQ | 冗 | MQ | 尤 | MQ | 宕 | MQH | 鳩 | MQP | 炦 | MQX | 炧 |
| MQY | 宨 | MQY | 寬 | MR | 雪 | MR.7 | 霫 | MR/O | 寣 | MR11 | 宦 |
| MR11 | 宦 | MRC | 回 | MS38 | 寘 | MS8 | 典 | MS8. | 寒 | MS81 | 騫 |
| MS88 | 賽 | MS89 | 蹇 | MS8B | 騫 | MS8C | 蹇 | MS8F | 塞 | MS8G | 搴 |
| MS8H | 騫 | MS8I | 寨 | MS8K | 褰 | MS8Q | 腆 | MS; | 宏 | MSE | 雪 |
| MSJ | 霸 | MSJ | 宥 | MSJX | 霰 | MSRL | 靉 | MTJ | 宵 | MTJ | 霄 |
| MU | 冊 | MU | 皿 | MU, | 眾 | MU3. | 寬 | MUAA | 眾 | MUD1 | 冪 |
| MUDV | 寞 | MUKL | 罔 | MUMV | 霙 | MUN | 刪 | MUW | 罔 | MUWN | 剛 |
| MV | 央 | MV8T | 寮 | MVA | 宊 | MVC | 宅 | MVC | 宅 | MVEJ | 寄 |
| MVH | 鴦 | MVMU | 盎 | MWBY | 寫 | MWQ | 霓 | MX9O | 霑 | MXH9 | 霪 |
| MXI | 霂 | MXJ5 | 霍 | MXK1 | 霈 | MXMO | 霨 | MXO | 客 | MXO8 | 額 |
| MXPL | 霪 | MXR; | 霰 | MXRX | 寖 | MXS8 | 霙 | MXSM | 霈 | MXX | 罔 |
| MZ/ | 忞 | MZ/; | 蜜 | MZ/W | 密 | MZ4H | 霽 | MZ4J | 寧 | MZMF | 甯 |
| MZMH | 寧 | MZMJ | 寧 | MZMU | 寍 | M\ET | 察 | M\EU | 霻 | N | 刀 |
| N | 夕 | N | 角 | N | 魚 | N, | 觔 | N, | 象 | N,;; | 蠡 |
| N,;N | 劙 | N,H | 鶞 | N. | 刃 | N. | 魴 | N.S | 斛 | N.Z | 忍 |
| N.\ | 遑 | N/BX | 般 | N/D5 | 鯁 | N/DI | 鰈 | N/DI | 鰈 | N/H5 | 鰥 |
| N/M, | 歸 | N/T | 鯀 | NO | 鯆 | NO\ | 鰱 | N2 | 舛 | N23 | 鮓 |
| N2D/ | 觴 | N2DX | 艫 | N2I | 桀 | N2I | 餠 | N33 | 餅 | N38 | 負 |

| | | | | | | | | | | | |
|---|---|---|---|---|---|---|---|---|---|---|---|
| N4, | 象 | N4, | 鰥 | N4, | 鱞 | N43X | 鯗 | N4B; | 觸 | N4EK | 鱌 |
| N4ET | 鱇 | N4X | 鯠 | N5OO | 鱷 | N7A | 鰡 | N7UU | 鱧 | N7Z | 鰓 |
| N88. | 鱒 | N8N | 魵 | N8N2 | 鱗 | N8OQ | 鯇 | N8TU | 彝 | N9 | 外 |
| N9ET | 鮭 | N; | 鮁 | N;O | 鮐 | N;P | 鯽 | NA | 欠 | NA1I | 鮯 |
| NA4D | 鱠 | NA; | 飧 | NABZ | 鯰 | NAC | 鈍 | NAG. | 鮒 | NAI | 鯀 |
| NAO | 鮯 | NARK | 飧 | NARV | 鰷 | NB,I | 鮃 | NB,O | 鰠 | NB. | 鈞 |
| NBBA | 鮻 | NBBD | 鰠 | NBC | 夗 | NBC3 | 智 | NBCB | 鴛 | NBCH | 鴦 |
| NBCL | 婜 | NBCZ | 怨 | NBO | 鮈 | NBRC | 鮑 | NC2C | 毳 | NC7U | 鱸 |
| NCD | 鮨 | NCKX | 鰕 | NCU | 鱇 | ND | 魯 | ND1 | 鯶 | ND4X | 鰻 |
| NDBB | 鰑 | NDCC | 鯤 | NDD | 鱛 | NDE | 鮋 | NDE9 | 鯷 | NDF | 鯉 |
| NDF. | 鮒 | NDM; | 鰑 | NE,\ | 鰹 | NE2O | 鰐 | NE7D | 鰭 | NED. | 鱄 |
| NEDX | 鯁 | NEI | 鯄 | NEMC | 鰥 | NEN | 鮖 | NEOJ | 鮦 | NEWC | 魽 |
| NEX. | 鯐 | NEX. | 鯐 | NF38 | 鰿 | NF8F | 鯥 | NF8X | 鯪 | NF; | 鮭 |
| NFCD | 鰭 | NFD | 鮨 | NFF | 鮭 | NFF | 鮭 | NFFQ | 鱙 | NFJ | 鯖 |
| NFO | 鮚 | NH | 鴟 | NH8. | 鮔 | NH81 | 詹 | NH9E | 鮕 | NH;\ | 觚 |
| NHB8 | 顏 | NHBC | 危 | NHM1 | 鮰 | NHO5 | 鰔 | NHR1 | 鮿 | NHU; | 鱺 |
| NHUA | 鰲 | NHX | 鮍 | NIAA | 鮇 | NIO | 鰊 | NJ2W | 鯹 | NJI7 | 鰩 |
| NK7E | 鱣 | NK8P | 鰟 | NK8X | 鮫 | NKDS | 鱆 | NKL | 鯪 | NKOG | 鯙 |
| NKOO | 鰝 | NKOT | 鯨 | NKQ | 魧 | NKX | 鮫 | NL1 | 魝 | NL7 | 鰡 |
| NM8O | 鯩 | NM8V | 奐 | NMA | 魶 | NMAV | 奐 | NMAX | 魯 | NMC | 鮀 |
| NMDI | 彙 | NME8 | 禽 | NMEO | 鯛 | NMEQ | 鯇 | NMER | 龜 | NMER | 鼉 |
| NMEX | 龜 | NMFO | 鯛 | NMR | 鰐 | NN | 多 | NN | 魛 | NN2 | 解 |
| NN2; | 蟹 | NN2\ | 邂 | NN4, | 鱌 | NN4X | 觽 | NNBB | 翊 | NNBO | 夠 |
| NNHC | 觿 | NNHC | 鯱 | NNLC | 夠 | NNMX | 觸 | NNOQ | 鮸 | NN\ | 迻 |
| NO | 名 | NO | 召 | NO, | 劭 | NOC. | 鬽 | NOCN | 鶴 | NOCP | 鄒 |
| NOOB | 鱺 | NOOI | 鰇 | NOOS | 觧 | NOP | 邵 | NOP | 卲 | NOQ | 免 |
| NOQ, | 勉 | NOQ. | 兔 | NOQH | 鵵 | NOQ\ | 逸 | NO\ | 迢 | NP | 鮑 |
| NP8 | 鯕 | NPC | 鯤 | NPX | 鯫 | NQY | 鮸 | NR | 魟 | NR.7 | 鰡 |
| NR/O | 鋁 | NR16 | 鱇 | NR1C | 色 | NR1F | 鮏 | NR61 | 鱘 | NRA | 鮧 |
| NRDL | 鰻 | NREE | 觝 | NRF\ | 鰱 | NRM1 | 歸 | NRR. | 鰂 | NRX | 鯠 |
| NRXY | 鯸 | NRZ | 急 | NS, | 鯿 | NSC. | 鮲 | NSE | 鮋 | NSJ | 鮪 |
| NSLI | 鰈 | NSO | 鮚 | NSOJ | 鯛 | NSOY | 鰈 | NT/ | 魦 | NTEQ | 鯢 |
| NTJ | 鮹 | NTMD | 譜 | NU45 | 鱥 | NUF | 鮮 | NUF2 | 鱻 | NUFO | 鱔 |
| NUOF | 鱹 | NURT | 鯡 | NV | 穌 | NVAO | 鰝 | NVBG | 鯙 | NVC | 魠 |
| NVD | 鯖 | NVEJ | 鯺 | NVY | 鰍 | NWAO | 鰩 | NWE8 | 鰂 | NWNA | 欲 |
| NWQ | 鯇 | NWQ | 鯢 | NWYY | 鰦 | NX | 彔 | NXAO | 鮥 | NXMU | 盉 |
| NXN | 剝 | NXO | 鮥 | NXO | 鮥 | NX\ | 逯 | NZ/ | 鮵 | N\ | 久 |
| N\ET | 鰶 | N\RX | 鰀 | N\Y | 灸 | O | 口 | O, | 另 | O, | 叻 |
| O,,J | 嚀 | O,N | 別 | O,O | 咖 | O./Y | 嗚 | O.2V | 嗾 | O.;P | 唧 |
| O.A. | 嘧 | O/3 | 咱 | O/3. | 嗅 | O/9\ | 嚥 | O/; | 㕭 | O/BX | 吸 |
| O/D1 | 啤 | O/D5 | 喤 | O/DS | 哼 | O/DS | 嗥 | O/DX | 噭 | O/MV | 噢 |
| O/O | 呂 | O/OP | 郘 | O/RA | 嗤 | OO | 哺 | OOE. | 嚩 | OO\ | 嗹 |
| O1 | 中 | O1 | 唁 | O1E8 | 貴 | O1E\ | 遺 | O1E\ | 遣 | O1MU | 盅 |
| O1RX | 嗖 | O1WX | 嗖 | O1Z | 忠 | O2 | 吽 | O22 | 哖 | O23 | 咋 |
| O2C | 吃 | O2EP | 啣 | O2I | 咮 | O2O | 哠 | O2O2 | 嘷 | O2Q8 | 嘖 |
| O2S | 吘 | O2SP | 啣 | O2SY | 嘸 | O33 | 啡 | O38 | 員 | O38 | 唄 |
| O38, | 勛 | O38L | 嚶 | O38P | 鄖 | O4 | 哂 | O4 | 嘿 | O4 | 咽 |
| O438 | 嗩 | O4B; | 嗎 | O4DS | 嘾 | O4EK | 嚗 | O4ET | 嘌 | O4F | 嚜 |
| O4L | 喓 | O4TF | 嚦 | O4X\ | 噠 | O5 | 呈 | O5P | 郢 | O5U | 哢 |
| O5\ | 逞 | O6NW | 嚐 | O7. | 嗨 | O7E5 | 嘓 | O7EK | 喂 | O7J | 嘏 |
| O7UK | 噥 | O7V | 咽 | O7VZ | 嗯 | O8 | 只 | O8 | 叭 | O8 | 咪 |
| O8 | 唔 | O84D | 噌 | O88. | 噂 | O8;E | 嗡 | O8N | 吩 | O8XN | 嗲 |
| O9 | 啶 | O9C | 吡 | O9CI | 嗦 | O9CN | 嘴 | O9DS | 啅 | O9H5 | 噦 |
| O9J | 啃 | O9O | 呫 | O9T8 | 嘣 | O9W | 嗇 | O;2 | 哞 | O;2V | 唉 |
| O;8X | 唆 | O;AF | 雖 | O;O | 咍 | O;P | 唧 | O;Q | 吮 | OA11 | 吤 |
| OA4D | 噲 | OAAF | 唑 | OAB | 吟 | OAB. | 呤 | OAB8 | 噴 | OABO | 哈 |
| OABZ | 唸 | OAC | 吪 | OAE; | 噙 | OAG. | 咐 | OAI | 啉 | OAI | 唋 |

| | | | | | | | | | | | |
|---|---|---|---|---|---|---|---|---|---|---|---|
| OAJN | 喻 | OAKF | 唯 | OAKH | 鷺 | OAO | 哈 | OAOA | 喰 | OAOU | 哼 |
| OAR/ | 呷 | OARO | 嗆 | OARV | 喉 | OAS | 呁 | OASO | 啥 | OB | 嗎 |
| OB,O | 嗃 | OB. | 呁 | OB/ | 吻 | OB/O | 吻 | OB2W | 啕 | OBB/ | 嘐 |
| OBBA | 吸 | OBBF | 嚁 | OBBS | 嚁 | OBD | 咰 | OBE | 叼 | OBEE | 呁 |
| OBF | 呾 | OBFP | 嚩 | OBG | 呼 | OBGC | 吼 | OBO | 响 | OBOY | 噢 |
| OBRC | 咆 | OBXW | 喲 | OC | 叱 | OC7U | 嚧 | OCCD | 喈 | OCE, | 嗪 |
| OCII | 嗁 | OCOV | 嚱 | OCQ | 唬 | OCS8 | 嗔 | OCSX | 嗖 | OCU | 嘘 |
| OD1 | 呻 | OD1 | 呷 | ODBL | 喝 | ODD | 唱 | ODE | 呾 | ODES | 哻 |
| ODF | 哩 | ODM; | 喁 | ODMU | 嗢 | ODOL | 嘍 | ODPX | 嘬 | ODSX | 嚗 |
| ODUF | 嘽 | OE,. | 啄 | OE,\ | 啄 | OE1E | 啞 | OE1Z | 噁 | OE2O | 唔 |
| OE7D | 嘈 | OE9Y | 嗚 | OE;F | 咥 | OEB | 號 | OEBH | 鴞 | OEBK | 饕 |
| OEBQ | 號 | OEDE | 咺 | OEDX | 哽 | OEG | 吁 | OEI | 味 | OEJ | 叮 |
| OEMA | 唡 | OENN | 咧 | OEO1 | 嗃 | OEOJ | 呵 | OER9 | 唓 | OESO | 咶 |
| OESW | 唽 | OEU1 | 呯 | OEW8 | 嗔 | OEWC | 吨 | OF | 吐 | OF.8 | 嚐 |
| OF.X | 嗷 | OF38 | 嘖 | OF9 | 哇 | OF; | 呿 | OF;U | 嗑 | OFBG | 哮 |
| OFC | 咾 | OFCD | 嗜 | OFDP | 嘟 | OFEU | 噎 | OFF | 哇 | OFFQ | 嘵 |
| OFFR | 噶 | OFNV | 喫 | OFNW | 嚠 | OFO | 咭 | OFOO | 嘻 | OFT | 嗪 |
| OFT | 哧 | OFTT | 嚇 | OFUS | 唪 | OFU\ | 喹 | OG. | 吋 | OG/D | 啪 |
| OGEJ | 叮 | OGH1 | 嘶 | OGK | 啦 | OH | 鳴 | OH1; | 囑 | OH35 | 嘎 |
| OH3X | 嗄 | OH7P | 喕 | OH9 | 吥 | OH95 | 喊 | OH9E | 呸 | OH;\ | 呱 |
| OHBC | 呃 | OHC | 呢 | OHDF | 喱 | OHE. | 嗕 | OHE1 | 听 | OHEF | 喔 |
| OHEY | 鳴 | OHFF | 哩 | OHJX | 嗳 | OHMN | 唰 | OHO5 | 喊 | OHRI | 嗥 |
| OHUA | 嘁 | OHV. | 嗅 | OHV9 | 嚦 | OHWW | 喔 | OH\ | 呎 | OI | 呆 |
| OIAA | 唻 | OIDE | 喳 | OIE | 咻 | OIIT | 喋 | OIOA | 啾 | OION | 喇 |
| OJ | 肙 | OJ2W | 嗂 | OJ4. | 嗍 | OJE | 咀 | OJG | 呼 | OJG. | 哷 |
| OJH | 鵑 | OJI | 啋 | OJL | 唆 | OJMX | 噯 | OK// | 嗲 | OK7P | 嘟 |
| OK8. | 嗙 | OK81 | 啼 | OK8O | 嘀 | OK8P | 嚌 | OK8X | 咬 | OK;J | 唷 |
| OKAF | 嚾 | OKAS | 啐 | OKD | 喑 | OKDA | 噉 | OKDZ | 噫 | OKIQ | 嘰 |
| OKJX | 嚆 | OKL | 喉 | OKLA | 咳 | OKO, | 嚎 | OKO | 嗽 | OKOG | 哼 |
| OKOJ | 哼 | OKOK | 嚷 | OKOO | 嗃 | OKOQ | 嘵 | OKQ | 吭 | OKTF | 嚏 |
| OKX | 咬 | OKX/ | 嗲 | OL1 | 叫 | OLOC | 嗾 | OLV | 吳 | OLX | 啾 |
| OM1 | 吊 | OM8D | 噌 | OMA | 吶 | OMC | 叱 | OME9 | 啶 | OMEE | 喧 |
| OMEO | 啊 | OMF | 呐 | OMFO | 啊 | OMFO | 嗐 | OMH1 | 嚅 | OMO | 喎 |
| OMUO | 嗣 | OMXO | 喀 | OMZJ | 嚀 | OMZW | 啌 | OM\T | 嚓 | ON | 叨 |
| ON | 喃 | ON, | 喙 | ON.S | 唎 | ONA | 吹 | OND | 嚕 | ONMV | 喚 |
| ONN | 別 | ONN | 哆 | ONO. | 嚷 | ONW | 啗 | OO.1 | 嘂 | OO1 | 串 |
| OO11 | 弗 | OO18 | 嘖 | OO1Z | 患 | OO7. | 獸 | OO7R | 靈 | OOB | 罵 |
| OOD5 | 戰 | OODH | 鸚 | OODK | 嚴 | OODK | 嚴 | OODP | 鄲 | OODS | 單 |
| OOE8 | 顎 | OOEB | 咢 | OOEB | 咢 | OOEH | 鶚 | OOEP | 鄂 | OOHO | 嚣 |
| OOHX | 嚴 | OOLO | 嚚 | OOMS | 罪 | OOO | 品 | OOOC | 彜 | OOOI | 噪 |
| OOOI | 喿 | OOON | 剿 | OOOP | 鄵 | OOOQ | 喦 | OOOS | 嚛 | OOOW | 嵒 |
| OOQ | 咒 | OORC | 唈 | OORO | 囂 | OOU\ | 遻 | OOV. | 哭 | OOVO | 器 |
| OP | 叩 | OP | 咡 | OP | 咠 | OP8 | 哄 | OP81 | 嘶 | OP8L | 唯 |
| OPE5 | 咫 | OPEJ | 啊 | OPPP | 嗫 | OPQL | 嗤 | OQ | 兄 | OQY | 咣 |
| OR16 | 嘯 | OR1C | 吧 | OR1C | 邑 | OR1U | 嚧 | OR1U | 嗐 | OR38 | 嗔 |
| OR61 | 嘯 | ORA | 映 | ORB1 | 咈 | ORC8 | 嘆 | OREE | 呧 | ORG | 呀 |
| ORJ/ | 呀 | ORJ5 | 哏 | ORK | 哏 | ORM1 | 哐 | ORMX | 哏 | OROO | 嘔 |
| ORPX | 噉 | ORQD | 嘗 | ORR. | 噚 | OS38 | 嗔 | OS8 | 哄 | OS; | 呟 |
| OSAN | 唛 | OSC/ | 呢 | OSD | 嗜 | OSDJ | 嘲 | OSE | 咁 | OSLI | 喋 |
| OSM1 | 啼 | OSM9 | 嗹 | OSMG | 哱 | OSMS | 喃 | OSMT | 嗪 | OSO | 咕 |
| OSOK | 嚎 | OSOV | 嘆 | OSOY | 嚥 | OSU8 | 嗩 | OSX | 吱 | OT | 吆 |
| OT, | 呦 | OT/ | 吵 | OT38 | 唄 | OTB. | 喲 | OTJ | 哨 | OTM7 | 嗤 |
| OTMD | 嚐 | OTT5 | 哦 | OU7 | 喵 | OU8U | 嗟 | OUAI | 嗾 | OUAO | 嗒 |
| OUAX | 噗 | OUD; | 嘸 | OUDL | 噶 | OUDV | 嗼 | OUEF | 嘩 | OUF | 咩 |
| OUF; | 嚜 | OUFQ | 咲 | OUFR | 嗟 | OUKO | 嚆 | OUNV | 嚇 | OUOF | 嚾 |
| OURT | 嗽 | OUSO | 喏 | OUUV | 噗 | OUWJ | 嘲 | OUX | 哎 | OV. | 吠 |
| OV. | 呔 | OV11 | 呀 | OV1O | 咭 | OV1W | 嗵 | OV8T | 嘹 | OVAA | 咦 |

| | | | | | | | | | | | |
|---|---|---|---|---|---|---|---|---|---|---|---|
| OVAO | 嚆 | OVC | 吒 | OVDC | 唵 | OVF | 唪 | OVG5 | 哦 | OVN | 唎 |
| OVRB | 咦 | OVS | 咻 | OVUF | 唾 | OVY | 啾 | OW; | 嗤 | OWAF | 嗺 |
| OWH1 | 喘 | OWQ | 哯 | OWW | 咄 | OX | 史 | OX. | 咚 | OX2. | 嗨 |
| OX9D | 嗒 | OXAD | 嗜 | OXCX | 啵 | OXO | 咯 | OXS1 | 唏 | OXT/ | 吵 |
| OXXI | 嗓 | OXXX | 啜 | OY | 吠 | OYY | 啖 | OYY, | 嘮 | OZ/ | 吡 |
| P | 耳 | P | 身 | P, | 防 | P. | 防 | P/ | 髟 | P/. | 髣 |
| P//8 | 鬚 | P/4K | 鬟 | P/7U | 髷 | P/7Z | 聰 | P/8D | 鬐 | P/9C | 髭 |
| P/; | 隗 | P/;/ | 鬖 | P/AD | 髻 | P/AF | 髽 | P/AI | 鬃 | P/B, | 髫 |
| P/BC | 髱 | P/BI | 躲 | P/CX | 髲 | P/D/ | 鬄 | P/D1 | 陴 | P/D5 | 隉 |
| P/DS | 陴 | P/DX | 鬉 | P/EQ | 髡 | P/FD | 髾 | P/FO | 髫 | P/HE | 鬘 |
| P/I; | 鬆 | P/IN | 鬍 | P/JJ | 鬜 | P/KK | 鬘 | P/L5 | 鬛 | P/M8 | 鬢 |
| P/MF | 髯 | P/MK | 鬢 | P/MQ | 髦 | P/MT | 鬃 | P/MV | 陾 | P/NO | 髻 |
| P/P | 髶 | P/S. | 髮 | P/S8 | 鬓 | P/SA | 鬍 | P/SJ | 鬍 | P/SJ | 鬌 |
| P/SX | 髮 | P/TJ | 髫 | P/UC | 鬆 | P/UN | 鬚 | P/UT | 鬆 | P/UV | 鬟 |
| P/VC | 髦 | P/VD | 鬌 | P/VN | 鬋 | P/VO | 髻 | P/XF | 鬘 | P0 | 陣 |
| P23 | 阼 | P2C | 阢 | P2I | 陎 | P2V | 趺 | P33 | 陫 | P5SZ | 聽 |
| P7EK | 隈 | P7SB | 聘 | P8 | 其 | P81 | 碁 | P8;B | 聯 | P8F | 基 |
| P8H1 | 斯 | P8H; | 蟴 | P8J | 期 | P8L | 甚 | P8L, | 勘 | P8L5 | 戡 |
| P8LA | 歁 | P8LS | 斟 | P8N2 | 鄴 | P8NA | 欺 | P8T | 綦 | P8Z | 碁 |
| P9 | 恥 | P9 | 阯 | P9O | 阽 | P9T | 陟 | P9TB | 騭 | P;Q | 阬 |
| PAB | 聆 | PAB. | 聆 | PAB; | 陰 | PAG. | 附 | PAI | 除 | PAJN | 隃 |
| PAMU | 陯 | PAOA | 險 | PASF | 陞 | PB1C | 阤 | PB2W | 陶 | PB8 | 陶 |
| PBBI | 躲 | PC | 耴 | PC1. | 阠 | PC9 | 阠 | PCC | 阰 | PCCD | 階 |
| PCCF | 陛 | PCS | 阠 | PCX | 陂 | PDE/ | 陽 | PDE9 | 隄 | PDF | 陧 |
| PDH/ | 陽 | PDM; | 隅 | PDR | 陧 | PDTY | 隰 | PE8X | 隬 | PE9 | 聇 |
| PEE1 | 阱 | PEEQ | 阮 | PEJ | 耵 | PELR | 陘 | PEMA | 陃 | PEML | 陋 |
| PEO1 | 隔 | PEO5 | 聝 | PEOJ | 阿 | PEQ | 阢 | PEU | 阱 | PEV | 跃 |
| PF.X | 隞 | PF1 | 阱 | PF8F | 陸 | PF8X | 陵 | PF9 | 陡 | PF; | 陆 |
| PFD | 陼 | PFFQ | 隢 | PFO | 聐 | PG. | 射 | PHBC | 陀 | PHD | 陌 |
| PHL5 | 隇 | PHM1 | 陑 | PHM1 | 聏 | PHMV | 陾 | PHWW | 躧 | PHX | 阪 |
| PID | 陳 | PID; | 墬 | PIDX | 隞 | PJE | 阻 | PJRI | 隟 | PJRZ | 隱 |
| PK | 長 | PK/E | 隨 | PK8P | 隮 | PKD5 | 職 | PKDS | 障 | PKJX | 隴 |
| PKLA | 陔 | PKO | 陪 | PKOJ | 聤 | PKQ | 阬 | PKXE | 隨 | PM58 | 贖 |
| PM8R | 聍 | PMC | 陀 | PMEQ | 院 | PMF | 聃 | PMQ | 耽 | PMZJ | 聹 |
| PN | 刵 | PN,F | 墜 | PNH1 | 聸 | PNN | 陊 | PNW | 陷 | PO18 | 隤 |
| PO18 | 聵 | PO38 | 隕 | PO5 | 聖 | PP | 耶 | PP | 聑 | PPP | 聶 |
| PPP8 | 顳 | PPX | 隬 | PQI | 躲 | PQL | 甚 | PQL, | 勘 | PQL5 | 戡 |
| PQLA | 歁 | PQLS | 斟 | PR1P | 聊 | PRB | 躬 | PRDL | 軀 | PREE | 陙 |
| PRF | 肆 | PRK | 限 | PROO | 軀 | PS; | 耾 | PSJ | 陏 | PSRF | 墮 |
| PSRJ | 隋 | PSRR | 隓 | PSRW | 墮 | PSRZ | 隳 | PSR\ | 隨 | PT, | 聊 |
| PT/T | 隙 | PTMO | 躺 | PTT6 | 聯 | PU, | 隊 | PU,F | 墜 | PU,\ | 隧 |
| PU,\ | 墜 | PU8U | 隘 | PURT | 隒 | PUV | 聯 | PV1 | 阡 | PV1F | 陞 |
| PV1O | 聒 | PV8T | 騄 | PVA | 跃 | PVAA | 陜 | PVC | 耗 | PVDF | 陲 |
| PVEB | 陓 | PVEJ | 陭 | PVUF | 陲 | PWEU | 隑 | PWF | 陞 | PWR | 陛 |
| PX | 取 | PX, | 聚 | PX,P | 鄹 | PX2 | 降 | PXAA | 聚 | PXAP | 鄹 |
| PXEE | 隆 | PXI | 聚 | PXL | 娶 | PXP | 郰 | PXY | 聚 | PY | 耿 |
| PYKK | 娶 | PYY, | 嫪 | PZ | 恥 | P\ET | 際 | P\EV | 聧 | Q | 石 |
| Q | 儿 | Q | 几 | Q. | 凡 | Q.RK | 硠 | Q.X | 砅 | Q/; | 硊 |
| Q/BX | 破 | Q/D1 | 碑 | Q/D5 | 凰 | Q/DI | 磔 | Q/DS | 碑 | Q/DX | 礉 |
| Q/K | 砭 | Q0 | 碑 | Q23 | 砟 | Q2C | 矻 | Q2I | 硃 | Q2O | 碚 |
| Q2Q8 | 礦 | Q3Q | 硯 | Q4 | 硒 | Q4DS | 磾 | Q5. | 砝 | Q7. | 碍 |
| Q777 | 礌 | Q7EK | 碨 | Q7I | 硱 | Q7T | 磲 | Q7V | 硱 | Q84D | 碏 |
| Q8N | 砏 | Q8N2 | 磷 | Q97Y | 硝 | Q9O | 砧 | Q; | 風 | Q;/ | 彫 |
| Q;1X | 颱 | Q;38 | 颶 | Q;4T | 飄 | Q;5/ | 颺 | Q;7Z | 飃 | Q;9O | 颭 |
| Q;;/ | 磣 | Q;;O | 颭 | Q;B/ | 飂 | Q;BC | 颮 | Q;D/ | 颺 | Q;EN | 颱 |
| Q;R/ | 颼 | Q;R7 | 飀 | Q;VO | 颳 | Q;VT | 颼 | Q;X; | 颾 | QA11 | 矸 |
| QAB. | 矝 | QAI | 硢 | QAKF | 碓 | QAKI | 礁 | QAKY | 礁 | QAMU | 碖 |

| | | | | | | | | | | | |
|---|---|---|---|---|---|---|---|---|---|---|---|
| QB | 碼 | QBB/ | 磟 | QBBA | 破 | QBG | 砑 | QBKX | 砲 | QBRC | 砲 |
| QC29 | 礙 | QCC | 砒 | QCN | 磡 | QCRO | 磄 | QCS8 | 礦 | QCX | 破 |
| QD1 | 砷 | QDBL | 碣 | QDE/ | 碭 | QDEM | 礙 | QDH/ | 碭 | QE7E | 礓 |
| QED. | 磚 | QEDX | 硬 | QEE5 | 硪 | QEH | 鳳 | QEJN | 砌 | QELR | 硜 |
| QEN | 夙 | QEOJ | 砢 | QEQ | 矾 | QES | 矸 | QEU | 研 | QEU1 | 砰 |
| QEUG | 礱 | QEUN | 硎 | QF.X | 磁 | QF38 | 磧 | QF7. | 磕 | QF; | 砝 |
| QF;U | 磕 | QFF | 硅 | QFFQ | 磽 | QFJ | 碃 | QFO | 砧 | QFOO | 硞 |
| QH38 | 碩 | QH95 | 碱 | QHC | 硊 | QHCQ | 礠 | QHE1 | 斫 | QHE8 | 礩 |
| QHEJ | 磳 | QHEX | 碬 | QHMU | 碥 | QHOS | 礔 | QHSK | 碾 | QHU; | 礪 |
| QHXX | 碫 | QI | 朵 | QI8; | 硹 | QIDE | 碴 | QIE | 砵 | QII | 碄 |
| QII9 | 礎 | QIN | 剁 | QJE | 砠 | QJI7 | 磖 | QJJ | 硼 | QJRJ | 磚 |
| QJTV | 碤 | QK | 砬 | QK8. | 磅 | QK81 | 碲 | QK;Q | 硫 | QKAS | 碎 |
| QKF | 砫 | QKO | 碚 | QKOJ | 碠 | QKOO | 碻 | QKOX | 磝 | QM7 | 礌 |
| QM8R | 硿 | QMAF | 確 | QMAF | 礭 | QMC | 砣 | QME8 | 磧 | QME9 | 碇 |
| QMEO | 碉 | QMFO | 碉 | QMFO | 碚 | QMH1 | 礌 | QMI3 | 礵 | QMK | 研 |
| QMNC | 碗 | QMO | 碢 | QMS8 | 磺 | QMUW | 碉 | QN | 矽 | QN | 确 |
| QN2I | 磔 | QNA | 砍 | QNHC | 硊 | QNX | 磜 | QO38 | 隕 | QOOS | 礴 |
| QOOX | 礹 | QP8, | 礴 | QP8L | 礁 | QPQ, | 礴 | QPQL | 礁 | QQ | 砳 |
| QQQ | 磊 | QQX | 砓 | QR | 矼 | QR18 | 礥 | QR1U | 礛 | QRB1 | 磦 |
| QREE | 砥 | QRF | 硉 | QRG | 砑 | QRJ/ | 砑 | QRK | 硍 | QRM1 | 硒 |
| QS38 | 磌 | QS78 | 磺 | QSC/ | 硥 | QSD | 碏 | QSE8 | 磧 | QSLI | 碟 |
| QT/ | 砂 | QTJ | 嵐 | QTJ | 硝 | QTM7 | 礌 | QTT5 | 磯 | QU0. | 礴 |
| QU45 | 礤 | QUF5 | 礒 | QUFR | 磋 | QUKL | 硴 | QUM, | 礞 | QUMV | 碤 |
| QURT | 礁 | QUTT | 磁 | QUU | 碰 | QU\T | 磜 | QV | 砆 | QVAA | 砍 |
| QVAO | 礄 | QVC | 砃 | QVEJ | 碕 | QVG5 | 硪 | QVS | 砵 | QVUF | 硾 |
| QVXX | 碶 | QW | 凸 | QWAF | 碓 | QWEU | 磑 | QWHY | 碶 | QWJJ | 磞 |
| QWSY | 碟 | QX | 泵 | QX | 殳 | QX | 砅 | QXO | 硌 | QXRI | 磲 |
| QXXI | 磙 | QY | 兆 | QY3Q | 覩 | QYH8 | 頫 | QYYT | 磔 | QY\ | 逃 |
| Q\EU | 磴 | R | 工 | R | 匚 | R, | 功 | R.1. | 卵 | R.18 | 韏 |
| R.1G | 孵 | R.1X | 毈 | R.N7 | 留 | R.N8 | 貿 | R.NH | 鼯 | R.NN | 劉 |
| R.NP | 鄮 | R.N\ | 遛 | R/ | 尹 | R/3U | 匱 | R/O | 君 | R/O8 | 頵 |
| R/OF | 群 | R/OH | 鵘 | R/OP | 郡 | R/OY | 焄 | R0/C | 甗 | R1.. | 卵 |
| R1.8 | 轒 | R1.G | 孵 | R1.X | 毈 | R16 | 肅 | R16H | 鷫 | R1;P | 卿 |
| R1C | 巴 | R1CW | 邑 | R1E8 | 賁 | R1EU | 盡 | R1O8 | 頤 | R1O8 | 賾 |
| R1OL | 娶 | R1OY | 熙 | R1P | 卯 | R1R1 | 臣 | R1R1 | 亞 | R1R1 | 檗 |
| R1R5 | 塱 | R1R8 | 賢 | R1R9 | 臥 | R1R; | 豎 | R1RA | 臥 | R1RF | 堅 |
| R1RG | 擊 | R1RJ | 腎 | R1RL | 娶 | R1RO | 臨 | R1RQ | 覽 | R1RQ | 硻 |
| R1RT | 緊 | R1RU | 監 | R1RU | 豎 | R1RU | 鹽 | R1RU | 監 | R1RY | 耎 |
| R1R\ | 鑿 | R1R\ | 鋻 | R2V | 醫 | R2V. | 堅 | R2V4 | 驥 | R2V8 | 醫 |
| R2V8 | 贒 | R2VA | 豎 | R2VB | 驗 | R2VH | 鷖 | R2VL | 嫛 | R2VT | 繄 |
| R33 | 匪 | R33F | 匯 | R38 | 貢 | R5 | 匡 | R5 | 戉 | R5, | 劻 |
| R61 | 肅 | R61H | 鷫 | R8 | 匹 | R8H | 鴄 | RA | 夬 | RAA | 巫 |
| RAAQ | 覡 | RAO | 匫 | RAOA | 奩 | RB | 弓 | RB.. | 弱 | RB.H | 鶸 |
| RB/ | 匢 | RB1 | 引 | RB1 | 弔 | RB11 | 弗 | RB18 | 費 | RB1C | 匜 |
| RB1C | 艴 | RB1N | 刜 | RB1P | 鄁 | RB1U | 盉 | RB3X | 彃 | RB4K | 瞏 |
| RB81 | 鬻 | RB8B | 粥 | RB; | 弘 | RB;1 | 謽 | RB;; | 強 | RBA. | 弣 |
| RBBC | 弛 | RBDF | 彈 | RBE. | 彏 | RBEE | 疆 | RBER | 弳 | RBEX | 彌 |
| RBFE | 疆 | RBHB | 弼 | RBH\ | 弧 | RBJJ | 弸 | RBKT | 弦 | RBKT | 弶 |
| RBNO | 弨 | RBO; | 強 | RBOS | 彈 | RBP | 弭 | RBPK | 張 | RBRB | 弱 |
| RBRC | 弝 | RBRE | 弤 | RBRH | 鷚 | RBRO | 彊 | RBS8 | 彉 | RBTJ | 弰 |
| RBWX | 弢 | RC | 己 | RC | 已 | RC | 巳 | RC/9 | 巹 | RC/\ | 鋻 |
| RCL | 改 | RCP | 邔 | RCR8 | 巽 | RCR\ | 選 | RCU | 异 | RCX | 改 |
| RCZ | 忌 | RCZH | 鵋 | RD1 | 匣 | RDL | 匽 | RDLH | 鷃 | RDLP | 郾 |
| RE5 | 氏 | RE5D | 昏 | RE5E | 氐 | RE5H | 鴟 | RE5P | 邸 | REB | 巧 |
| REJ. | 玒 | RF | 聿 | RF7E | 畫 | RF7N | 劃 | RFD | 書 | RFDE | 晝 |
| RFHU | 蠹 | RF\ | 建 | RG | 牙 | RGAF | 雅 | RGH | 鴉 | RGP | 邪 |
| RG\ | 迓 | RH38 | 項 | RHE1 | 匠 | RHMU | 匾 | RJ/ | 牙 | RJ/F | 雅 |

| | | | | | | | | | | | |
|---|---|---|---|---|---|---|---|---|---|---|---|
| RJ/H | 鴉 | RJ/P | 邪 | RJ/\ | 迓 | RJE3 | 暨 | RJE5 | 民 | RJED | 暋 |
| RJEN | 刡 | RJEX | 欧 | RJEX | 殴 | RJEZ | 愍 | RJL | 改 | RJP | 邵 |
| RJX | 改 | RK | 艮 | RKQ | 匠 | RK\ | 退 | RLR8 | 巽 | RLR\ | 選 |
| RM1 | 匝 | RMM1 | 帝 | RO | 巨 | RO18 | 匱 | ROO. | 甌 | ROOA | 歐 |
| ROOH | 鷗 | ROOO | 區 | ROOS | 匯 | ROOX | 毆 | ROOX | 毆 | RP | 印 |
| RP | 印 | RP | 邛 | RPX | 敢 | RPXZ | 憨 | RP\ | 迎 | RQ | 匹 |
| RQ | 旡 | RQ.9 | 趕 | RQ.; | 蛩 | RQ.S | 鞏 | RQ.Z | 恐 | RQ.\ | 跫 |
| RQH | 鴄 | RQR1 | 觜 | RQR; | 暨 | RQRD | 替 | RR | 巨 | RR;; | 匭 |
| RRO. | 尋 | RROP | 鄩 | RUSO | 匿 | RUSZ | 慝 | RX | 攻 | RX | 汞 |
| RXAF | 匯 | RX\ | 逮 | S | 十 | S | 廿 | S | 革 | S, | 勒 |
| S,,, | 協 | S/BX | 毂 | S/D1 | 鞞 | S/DS | 鞞 | S0G. | 博 | S1BG | 存 |
| S1F | 在 | S3 | 直 | S38 | 真 | S388 | 顛 | S38H | 鷏 | S3S3 | 矗 |
| S4V\ | 韆 | S78 | 黄 | S78F | 鼓 | S78H | 鶘 | S78S | 斟 | S8 | 共 |
| S80 | 龚 | S8; | 巷 | S8BC | 巷 | S8G | 拲 | S8RC | 巷 | S8Z | 恭 |
| S;AF | 雄 | S;BB | 翃 | SAA2 | 麸 | SAA8 | 麴 | SAA; | 麸 | SAAB | 麵 |

| | | | | | | | | | | | |
|---|---|---|---|---|---|---|---|---|---|---|---|
| SAAC | 麩 | SAAC | 麹 | SAAN | 麥 | SAAP | 麵 | SAAU | 麯 | SAAV | 麩 |
| SAB | 靲 | SAC | 靴 | SAEX | 鞭 | SAO | 鞈 | SAOU | 鞥 | SB,I | 鞣 |
| SB. | 靮 | SB1 | 鞨 | SB8 | 鞠 | SBBA | 鞁 | SBRC | 鞄 | SC | 尢 |
| SC. | 尤 | SC./ | 尨 | SC5 | 尪 | SCA1 | 尬 | SCB. | 尥 | SCMJ | 尷 |
| SCRU | 尶 | SCVF | 尰 | SCX | 鞍 | SD | 昔 | SDBL | 鞨 | SDCX | 散 |
| SDE | 靼 | SDE9 | 韃 | SDH | 鵲 | SDH1 | 斮 | SDN | 剒 | SDOL | 鞻 |
| SDS2 | 韓 | SDS5 | 戟 | SDS; | 韐 | SDSB | 翰 | SDSC | 乾 | SDSF | 乾 |
| SDSH | 韓 | SDSI | 榦 | SDSJ | 朝 | SDSS | 幹 | SDSS | 斡 | SDTY | 韞 |
| SE | 甘 | SE78 | 黄 | SE7E | 韁 | SE7F | 鼓 | SE7H | 鶘 | SE7S | 斟 |
| SEI | 某 | SEI | 鞢 | SEJ | 靪 | SEP | 邯 | SEQ | 靰 | SES | 靬 |
| SF48 | 韈 | SFF | 鞋 | SFO | 鞊 | SFU\ | 韃 | SGK | 鞡 | SHE1 | 靳 |
| SJ | 有 | SJE | 靻 | SJE5 | 鞴 | SJP | 郁 | SJX | 散 | SJ\ | 逌 |
| SKOP | 鄚 | SL | 世 | SL3, | 勤 | SL38 | 貫 | SL\ | 迣 | SM | 有 |
| SM | 市 | SM1 | 布 | SM18 | 顢 | SM79 | 毒 | SM8R | 鞋 | SMB, | 勃 |
| SMBG | 孛 | SMBH | 鵓 | SMBP | 郣 | SMF | 菁 | SMF8 | 韒 | SMFQ | 觀 |
| SMFS | 斠 | SMF\ | 遘 | SML | 鞍 | SMM1 | 帶 | SMM\ | 遰 | SMT | 索 |
| SMUS | 南 | SMV | 鞅 | SNO | 鞀 | SNOQ | 鞔 | SO | 古 | SO | 右 |
| SO9H | 鳶 | SO9P | 鄢 | SO9Y | 燕 | SOF | 堇 | SOF, | 勤 | SOF1 | 靳 |
| SOFP | 鄞 | SOFQ | 覲 | SOFZ | 懃 | SOH | 鴣 | SOHX | 嘏 | SOJ | 胡 |
| SOJ | 鞙 | SOJH | 鶘 | SOJH | 鵱 | SOK | 袁 | SOKS | 辜 | SOM; | 臺 |
| SOM; | 臺 | SOMI | 橐 | SOMI | 橐 | SOMK | 囊 | SOQ | 克 | SOQ, | 勀 |
| SOQM | 剋 | SOQN | 剋 | SOQQ | 兢 | SOVA | 歎 | SOVA | 鞨 | SOVF | 難 |
| SOVK | 艱 | SOVZ | 懃 | SOX | 故 | SR | 左 | SR1C | 鞔 | SRB1 | 鞞 |
| SRB; | 靿 | SRF\ | 韃 | SRJC | 毦 | SRK | 艰 | SRL | 妻 | SRLH | 韉 |
| SRLP | 鄞 | SSL | 靴 | SSLI | 鞢 | ST, | 勸 | STJ | 鞘 | STMO | 鞘 |
| STT5 | 韈 | SU | 卉 | SU38 | 責 | SU3A | 歕 | SU3B | 翻 | SUAO | 鞳 |
| SUAX | 韄 | SUCY | 韉 | SUFX | 鞍 | SUS | 鞐 | SV | 鞣 | SVY | 鞦 |
| SX | 友 | SX | 支 | SX. | 犮 | SXBB | 翅 | SXD | 鞍 | SXH | 嬉 |
| SXH8 | 頍 | SXR. | 趗 | SY | 灰 | SYMU | 盔 | S\ | 丈 | T | 小 |
| T | 糸 | T, | 幼 | T,H | 鴼 | T. | 紡 | T.11 | 紃 | T.29 | 綫 |
| T.;; | 鑾 | T.;D | 轡 | T.;K | 變 | T.;O | 縊 | T.;P | 鄉 | T.H | 鷥 |
| T.NA | 紋 | T.S | 料 | T/ | 少 | T/, | 劣 | T/3 | 省 | T/7X | 緵 |
| T/7Z | 總 | T/9\ | 綖 | T/BX | 級 | T/C. | 紈 | T/D1 | 綿 | T/D1 | 紳 |
| T/DP | 鄉 | T/DS | 紳 | T/DX | 線 | T/DX | 緻 | T0G. | 縛 | T0\ | 縺 |
| T111 | 紃 | T2BC | 絁 | T2C | 紇 | T2DX | 緩 | T2I | 絑 | T2O2 | 緯 |
| T2Q8 | 纘 | T2V | 紩 | T33 | 緋 | T38L | 纓 | T3QY | 緄 | T3T/ | 繖 |
| T4EK | 繯 | T4ET | 縹 | T4F | 綞 | T4FS | 繹 | T4TF | 繹 | T5 | 紝 |
| T5\ | 綎 | T7 | 細 | T7I | 細 | T7S | 紬 | T7T | 繧 | T7UK | 纏 |
| T7V | 緦 | T7Z | 緦 | T84D | 縉 | T88 | 緧 | T88. | 繙 | T8N | 紛 |
| T8N2 | 繽 | T8O | 綹 | T8R/ | 綈 | T9DS | 綽 | T;;/ | 緣 | T;O | 紿 |
| TA/ | 紾 | TA11 | 紒 | TA4D | 繪 | TAA5 | 纖 | TAB | 紟 | TAEX | 緶 |

| | | | | | | | | | | | |
|---|---|---|---|---|---|---|---|---|---|---|---|
| TAF | 絟 | TAG. | 紨 | TAJN | 綸 | TAK; | 鎜 | TAKF | 維 | TAKF | 雀 |
| TAMU | 綸 | TAO | 給 | TARV | 緱 | TAUV | 緵 | TB | 幻 | TB,O | 繑 |
| TB. | 約 | TB2W | 絢 | TB9J | 縐 | TBB/ | 繆 | TBBA | 級 | TBD | 絁 |
| TBF | 紐 | TBJ | 紓 | TBO | 絇 | TBWW | 綯 | TC4F | 縺 | TC7U | 縒 |
| TCC | 紕 | TCS8 | 纘 | TD1 | 紳 | TD4X | 縵 | TD5 | 綫 | TDB/ | 緆 |
| TDCC | 緹 | TDE9 | 綻 | TDMU | 緼 | TDOL | 縷 | TDPX | 緺 | TDTQ | 虢 |
| TDUF | 繹 | TE55 | 綡 | TE99 | 縱 | TE;D | 縚 | TE;F | 經 | TE;X | 綴 |
| TEA9 | 縱 | TED. | 繂 | TEDX | 綆 | TEDZ | 纏 | TEE5 | 綜 | TEE; | 紜 |
| TEEJ | | TEG | 紆 | TEJ | 紅 | TELR | 經 | TEMA | 緬 | TEMC | 緇 |
| TEO5 | 絨 | TEQ | 光 | TEQ0 | 輝 | TEQF | 耀 | TER9 | 縺 | TERL | 縷 |
| TES5 | 絨 | TEWC | 純 | TEX. | 綵 | TF38 | 績 | TF48 | 纉 | TF8X | 綾 |
| TF; | 結 | TFD | 緒 | TFF | 絓 | TFFQ | 繞 | TFJ | 綪 | TFO | 結 |
| TFO8 | 纈 | TFP | 綁 | TFT | 繚 | TFUU | 鼇 | TFU\ | 縫 | TG. | 紂 |
| TH/T | 縓 | TH4F | 纏 | TH7P | 緬 | TH9 | 紑 | THD | 絔 | THE. | 綒 |
| THJX | 緩 | THMU | 編 | THMV | 緶 | THO5 | 緘 | THR\ | 縋 | THV. | 緱 |
| THXX | 緞 | TI3 | 緗 | TI4 | 練 | TIE | 絉 | TII | 緋 | TIO | 練 |
| TJ | 尚 | TJ, | 綉 | TJBG | 綒 | TJE | 組 | TJEX | 緩 | TJI | 綵 |
| TJI7 | 繙 | TJL | 綏 | TJMX | 綬 | TJN | 削 | TJNG | 掣 | TJQ | 胤 |
| TJW | 綯 | TJ\ | 道 | TK7E | 纏 | TK8. | 綉 | TK81 | 締 | TK8X | 絞 |
| TK;Q | 統 | TKAS | 綷 | TKD5 | 織 | TKDK | 縗 | TKDZ | 總 | TKF | 絓 |
| TKLA | 絯 | TKOG | 綧 | TKOK | 纊 | TKOO | 縞 | TKOT | 綀 | TKT | 絃 |
| TKT2 | 繂 | TKTS | 綍 | TKX | 紋 | TKX; | 縭 | TL1 | 糾 | TL7 | 緇 |
| TLDI | 繰 | TM0 | 緷 | TMA | 納 | TMAD | 縮 | TMC | 紽 | TME8 | 縯 |
| TME8 | 縯 | TME9 | 綻 | TMEJ | 紵 | TMEO | 綢 | TMEQ | 綄 | TMER | 繩 |
| TMET | 綜 | TMFO | 綢 | TMFO | 絬 | TMH1 | 縊 | TMHR | 綰 | TMJ | 綃 |
| TMKS | 綷 | TMNC | 綄 | TMO | 尚 | TMO | 網 | TMO | 綢 | TMO. | 棠 |
| TMO/ | 掌 | TMO1 | 常 | TMO4 | 黨 | TMO7 | 當 | TMO8 | 賞 | TMOC | 鼞 |
| TMOD | 嘗 | TMOF | 堂 | TMOG | 掌 | TMOG | 掌 | TMOI | 棠 | TMOK | 裳 |
| TMOQ | 党 | TMOX | 敞 | TMQ | 紈 | TMUL | 網 | TMUW | 網 | TMV | 紻 |
| TN, | 緣 | TN. | 紉 | TNN2 | 繲 | TNO | 紹 | TNO. | 纔 | TNOQ | 繞 |
| TNRC | 絕 | TNRY | 繸 | TNX | 緣 | TO/O | 綤 | TO18 | 績 | TO1\ | 縉 |
| TO38 | 縜 | TOJ | 絹 | TOOI | 繰 | TOOS | 繹 | TOP | 緝 | TPX | 繳 |
| TQY | 繞 | TR | 紅 | TR16 | 繡 | TR1Q | 纇 | TR61 | 繡 | TRB1 | 綈 |
| TRB1 | 紉 | TRB; | 緻 | TRC | 紀 | TRE5 | 紙 | TRFE | 縺 | TRJD | 縉 |
| TRMX | 緩 | TS | 緈 | TS38 | 縝 | TS; | 紘 | TSC. | 紌 | TSE | 紺 |
| TSJX | 徽 | TSL | 繼 | TSMG | 綍 | TSRL | 縷 | TSX. | 絨 | TT | 絲 |
| TT/ | 紗 | TTE1 | 斷 | TTE5 | 幾 | TTE5 | 畿 | TTE; | 纏 | TTEQ | 絖 |
| TTH | 蠶 | TTH5 | 幾 | TTJ | 綃 | TTTL | 繼 | TTV5 | 幾 | TTW | 幽 |
| TU,\ | 縫 | TU8U | 縊 | TUDV | 縸 | TUFO | 繕 | TUFR | 縒 | TURT | 纈 |
| TUS | 絆 | TUU | 絣 | TUVC | 繙 | TUW\ | 縫 | TV | 尖 | TV. | 紎 |
| TV/B | 纏 | TV4 | 縹 | TV8T | 繚 | TVAO | 縞 | TVB/ | 繡 | TVDF | 繾 |
| TVEJ | 綺 | TVL | 綉 | TVS | 絑 | TVUF | 縺 | TVV | 綠 | TWAF | 縱 |
| TWAO | 繼 | TWAU | 繼 | TWJJ | 繼 | TWW | 細 | TX. | 終 | TX. | 紋 |
| TX2 | 絳 | TX9O | 綹 | TXAO | 絡 | TXF\ | 縫 | TXO | 絡 | TXS1 | 絺 |
| TXXI | 緣 | TXXX | 綴 | TYY | 緂 | TZE. | 緪 | TZEE | 緪 | T\ | 心 |
| T\ET | 綜 | U | 廾 | U | 丌 | U | 艸 | U,,, | 茘 | U,88 | 蕕 |
| U,AX | 獲 | U,BF | 茹 | U,O | 茄 | U,Y | 荻 | U,\ | 遂 | U. | 芳 |
| U./Y | 蔫 | U.29 | 葹 | U.2C | 葹 | U.2V | 蔟 | U.A. | 菸 | U.N8 | 蕢 |
| U.NA | 茨 | U.QX | 蔽 | U.RK | 莨 | U/3 | 首 | U/3. | 導 | U/35 | 馘 |
| U/3X | 夔 | U/3Z | 葸 | U/3\ | 道 | U/7C | 菎 | U/7Z | 蔥 | U/9\ | 莚 |
| U/; | 蒐 | U/BB | 芀 | U/BX | 茇 | U/C | 芁 | U/C. | 芁 | U/D. | 葯 |
| U/D1 | 萆 | U/D5 | 葟 | U/DC | 葩 | U/DI | 葉 | U/DS | 萆 | U/DX | 蔌 |
| U/DY | 菡 | U/H8 | 蘋 | U/MV | 萁 | U/O; | 萬 | U0 | 莆 | U0 | 華 |
| U0ES | 蘄 | U0G. | 蕈 | U0H1 | 蘄 | U0V1 | 蘄 | U0WT | 蘩 | U0\ | 蓮 |
| U1 | 卅 | U11 | 卌 | U1AX | 護 | U1DL | 藹 | U1EA | 苡 | U1FD | 藷 |
| U1QX | 蔎 | U23 | 荐 | U27. | 蓐 | U27T | 蘩 | U2I | 茱 | U2O2 | 葦 |

| | | | | | | | | | | | |
|---|---|---|---|---|---|---|---|---|---|---|---|
| U2SA | 蕻 | U2SY | 蕪 | U2V | 芙 | U2VF | 薙 | U3 | 旨 | U33 | 菲 |
| U33E | 韭 | U3G | 蕭 | U38 | 蘇 | U38L | 韈 | U38N | 蕑 | U3Q | 莧 |
| U3R\ | 藍 | U3U | 葺 | U3\V | 蘇 | U4 | 茜 | U41N | 蕲 | U4;C | 蘢 |
| U4DS | 蕫 | U4ET | 蕀 | U4F. | 蘱 | U4FD | 薯 | U4H5 | 蔑 | U4HN | 蔛 |
| U4L | 蔞 | U4M. | 蔻 | U4M3 | 蕒 | U4M5 | 蕽 | U4MC | 蕘 | U4MN | 夢 |
| U4MP | 蘡 | U4MX | 藮 | U4TF | 蘿 | U5OO | 蘁 | U5\ | 蓮 | U6 | 芇 |
| U6AF | 藺 | U6E5 | 藏 | U6F | 莊 | U6FO | 蘳 | U6I4 | 蘭 | U6J | 蒨 |
| U6J. | 蒋 | U6Z | 蔄 | U7 | 苗 | U7, | 莮 | U7. | 苺 | U777 | 藟 |
| U77F | 蓳 | U77T | 蘂 | U78M | 蓾 | U7A | 茵 | U7E5 | 蘟 | U7EK | 蒖 |
| U7O | 茴 | U7S | 苗 | U7T | 葉 | U7UC | 菌 | U7V | 茵 | U7V | 菌 |
| U7Z | 蒽 | U8 | 蕌 | U8 | 蕭 | U80 | 黼 | U88N | 黺 | U8;B | 蒻 |
| U8AY | 薰 | U8M; | 藹 | U8MH | 鷄 | U8MT | 蕭 | U8MU | 益 | U8N | 芬 |
| U8NI | 菜 | U8NU | 蓋 | U8OQ | 莌 | U8S. | 蔽 | U8V8 | 蕱 | U8X | 蔽 |
| U8XR | 藍 | U9 | 芷 | U97Y | 菡 | U9C | 茈 | U9EX | 菽 | U9H5 | 蔵 |
| U9O | 苦 | U9T8 | 蘋 | U9XO | 蕗 | U; | 茧 | U;8X | 萲 | U;;/ | 蓼 |
| U;A | 苡 | U;M | 萵 | U;O | 苔 | U;RQ | 菆 | UA11 | 芥 | UA1I | 蒢 |
| UA1J | 蒂 | UA23 | 萑 | UA4D | 蒼 | UA5 | 茌 | UA;X | 葰 | UAAE | 菹 |
| UAAF | 堇 | UAAX | 萋 | UAA\ | 蓮 | UAB | 芩 | UAB. | 芩 | UAC | 花 |
| UAE5 | 莪 | UAEE | 芒 | UAEJ | 荷 | UAF | 荃 | UAF | 茌 | UAFJ | 蒨 |
| UAG. | 苻 | UAI | 茶 | UAI | 荼 | UAI | 莯 | UAIH | 鷂 | UAK | 蒞 |
| UAKF | 萑 | UAKO | 蓓 | UAKW | 蓍 | UAKY | 蕉 | UAMU | 蓊 | UAO | 苔 |
| UAOA | 莪 | UAOI | 葆 | UAOU | 蕭 | UAOX | 菣 | UARO | 蒼 | UARV | 葠 |
| UARX | 葠 | UAT | 茶 | UAV. | 茯 | UB, | 茅 | UB, | 葯 | UB,, | 蓩 |
| UB,H | 鵪 | UB,I | 茉 | UB. | 芍 | UB.\ | 蒟 | UB/ | 芴 | UB0 | 葡 |
| UB2W | 萄 | UB8 | 菊 | UB9Q | 蔬 | UB; | 菂 | UBB/ | 芀 | UBB/ | 蔘 |
| UBBA | 芨 | UBBF | 蘿 | UBD | 苟 | UBE7 | 萄 | UBG | 芋 | UBGC | 芤 |
| UBGT | 蓀 | UBG\ | 菰 | UBJ | 芋 | UBJ8 | 蘋 | UBO | 苟 | UBO1 | 蔓 |
| UBO; | 擥 | UBOB | 蔫 | UBOG | 擎 | UBOI | 桀 | UBOX | 敬 | UBOZ | 慜 |
| UBRC | 苞 | UBXW | 菌 | UBXY | 蒸 | UC | 芎 | UC | 蘼 | UC.; | 蒐 |
| UC.V | 蔟 | UC29 | 蕤 | UC7U | 蘆 | UC7Z | 蕊 | UC8 | 蘗 | UCC | 芘 |
| UCE\ | 蘯 | UCH\ | 蘯 | UCI3 | 蘿 | UCIG | 摩 | UCIQ | 蘑 | UCJE | 蘆 |
| UCRA | 蕨 | UCRE | 蔍 | UCRO | 蓎 | UCRY | 蔦 | UCS1 | 蔣 | UCSY | 蔗 |
| UCUT | 蘸 | UCY | 蘢 | UD23 | 莋 | UD3 | 曾 | UD4X | 蔓 | UD;, | 勸 |
| UD;9 | 薑 | UD;U | 藿 | UD;\ | 邁 | UDBL | 葛 | UDCC | 昆 | UDD | 菖 |
| UDF. | 蒔 | UDJ | 萌 | UDM, | 勱 | UDM9 | 蘲 | UDM; | 萬 | UDMU | 薑 |
| UDM\ | 邁 | UDOL | 蔓 | UDOX | 藪 | UDPX | 蕞 | UDS | 草 | UDUF | 蓽 |
| UDV | 莫 | UDV, | 募 | UDV1 | 幕 | UDVB | 驀 | UDVD | 暮 | UDVF | 墓 |
| UDVG | 摹 | UDVP | 鄚 | UDVZ | 慕 | UE,D | 豬 | UE,E | 薤 | UE,\ | 蘧 |
| UE2P | 葥 | UE2T | 藥 | UE2X | 蕧 | UE5 | 芛 | UE7E | 蔓 | UE8X | 蕌 |
| UE9 | 芐 | UE99 | 蓰 | UE9Y | 蔦 | UE;F | 荎 | UE;N | 葪 | UEA9 | 蓯 |
| UED. | 蕁 | UEDE | 萓 | UEDZ | 蕙 | UEE; | 芸 | UEEJ | 荇 | UEEQ | 莞 |
| UEET | 蒔 | UEF9 | 蓰 | UEG | 芧 | UEI | 茉 | UEJ | 苧 | UEL, | 葝 |
| UELR | 墪 | UEMA | 茼 | UEN/ | 蔦 | UENE | 蕥 | UENJ | 蘅 | UENK | 蘋 |
| UENN | 荊 | UENU | 葬 | UEO1 | 萬 | UEO7 | 蕾 | UEOF | 蓳 | UEOJ | 苛 |
| UEOU | 荳 | UER9 | 蓮 | UERF | 蔁 | UERL | 萋 | UES5 | 莪 | UEU1 | 芊 |
| UEUF | 華 | UEUH | 鞾 | UEUN | 荊 | UEWC | 芚 | UEWX | 薇 | UEWX | 蘐 |
| UEX. | 茉 | UF | 羊 | UF | 芈 | UF | 芏 | UF.A | 美 | UF.X | 羕 |
| UF.X | 菝 | UF/3 | 菩 | UF/F | 羞 | UF/R | 差 | UF/W | 善 | UF48 | 蕡 |
| UF8. | 蓺 | UF8; | 藝 | UF8K | 養 | UF8N | 羚 | UF8N | 羴 | UF8X | 菱 |
| UF8Y | 蓺 | UF;U | 蓋 | UF;X | 羖 | UFA. | 羚 | UFAA | 羷 | UFAK | 養 |
| UFAN | 羭 | UFAO | 蕾 | UFB. | 蒟 | UFB. | 蕎 | UFBB | 翔 | UFBE | 蒟 |
| UFC | 著 | UFCD | 著 | UFCX | 羻 | UFD | 著 | UFD. | 著 | UFDL | 羯 |
| UFE5 | 羬 | UFER | 羥 | UFF | 菫 | UFF. | 葑 | UFFQ | 莪 | UFFR | 蕽 |
| UFFU | 蕫 | UFH5 | 羬 | UFHT | 羱 | UFJ | 菁 | UFJ7 | 羺 | UFKE | 羶 |
| UFKK | 羲 | UFL | 姜 | UFM1 | 羺 | UFMJ | 芊 | UFMQ | 羦 | UFNA | 羢 |
| UFN\ | 羑 | UFOF | 蓋 | UFOX | 羖 | UFO\ | 蓬 | UFQ | 羌 | UFQX | 羖 |
| UFR1 | 羴 | UFRE | 羝 | UFS8 | 羵 | UFU. | 蓺 | UFUO | 善 | UFUP | 鄯 |

| | | | | | | | | | | | |
|---|---|---|---|---|---|---|---|---|---|---|---|
| UFUX | 鞣 | UFU\ | 蓬 | UFV | 美 | UFV5 | 義 | UFV5 | 羲 | UFVB | 羰 |
| UFWY | 羰 | UFXA | 羡 | UFY | 羔 | UFYV | 羹 | UFZ | 恙 | UG0 | 蒱 |
| UG4S | 薞 | UG7S | 蒴 | UGAF | 萑 | UGBC | 葹 | UGK | 莅 | UGS. | 菝 |
| UGT/ | 莎 | UGV | 茯 | UGVO | 菇 | UH | 蔦 | UH/T | 蒝 | UH35 | 蔗 |
| UH3O | 蘼 | UH5 | 茂 | UH9 | 芥 | UH95 | 蔵 | UH9E | 茶 | UH;\ | 蘊 |
| UHB5 | 荿 | UHC | 苊 | UHE. | 蔚 | UHE. | 蓐 | UHE1 | 芹 | UHEO | 萿 |
| UHEX | 葭 | UHEZ | 甦 | UHE\ | 蘧 | UHJ | 蔫 | UHL5 | 藏 | UHL5 | 葳 |
| UHM1 | 蕭 | UHMU | 蕭 | UHO5 | 蒧 | UHOC | 蘿 | UHOI | 蘖 | UHOS | 薛 |
| UHR1 | 蒒 | UHR9 | 蘁 | UHRG | 孽 | UHRS | 薜 | UHRX | 薇 | UHUA | 蕨 |
| UHV9 | 蘸 | UHXX | 葮 | UI3 | 萜 | UI4 | 菓 | UI8; | 菘 | UIAA | 菜 |
| UID | 菓 | UIE | 苯 | UIH1 | 菥 | UII | 菻 | UIM | 策 | UIMM | 蕀 |
| UIMN | 莿 | UIMX | 藪 | UIO | 蓍 | UIO8 | 蘒 | UIOA | 蔌 | UIO\ | 蓫 |
| UIRO | 蘠 | UJ,F | 韃 | UJ,Q | 藐 | UJ.A | 苡 | UJ23 | 菲 | UJBC | 蓏 |
| UJBG | 芧 | UJBO | 蕍 | UJE | 苴 | UJE, | 葅 | UJEX | 蒫 | UJHX | 蔙 |
| UJI | 菜 | UJI7 | 蕃 | UJJN | 蒯 | UJL | 葽 | UJM2 | 蕣 | UJMX | 蘷 |
| UJN | 前 | UJNB | 翦 | UJNN | 剪 | UJNY | 煎 | UJRC | 葩 | UJUX | 藤 |
| UK | 芝 | UK | 芷 | UK,X | 蔎 | UK8. | 蒡 | UK81 | 蒂 | UK8E | 螫 |
| UK8K | 蓑 | UK8O | 菂 | UK8P | 警 | UK8Q | 菪 | UK8X | 茭 | UK8\ | 藹 |
| UK;Q | 芜 | UKAS | 萃 | UKBO | 蒟 | UKD | 菩 | UKDF | 薹 | UKDK | 蕢 |
| UKDZ | 蕙 | UKI1 | 薪 | UKIQ | 藾 | UKJX | 蘟 | UKL | 芒 | UKL | 蘉 |
| UKLA | 荽 | UKLQ | 荒 | UKLZ | 蒄 | UKM1 | 芾 | UKO | 菩 | UKOA | 蘞 |
| UKOC | 蒉 | UKOJ | 葶 | UKOK | 蘁 | UKOO | 蒿 | UKOP | 蒚 | UKQ | 荒 |
| UKS | 莘 | UKT7 | 蓄 | UKTF | 薵 | UKX | 艾 | UKXF | 蘸 | UL1X | 莜 |
| UL7 | 菑 | ULH. | 薅 | ULLL | 蕤 | ULO | 茹 | ULOG | 葦 | ULOT | 蘋 |
| ULSO | 菇 | UM0 | 董 | UM1; | 蔺 | UM7 | 蕾 | UM8 | 菑 | UM8. | 芙 |
| UM8B | 蒻 | UM8O | 蓉 | UMA | 芮 | UMA. | 蓁 | UMAD | 菅 | UMAF | 萑 |
| UMAF | 藿 | UMD8 | 荚 | UME, | 蒙 | UME8 | 黄 | UME9 | 芷 | UME; | 芸 |
| UMEC | 蔪 | UMEE | 萱 | UMEH | 蘡 | UMEJ | 苧 | UMEO | 菏 | UMEQ | 莞 |
| UMEX | 蔻 | UMF | 苒 | UMH1 | 蓆 | UMHR | 菅 | UMJ | 萵 | UMJE | 萱 |
| UML | 荽 | UMN. | 葾 | UMNC | 菀 | UMO | 苘 | UMOO | 藹 | UMO\ | 蕰 |
| UMQ | 苕 | UMSG | 華 | UMUL | 菌 | UMV | 英 | UMVH | 鶧 | UMZJ | 葶 |
| UMZW | 蓇 | UN | 芀 | UN.Z | 葱 | UN2 | 菕 | UN38 | 蕒 | UN4X | 蘐 |
| UNA | 苂 | UNAK | 蕵 | UNBC | 苑 | UNBZ | 蕜 | UNDX | 薑 | UNH1 | 蓎 |
| UNMX | 藚 | UNN | 蓟 | UNN | 茅 | UNN2 | 薢 | UNO | 茗 | UNO | 茖 |
| UNO, | 葂 | UNO. | 莬 | UNUF | 蘚 | UNV | 蘇 | UNW | 茖 | UNX | 萘 |
| UO/O | 莒 | UO18 | 蒈 | UOAB | 莟 | UOAF | 蘸 | UOEI | 萂 | UOO, | 勸 |
| UOO1 | 蘄 | UOO8 | 藺 | UOO; | 藿 | UOOA | 歡 | UOOB | 蕚 | UOOF | 蘿 |
| UOOH | 蘺 | UOOO | 蘺 | UOOP | 鄯 | UOOP | 鄰 | UOOQ | 觀 | UOOS | 蕫 |
| UOP | 葺 | UOP5 | 蔃 | UP | 茸 | UP8 | 萁 | UP8J | 蘬 | UP8L | 萁 |
| UP8T | 蒖 | UPA; | 蔭 | UPAI | 蒢 | UPID | 蔯 | UPJZ | 蕯 | UPK | 萇 |
| UPK5 | 蔵 | UPKE | 薩 | UPO8 | 蘭 | UPQJ | 藺 | UPQL | 茸 | UPRF | 蓳 |
| UPS8 | 蘇 | UPX | 鼓 | UPX, | 藜 | UPXA | 黎 | UQ. | 芃 | UQQQ | 藭 |
| UQX | 芟 | UR.N | 蒻 | UR/ | 芛 | UR/O | 著 | UR/Y | 著 | UR11 | 苣 |
| UR1G | 蘄 | UR1C | 芭 | UR1P | 茆 | UR1U | 藍 | UR1U | 藎 | UR1X | 菽 |
| UR2B | 藍 | UR61 | 蘬 | URA | 芵 | URAA | 莁 | URB | 芎 | URB. | 蒻 |
| URB1 | 蕔 | URB; | 茳 | URBB | 蒻 | URBF | 蘢 | URBP | 蒱 | URC | 苎 |
| URC. | 芃 | URCL | 葼 | URCS | 芃 | URG/ | 芽 | URGF | 蘿 | URJ/ | 芽 |
| URJ5 | 莨 | URJF | 蘿 | URK | 萁 | UROO | 蘆 | URQL | 葽 | URR | 苣 |
| URR. | 葎 | URT | 兼 | URTA | 歉 | URTH | 鶼 | US | 半 | US1F | 荏 |
| US1G | 蓒 | US7F | 鞋 | US7F | 鞋 | USAX | 鞬 | USB8 | 鞠 | USEF | 鞋 |
| USEF | 鞋 | USH8 | 類 | USHX | 叛 | USLI | 葉 | USM | 芇 | USM, | 葕 |
| USM1 | 蒂 | USMG | 蘉 | USMS | 蔺 | USN | 判 | USO | 若 | USO | 苦 |
| USOF | 堇 | USOJ | 葫 | USOP | 鄀 | USOZ | 惹 | USO\ | 蓌 | USRL | 葚 |
| USU8 | 蓄 | USX | 芰 | USX | 茇 | USX. | 芨 | UT, | 芴 | UT.P | 菰 |
| UT8N | 葯 | UTB, | 葯 | UTDU | 蘊 | UTEQ | 芜 | UTJ | 茼 | UTJN | 蔺 |
| UTNC | 蒾 | UTR | 茳 | UTT | 茲 | UTT | 慈 | UTTG | 孳 | UTTH | 蓫 |
| UTTZ | 慈 | UTX. | 萿 | UU | 並 | UU | 井 | UU | 丼 | UUD | 普 |

| | | | | | | | | | | | |
|---|---|---|---|---|---|---|---|---|---|---|---|
| UUE. | 瓶 | UUEI | 業 | UUEP | 鄴 | UUF. | 對 | UUFR | 菨 | UUFX | 叢 |
| UUFY | 菐 | UUFZ | 懟 | UUH | 鵏 | UUH8 | 顜 | UUJN | 葥 | UUNC | 艴 |
| UUP | 邦 | UURT | 蒹 | UUS\ | 鑿 | UUU | 芊 | UUU. | 葑 | UUVC | 蓄 |
| UUWJ | 葫 | UU\ | 迸 | UV | 芙 | UV.U | 莽 | UV/B | 莠 | UV1 | 芊 |
| UV2 | 拳 | UV22 | 鼞 | UV3 | 眷 | UV4 | 藁 | UV8/ | 蕛 | UV9W | 薔 |
| UVA | 芺 | UVAA | 莢 | UVAO | 蕎 | UVAZ | 荼 | UVB/ | 莠 | UVBC | 卷 |
| UVBI | 藜 | UVBX | 藜 | UVC | 芼 | UVD | 著 | UVD | 蓄 | UVDC | 菴 |
| UVDF | 董 | UVDL | 藉 | UVE, | 豢 | UVEB | 荂 | UVF | 華 | UVFX | 蕿 |
| UVG | 拳 | UVG5 | 莪 | UVI; | 藕 | UVID | 藉 | UVJE | 葙 | UVL | 萎 |
| UVL; | 蘈 | UVM1 | 帣 | UVN | 券 | UVN | 莉 | UVN | 眷 | UVRB | 桊 |
| UVRB | 蒭 | UVS | 茉 | UVT | 絭 | UVTJ | 蕱 | UVU. | 莽 | UVUF | 堇 |
| UVV | 葉 | UVY | 荻 | UV\ | 送 | UWA | 萸 | UWBY | 蔦 | UWE8 | 蕒 |
| UWFU | 蘴 | UWJ | 朔 | UWJF | 塑 | UWJI | 槊 | UWJZ | 愬 | UWMN | 鶩 |
| UWW | 茁 | UW\ | 逆 | UX | 艾 | UX. | 苓 | UX.K | 蒗 | UX/X | 葭 |
| UX0 | 蒲 | UX0. | 薄 | UX4S | 藫 | UX4T | 藻 | UX9X | 蔽 | UXA5 | 藪 |
| UXAI | 蒜 | UXAK | 蒞 | UXAN | 蕍 | UXBC | 范 | UXCX | 菠 | UXD/ | 蕩 |
| UXD; | 蕅 | UXDU | 蘊 | UXE1 | 萍 | UXEJ | 菏 | UXFX | 菱 | UXF\ | 蓬 |
| UXH | 鳩 | UXH8 | 蘋 | UXHK | 菰 | UXI | 茱 | UXIX | 蕟 | UXJ7 | 藩 |
| UXJE | 菹 | UXKL | 茫 | UXKO | 薃 | UXKQ | 蓅 | UXMQ | 莐 | UXNO | 菭 |
| UXO | 荅 | UXOI | 藻 | UXQX | 菝 | UXR | 茳 | UXR1 | 瀟 | UXR6 | 瀟 |
| UXRI | 藥 | UXRR | 萡 | UXS1 | 蔕 | UXT/ | 莎 | UXUU | 萍 | UXVO | 菩 |
| UXXO | 落 | UY | 芆 | UYDS | 葦 | UYH8 | 積 | UYY | 菱 | UYYY | 蕠 |
| UZ | 芯 | UZ/ | 苾 | UZKK | 蓑 | UZZZ | 蕊 | U\ | 荃 | U\ET | 蔡 |
| U\EV | 葵 | V | 大 | V | 夫 | V | 禾 | V, | 夯 | V,X\ | 墊 |
| V. | 太 | V. | 犬 | V.RK | 稂 | V.S | 科 | V.V. | 森 | V.V; | 稦 |
| V.\ | 达 | V/B/ | 秫 | V/BB | 秀 | V/B\ | 透 | V/D/ | 穆 | V/D1 | 稗 |
| V/DS | 稗 | V1 | 千 | V11 | 升 | V111 | 乔 | V19C | 乖 | V1N | 刊 |
| V1O | 舌 | V1O5 | 舐 | V1OE | 甜 | V1OF | 舑 | V1OH | 鴰 | V1ON | 刮 |
| V1OY | 舕 | V1OZ | 舔 | V1OZ | 憩 | V1O\ | 适 | V1VC | 麄 | V1VY | 兟 |
| V1W | 舌 | V1WA | 敌 | V1YQ | 規 | V2O2 | 稑 | V2V | 秩 | V3Q | 規 |
| V3QI | 槼 | V3QL | 嫢 | V4 | 熏 | V4, | 勳 | V4,Y | 勳 | V78X | 稷 |
| V7S | 秞 | V7SO | 稲 | V7UK | 穰 | V7V | 稛 | V8DH | 鵜 | V8D\ | 遼 |
| V8N | 秎 | V8OQ | 稅 | V8R/ | 稊 | V9EC | 乘 | V9EN | 剩 | V9H5 | 穖 |
| V; | 私 | V;8X | 稜 | V;;/ | 穇 | V;O | 秴 | V;RQ | 穊 | VA | 夭 |
| VA; | 蚕 | VAA | 夾 | VAA8 | 頰 | VAA; | 趞 | VAAH | 鴂 | VAAP | 郟 |
| VABZ | 稔 | VAD | 香 | VAI | 稌 | VAK. | 奪 | VAK7 | 奮 | VAKF | 稚 |
| VAKY | 穛 | VAMU | 稍 | VAO | 吞 | VAOH | 鷸 | VAOO | 喬 | VAOX | 鄗 |
| VAX | 黍 | VAX; | 黐 | VAXO | 黏 | VAZ | 黍 | VA\ | 迗 | VB/2 | 犁 |
| VB/4 | 黧 | VB/H | 黧 | VB/N | 黧 | VB/X | 黎 | VB9J | 稽 | VBB/ | 秀 |
| VBB/ | 穋 | VBB\ | 透 | VBG | 季 | VC | 毛 | VC | 乇 | VC2Q | 毡 |
| VC4 | 毡 | VC7Z | 氌 | VCC | 秕 | VCE. | 毬 | VCE5 | 毯 | VCKO | 毡 |
| VCND | 氌 | VCR\ | 毽 | VCS8 | 穤 | VCUD | 氈 | VCUV | 氍 | VCVC | 氄 |
| VCY | 穗 | VCYY | 毯 | VD | 春 | VD | 香 | VD2X | 馥 | VD33 | 郡 |
| VD;; | 蠢 | VDC | 奄 | VDCH | 鶺 | VDDU | 疆 | VDES | 程 | VDF | 重 |
| VDF, | 動 | VDFD | 黏 | VDHC | 琵 | VDI | 稞 | VDJH | 鶺 | VDL | 奄 |
| VDLH | 鶬 | VDSG | 醇 | VDUT | 靜 | VDVC | 醃 | VDVD | 蠢 | VDZ | 惷 |
| VDZ/ | 贛 | VE;F | 秷 | VEDZ | 穗 | VEEB | 夸 | VEEC | 匏 | VEEH | 鴦 |
| VEEN | 剄 | VEET | 奈 | VEET | 毵 | VEE\ | 瓠 | VEI | 秣 | VEJX | 敧 |
| VEO5 | 毬 | VEO7 | 稫 | VEOA | 敧 | VEOH | 鵸 | VEOJ | 奇 | VEON | 剞 |
| VEOX | 攲 | VEU1 | 秤 | VF | 奉 | VF38 | 積 | VF8F | 稑 | VF8X | 稜 |
| VFAO | 稿 | VFD | 奢 | VFDS | 韡 | VFF | 奎 | VFFQ | 穘 | VFO | 秸 |
| VG5 | 我 | VG5H | 鵝 | VH | 鳺 | VH9E | 秠 | VHC | 秜 | VHDD | 爽 |
| VHMU | 稨 | VI | 耒 | VI,O | 耡 | VI. | 秫 | VI1R | 耜 | VI;O | 耠 |
| VIBG | 耔 | VID; | 耦 | VIDL | 耬 | VIE; | 耘 | VIEU | 耕 | VIF1 | 耕 |
| VIH. | 耨 | VIH8 | 頛 | VIHR | 耜 | VIHX | 耰 | VIJ, | 耡 | VIK. | 耪 |
| VIRC | 耙 | VIRR | 耟 | VISD | 耤 | VISF | 耩 | VIT/ | 耖 | VIVC | 耗 |

| | | | | | | | | | | | |
|---|---|---|---|---|---|---|---|---|---|---|---|
| VJ4. | 稲 | VJBG | 稃 | VJE | 租 | VJMF | 稱 | VJRZ | 穩 | VJW | 稻 |
| VK8P | 稽 | VKDF | 穜 | VKOG | 稕 | VKOK | 穰 | VKOO | 稿 | VL | 委 |
| VL/2 | 犁 | VL/; | 魏 | VL3Q | 黎 | VLE. | 頲 | VL\ | 透 | VME, | 稼 |
| VMFO | 稠 | VMU | 盉 | VMV | 秧 | VMVC | 秺 | VN | 利 | VN2 | 犁 |
| VND | 穡 | VNI | 梨 | VNN | 移 | VNN | 李 | VNT | 稱 | VO | 和 |
| VO1 | 种 | VO5 | 程 | VP | 季 | VP | 邾 | VP | 奪 | VP8 | 稘 |
| VQ | 秃 | VQH | 鵚 | VQH8 | 頹 | VQO8 | 穨 | VR | 秉 | VR1P | 秭 |
| VRB | 夷 | VRE5 | 秖 | VREE | 秪 | VROO | 奩 | VRR | 秬 | VS | 本 |
| VS3 | 看 | VS3 | 植 | VS38 | 稹 | VS78 | 積 | VSBB | 栩 | VSCD | 稽 |
| VSCW | 稭 | VSD | 稓 | VSE8 | 穙 | VSEF | 拜 | VSP | 邦 | VSU | 奔 |
| VT/ | 秒 | VTJ | 稍 | VTT5 | 穖 | VU,\ | 穟 | VUAX | 穫 | VUF | 垂 |
| VUF | 奎 | VUF. | 甀 | VUFP | 郵 | VV | 秦 | VV | 秆 | VV0 | 蓁 |
| VV0P | 鄰 | VVA | 奏 | VVAO | 穚 | VVC | 秏 | VVC | 秏 | VVD | 昔 |
| VVDF | 穜 | VW | 香 | VW | 秈 | VWZ | 悉 | VX | 泰 | VX6 | 黐 |
| VXS1 | 稀 | VXWX | 稷 | VXXH | 鶖 | VXXX | 爽 | VY | 秋 | VY; | 犂 |
| VYE. | 犂 | VYG | 犂 | VYH | 鶩 | VYL | 婺 | VYZ | 愁 | VZ/ | 秘 |
| V\ET | 稼 | W | 山 | W | 臼 | W | 凵 | W | 中 | W, | 岁 |
| W,1. | 嶽 | W.2C | 崼 | W/3I | 嵲 | W/; | 嵬 | W/BX | 岌 | W/BX | 岈 |
| W/D | 峆 | W/D1 | 崥 | W/D5 | 崲 | W/DS | 嵲 | WO | 峬 | WOH1 | 嶄 |
| W23 | 岩 | W2C | 屹 | W2Q8 | 嶺 | W38N | 崱 | W3Q | 峴 | W433 | 巘 |
| W4FS | 嶧 | W5 | 鼠 | W52E | 鼫 | W53. | 鼰 | W538 | 鼳 | W55\ | 鼸 |
| W57S | 鼩 | W58N | 鼭 | W5BO | 鼩 | W5EO | 鼮 | W5F. | 鼯 | W5FJ | 鼱 |
| W5HQ | 鼲 | W5JV | 鼶 | W5KX | 鼵 | W5M. | 鼷 | W5MO | 鼹 | W5Q | 鼬 |
| W5RL | 鼺 | W5S. | 鼪 | W5UT | 鼲 | W5V. | 鼪 | W5X. | 鼦 | W6J. | 崵 |
| W7, | 舅 | W7S | 岫 | W7SO | 崮 | W7UK | 嵲 | W7Z | 崽 | W84D | 嶒 |
| W88 | 嵫 | W88. | 嶋 | W8N2 | 嶙 | W8O | 峪 | W8QX | 毀 | W; | 崟 |
| W;8X | 峻 | W;;/ | 嵾 | WA | 臾 | WA.S | 舁 | WA11 | 岕 | WAB | 嵩 |
| WAB | 岭 | WAB. | 岭 | WAB8 | 嶺 | WAJN | 崳 | WAKF | 崔 | WAKO | 嵩 |
| WAKP | 嶹 | WAKW | 嵩 | WAKY | 嶕 | WAMU | 崙 | WAO | 峇 | WAO | 嵢 |
| WAOA | 嶮 | WARO | 嵢 | WB/ | 岰 | WBB/ | 嵺 | WBBA | 岩 | WBBA | 峧 |
| WBBD | 嶟 | WBD | 峋 | WBO | 峋 | WC29 | 嵯 | WCE. | 嶼 | WCE5 | 巖 |
| WCRO | 嶇 | WCX | 峻 | WD1 | 岬 | WDBL | 嵑 | WDCC | 崑 | WDE/ | 嵎 |
| WDE9 | 崐 | WDH/ | 嵎 | WDM; | 嵎 | WDOL | 嶁 | WE | 凹 | WE,, | 嚻 |
| WE2O | 峿 | WE7D | 嶆 | WE8 | 與 | WE8 | 興 | WE8 | 輿 | WE8O | 舉 |
| WE81 | 譽 | WE8A | 歟 | WE8F | 舉 | WE8G | 舉 | WE8H | 鸒 | WE8Q | 礜 |
| WE;F | 峌 | WEA9 | 嶬 | WEBY | 舄 | WEDE | 岠 | WEEQ | 岏 | WEJ8 | 嶺 |
| WENN | 峛 | WEO. | 獃 | WEO8 | 嶺 | WEO; | 凱 | WEOJ | 岢 | WEON | 剴 |
| WEOQ | 凱 | WEOQ | 覬 | WEOU | 豈 | WEOX | 敳 | WEQ | 兇 | WEQ | 岏 |
| WER9 | 嵲 | WERF | 崖 | WEU | 岍 | WEUF | 崖 | WEV | 岆 | WF8X | 崚 |
| WFC | 峗 | WFF. | 對 | WFFC | 豔 | WFFP | 豐 | WFFQ | 嶢 | WFFU | 豐 |
| WFFU | 豔 | WFG. | 峙 | WFJ | 崝 | WFNA | 嵗 | WFQX | 毀 | WGAF | 嶉 |
| WH13 | 峘 | WH38 | 嵿 | WH9E | 岻 | WHB5 | 巇 | WHE1 | 岴 | WHES | 岸 |
| WHEY | 嶋 | WHFF | 崖 | WHL5 | 崴 | WHM1 | 崙 | WHM1 | 崹 | WHM8 | 巔 |
| WHMA | 歂 | WHMN | 嵽 | WHM\ | 端 | WHO5 | 崴 | WHR1 | 嶧 | WHR8 | 嶸 |
| WHR; | 嶭 | WHRI | 嶭 | WHRS | 嶭 | WHSO | 崌 | WHUA | 嶡 | WHWW | 崌 |
| WHY | 炭 | WI8; | 崧 | WIAA | 崍 | WID | 崥 | WIKF | 崔 | WJE | 岨 |
| WJI7 | 嵧 | WJJ | 崩 | WJJN | 嶺 | WJRJ | 崢 | WK | 岦 | WK// | 嵃 |
| WK/E | 嶐 | WK81 | 崎 | WKAS | 岸 | WKDS | 嶂 | WKJX | 巃 | WKLA | 峐 |
| WKOG | 崞 | WKOJ | 崞 | WKOO | 嵩 | WKS | 峑 | WKX/ | 嵃 | WKXE | 嶐 |
| WL7 | 嵧 | WM1 | 帛 | WM2O | 嶨 | WM3Q | 覺 | WM5. | 嚳 | WM8 | 峸 |
| WM8N | 嶨 | WM8O | 嵱 | WM8R | 崆 | WMBG | 學 | WMC | 岮 | WMEB | 嶹 |
| WMEO | 峒 | WMET | 崇 | WMF | 岩 | WMH | 鸒 | WMIY | 褰 | WMJE | 巋 |
| WML | 峧 | WMN | 巒 | WMN | 嶨 | WMQ | 嚳 | WMRK | 嵳 | WMS8 | 巑 |
| WMU | 盟 | WMUW | 崗 | WMV | 峡 | WMW | 岩 | WMX | 泉 | WMY | 泉 |
| WMY | 炭 | WN. | 岈 | WN2I | 嵲 | WNHC | 峞 | WNHC | 岩 | WNN2 | 嶺 |
| WNO | 岧 | WNO. | 嶢 | WOAF | 嶉 | WOOB | 嶍 | WOOX | 巖 | WOP5 | 巇 |

| | | | | | | | | | | | |
|---|---|---|---|---|---|---|---|---|---|---|---|
| WP8L | 嵁 | WPQL | 嵁 | WQ | 兒 | WQ | 岩 | WQ; | 嵐 | WQH | 鵮 |
| WQP | 郳 | WR.7 | 嶱 | WR/O | 崌 | WRB1 | 嵛 | WRB; | 嶖 | WRC | 峐 |
| WRED | 嵴 | WRG | 岈 | WRJ/ | 岈 | WRJ5 | 嶎 | WRK | 崀 | WROO | 㟪 |
| WRQD | 嵱 | WRQX | 毁 | WRR | 岠 | WS38 | 巅 | WSEA | 嵌 | WSJ | 岩 |
| WSM1 | 嶿 | WSO | 岵 | WSX | 岐 | WSY | 炭 | WT, | 嶅 | WTA5 | 巀 |
| WTJ | 嶠 | WTT | 峀 | WU | 𡶰 | WU | 昇 | WUDL | 嶋 | WUF5 | 巇 |
| WUFR | 嵯 | WUHL | 嶁 | WUOF | 巄 | WUTT | 嶝 | WUUI | 嶫 | WV.S | 峷 |
| WV0 | 崋 | WV8T | 嶺 | WV9C | 嵊 | WVA | 岆 | WVAA | 峡 | WVAO | 嶠 |
| WVDC | 崦 | WVDL | 崦 | WVEJ | 崎 | WVF | 崟 | WVG5 | 峨 | WVL | 崣 |
| WVL; | 巍 | WVRB | 嵘 | WW | 出 | WW | 岫 | WW8F | 嶉 | WWE8 | 嶼 |
| WWET | 崇 | WWW | 㠯 | WWWW | 巗 | WXF | 峰 | WXO | 客 | WXO | 峈 |
| WXSJ | 嶠 | WXWX | 峻 | WYY, | 嶗 | WYYI | 嵘 | WYYO | 嶦 | W\ | 辿 |
| W\ | 崖 | W\EU | 嶝 | W\NA | 嶔 | X | 水 | X | 又 | X | 乂 |
| X, | 汸 | X,FD | 潴 | X,O | 泇 | X,VJ | 漪 | X. | 叉 | X. | 冬 |
| X. | 汸 | X. | 涓 | X..; | 蛋 | X./Y | 溈 | X.11 | 洲 | X.29 | 滗 |
| X.2C | 漩 | X.2G | 游 | X.;; | 螽 | X.A. | 淤 | X.N8 | 渲 | X.QU | 滥 |
| X.RK | 浪 | X.X | 泳 | X/3 | 洎 | X/3. | 湨 | X/3U | 濞 | X/9\ | 涎 |
| X/; | 滺 | X/;P | 澣 | X/B/ | 渀 | X/BX | 没 | X/BX | 没 | X/C | 氿 |
| X/C. | 泬 | X/CI | 染 | X/D | 泊 | X/D5 | 湟 | X/DE | 滜 | X/DI | 澲 |
| X/DO | 滈 | X/DS | 滜 | X/DX | 激 | X/K | 泛 | X/MU | 溢 | X/MV | 湨 |
| X/RA | 滏 | X/RF | 潼 | X0 | 湍 | X0G. | 溥 | X0H1 | 澌 | X0H; | 灩 |
| X0\ | 湕 | X111 | 洲 | X12S | 滸 | X1J. | 瀛 | X1RX | 溲 | X1TE | 漪 |
| X1TI | 澡 | X1WX | 溲 | X27. | 海 | X27T | 潆 | X2C | 汔 | X2D/ | 濤 |
| X2E | 洼 | X2I | 洙 | X2MN | 澍 | X2O | 浩 | X2O2 | 湋 | X2Q | 洗 |
| X2Q8 | 灉 | X2Q\ | 滏 | X2S | 汻 | X2SY | 漁 | X2V | 洑 | X2VD | 溜 |
| X2\ | 淽 | X33F | 濯 | X36 | 漏 | X38 | 溟 | X385 | 澱 | X38L | 漯 |
| X38N | 潩 | X3AF | 灘 | X3Q | 湜 | X3T/ | 泄 | X3V. | 湜 | X! | 洒 |
| X4 | 酒 | X4 | 潶 | X4, | 深 | X4AA | 深 | X4B; | 濹 | X4DS | 潭 |
| X4EK | 澴 | X4ET | 漂 | X4F | 湮 | X4FS | 潭 | X4HN | 瀰 | X4I | 溧 |
| X5 | 汪 | X55/ | 瀝 | X6 | 淵 | X6 | 浒 | X6/X | 瀶 | X65 | 潤 |
| X6D | 澗 | X6I | 澗 | X6I4 | 潤 | X6KX | 澖 | X6OS | 瀾 | X6VO | 闊 |
| X7 | 洄 | X722 | 澴 | X77F | 漽 | X7A | 泗 | X7E, | 瀰 | X7E5 | 滀 |
| X7EK | 溨 | X7I | 涸 | X7J | 澠 | X7O | 洄 | X7S | 油 | X7S8 | 淏 |
| X7SB | 湯 | X7SO | 濇 | X7T | 澪 | X7U | 油 | X7U | 湨 | X7UK | 濃 |
| X7US | 澍 | X7UU | 澧 | X7UU | 澧 | X7UU | 灃 | X7V | 洇 | X8 | 酒 |
| X8 | 汃 | X84D | 潽 | X878 | 漢 | X8;B | 溪 | X8N | 汾 | X8N2 | 潫 |
| X8NU | 溢 | X8O | 浴 | X8OQ | 涗 | X8R/ | 涕 | X8X | 澈 | X8XU | 滏 |
| X9 | 沚 | X9 | 浞 | X938 | 湞 | X97Y | 滷 | X9C | 泚 | X9D | 咎 |
| X9DS | 淖 | X9EX | 淑 | X9H5 | 溅 | X9M3 | 濬 | X9N8 | 溹 | X9NE | 瀊 |
| X9O | 沾 | X9O | 咎 | X9OZ | 涹 | X9T | 涉 | X9T8 | 瀕 | X9XO | 瀚 |
| X;2 | 滓 | X;2V | 涘 | X;8X | 浚 | X;;/ | 滲 | X;KE | 灕 | X;O | 治 |
| X;Q | 沇 | X;R | 洳 | X;RQ | 溉 | XA/ | 沴 | XA1I | 濂 | XA1J | 濬 |
| XA1X | 潋 | XA4D | 滄 | XAA5 | 瀸 | XAAU | 瀹 | XAB. | 泠 | XABZ | 淰 |
| XAC | 沘 | XAD | 咎 | XAG. | 洏 | XAI | 涂 | XAIF | 塗 | XAIX | 澰 |
| XAJN | 渝 | XAKF | 淮 | XAKI | 準 | XAKS | 準 | XAKY | 淮 | XAMU | 淪 |
| XAO | 洽 | XAO | 咎 | XAOA | 澰 | XAOB | 澮 | XAOU | 渰 | XAOU | 淪 |
| XAOX | 激 | XAR/ | 浄 | XARO | 滄 | XASO | 淦 | XAUV | 濮 | XAV. | 洑 |
| XB | 馮 | XB,O | 潏 | XB. | 汋 | XB., | 湧 | XB.F | 涌 | XB/ | 沕 |
| XB/Z | 溷 | XB1 | 淘 | XB1C | 池 | XB2W | 洶 | XB8 | 淘 | XB9J | 滑 |
| XBB/ | 滲 | XBB8 | 濯 | XBBA | 汲 | XBBF | 濯 | XBBS | 澤 | XBC | 氾 |
| XBD | 洵 | XBEO | 河 | XBJ | 汿 | XBJ8 | 瀕 | XBO | 洵 | XBRC | 泡 |
| XBXW | 涵 | XBXW | 洶 | XC | 汽 | XC | 漉 | XC/. | 汛 | XC1. | 汛 |
| XC4F | 瀍 | XC7U | 濾 | XC7Z | 濾 | XC8 | 溗 | XCC | 沘 | XCCD | 浩 |
| XCE, | 滹 | XCI | 柒 | XCI3 | 灦 | XCJG | 滹 | XCN | 沏 | XCOV | 瀛 |
| XCQ | 滤 | XCQ/ | 滤 | XCRF | 潚 | XCRO | 溏 | XCRX | 漮 | XCS | 汛 |
| XCS8 | 瀟 | XCSX | 渡 | XCUT | 濂 | XCX | 波 | XCXL | 婆 | XCXQ | 鋈 |
| XCY | 濾 | XD | 汨 | XD | 沓 | XD2E | 涅 | XD4X | 漫 | XD5 | 洩 |

| | | | | | | | | | | | |
|---|---|---|---|---|---|---|---|---|---|---|---|
| XDBL | 渴 | XDCC | 混 | XDD | 淐 | XDE | 泹 | XDE. | 浔 | XDE/ | 湯 |
| XDE9 | 湜 | XDE; | 鎏 | XDES | 浙 | XDEU | 盪 | XDEV | 淏 | XDEY | 湨 |
| XDF | 浬 | XDF | 涅 | XDF. | 澥 | XDH/ | 湯 | XDH5 | 墬 | XDHU | 盪 |
| XDHY | 湨 | XDI | 淉 | XDK8 | 灝 | XDKT | 瀑 | XDM; | 湡 | XDMU | 溫 |
| XDOL | 漊 | XDR | 涅 | XDSX | 瀑 | XDT8 | 灅 | XDTQ | 涀 | XDTY | 濕 |
| XDUF | 澤 | XE,. | 涿 | XE,D | 潴 | XE1B | 沔 | XE2O | 浯 | XE2X | 澓 |
| XE55 | 淺 | XE7D | 漕 | XE8X | 濔 | XE99 | 漩 | XE9Y | 溤 | XE;D | 涾 |
| XE;F | 涇 | XEA9 | 漎 | XED. | 溥 | XEDE | 洹 | XEDX | 浭 | XEDZ | 淲 |
| XEE5 | 淺 | XEE; | 沄 | XEEB | 污 | XEEJ | 洐 | XEEQ | 沅 | XEET | 沶 |
| XEG | 汙 | XEGU | 猛 | XEI | 沬 | XEI | 沫 | XEJ | 汀 | XEJN | 湖 |
| XELR | 涇 | XEMC | 灑 | XEN | 洹 | XENN | 洌 | XEO1 | 渴 | XEO5 | 淢 |
| XEO7 | 湢 | XEO; | 灩 | XEOJ | 河 | XEOJ | 渮 | XEOU | 浢 | XERL | 淒 |
| XES | 汗 | XETF | 溼 | XEU | 汧 | XEU | 洴 | XEU1 | 泙 | XEWC | 沌 |
| XF | 圣 | XF | 夆 | XF.X | 滶 | XF1 | 洴 | XF38 | 漬 | XF48 | 瀆 |
| XF75 | 瀨 | XF8F | 浡 | XF8X | 淩 | XF; | 法 | XF;U | 瀘 | XFAO | 湻 |
| XFB. | 濤 | XFBG | 涍 | XFD | 渚 | XFEB | 洘 | XFEX | 瀫 | XFEX | 瀫 |
| XFF | 洼 | XFFQ | 澆 | XFFU | 灃 | XFFU | 澧 | XFFU | 灃 | XFJ | 清 |
| XFNT | 潔 | XFO | 洁 | XFO. | 澍 | XFO/ | 澎 | XFO5 | 瀸 | XFOK | 溒 |
| XFQ | 渚 | XFT | 浡 | XFT | 溸 | XFUS | 涬 | XFVX | 濲 | XF\ | 澾 |
| XGAO | 溚 | XGEF | 漭 | XGH1 | 浙 | XH/T | 源 | XH13 | 湄 | XH1; | 濿 |
| XH7P | 湎 | XH;\ | 泒 | XHBG | 潺 | XHC | 泥 | XHDF | 湹 | XHE. | 溽 |
| XHE1 | 沂 | XHE9 | 泝 | XHEF | 渥 | XHEF | 浧 | XHEJ | 潛 | XHEO | 浯 |
| XHFD | 漽 | XHFF | 涯 | XHI | 淚 | XHJX | 漫 | XHM | 漏 | XHM1 | 洏 |
| XHMN | 淵 | XHMV | 漢 | XHO5 | 減 | XHOC | 漉 | XHOS | 澼 | XHOZ | 減 |
| XHR1 | 澌 | XHRK | 派 | XHSO | 滬 | XHSX | 澱 | XHU; | 濡 | XHV. | 淚 |
| XHV9 | 瀝 | XHVC | 泥 | XHWW | 澀 | XHX | 汳 | XHY5 | 滅 | XI | 沐 |
| XI. | 沭 | XI.5 | 秫 | XI.A | 稠 | XI.X | 殺 | XI2/ | 灤 | XI3 | 湘 |
| XI4 | 涑 | XI6A | 稠 | XI8; | 淞 | XIAA | 淶 | XIAX | 漆 | XID | 涑 |
| XIDE | 渣 | XIE | 沐 | XIE5 | 秫 | XIET | 漆 | XIFF | 湘 | XIH1 | 淅 |
| XII | 淋 | XII. | 淋 | XII9 | 湜 | XIIF | 漤 | XIIJ | 濳 | XIIT | 漛 |
| XIN | 剎 | XIO | 涑 | XIO8 | 瀨 | XIOA | 漱 | XIQX | 殺 | XJ3Q | 潰 |
| XJ4. | 潣 | XJ5 | 淫 | XJBG | 浮 | XJE | 沮 | XJEX | 湲 | XJI7 | 潘 |
| XJJ | 漝 | XJL | 湲 | XJRC | 灑 | XJRJ | 淨 | XJRZ | 湓 | XJTH | 灘 |
| XJTV | 溪 | XJW | 滔 | XK | 泣 | XK/E | 澾 | XK4K | 瀼 | XK7E | 澶 |
| XK8. | 滂 | XK81 | 渧 | XK8K | 滾 | XK8O | 滴 | XK8P | 濟 | XK8X | 洨 |
| XK9 | 汴 | XK;J | 湑 | XK;Q | 流 | XK;X | 澈 | XK;\ | 鎏 | XKAS | 淬 |
| XKA\ | 液 | XKD | 湆 | XKD8 | 灝 | XKDF | 潼 | XKDK | 滾 | XKDS | 漳 |
| XKDZ | 澺 | XKF | 注 | XKIQ | 瀏 | XKJ | 湇 | XKJX | 瀧 | XKL | 汒 |
| XKM1 | 沛 | XKO | 涪 | XKO, | 濠 | XKOG | 淳 | XKOJ | 渟 | XKOK | 瀼 |
| XKOO | 滈 | XKOP | 漷 | XKOQ | 澆 | XKOT | 涼 | XKOX | 澈 | XKQ | 沆 |
| XKT | 泫 | XKT7 | 澮 | XKTF | 漼 | XKX | 汶 | XKX; | 漓 | XKXE | 漨 |
| XKXF | 灕 | XL | 汝 | XL7 | 淄 | XLDI | 漢 | XLO | 洳 | XLOF | 瀡 |
| XM0 | 渾 | XM2 | 浫 | XM8 | 泬 | XM8. | 涳 | XM8F | 窪 | XM8I | 深 |
| XM8O | 溶 | XM8O | 涸 | XM8O | 滘 | XM8R | 溶 | XM8\ | 湴 | XM9X | 溆 |
| XMA | 汭 | XMA. | 溽 | XMAF | 濯 | XMC | 沱 | XMD8 | 溟 | XME8 | 演 |
| XME8 | 濱 | XME9 | 淀 | XME; | 澐 | XMEE | 渲 | XMEJ | 泞 | XMEO | 洞 |
| XMEQ | 浣 | XMER | 澠 | XMET | 淙 | XMEX | 涴 | XMFO | 淍 | XMFZ | 濾 |
| XMH1 | 濡 | XMHR | 涫 | XMI | 渋 | XMI3 | 灞 | XMJ | 滑 | XMJ7 | 瀋 |
| XMK/ | 滲 | XMKS | 滓 | XML | 洝 | XMNC | 浼 | XMO | 渦 | XMO | 洞 |
| XMO\ | 濄 | XMQ | 沈 | XMQ | 沉 | XMS8 | 澳 | XMS; | 汯 | XMSJ | 瀟 |
| XMV | 泱 | XMV. | 泆 | XMWY | 瀉 | XMZJ | 澤 | XMZW | 滵 | XN | 漁 |
| XN | 刈 | XN | 汐 | XN.8 | 梁 | XN.9 | 濯 | XN.I | 梁 | XN.Z | 沏 |
| XN2I | 滐 | XN4, | 潒 | XN88 | 粱 | XN8I | 粱 | XNAU | 盜 | XNH1 | 澹 |
| XNHC | 溈 | XNMV | 渙 | XNN2 | 澥 | XNO | 沼 | XNO# | 洛 | XNO. | 潙 |
| XNOQ | 浼 | XNW | 淊 | XNX | 没 | XNX | 涤 | XO | 各 | XO | 杳 |
| XO1 | 沖 | XO18 | 漬 | XO1\ | 澅 | XO38 | 涓 | XO5 | 浧 | XO5F | 逞 |
| XOAF | 雒 | XOH | 鴿 | XOJ | 涓 | XOLV | 淏 | XOOI | 澡 | XOOS | 渾 |

| | | | | | | | | | | | |
|---|---|---|---|---|---|---|---|---|---|---|---|
| XOOZ | 漶 | XOP | 湒 | XOP5 | 濈 | XOQ | 況 | XORC | 浥 | XP | 洱 |
| XP, | 泐 | XP8 | 淇 | XP81 | 澌 | XP8L | 湛 | XP8T | 濮 | XPAI | 澼 |
| XPO8 | 瀆 | XPPP | 灄 | XPQL | 湛 | XPS\ | 瀡 | XQ | 沰 | XQ. | 汎 |
| XQ; | 溷 | XQEN | 溵 | XQO | 沿 | XQX | 沒 | XQY | 洮 | XR | 江 |
| XR.7 | 溜 | XR.N | 瀏 | XR/O | 涒 | XR11 | 洍 | XR16 | 潚 | XR1P | 泖 |
| XR1Q | 瀸 | XR1U | 濫 | XR1U | 澾 | XR5 | 減 | XR5 | 洭 | XR61 | 潚 |
| XRA | 決 | XRAF | 滙 | XRB. | 溺 | XRB1 | 沸 | XRB; | 泓 | XRB; | 漒 |
| XRBB | 溺 | XRBK | 漲 | XRBP | 渳 | XRBX | 㵋 | XRC | 汜 | XRC8 | 潠 |
| XRE5 | 泜 | XRED | 湣 | XREE | 泜 | XRF | 津 | XRFE | 瀍 | XRFF | 逮 |
| XRF\ | 湕 | XRH | 鴻 | XRH8 | 澒 | XRJ5 | 泯 | XRJD | 湣 | XRMX | 浸 |
| XROO | 漚 | XRPX | 澈 | XRQ1 | 灊 | XRQD | 潛 | XRR | 洰 | XRR. | 潯 |
| XRRI | 渠 | XRRU | 盥 | XS | 汁 | XS1G | 洊 | XS3 | 渲 | XS38 | 潽 |
| XS78 | 潢 | XS8 | 洪 | XS8C | 港 | XS8\ | 溇 | XS; | 泫 | XSC. | 沈 |
| XSDB | 瀚 | XSDC | 澣 | XSDJ | 潮 | XSDS | 澣 | XSDS | 瀚 | XSE | 治 |
| XSE8 | 潢 | XSJ | 肴 | XSJ | 淆 | XSJP | 郩 | XSJX | 殽 | XSL | 泄 |
| XSLI | 渫 | XSM | 沛 | XSM, | 渤 | XSM. | 馡 | XSM1 | 希 | XSM1 | 浠 |
| XSMA | 滿 | XSMA | 獻 | XSMF | 溝 | XSMG | 浡 | XSMH | 鵓 | XSMF | 郗 |
| XSMS | 湳 | XSMZ | 澔 | XSMZ | 澔 | XSO | 沽 | XSOF | 灘 | XSOJ | 湖 |
| XSOK | 濛 | XSOV | 漠 | XSRL | 淒 | XSU8 | 瀆 | XSX | 汥 | XSX. | 波 |
| XSY | 汝 | XT, | 泑 | XT/ | 沙 | XT/3 | 消 | XT/G | 鯊 | XT/K | 裟 |
| XT/L | 娑 | XT/N | 鯊 | XT/Q | 沯 | XT/\ | 逊 | XTAF | 漧 | XTEQ | 洸 |
| XTJ | 消 | XTJQ | 潲 | XTM7 | 澢 | XTMF | 漟 | XTMO | 淌 | XU. | 滂 |
| XU45 | 濃 | XU64 | 灡 | XU7 | 湽 | XU8U | 溢 | XU9 | 溰 | XUAX | 濩 |
| XUBZ | 濾 | XUCY | 灑 | XUD; | 澫 | XUDV | 漠 | XUEF | 澕 | XUEJ | 渮 |
| XUF | 洋 | XUFK | 瀼 | XUFR | 溠 | XUFU | 瀁 | XUFV | 渼 | XUFX | 漾 |
| XUFY | 溔 | XUJN | 湔 | XUM, | 濛 | XUMV | 漢 | XUOF | 灌 | XUR1 | 瀟 |
| XUR6 | 瀟 | XURT | 濂 | XURU | 灆 | XUS | 泮 | XUSO | 渃 | XUTT | 溢 |
| XUTZ | 濨 | XUU | 洴 | XUU | 溢 | XUU. | 澍 | XUUD | 潽 | XUUI | 濮 |
| XUV | 浂 | XUV. | 潸 | XUVT | 濤 | XUVU | 潸 | XUWJ | 溯 | XV | 汏 |
| XV. | 汰 | XV. | 汱 | XV1O | 活 | XV8T | 潦 | XV9C | 溙 | XVA | 沃 |
| XVAA | 浹 | XVAX | 漆 | XVAZ | 添 | XVA\ | 鍌 | XVD | 溚 | XVDC | 淹 |
| XVDF | 湩 | XVDL | 淹 | XVEB | 洿 | XVEV | 湊 | XVG5 | 泧 | XVN | 浰 |
| XVQ8 | 瀨 | XVRB | 洟 | XVS | 沐 | XVSF | 湃 | XVSU | 滘 | XVTJ | 漪 |
| XVV | 溱 | XVVA | 湊 | XVX | 溱 | XVXX | 浹 | XVY | 湫 | XW | 凶 |
| XW | 汕 | XW; | 溠 | XWAB | 涔 | XWAF | 漼 | XWBY | 瀉 | XWEU | 溰 |
| XWEX | 溦 | XWEX | 澂 | XWFU | 灩 | XWFU | 澧 | XWFU | 灃 | XWH1 | 湍 |
| XWHY | 湀 | XWJJ | 灀 | XWMQ | 滖 | XWQ | 兒 | XWQ | 淣 | XWSY | 湀 |
| XWW | 浀 | XX | 爻 | XX | 雙 | XX | 林 | XX. | 汲 | XX.; | 滛 |
| XX2 | 洚 | XXD | 渣 | XXO | 洛 | XXS1 | 浠 | XXSA | 潹 | XXSJ | 滫 |
| XXX | 淼 | XXX8 | 類 | XXXA | 敪 | XXXA | 歠 | XXXC | 甕 | XXXE | 疊 |
| XXXH | 躐 | XXXI | 桑 | XXXN | 劉 | XXXX | 敪 | XYWC | 罾 | XYY | 淡 |
| XYY, | 滂 | XYY. | 瀅 | XYYO | 瀠 | XYYT | 濼 | XYYX | 潈 | XZ | 沁 |
| XZ/ | 泌 | XZO1 | 沖 | XZVO | 湉 | X\ | 淦 | X\ET | 潻 | X\EU | 澄 |
| X\EV | 渓 | X\RX | 潑 | Y | 火 | Y,,8 | 燮 | Y,,J | 熔 | Y.RK | 焜 |
| Y.S | 料 | Y/3Z | 熄 | Y/7Z | 熜 | Y/9\ | 烶 | Y/D5 | 煌 | Y/DI | 燦 |
| Y/MU | 炩 | Y/MV | 燠 | YO | 焆 | Y23 | 炸 | Y27. | 烸 | Y2O2 | 煒 |
| Y2Q | 烘 | Y4B; | 燭 | Y4DS | 燂 | Y4ET | 熛 | Y4F | 煙 | Y4F | 熛 |
| Y4FS | 燡 | Y5\ | 烶 | Y6I4 | 燗 | Y6KX | 燜 | Y6NW | 燗 | Y6Z | 燜 |
| Y7EK | 煨 | Y7J | 熠 | Y7S8 | 煤 | Y7V | 煙 | Y88 | 熘 | Y88. | 熸 |
| Y8; | 焓 | Y8N2 | 燐 | Y8O | 焰 | Y8R/ | 焍 | Y9DS | 焯 | Y9N8 | 燥 |
| Y;8X | 焌 | Y;;; | 爐 | YA4D | 燴 | YAB. | 焓 | YABO | 焓 | YAF | 烇 |
| YAJ | 斎 | YAKY | 焦 | YAO | 焰 | YAOU | 焓 | YARO | 熗 | YB,I | 煣 |
| YB,O | 燆 | YB. | 灼 | YB.\ | 熵 | YB1C | 炧 | YBBD | 熠 | YBBF | 燿 |
| YBBK | 熤 | YBF | 炟 | YBRC | 炮 | YC | 熫 | YC7U | 爐 | YC8 | 熝 |
| YCRO | 煻 | YCS8 | 燶 | YCY | 爐 | YD2E | 煋 | YD4X | 熳 | YDAS | 焗 |
| YDCC | 焜 | YDE | 炟 | YDE/ | 煬 | YDES | 焊 | YDH/ | 煬 | YDJ | 焆 |
| YDK | 煋 | YDMU | 熘 | YDOL | 熳 | YDSX | 爆 | YDTQ | 熀 | YDUF | 爆 |

| | | | | | | | | | | | |
|---|---|---|---|---|---|---|---|---|---|---|---|
| YDV1 | 焊 | YE, | 烼 | YE2O | 焐 | YE9 | 炡 | YEDE | 烜 | YEEJ | 烆 |
| YELR | 烴 | YEMA | 炳 | YER5 | 烒 | YEWC | 炖 | YF | 灶 | YF;U | 熆 |
| YFB. | 燽 | YFEB | 烤 | YFF | 烓 | YFFQ | 燒 | YH | 爐 | YH13 | 煝 |
| YH38 | 熉 | YHBB | 煸 | YHBO | 焗 | YHE1 | 炘 | YHEA | 焎 | YHEX | [illegible] |
| YHMU | 煀 | YHO5 | 烕 | YHOC | 熩 | YI | 炢 | YI2/ | 燵 | YI4 | [illegible] |
| YI9 | 烐 | YJ4. | 燏 | YJBG | 烰 | YJEX | 煖 | YJI7 | 熎 | YJMX | 熛 |
| YJVY | 燃 | YK8O | 熵 | YKAS | 焠 | YKA\ | 焲 | YKD5 | 熾 | YKDZ | 燱 |
| YKF | 炷 | YKLA | 烗 | YKO | 焙 | YKOG | 焞 | YKOK | 爙 | YKOO | 熇 |
| YKOX | 燉 | YKQ | 炕 | YKT | 炫 | YKX | 炆 | YMO | 煇 | YM8O | 熔 |
| YM8R | 焢 | YMD8 | 熐 | YMEO | 烔 | YMEQ | 烷 | YMH1 | 燸 | YMK/ | 烿 |
| YMNC | 焥 | YMO | 焵 | YMOA | 熿 | YMV | 焕 | YMVC | 烢 | YN | 灱 |
| YNA | 炊 | YNMV | 煥 | YNO | 炤 | YNW | 焰 | YO38 | 熉 | YOJ | 焆 |
| YOOI | 燥 | YOOO | 煰 | YOOS | 燀 | YOQ | 炾 | YP8L | 煁 | YQ | 兆 |
| YQY | 烑 | YR | 灯 | YR16 | 燫 | YR1F | 熞 | YR1Q | 爈 | YR1U | 燼 |
| YR1U | 爁 | YR61 | 燫 | YRA | 炔 | YRF\ | 煡 | YROO | 熰 | YRQD | 熠 |
| YRR | 炬 | YRR. | 燖 | YS | 燁 | YS78 | 熿 | YS8 | 烘 | YS8 | 粪 |
| YSD | 焟 | YSE8 | 燌 | YSEI | 煤 | YSJ | 焨 | YSLI | 煠 | YSOV | 熿 |
| YT/ | 炒 | YTM4 | 爣 | YU,\ | 燧 | YUD; | 燐 | YUEF | 燁 | YUF | 烊 |
| YUF5 | 燨 | YUF5 | 爔 | YUMV | 煐 | YUOF | 燿 | YV4 | 熛 | YV8T | 燎 |
| YVAO | 燆 | YVDF | 煄 | YVFF | 焳 | YVNN | [illegible] | YVY | 燩 | YWFX | 燬 |
| YWH1 | 煓 | YX. | 炵 | YXF | 烽 | YXO | 烙 | YXS1 | 烯 | YY | 炎 |
| YY3Q | 覢 | YY9O | 粘 | YY9X | 敥 | YYH8 | 頰 | YYH8 | 顈 | YYM, | 劳 |
| YYM. | 瑩 | YYM. | 荧 | YYM. | 熒 | YYM1 | 營 | YYM2 | 犖 | YYM8 | 醟 |
| YYM; | 螢 | YYMF | 塋 | YYMH | 鶯 | YYMI | 榮 | YYMJ | 膋 | YYMK | 褮 |
| YYML | 縈 | YYMO | 營 | YYMQ | 覮 | YYMS | 荥 | YYMT | 縈 | YYMT | 禜 |
| YYMW | 罃 | YYMX | 榮 | YYMY | 荧 | YYM\ | 鎣 | YYN | 剡 | YYNA | 欻 |
| YYP | 焲 | YYY | 焱 | YYYI | 燊 | YYYI | 燦 | YYYY | 燚 | Y\EU | 燈 |
| Z | 心 | Z,,J | 惰 | Z.RK | 恨 | Z/ | 必 | Z/3Q | 覕 | Z/; | 憢 |
| Z/BX | 伋 | Z/D | 怕 | Z/D5 | 惶 | Z/DX | 憿 | Z/IM | 傢 | Z/MO | 惝 |
| Z/MU | 恤 | Z/MV | 慎 | Z/P | 邲 | Z0H1 | 慚 | Z23 | 怍 | Z27. | 悔 |
| Z2C | 忔 | Z2DX | 愎 | Z2E | 性 | Z2O | 悎 | Z2O\ | 慥 | Z2S | 忤 |
| Z2SY | 憮 | Z2V | 怢 | Z33 | 悱 | Z33F | 懼 | Z33X | 懼 | Z38N | 惻 |
| Z4 | 恓 | Z4 | 恓 | Z4. | 愣 | Z48 | 慄 | Z4DS | 憛 | Z4EK | 惈 |
| Z4ET | 慓 | Z4FS | 懌 | Z4I | 慄 | Z6J | 憪 | Z6KX | 憫 | Z7E5 | 慖 |
| Z7EK | 愄 | Z7I | 悃 | Z7M4 | 儻 | Z7O | 恛 | Z7S | 怞 | Z7S8 | 慣 |
| Z84D | 憎 | Z8; | 忪 | Z8N2 | 憐 | Z8OQ | 悅 | Z8R/ | 悌 | Z9DS | 悼 |
| Z9E8 | 懞 | Z9O | 怗 | Z;8X | 悛 | Z;;/ | 慘 | Z;O | 怡 | Z;RQ | 慨 |
| ZAA5 | 懺 | ZAB | 怜 | ZAB. | 怜 | ZAF | 恮 | ZAI | 惏 | ZAI | 悇 |
| ZAJN | 愉 | ZAKF | 惟 | ZAKX | 僂 | ZAKY | 憔 | ZAMU | 惀 | ZAO | 恰 |
| ZAOA | 憸 | ZARO | 愴 | ZB,O | 憍 | ZB.F | 悀 | ZB/Z | 惚 | ZBB/ | 憀 |
| ZBBA | 彶 | ZBBD | 慴 | ZBD | 恂 | ZBDG | 惇 | ZBF | 忸 | ZBO | 怐 |
| ZBRC | 怉 | ZBXW | 恟 | ZC8 | 慷 | ZC9O | 惦 | ZCD | 恉 | ZCE, | 慷 |
| ZCRF | 憊 | ZCRX | 慷 | ZCS8 | 儹 | ZD2E | 惺 | ZD4X | 慢 | ZDB/ | 愓 |
| ZDBL | 愒 | ZDCC | 惃 | ZDE | 怛 | ZDE/ | 惕 | ZDE9 | 惿 | ZDES | 悍 |
| ZDF | 悝 | ZDH/ | 傷 | ZDI | 倮 | ZDKT | 憬 | ZDMU | 慍 | ZDOL | 僂 |
| ZDSX | 懪 | ZE2O | 悟 | ZE7D | 慒 | ZE9 | 怔 | ZED. | 慱 | ZEDE | 恒 |
| ZEDZ | 惪 | ZEEQ | 忨 | ZEJE | 恆 | ZEMA | 倆 | ZEN. | 恆 | ZEO7 | 愊 |
| ZERL | 悽 | ZEU1 | 怦 | ZEU5 | 惐 | ZEWC | 忳 | ZF; | 怯 | ZFB. | 懤 |
| ZFC | 恅 | ZFFQ | 憢 | ZFG. | 恃 | ZFJ | 情 | ZFO | 怙 | ZFO/ | 憉 |
| ZFT | 僐 | ZFUS | 悻 | ZG. | 忖 | ZH7P | 㥔 | ZH9 | 怀 | ZH9E | 怌 |
| ZHC | 怩 | ZHD. | 懨 | ZHE1 | 忻 | ZHE8 | 憒 | ZHJX | 優 | ZHMU | 惼 |
| ZHO5 | 憾 | ZHOZ | 憾 | ZHV. | 悷 | ZI. | 怵 | ZII | 惏 | ZIO | 悚 |
| ZIO8 | 懾 | ZJ2W | 愮 | ZJE | 怚 | ZJEX | 愋 | ZJTV | 傒 | ZJW | 慆 |
| ZK4K | 懷 | ZK7V | 懍 | ZK8P | 愭 | ZK8X | 恔 | ZK9 | 忭 | ZKAS | 悴 |
| ZKD | 愔 | ZKDF | 憧 | ZKDS | 憧 | ZKDZ | 憶 | ZKL | 忙 | ZKO. | 儆 |
| ZKOG | 惇 | ZKOK | 懹 | ZKOT | 惊 | ZKT7 | 憘 | ZL/N | 惱 | ZL/X | 惱 |

| | | | | | | | | | | | |
|---|---|---|---|---|---|---|---|---|---|---|---|
| ZLKW | 惱 | ZLX | 慠 | ZM0 | 僤 | ZM8R | 悾 | ZMD8 | 惧 | ZMEE | 愃 |
| ZMEO | 恫 | ZMER | 懼 | ZMET | 悰 | ZMFO | 惆 | ZMH1 | 懦 | ZMHR | 愔 |
| ZMJ | 悄 | ZMNC | 憢 | ZMQ | 忱 | ZMUL | 惘 | ZMV | 怏 | ZMXO | 愘 |
| ZMZJ | 悖 | ZN | 切 | ZNA | 忺 | ZNH1 | 憺 | ZNN | 侈 | ZNN2 | 懈 |
| ZNO | 慆 | ZNOQ | 悗 | ZO1 | 忡 | ZO18 | 憒 | ZO5 | 悝 | ZOJ | 悁 |
| ZOOB | 愕 | ZOOI | 慄 | ZOOS | 憚 | ZOQ | 悅 | ZORC | 悒 | ZP8L | 愖 |
| ZPK | 悵 | ZPPP | 懾 | ZPQL | 惎 | ZQY | 恌 | ZR.N | 懰 | ZR1F | 慳 |
| ZR38 | 愪 | ZR5 | 悈 | ZR5 | 恇 | ZRA | 怢 | ZRB1 | 怫 | ZRBT | 慍 |
| ZRDL | 慪 | ZRE5 | 怟 | ZRED | 惛 | ZRJ5 | 怋 | ZRK | 恨 | ZROO | 愊 |
| ZRQD | 慴 | ZRR. | 悜 | ZRVA | 愜 | ZS | 憻 | ZS38 | 慎 | ZSD | 惜 |
| ZSLI | 憟 | ZSM1 | 怖 | ZSM9 | 慩 | ZSMA | 憪 | ZSMG | 悖 | ZSO | 怙 |
| ZSOF | 懂 | ZSRF | 懂 | ZSRJ | 惰 | ZSRL | 悽 | ZSU8 | 憒 | ZSX | 怈 |
| ZSY | 恢 | ZT, | 恊 | ZTEQ | 恍 | ZTJ | 悄 | ZTMO | 惝 | ZU43 | 懵 |
| ZU45 | 懱 | ZUDV | 惧 | ZUFK | 懩 | ZUKQ | 慌 | ZUM, | 懞 | ZUOF | 懽 |
| ZURT | 慊 | ZUS | 怑 | ZUU | 怲 | ZUVC | 惓 | ZUVF | 僅 | ZV | 怢 |
| ZV1 | 忏 | ZV1O | 恬 | ZV8T | 憭 | ZVAO | 憍 | ZVAZ | 愫 | ZVBG | 悸 |
| ZVD, | 慟 | ZVRB | 悽 | ZVXX | 恢 | ZVY | 愀 | ZWAF | 惟 | ZWEU | 愷 |
| ZWH1 | 惴 | ZX.; | 慅 | ZXF | 怪 | ZXO | 恪 | ZXS1 | 悕 | ZXW | 悩 |
| ZXWX | 愋 | ZXXX | 慑 | ZYY | 惔 | ZZ/ | 愡 | ZZZ | 怂 | ZZZI | 絫 |
| ZZZT | 縈 | Z\ | 恮 | \ | 金 | \. | 鈁 | \.11 | 鍘 | \.29 | 鍥 |
| \.2V | 鏃 | \.;P | 鏍 | \.RK | 鋠 | \.S | 鈄 | \.X | 錄 | \/ | 釤 |
| \/3I | 鎳 | \/3Z | 鍶 | \/7C | 鏞 | \/9\ | 鋌 | \/BB | 鈁 | \/BX | 鈑 |
| \/C | 鈧 | \/D | 鉑 | \/D1 | 錦 | \/D1 | 鐸 | \/D5 | 鍠 | \/DI | 鏷 |
| \/DS | 錍 | \/IM | 鎌 | \0 | 鋪 | \0G. | 鏄 | \0\ | 鏈 | \111 | 鍘 |
| \1EA | 鍘 | \1WX | 鍍 | \27. | 錡 | \2C | 釳 | \2DX | 鍑 | \2E | 銈 |
| \2I | 銖 | \2M1 | 鍗 | \2O | 銡 | \2O2 | 鏵 | \2Q | 銑 | \2Q8 | 鏇 |
| \2V | 鐵 | \3 | 鋁 | \33X | 鍡 | \38 | 鉅 | \38N | 鄭 | \3Q | 鋇 |
| \4B; | 鑼 | \4DS | 鐔 | \4EK | 鐶 | \4ET | 鏢 | \4FS | 鐸 | \4TF | 鑼 |
| \5. | 鉦 | \5; | 鍩 | \5OO | 鐳 | \5\ | 鋌 | \6 | 鍘 | \6I4 | 鍘 |
| \6J. | 鏽 | \7 | 鈿 | \7. | 鉧 | \77F | 鑘 | \7EK | 鐶 | \7S | 鈾 |
| \7SO | 鋁 | \7T | 鏍 | \7V | 鉬 | \7Z | 鍶 | \8 | 銖 | \88. | 鐏 |
| \8; | 鉍 | \8N | 鈖 | \8N2 | 銵 | \8O | 鉛 | \8O | 鉛 | \8OQ | 鋭 |
| \8R/ | 鎅 | \9 | 釙 | \938 | 鎮 | \97Y | 鏞 | \9E9 | 鉎 | \9H5 | 鑝 |
| \9J | 錆 | \9O | 鈷 | \9X | 鈹 | \;2 | 鉾 | \;8X | 鋑 | \;;/ | 鏐 |
| \;A | 鍬 | \;O | 鉛 | \;Q | 鈗 | \A1/ | 鏓 | \A5 | 鋌 | \AA5 | 鐵 |
| \AAF | 錐 | \AB | 鈐 | \AB. | 鈴 | \ABO | 鎗 | \AF | 銓 | \AI | 鉌 |
| \AKF | 錐 | \AKI | 鏶 | \AKS | 鉾 | \AKW | 鐫 | \AKY | 鐎 | \AMU | 鍮 |
| \AO | 鈴 | \AOA | 鐱 | \AOU | 鑰 | \ARO | 鎗 | \ARV | 鋸 | \B | 鍚 |
| \B,I | 鍒 | \B,O | 鐍 | \B. | 鈞 | \B. | 鉤 | \B.Z | 鍃 | \B1 | 鉤 |
| \B2W | 鏑 | \B; | 鉤 | \BB/ | 鈣 | \BB/ | 鏐 | \BBA | 鍛 | \BEE | 鈎 |
| \BEO | 鋼 | \BEZ | 鍃 | \BF | 鈕 | \BG | 釪 | \BGU | 鍣 | \BJ | 釘 |
| \BO | 鉤 | \BRC | 鉋 | \C | 釔 | \C | 釓 | \C | 鏽 | \C7, | 鑛 |
| \C7U | 鑷 | \C7Z | 鏈 | \C8 | 鎞 | \CC | 鈚 | \CCD | 鍇 | \CE, | 鏄 |
| \CE. | 鑽 | \CJG | 鎛 | \CRF | 鏞 | \CRO | 鋸 | \CRX | 鏢 | \CS8 | 礦 |
| \CSX | 鋑 | \CSY | 鑣 | \CUT | 鏮 | \CX | 鈹 | \CY | 鐶 | \D | 鉏 |
| \D1 | 鉀 | \D4X | 鏝 | \DB/ | 錫 | \DBB | 鍻 | \DBL | 鍻 | \DCC | 鋸 |
| \DD | 鐠 | \DE | 鉅 | \DE/ | 鍚 | \DE9 | 鍉 | \DES | 鋽 | \DF | 鋰 |
| \DH/ | 錫 | \DI | 鍱 | \DOL | 鏝 | \DSX | 鑺 | \DTQ | 鋺 | \DUF | 鐸 |
| \E1E | 鋌 | \E2O | 鋁 | \E5 | 鉽 | \E55 | 錢 | \E8X | 鋼 | \E9 | 鉦 |
| \E9B | 鍔 | \E;F | 鋞 | \EA9 | 鏦 | \ED. | 鐏 | \EDZ | 鏸 | \EE5 | 錢 |
| \EEB | 鋝 | \EET | 祭 | \EG | 鈃 | \EJ | 釘 | \ELR | 鋥 | \EO1 | 鍢 |
| \EOJ | 錒 | \EOP | 鄧 | \EOQ | 發 | \EOU | 登 | \EOU | 登 | \EOU | 鐙 |
| \EO\ | 鐙 | \ER5 | 鉽 | \ES | 鈃 | \ESW | 鍤 | \ESZ | 鐖 | \EU | 鈃 |
| \EU1 | 鋝 | \EUN | 鏰 | \EV | 癸 | \EV5 | 戣 | \EVP | 揆 | \EWQ | 鈍 |
| \EX. | 銶 | \EYX | 鋟 | \EZ5 | 鉽 | \F | 釷 | \F8F | 銈 | \F8X | 鋑 |
| \F; | 鉣 | \F;U | 錯 | \FB. | 錡 | \FC | 銠 | \FD | 錯 | \FEB | 鋳 |
| \FE | 銈 | \FFQ | 鐃 | \FFR | 錯 | \FJ | 錆 | \FK | 錴 | \FNV | 鍥 |

| | | | | | | | | | | | |
|---|---|---|---|---|---|---|---|---|---|---|---|
| \FO | 銡 | \FO5 | 鐵 | \FOK | 鎱 | \FU\ | 鐽 | \FZ | 鉣 | \G/ | 釮 |
| \H1; | 鏤 | \H1\ | 釽 | \H38 | 鎮 | \H5 | 鈸 | \H95 | 鏚 | \H;\ | 鈲 |
| \HB5 | 鋮 | \HBO | 鋦 | \HC | 鈮 | \HD | 銆 | \HE. | 鋝 | \HE1 | 釿 |
| \HE8 | 鐨 | \HEK | 鋠 | \HEO | 銗 | \HEX | 鍜 | \HEY | 鎢 | \HO5 | 鍼 |
| \HR\ | 鍉 | \HS3 | 鍤 | \HSO | 鋸 | \HX | 鈑 | \HXX | 鍛 | \I. | 鉥 |
| \I4 | 鍊 | \IAA | 錸 | \IE | 鉢 | \IO | 銇 | \J | 鈅 | \J.A | 鉯 |
| \JE | 鉏 | \JE, | 鋤 | \JEX | 鍰 | \JG. | 鋢 | \JI7 | 鐇 | \JJ | 錙 |
| \JMX | 鍰 | \JRJ | 錚 | \K/E | 鏟 | \K8. | 鎊 | \K81 | 鍗 | \K8O | 鏑 |
| \K8P | 鏑 | \K8X | 鉸 | \K;J | 鏑 | \K;Q | 銃 | \KDF | 鐘 | \KDQ | 鏡 |
| \KDZ | 鐿 | \KF | 鉒 | \KJX | 鑨 | \KK | 鍄 | \KM1 | 鈰 | \KOG | 錞 |
| \KOK | 鑲 | \KOO | 鎬 | \KOX | 鐓 | \KQ | 鈧 | \KS | 鋅 | \KT | 鉉 |
| \KXE | 鐥 | \L | 鈘 | \L45 | 鐙 | \L7 | 鐂 | \L75 | 鐙 | \LD5 | 鐙 |
| \LO | 鈊 | \M0 | 鍕 | \M7 | 鐳 | \M8O | 鋐 | \MA | 鈉 | \MC | 鉈 |
| \ME, | 錝 | \ME8 | 鎭 | \ME8 | 鑌 | \ME9 | 錠 | \MEE | 鍹 | \MEO | 銅 |
| \MEQ | 鋎 | \MET | 錝 | \MFO | 錭 | \MH1 | 鑐 | \MHR | 錧 | \ML | 銨 |
| \MNC | 鋶 | \MO | 鍋 | \MO\ | 鎚 | \MQ | 鈗 | \MS8 | 錪 | \MS9 | 鍵 |
| \MS; | 鉉 | \MUW | 鋗 | \MV | 鉠 | \MVT | 鐐 | \MZJ | 鐸 | \N | 釗 |
| \N | 鈔 | \N4, | 鎵 | \NA | 欽 | \NN | 鉹 | \NO | 銘 | \NO | 鉊 |
| \NO. | 鐃 | \NRC | 銫 | \NW | 鉻 | \NX | 錄 | \O | 釦 | \O/O | 鋁 |
| \O18 | 鐀 | \OJ | 鍋 | \OLV | 鋘 | \OOB | 鍔 | \OOI | 鐰 | \P | 鉺 |
| \P | 鍚 | \P8 | 錤 | \P8L | 鏙 | \PD/ | 鍔 | \PEJ | 鋼 | \PK | 鋹 |
| \PPP | 鍢 | \PQL | 鏶 | \PX | 鋷 | \Q | 鉆 | \Q. | 釩 | \QO | 鉛 |
| \QX | 癹 | \QY | 銚 | \R | 釭 | \R.7 | 鎦 | \R16 | 鏽 | \R1C | 鈀 |
| \R1F | 鋞 | \R1P | 鉚 | \R1U | 鋯 | \R5 | 鉞 | \R61 | 鏞 | \RA | 鈌 |
| \RB1 | 鉶 | \RB8 | 鑟 | \RB; | 鏺 | \RBX | 發 | \RC8 | 鏁 | \RED | 鍣 |
| \RF\ | 鏈 | \RJ5 | 鈱 | \RK | 銀 | \RM1 | 錘 | \RMX | 錢 | \ROO | 鑼 |
| \RQD | 鏍 | \RR | 鉅 | \S | 針 | \S1G | 鍮 | \S38 | 鎮 | \S; | 鉉 |
| \SD | 錯 | \SE | 鉗 | \SJ | 銪 | \SJX | 鐵 | \SLI | 鍱 | \SM1 | 鈽 |
| \SMG | 鋍 | \SMT | 鑠 | \SO | 鈷 | \SU8 | 鑽 | \SX. | 鈸 | \T/ | 鈔 |
| \T38 | 鎖 | \TEQ | 銑 | \TFO | 鍇 | \TJ | 銷 | \TM4 | 鐮 | \TM7 | 鐺 |
| \TMF | 鏜 | \TMI | 鏷 | \TMO | 鋿 | \TMQ | 銳 | \TT5 | 鐖 | \U,\ | 鐩 |
| \U7 | 錨 | \U8U | 鎰 | \UAC | 錵 | \UAO | 鎔 | \UAX | 鑊 | \UDV | 鏌 |
| \UEF | 鏵 | \UFQ | 銑 | \UFR | 鎈 | \UFU | 鐯 | \UFV | 鎂 | \UH5 | 鐡 |
| \UKL | 鍩 | \UNO | 錯 | \UOF | 鑵 | \URT | 鎌 | \US | 鉡 | \USI | 鏁 |
| \UTT | 鎡 | \UU | 鉼 | \UU. | 錮 | \UUD | 鐠 | \UUV | 鏷 | \UVC | 鍖 |
| \UWJ | 鎙 | \UX. | 鑄 | \UX\ | 鏠 | \V | 鈇 | \V | 鈦 | \V | 鉌 |
| \V. | 鈦 | \V/B | 鏽 | \V1O | 銛 | \V1W | 鍤 | \V1Z | 鍉 | \V8T | 鐐 |
| \VAA | 鋏 | \VB/ | 鏽 | \VBX | 鐷 | \VDF | 鍾 | \VEB | 鎊 | \VEJ | 錡 |
| \VET | 錝 | \VFF | 鐽 | \VG5 | 銾 | \VI | 銖 | \VN | 鋓 | \VRB | 銕 |
| \VS | 鉢 | \VSU | 鋳 | \VUF | 錘 | \VY | 鍬 | \WAF | 錐 | \WAO | 鐫 |
| \WEU | 鎧 | \WHS | 錊 | \X. | 釵 | \X. | 鉖 | \XD | 鍺 | \XD/ | 錫 |
| \XF | 鋒 | \XHK | 鏃 | \XIX | 鍛 | \XO | 鉻 | \XWX | 鏺 | \XXI | 錄 |
| \XXX | 錣 | \Y | 鈥 | \YY | 錟 | \YY, | 鐒 | \YYI | 鑅 | \Z | 釓 |
| \Z/ | 鉍 | \\EU | 鐙 | \\RX | 鏺 | \\\ | 鑫 | | | | |

ATTACHMENT 2 LIST OF REPEATED CHARACTERS

| | | | | | | |
|---|---|---|---|---|---|---|
| ,5 | 狂 | 狂 | | /7NZ | 匆 | 匆 |
| . | 方 | 舟 | | /7X | 囪 | 囱 |
| .2Q | 冼 | 沆 | | /; | 鬼 | 厶 |
| .AB. | 冷 | 鈴 | | /C | 九 | 簏 |
| .ARO | 艙 | 滄 | | /CD | 旭 | 旮 |
| .NA8 | 資 | 粢 | | /DC | 皂 | 皀 |
| .NAI | 粢 | 餈 | | /DVH | 鶵 | 鶵 |
| .X | 永 | 放 | 冰 | /FB. | 筠 | 籌 |
| /37C | 鼽 | 鼿 | | /K | 乏 | 笠 |
| /37K | 鱚 | 鱚 | | /KH | 鴉 | 鴟 |

| | | | | | |
|---|---|---|---|---|---|
| /MAF | 篧 | 籗 | | | |
| /MUP | 鲫 | 鲴 | | | |
| /RP | 節 | 篩 | | | |
| 0 | 車 | 甫 | | | |
| 0C | 軋 | 轆 | | | |
| 0MFO | 轄 | 輣 | | | |
| 0\ | 連 | 逋 | | | |
| 1AKF | 誰 | 讎 | | | |
| 1K8O | 謫 | 譎 | | | |
| 1NO | 詔 | 詻 | | | |
| 1TTG | 擧 | 擊 | | | |
| 22 | 年 | 牪 | | | |
| 27. | 每 | 犅 | | | |
| 27.X | 敏 | 繁 | | | |
| 2C | 乞 | 牤 | | | |
| 2O2. | 轫 | 鈸 | | | |
| 2O2F | 講 | 鏵 | | | |
| 2O2I | 鍊 | 鍒 | 鍱 | | |
| 2SWS | 鉢 | 鐔 | | | |
| 2SWU | 罐 | 鉼 | | | |
| 2V | 失 | 矢 | | | |
| 2VAF | 雉 | 雉 | | | |
| 2VH | 鴂 | 鴂 | | | |
| 38 | 貝 | 具 | 眯 | | |
| 3838 | 賏 | 贔 | | | |
| 38E5 | 賊 | 賦 | 賤 | | |
| 38N | 則 | 盼 | | | |
| 3ME8 | 膑 | 矉 | | | |
| 3MFO | 瞎 | 瞷 | | | |
| 3NO | 昭 | 賂 | | | |
| 3R5 | 賍 | 眡 | | | |
| 4 | 四 | 西 | 黑 | | |
| 438 | 買 | 賈 | | | |
| 4F | 墨 | 垔 | | | |
| 4VDC | 罨 | 黤 | | | |
| 5 | 王 | 壬 | | | |
| 5. | 玉 | 王 | 瑡 | | |
| 5D1 | 珅 | 玾 | | | |
| 5K;Q | 琉 | 琉 | | | |
| 5\ | 廷 | 廷 | | | |
| 6 | 門 | 片 | 門 | 片 | 丱 |
| 6EOJ | 泂 | 問 | | | |
| 6I | 床 | 閑 | | | |
| 6RPX | 闞 | 闞 | | | |
| 7 | 田 | 口 | | | |
| 777F | 壘 | 壘 | | | |
| 7CC | 毗 | 昆 | | | |
| 7S | 由 | 毌 | | | |
| 7SJ | 胄 | 囿 | | | |
| 7U | 曲 | 畀 | | | |
| 7UEU | 黇 | 豊 | | | |
| 7V | 因 | 困 | | | |
| 8 | 八 | 米 | 酉 | | |
| 88N | 粉 | 酚 | | | |
| 88\ | 遒 | 酟 | | | |
| 89O | 粘 | 酟 | | | |
| 8CRO | 糖 | 醣 | | | |

| | | | |
|---|---|---|---|
| 8G. | 籿 | 酎 | |
| 8KAS | 醉 | 粹 | |
| 8MEO | 粡 | 酮 | |
| 8MH1 | 糯 | 醽 | |
| 8NX | 敓 | 醁 | |
| 8RB1 | 弟 | 粡 | |
| 8SOJ | 糊 | 醐 | |
| 8VC | 粍 | 酕 | |
| 8X | 父 | 敉 | 敝 |
| 9 | 足 | 卜 | 止 |
| 99 | 趾 | 跕 | |
| 9C | 此 | 蹝 | |
| 9CN | 呰 | 貲 | |
| 9DI | 桌 | 踝 | |
| 9ECP | 鼎 | 鄁 | |
| 9FG. | 峙 | 跱 | |
| 9MEX | 穀 | 敔 | |
| 9SX | 歧 | 跂 | |
| 9UU | 踫 | 跗 | |
| 9WH1 | 踹 | 齗 | |
| ;2V | 矣 | 蛈 | |
| ;B. | 蚐 | 蚐 | |
| ;ME8 | 蠙 | 壙 | |
| ;MFO | 堈 | 塘 | |
| ;Q | 允 | 虮 | |
| ;UF | 垟 | 蜉 | |
| ;VC | 蚝 | 蚝 | |
| A | 人 | 入 | |
| A. | 仿 | 仿 | |
| A9 | 企 | 促 | 仆 |
| A;EJ | 飣 | 餡 | |
| A;FU | 饁 | 饐 | |
| AAF | 坐 | 佺 | |
| AB | 今 | 偒 | |
| ABB/ | 仍 | 僇 | |
| ABO | 含 | 佝 | |
| AE5 | 代 | 伐 | |
| AEOJ | 何 | 俥 | |
| AF | 全 | 仕 | |
| AI | 休 | 余 | |
| AIE | 體 | 体 | |
| AK8X | 做 | 伎 | |
| AKF | 住 | 隹 | |
| AKFF | 齒 | 鑑 | 龘 |
| AKFX | 隻 | 雙 | |
| AKOK | 偯 | 儴 | |
| AOOX | 斂 | 儼 | |
| AOF | 命 | 郤 | 倡 |
| AR | 仜 | 仝 | |
| ARB1 | 佛 | 佛 | |
| ARK | 食 | 偎 | |
| AS | 什 | 升 | |
| ASO | 估 | 佑 | 含 |
| ASOF | 僅 | 儺 | |
| AW | 仙 | 仚 | 仚 |
| B. | 勺 | 与 | |
| BBA5 | 黝 | 黴 | |

| | | | | | | |
|---|---|---|---|---|---|---|
| BBAF | 翟 | 翟 | | | | |
| BBAH | 鶩 | 鶴 | | | | |
| BBK | 翌 | 翋 | | | | |
| BD | 旬 | 駋 | | | | |
| BEU1 | 甸 | 騂 | | | | |
| BG | 子 | 孑 | | | | |
| BJ | 了 | 予 | | | | |
| BMO | 騶 | 騶 | | | | |
| BX | 毆 | 豖 | 敃 | | | |
| BXW | 函 | 匈 | | | | |
| C | 七 | 乙 | 匕 | 鹿 | 气 | 虍 |
| C.70 | 痼 | 痼 | | | | |
| C.AF | 痤 | 痤 | 瘫 | | | |
| C.E9 | 症 | 症 | | | | |
| C.EX | 瘋 | 瘋 | | | | |
| C.FZ | 虑 | 癒 | | | | |
| C.HX | 瘕 | 瘕 | | | | |
| C.II | 痳 | 痳 | | | | |
| C.KS | 瘴 | 痒 | | | | |
| C.MO | 瘸 | 瘸 | | | | |
| C.S8 | 癫 | 瘨 | | | | |
| C.SF | 癱 | 癯 | | | | |
| C.UO | 痦 | 痞 | | | | |
| C.VL | 瘻 | 痷 | | | | |
| C/D; | 廛 | 廱 | | | | |
| C8 | 氣 | 粟 | 廼 | | | |
| CBB/ | 廖 | 氛 | | | | |
| CC | 比 | 庀 | 毞 | 麃 | | |
| CCC | 庇 | 麤 | | | | |
| CEO. | 獻 | 甗 | | | | |
| CF | 塵 | 丮 | 庄 | | | |
| CII8 | 麋 | 麢 | | | | |
| CIIT | 麼 | 麇 | | | | |
| COLV | 虞 | 虞 | | | | |
| CQ | 虎 | 虎 | | | | |
| CSH | 鸨 | 鷹 | | | | |
| CSX | 度 | 庋 | | | | |
| CUF | 氧 | 庠 | | | | |
| CXH8 | 頗 | 穎 | | | | |
| D | 日 | 曰 | | | | |
| D/MO | 晌 | 晑 | | | | |
| D1 | 甲 | 申 | | | | |
| D5 | 旺 | 曳 | | | | |
| DB. | 昀 | 的 | | | | |
| DB/ | 易 | 昒 | | | | |
| DD | 昌 | 畕 | | | | |
| DES | 旱 | 旰 | | | | |
| DI | 果 | 杲 | | | | |
| DKOT | 景 | 晾 | | | | |
| DKX | 旼 | 旻 | | | | |
| DMO | 暉 | 暈 | | | | |
| DNOQ | 晥 | 冕 | | | | |
| DV11 | 昇 | 界 | | | | |
| DY | 昃 | 昳 | | | | |
| E | 一 | 彳 | | | | |
| E,\ | 逐 | 豕 | | | | |
| E5 | 戈 | 弋 | | | | |

| | | | | | |
|---|---|---|---|---|---|
| E9 | 下 | 正 | | | |
| EBX | 考 | 致 | | | |
| ED;. | 專 | 磚 | | | |
| EI | 未 | 末 | | | |
| EJE | 亙 | 徂 | | | |
| EN | 互 | 歹 | | | |
| ENEE | 殛 | 殛 | | | |
| ENM8 | 殯 | 殯 | | | |
| ENVA | 殀 | 殀 | | | |
| EOE5 | 或 | 或 | | | |
| ESOZ | 逑 | 惑 | | | |
| EU | 井 | 亓 | | | |
| EWEX | 徵 | 徵 | 徵 | 徵 | 徵 |
| F | 土 | 士 | 丰 | | |
| F38 | 賣 | 填 | | | |
| F7. | 毒 | 坶 | | | |
| F8FY | 熱 | 鼓 | | | |
| F9 | 走 | 址 | | | |
| F9AF | 趕 | 趡 | | | |
| F9VC | 趄 | 趨 | | | |
| FB. | 均 | 均 | | | |
| FC | 老 | 圠 | 墉 | | |
| FDBB | 塌 | 轟 | | | |
| FE1E | 堊 | 壹 | | | |
| FEHX | 殼 | 歡 | | | |
| FFFQ | 堯 | 墝 | | | |
| FFP | 邦 | 埗 | | | |
| FFWU | 豐 | 豔 | | | |
| FH1D | 馨 | 馨 | | | |
| FK | 袁 | 垃 | | | |
| FMO | 堝 | 垌 | | | |
| FO5 | 哉 | 埕 | | | |
| FOU. | 鼕 | 尌 | 鼞 | | |
| FOUO | 喜 | 嘉 | 嚭 | 嚳 | 嚞 |
| FOUX | 鼓 | 鼓 | | | |
| FRC | 圮 | 圮 | | | |
| FT | 赤 | 赤 | | | |
| FUS | 幸 | 拌 | | | |
| G0 | 捕 | 捭 | | | |
| G9 | 捉 | 扑 | 扯 | | |
| GBB/ | 扔 | 摎 | | | |
| GC | 扎 | 搋 | | | |
| GD1 | 捍 | 抻 | | | |
| GDF | 捏 | 捚 | | | |
| GHE1 | 折 | 誓 | | | |
| GHE9 | 拆 | 踅 | | | |
| GHEK | 振 | 裚 | | | |
| GHEY | 搗 | 焎 | | | |
| GHE\ | 逝 | 銴 | | | |
| GMAF | 搭 | 擢 | | | |
| GUU | 拼 | 搵 | | | |
| GVC | 托 | 托 | | | |
| H | 烏 | 戶 | 尸 | 厂 | |
| H33 | 扉 | 扉 | 扇 | | |
| H5 | 戊 | 戌 | | | |
| H9E5 | 戚 | 感 | | | |
| H9E9 | 歪 | 蹙 | | | |

| | | | |
|---|---|---|---|
| H9O | 舌 | 居 | |
| HAKF | 雇 | 鮨 | |
| HB | 万 | 鴞 | |
| HC | 尼 | 鳰 | |
| HE18 | 賔 | 痕 | |
| HE;F | 屋 | 屋 | |
| HEE. | 辱 | 尉 | |
| HEEK | 辰 | 髮 | |
| HEEP | 鄏 | 鄏 | |
| HKS | 犀 | 犀 | |
| HM8 | 屄 | 軟 | |
| HOK. | 豎 | 覽 | |
| HOK1 | 譬 | 髩 | |
| HRW | 岳 | 島 | |
| HX | 反 | 尿 | |
| H\ | 尺 | 迟 | |
| I. | 朮 | 枋 | |
| I/D1 | 棉 | 椑 | |
| I/DS | 椑 | 榺 | |
| I38 | 椇 | 棋 | |
| I4 | 東 | 樝 | 栖 |
| IB,I | 椕 | 楺 | |
| IB. | 杓 | 枸 | |
| IBG | 李 | 杍 | |
| IC | 札 | 朼 | |
| ID | 東 | 杳 | |
| ID1 | 柙 | 椑 | |
| IDE | 查 | 柤 | |
| IMIM | 棘 | 棗 | |
| IO | 束 | 杏 | |
| IO, | 敕 | 枴 | |
| ION | 刺 | 拐 | |
| IQ | 机 | 柘 | |
| IRR | 櫃 | 柜 | |
| IUSO | 楉 | 楉 | |
| IUU | 栟 | 槿 | |
| IV | 枤 | 枎 | |
| IX. | 杈 | 栘 | |
| J, | 肋 | 豸 | |
| J,RF | 墾 | 豨 | |
| JD1 | 脾 | 腫 | |
| JE, | 助 | 豚 | |
| JI | 釆 | 采 | |
| K | 之 | 立 | |
| K2I | 株 | 侏 | |
| K2V | 佚 | 袟 | |
| K8MO | 商 | 啬 | |
| K8OQ | 充 | 祝 | |
| K8X | 交 | 襪 | |
| K9 | 卞 | 祉 | |
| KA4D | 襘 | 檜 | |
| KAO | 袷 | 拾 | |
| KB. | 礿 | 袧 | |
| KB1C | 袘 | 袘 | |
| KBB | 祤 | 翊 | |
| KBO | 竘 | 袧 | |
| KD | 音 | 袓 | |

| | | |
|---|---|---|
| KDBB | 褟 | 裼 |
| KDBL | 竭 | 褐 |
| KDE9 | 提 | 褆 |
| KDF | 裡 | 童 |
| KDI | 裸 | 裸 |
| KDSX | 韁 | 褸 |
| KEO7 | 福 | 福 |
| KF | 主 | 社 |
| KF; | 祛 | 袪 |
| KFNV | 禊 | 褉 |
| KHCQ | 褫 | 褫 |
| KHEK | 振 | 裖 |
| KJ98 | 冀 | 冀 |
| KJ9X | 龍 | 龔 |
| KJE | 倨 | 裾 |
| KJEN | 諼 | 援 |
| KK81 | 擒 | 擒 |
| KL | 亡 | 亦 |
| KL/8 | 齊 | 叕 |
| KL/A | 亥 | 效 |
| KMO | 揮 | 揮 |
| KMFO | 偶 | 偶 |
| KN, | 豫 | 豫 |
| KNO | 招 | 招 |
| KO1 | 袢 | 神 |
| KOBY | 熱 | 烹 |
| KOMC | 毫 | 毫 |
| KOMJ | 亭 | 膏 |
| KOMX | 敲 | 殼 |
| KOOS | 撣 | 撣 |
| KOTH | 鶉 | 鷙 |
| KQ | 亢 | 祏 |
| KRE5 | 祇 | 祇 |
| KREE | 祗 | 祗 |
| KS1S | 辦 | 辯 |
| KSO | 祜 | 祜 |
| KSX. | 祓 | 祓 |
| KT | 亦 | 玄 |
| KTAF | 雍 | 壅 |
| KU,\ | 褳 | 襚 |
| KXO | 吝 | 袼 |
| L/D1 | 婢 | 婂 |
| LBB/ | 奶 | 嫪 |
| LDI | 巢 | 婐 |
| LEI | 妹 | 妹 |
| LNO | 媌 | 姳 |
| M1 | 巾 | 雪 |
| M7S8 | 實 | 霙 |
| M8 | 穴 | 采 |
| M8/X | 窗 | 竅 |
| M8H\ | 窊 | 窳 |
| M8N | 穸 | 雰 |
| M8O | 容 | 罔 |
| MAKF | 霍 | 靄 |
| MDL | 宴 | 電 |
| MEEB | 雩 | 雲 |
| MEEF | 鄠 | 鄠 |

| | | | | |
|---|---|---|---|---|
| MEEX | 寇 | 護 | | |
| MF | 用 | 冉 | | |
| MFO | 周 | 害 | | |
| MFOH | 鵰 | 鶷 | | |
| MHEK | 震 | 宸 | | |
| MJUU | 骿 | 骿 | | |
| MKJX | 寵 | 龐 | | |
| MO\ | 過 | 週 | | |
| MQ | 冗 | 冘 | 宕 | |
| MQY | 兖 | 兗 | | |
| MR11 | 宦 | 宦 | | |
| MSJ | 霸 | 宥 | | |
| MTJ | 寓 | 寓 | | |
| MU | 冊 | 皿 | | |
| MVC | 宅 | 宅 | | |
| N | 刀 | 夕 | 角 | 魚 |
| N, | 舫 | 象 | | |
| N. | 刃 | 舫 | | |
| N/DI | 鰈 | 鰈 | | |
| N2I | 粲 | 鮢 | | |
| N4, | 象 | 鯉 | 鯉 | |
| NEX. | 鯡 | 鯡 | | |
| NFF | 鮭 | 鮭 | | |
| NMER | 鼉 | 鰐 | | |
| NN | 多 | 鮒 | | |
| NNHC | 舵 | 鮠 | | |
| NO | 名 | 召 | | |
| NOP | 邵 | 邵 | | |
| NWQ | 鯢 | 鯢 | | |
| NXO | 艪 | 鮎 | | |
| O, | 另 | 叻 | | |
| O/DS | 啤 | 啤 | | |
| O1 | 中 | 唁 | | |
| O1E\ | 遣 | 遣 | | |
| O38 | 員 | 唄 | | |
| O4 | 哂 | 嘿 | 晒 | |
| O8 | 只 | 叭 | 咪 | 唔 |
| OAI | 咻 | 除 | | |
| OD1 | 呻 | 呷 | | |
| OFT | 嗦 | 哧 | | |
| OMFO | 啕 | 嗒 | | |
| ON | 叨 | 啲 | | |
| ONN | 别 | 哆 | | |
| OODK | 戰 | 嚴 | | |
| OOEB | 嗎 | 号 | | |
| OOOI | 噪 | 梟 | | |
| OP | 叩 | 唱 | 昌 | |
| OR1C | 吧 | 邑 | | |
| OR1U | 嚧 | 嚐 | | |
| OV. | 吠 | 呔 | | |
| P | 耳 | 身 | | |
| P/SJ | 鬍 | 警 | | |
| P9 | 耽 | 阯 | | |
| PHM1 | 陌 | 聬 | | |
| PO18 | 隤 | 聵 | | |
| PP | 耶 | 聑 | | |
| PU,\ | 隨 | 聾 | | |

| | | | | |
|---|---|---|---|---|
| Q | 石 | 儿 | 几 | |
| QMAF | 礁 | 礶 | | |
| QMFO | 碉 | 諸 | | |
| QN | 砂 | 确 | | |
| QTJ | 亂 | 磅 | | |
| QX | 泵 | 殳 | 砯 | |
| R | 工 | 匚 | | |
| R1O8 | 頤 | 頡 | | |
| R1R1 | 臣 | 臤 | 粟 | |
| R1RQ | 覽 | 臋 | | |
| R1RU | 監 | 豎 | 監 | 鹽 |
| R1R\ | 鑒 | 豎 | | |
| R2V8 | 醫 | 賢 | | |
| R5 | 匡 | 戌 | | |
| RB1 | 引 | 弔 | | |
| RB1C | 匯 | 艴 | | |
| RBKT | 弦 | 琮 | | |
| RC | 己 | 巨 | 巴 | |
| RJEX | 殷 | 毆 | | |
| ROOX | 區 | 歐 | | |
| RP | 印 | 卬 | 邛 | |
| RQ | 匹 | 旡 | | |
| RX | 攻 | 汞 | | |
| S | 十 | 廿 | 革 | |
| SAAC | 韃 | 韃 | | |
| SDSS | 幹 | 幹 | | |
| SEI | 某 | 韎 | | |
| SM | 有 | 市 | | |
| SO | 古 | 右 | | |
| SOJ | 胡 | 鞘 | | |
| SOJH | 鶘 | 韜 | | |
| SOM; | 臺 | 臺 | | |
| SOMI | 薹 | 薹 | | |
| SOVA | 歎 | 韉 | | |
| SX | 友 | 支 | | |
| T | 小 | 糸 | | |
| T/D1 | 綿 | 緯 | | |
| T/DX | 線 | 繳 | | |
| TAKF | 維 | 雀 | | |
| TME8 | 繢 | 緶 | | |
| TMFO | 綢 | 綰 | | |
| TMO | 尚 | 絅 | 緺 | |
| TMOG | 掌 | 掌 | | |
| TRB1 | 綈 | 紖 | | |
| TTE5 | 幾 | 畿 | | |
| TX. | 終 | 紋 | | |
| U | 廾 | 丌 | 艸 | |
| U0 | 莆 | 華 | | |
| U7V | 茵 | 菌 | | |
| U8 | 茜 | 帯 | | |
| UAF | 荃 | 荏 | | |
| UAI | 茶 | 荼 | 荼 | |
| UB, | 茅 | 莉 | | |
| UBB/ | 芀 | 蓼 | | |
| UC | 芃 | 蔗 | | |
| UEWX | 薇 | 薇 | | |
| UF | 羊 | 芈 | 芏 | |

| | | | | |
|---|---|---|---|---|
| UF.X | 羕 | 菝 | | |
| UF8N | 羚 | 蕾 | | |
| UFB. | 荮 | 蓦 | | |
| UFV5 | 義 | 羲 | | |
| UHE. | 蔚 | 蓐 | | |
| UHL5 | 藏 | 葳 | | |
| UK | 芝 | 苙 | | |
| UKL | 芒 | 荽 | | |
| UMAF | 藿 | 藿 | | |
| UNN | 蓟 | 茤 | | |
| UNO | 茗 | 茗 | | |
| UOOP | 鄯 | 鄯 | | |
| UR1U | 藍 | 蓋 | | |
| US7F | 鞋 | 鞋 | | |
| USEF | 鞋 | 鞋 | | |
| USO | 若 | 苦 | | |
| USY | 芰 | 茇 | | |
| UTT | 茲 | 蕬 | | |
| UU | 並 | 并 | 丗 | |
| UVD | 蓄 | 蓄 | | |
| UVN | 券 | 莉 | 嵩 | |
| UVRB | 誊 | 莠 | | |
| V | 大 | 夫 | 禾 | |
| V. | 太 | 犬 | | |
| V1OZ | 舔 | 憩 | | |
| VBB/ | 秀 | 穋 | | |
| VC | 毛 | 乇 | | |
| VD | 春 | 香 | | |
| VEET | 奈 | 絮 | | |
| VNN | 移 | 爹 | | |
| VP | 套 | 邦 | 奄 | |
| VS3 | 看 | 稙 | | |
| VUF | 垂 | 奎 | | |
| VV | 秦 | 秝 | | |
| VVC | 秏 | 毹 | | |
| VW | 春 | 秞 | | |
| W | 山 | 白 | 凵 | 中 |
| W/BX | 岌 | 岈 | | |
| WAB | 岑 | 岭 | | |
| WAO | 岩 | 峆 | | |
| WBBA | 岌 | 岋 | | |
| WE8 | 與 | 興 | 輿 | |
| WEOQ | 凱 | 覬 | | |
| WEQ | 兒 | 屼 | | |
| WFFU | 豐 | 豔 | | |
| WHM1 | 耑 | 岠 | | |
| WMN | 嚳 | 嚳 | | |
| WMY | 覺 | 異 | | |
| WNHC | 峗 | 岩 | | |
| WQ | 兒 | 岩 | | |
| WU | 嵒 | 舁 | | |
| WW | 出 | 岫 | | |
| WXO | 客 | 峈 | | |
| W\ | 迪 | 峑 | | |
| X | 水 | 又 | 乂 | |
| X. | 叉 | 冬 | 汸 | 洀 |
| X/BX | 沒 | 没 | | |

| | | | |
|---|---|---|---|
| X1 | 泗 | 洒 | 漂 |
| X6 | 淵 | 汧 | |
| X7U | 油 | 淠 | |
| X7UU | 澧 | 澧 | 灧 |
| X8 | 酒 | 汃 | |
| X9 | 沚 | 浞 | |
| X9O | 沾 | 咎 | |
| XAO | 洽 | 咎 | |
| XAOU | 淪 | 淪 | |
| XBXW | 涵 | 洶 | |
| XC | 汽 | 淲 | |
| XD | 沿 | 沓 | |
| XDF | 湮 | 湦 | |
| XEI | 沫 | 沫 | |
| XEOJ | 河 | 河 | |
| XEU | [illegible] | 洪 | |
| XF | 圣 | [illegible] | |
| XFEX | [illegible] | [illegible] | |
| XFFU | 灃 | 灃 | 灩 |
| XFT | 涑 | 涛 | |
| XHEF | 淣 | 浧 | |
| XM8O | 溶 | 涸 | 沼 |
| XME8 | 湞 | 湞 | |
| XMO | 滑 | 洞 | |
| XMQ | 沈 | 沅 | |
| XN | 漁 | 洌 | [illegible] |
| XNX | 没 | 洨 | |
| XO | 各 | 沓 | |
| XR1U | 濫 | 瀍 | |
| XR5 | 淢 | 渥 | |
| XRB; | 泓 | 漒 | |
| XSPS | 澥 | 澥 | |
| XSJ | 肴 | 淯 | |
| XSM1 | 希 | 濡 | |
| XSMA | 滿 | 漱 | |
| XSMZ | 漗 | 澀 | |
| XUU | 洴 | 洷 | |
| XV. | 汰 | 汱 | |
| XW | 囪 | 汕 | |
| XWEX | 澂 | 澂 | |
| XWFU | 灩 | 灃 | 灩 |
| XWQ | 兕 | 涚 | |
| XX | 爻 | 雙 | 林 |
| XXXA | [illegible] | 歡 | |
| Y4F | 煙 | 煙 | |
| YR1U | 燼 | 爁 | |
| YS8 | 烘 | 粪 | |
| YUF5 | 燨 | 燨 | |
| YYH8 | 類 | 熲 | |
| YYM. | 塋 | 熒 | 茕 |
| YYMT | 榮 | 禜 | |
| YYYI | 燊 | 燊 | |
| Z4 | 櫃 | 栖 | |
| ZAI | 榷 | 梌 | |
| ZR5 | 棫 | 框 | |
| \/D1 | 鏞 | 錍 | |
| \8O | 鉛 | 鉛 | |

| | | | |
|---|---|---|---|
| \B. | 釣 | 鈎 | |
| \BB/ | 釢 | 鏐 | |
| \C | 釔 | 釓 | 鏕 |
| \EOU | 登 | 登 | 鋀 |
| \ME8 | 鏔 | 鑌 | |
| \N | 釗 | 釣 | |
| \NO | 銘 | 鉊 | |
| \P | 鉺 | 鎢 | |
| \V | 鈇 | 鈦 | 鉌 |
| \X. | 釵 | 鋅 | |

I claim:

1. An improved method of inputting Chinese characters and phrases, each of the phrases including more than two characters, each of the character including at least one radical, and each of the radical including at least one stroke, wherein 244 basic radicals for forming the characters are associated with 41 keys of a computer keyboard, comprising the following steps:

(A) Tracking stroke orders of the Chinese character, indexing the character by keying in the corresponding radicals, each of the radicals being keyed in with a code keying in one time, and completing the entry of the character with four codes at most, including a first, a second, a third and a last code, in which the steps for inputting the radicals comprising:

(1) selecting a radical covering as many strokes as possible without taking consideration of stroke orders;

(2) using at most four codes for a character while omitting the code between the third code and the last code;

(3) entering first the radical in the middle portion of a character in case the middle portion is flanked symmetrically by a left side portion and a right side portion, with the exception that the side portions are " ", " ", " " or " ";

(4) entering first a radical enclosing the remaining strokes of a character on four sides or three sides or upper left and right sides;

(5) entering a radical enclosing the remaining stroke of a character on lower left and right sides after inputting the remaining stroke, for example, " " and " ";

(6) entering directly the radicals of " " and " " if their strokes are completed before crossing by the other stroke, for example, " " and " "; otherwise, the radical of " " is keyed in alternatively, for example, " " and " ";

(7) entering the radical of " " by " " instead of " " in case the radical is crossed with other stroke, for example, " " being keyed in by " " instead of " "; and (8) entering directly the radical of " " is without taking consideration of the stroke contained therein; and (B) entering the phrases of two characters by inputting at most four codes, including the first and the last code of each character; and keying in the phrases of more than two characters by inputting at most four codes, including the first code of each of the former three characters and the last code of the last character.

2. A keyboard comprising a standard English language keyboard, wherein radicals for combining into Chinese characters are allocated to the standard keyboard as follows:

Key A specifically associated with " ", including " ", " ", " ", " " and " ";

Key B specifically associated with " " and " ", including " ", " ", " ", " " and " ";

Key C specifically associated with " " and " ", including " ", " ", " ", " ", " ", " ", " " and " ";

Key D specifically associated with " ", including " ", " " and " ";

Key E specifically associated with " " and " ", including " ";

Key F specifically associated with " ", including " ", " ", " ", " ", " " and " ";

Key G specifically associated with " ", including " ", " " and " ";

Key H specifically associated with " " and " ", including " ", " ", " ", " ", " ", " ", " ", " " and " ";

Key I specifically associated with " ", including " ";

Key J specifically associated with " ", including " ", " ", " ", " ", " " and " ";

Key K specifically associated with " " and " ", including " ", " ", " ", " ", " " and " ";

Key L specifically associated with " ", including " ", " ", " " and " ";

Key M specifically associated with " ", including " ", " " and " ";

Key N specifically associated with " " and " ", including " ", " ", " ", " " and " ";

Key O specifically associated with " ";

Key P specifically associated with " ", including " ", " ", " ", " ", " ", " ", " " and " ";

Key Q specifically associated with " " and " ", including " ", " ", " ", " " and " ";

Key R specifically associated with " " and " ", including " ", " ", " ", " ", " ", " " and " ";

Key S specifically associated with " ", including " ", " ", " ", " ", " ", " " and " ";

Key T specifically associated with " ", including " ", " ", " ", " ", " ", " " and " ";

Key U specifically associated with " ", including " ", " ", " ", " " and " ";

Key V specifically associated with " " and " ", including " ", " " and " ";

Key W specifically associated with " ", including " ", " ", " ", " ", " " and " ";

Key X specifically associated with " ", including " ", " ", " ", " ", " ", " ", " " and " ";

Key Y specifically associated with " ", including " ", " " and " ";

Key Z specifically associated with " ", including " " and " ";

Key 0 specifically associated with " ", including " ";

Key 1 specifically associated with " " and " ", including " " and " ";

Key 2 specifically associated with " ", including " ", " ", " ", " " and " ";

Key 3 specifically associated with " " and " ", including " ", " ", " " and " ";

Key 4 specifically associated with " ", including " ", " ", " ", " " and " ";

Key 5 specifically associated with " " and " ", including " ", " ", " ", " " and " ";

Key 6 specifically associated with " " and " ", including " ", " ", " ", " " and " ";

Key 7 specifically associated with " ", including " " and " ";

Key 8 specifically associated with " " and " ", including " ", " ", " " and " ";

Key 9 specifically associated with " ", including " ", " ", " ", " ", " " and " ";

Key ',' specifically associated with " " and " ", including " ", " " and " ";

Key '.' specifically associated with " " and " ", including " ", " ", " " and " ";

Key ';' specifically associated with " ", including " ", " ", " ", " " and " ";

Key '/' specifically associated with " ", including " ", " ", " " and " ";

Key ' ' specifically associated with " " and " ", including " ", " ", " " and " ".

* * * * *